(12) United States Patent
Goel

(10) Patent No.: US 7,472,080 B2
(45) Date of Patent: Dec. 30, 2008

(54) METHODS AND ASSOCIATED SYSTEMS FOR AN AIRLINE TO ENHANCE CUSTOMER EXPERIENCE AND PROVIDE OPTIONS ON FLIGHTS

(76) Inventor: Sachin Goel, 8 Olympic Ct., Walpole, MA (US) 02032

( * ) Notice: Subject to any disclaimer, the term of this patent is extended or adjusted under 35 U.S.C. 154(b) by 0 days.

(21) Appl. No.: 11/474,115

(22) Filed: Jun. 23, 2006

(65) Prior Publication Data

US 2007/0244766 A1    Oct. 18, 2007

Related U.S. Application Data

(63) Continuation-in-part of application No. 10/973,802, filed on Oct. 25, 2004, now Pat. No. 7,418,409.

(60) Provisional application No. 60/514,248, filed on Oct. 24, 2003.

(51) Int. Cl.
G06Q 30/00 (2006.01)
G06F 17/30 (2006.01)

(52) U.S. Cl. .................. 705/26; 705/5; 705/6; 705/27

(58) Field of Classification Search .................. 705/1, 705/5–6, 26–27
See application file for complete search history.

(56) References Cited

U.S. PATENT DOCUMENTS

| | | | |
|---|---|---|---|
| 4,775,936 A | 10/1988 | Jung | |
| 4,931,932 A | 6/1990 | Dalnekoff et al. | |
| 5,627,973 A | 5/1997 | Armstrong et al. | |
| 5,765,142 A | 6/1998 | Allred et al. | |
| 5,797,127 A | 8/1998 | Walker et al. | |
| 5,890,133 A | 3/1999 | Ernst | |
| 5,897,620 A * | 4/1999 | Walker et al. | 705/5 |
| 5,962,829 A | 10/1999 | Yoshinaga | |
| 5,963,910 A | 10/1999 | Ulwick | |
| 6,014,647 A | 1/2000 | Nizzari et al. | |
| 6,041,308 A | 3/2000 | Walker et al. | |
| 6,107,932 A | 8/2000 | Walker et al. | |

(Continued)

FOREIGN PATENT DOCUMENTS

GB     2366403 A   *   6/2002

(Continued)

OTHER PUBLICATIONS www.expedia.com. May 19, 2001. Obtained on Sep. 26, 2007 from www.Archive.org.*

(Continued)

*Primary Examiner*—Jeffrey A. Smith
*Assistant Examiner*—William J. Allen
(74) *Attorney, Agent, or Firm*—Wolf, Greenfield & Sacks, P.C.

(57) ABSTRACT

A computer-implemented system and method for an airline to enhance customers' experience. A computer-implemented service is operated that delivers to a customer an option to fly on up to n of m selected flights, where m and n are whole numbers and n<m. Information is recorded in a data store, pertaining to said option. In addition, a system is operated to define each of the n chosen flights, whereby after each of the n chosen flights is defined, the customer can fly on said chosen flight. The information pertaining to said defined flights is recorded in a data store.

34 Claims, 75 Drawing Sheets

U.S. PATENT DOCUMENTS

| | | |
|---|---|---|
| 6,115,691 A | 9/2000 | Ulwick |
| 6,119,094 A | 9/2000 | Lynch et al. |
| 6,119,933 A | 9/2000 | Wong et al. |
| 6,161,051 A | 12/2000 | Hafemann et al. |
| 6,236,977 B1 | 5/2001 | Verba et al. |
| 6,263,315 B1 | 7/2001 | Talluri |
| 6,295,521 B1 | 9/2001 | DeMarcken et al. |
| 6,304,850 B1* | 10/2001 | Keller et al. ............... 705/5 |
| 6,307,572 B1 | 10/2001 | DeMarcken et al. |
| 6,314,361 B1 | 11/2001 | Yu et al. |
| 6,377,932 B1 | 4/2002 | DeMarcken |
| 6,442,537 B1 | 8/2002 | Karch |
| 6,477,520 B1 | 11/2002 | Malaviya et al. |
| 6,496,568 B1 | 12/2002 | Nelson |
| 6,567,786 B1 | 5/2003 | Bibelnieks et al. |
| 6,721,714 B1 | 4/2004 | Baiada et al. |
| 6,757,689 B2 | 6/2004 | Battas et al. |
| 6,760,632 B1 | 7/2004 | Heching et al. |
| 6,778,660 B2 | 8/2004 | Fromm |
| 6,895,381 B1 | 5/2005 | Selby |
| 6,974,079 B1 | 12/2005 | Strothmann et al. |
| 7,050,987 B2 | 5/2006 | Lettovsky et al. |
| 7,069,309 B1 | 6/2006 | Dodrill et al. |
| 7,249,062 B2* | 7/2007 | Norins et al. ............... 705/26 |
| 2001/0034686 A1 | 10/2001 | Eder |
| 2001/0037243 A1* | 11/2001 | Rouston et al. ............ 705/14 |
| 2001/0051885 A1* | 12/2001 | Nardulli et al. ............ 705/6 |
| 2002/0059283 A1 | 5/2002 | Shapiro et al. |
| 2002/0065696 A1 | 5/2002 | Hack et al. |
| 2002/0065699 A1 | 5/2002 | Talluri |
| 2002/0095328 A1 | 7/2002 | Swart et al. |
| 2002/0194117 A1 | 12/2002 | Nabe et al. |
| 2002/0198775 A1 | 12/2002 | Ryan |
| 2003/0033155 A1 | 2/2003 | Peerson et al. |
| 2003/0036928 A1 | 2/2003 | Keinsberg et al. |
| 2003/0046130 A1 | 3/2003 | Golightly et al. |
| 2003/0050846 A1 | 3/2003 | Rodon |
| 2003/0065581 A1* | 4/2003 | Takada ............... 705/26 |
| 2003/0069780 A1 | 4/2003 | Hailwood et al. |
| 2003/0074239 A1 | 4/2003 | Hoffman et al. |
| 2003/0074247 A1 | 4/2003 | Dick et al. |
| 2003/0074249 A1 | 4/2003 | Hoffman et al. |
| 2003/0074250 A1 | 4/2003 | Burk |
| 2003/0074262 A1 | 4/2003 | Hoffman et al. |
| 2003/0074263 A1 | 4/2003 | Hoffman et al. |
| 2003/0074264 A1 | 4/2003 | Hoffman |
| 2003/0074281 A1 | 4/2003 | Hoffman et al. |
| 2003/0074285 A1 | 4/2003 | Hoffman et al. |
| 2003/0074355 A1 | 4/2003 | Menniger et al. |
| 2003/0074360 A1 | 4/2003 | Chen et al. |
| 2003/0078787 A1 | 4/2003 | Hoffman et al. |
| 2003/0078818 A1 | 4/2003 | Hoffman et al. |
| 2003/0078827 A1 | 4/2003 | Hoffman |
| 2003/0078845 A1 | 4/2003 | Hoffman et al. |
| 2003/0078846 A1 | 4/2003 | Burk et al. |
| 2003/0078860 A1 | 4/2003 | Hoffman et al. |
| 2003/0078861 A1 | 4/2003 | Hoffman et al. |
| 2003/0144867 A1 | 7/2003 | Campbell et al. |
| 2003/0158771 A1 | 8/2003 | Shen et al. |
| 2003/0187685 A1 | 10/2003 | Bakker |
| 2004/0015386 A1 | 1/2004 | Abe et al. |
| 2004/0039613 A1 | 2/2004 | Maycotte et al. |
| 2004/0039614 A1 | 2/2004 | Maycotte et al. |
| 2004/0073496 A1 | 4/2004 | Cohen |
| 2004/0083113 A1 | 4/2004 | Cao et al. |
| 2004/0158536 A1 | 8/2004 | Kowal et al. |
| 2004/0172319 A1 | 9/2004 | Eder |
| 2004/0230451 A1 | 11/2004 | Figa |
| 2004/0267580 A1 | 12/2004 | Becker |
| 2005/0033616 A1 | 2/2005 | Vavul et al. |
| 2005/0071245 A1* | 3/2005 | Norins et al. ............... 705/26 |
| 2005/0216317 A1 | 9/2005 | Medellin et al. |
| 2006/0106655 A1 | 5/2006 | Lettovsky et al. |

FOREIGN PATENT DOCUMENTS

| | | |
|---|---|---|
| WO | WO 00/73930 A2 | 12/2000 |
| WO | WO 00/73957 A2 | 12/2000 |
| WO | WO 00/73958 A2 | 12/2000 |
| WO | WO 0073930 A2 | 12/2000 |
| WO | WO 0073957 A2 | 12/2000 |
| WO | WO 0073958 | 12/2000 |
| WO | WO 0073958 A2 | 12/2000 |
| WO | WO 01/57771 A1 | 1/2001 |
| WO | WO 0157771 A1 | 1/2001 |
| WO | WO 01/18722 A1 | 3/2001 |
| WO | WO 02/079901 A2 | 10/2002 |
| WO | WO 02079901 A2 | 10/2002 |
| WO | WO 03/019448 A2 | 3/2003 |
| WO | WO 03019448 | 3/2003 |
| WO | WO 03019448 A2 | 3/2003 |
| WO | WO 03/054760 A2 | 7/2003 |
| WO | WO 03/102867 A1 | 12/2003 |
| WO | WO 03102867 A1 | 12/2003 |
| WO | WO 2004/036364 A2 | 4/2004 |

OTHER PUBLICATIONS

"A New Twist in Airline Travel: Surcharges Debut for Certain Ticket Types". Grant, Elaine X. Travel Agent, v 293, n 11, p. 135(1) Jan. 25, 1999. [recovered from Dialog Database on Dec. 6, 2008].*

"Booked on the 6.40, the 7.00, the 7,45 . . . ".UK: Drawbacks of Multiple Bookings Assessed Financial Times (FT) Mar. 8, 1999 p. 15. [recovered from Dialog Database on Dec. 6, 2008].*

Chatwin, "Multiperiod Airline Overbooking With a Single Fare Class," *Operations Research,* 46:6, 805-819p (1998).

Chatwin, "Optimal dynamic pricing of perishable products with stochastic demand and a finite set of prices," *Elsevir Science B.V.—European Journal of Operational Research;* 125, 149-174 (2000).

Compton, "Many Possibilities, One Price," *Customer Relationship Management,*8:8, 16-17 (2004).

Elmaghraby, "Dynamic Pricing in the Presence of Inventory Considerations: Research Overview, Current Practices and Future Directions," *Management Science,* 49:10, 1287-1309 (2003).

Ha et al., "Problem-Focused Incremental Elicitation of Multi-Attribute Utility Models," http://www.cs.uwm.edu/~vu/papers/uai97.pdf, 1-8.

Margulius, "Priced to sell . . . to you," Infoworld San Mataeo, 24:7, 47-48 http://www.infoworld.com/archives/emailPrint.jsp (2002).

Rios-Insua et al., Sensitivity Analysis in an Additive Multi-Attribute Utility Decision Support System, http://www.ciemat.es/convocatorias/eventos/samo2001/esp-riosinsua.pdf, 1-1.

Roth, et al., "Multi-Attribute Utility Analysis" http://ms11.mit.edu/maua_paper.pdf, 1-16.

Elmaghraby: Dynamic Pricing in the Presence of Inventory Considerations: Research Overview, Current Practices and Future Directions, Management Science 2003 INFORMS vol. 49, No. 10, Oct. 2003, pp. 1287-1309.

Jason Compton: Many Possibilities, One Price, Customer Relationship management Medford: Aug. 2004. vol. 8. Iss. 8, p. 16-17.

David L Margulius: Priced to sell . . . to you, Infoworld San Mataco: Feb. 18, 2002, vol. 24, Iss. 7, p. 47-48.

Optimal dynamic pricing of perishable products with stochastic demand and a finite set of prices: European Journal of Operational Research; Aug. 16, 2000, vol. 125 Isue 1, p. 149, 26p, 3 charts, 5 graphs.

Multiperiod airline overbooking with a single fare class., Operations Research; Nov./Dc98, vol. 46 Issue 6, p. 805, 15p.

Multi-Attribute Utility Analysis: R. Roth, F. Field, J. Clark; http://ms11.mit.edu/maua_paper.pdf.

U.S. Appl. No. 09/431,699, filed Nov. 1, 1999, DeMarcken.

* cited by examiner

Fig. 18 (Prior Art)

Itinerary Summary

| Alternate Flight Option | Upgrade Ticket Option | Smooth Travel Service |
|---|---|---|
| Know more...  Buy AFO | Know more...  Buy UTO | Know more...  Buy STS |

Your Itinerary

Onward Journey

| | Flight | | Departs | | Arrives | |
|---|---|---|---|---|---|---|
| Original Flight | Alpha 993 | Coach (U) | BOS | 8:55am May 2 | ORD | 11:57am May 2 |
| | Alpha 892 | Coach (U) | ORD | 1:00pm May 2 | ATL | 3:07pm May 2 |

Return Journey

| | Flight | | Departs | | Arrives | |
|---|---|---|---|---|---|---|
| Original Flight | Alpha 964 | Coach (U) | ATL | 9:55am May 7 | ORD | 11:50am May 7 |
| | Alpha 857 | Coach (U) | ORD | 1:00pm May 7 | BOS | 4:07pm May 7 |

Fig. 19

Choose an STS Option

Smooth Travel Service Options

| Serial No. | Smooth Travel Service Options | Description | Option Costs | Select One |
|---|---|---|---|---|
| 1 | Platinum | Get automatic rebooking to the next earliest available flight that suits your itinerary<br>- Includes all cabins on Alpha Airline flights<br>- Includes Coach cabin on other airline flights | $5 | ○ |
| 2 | Gold | Get automatic rebooking to the next earliest available Alpha Airline flight<br>- Includes all cabins | $3 | ○ |
| 3 | Silver | Get automatic rebooking to the next best available Alpha Airline flight<br>- Includes Coach cabin | $0 | ⊙ |

Optional Smooth Travel Preferences

Fig. A1
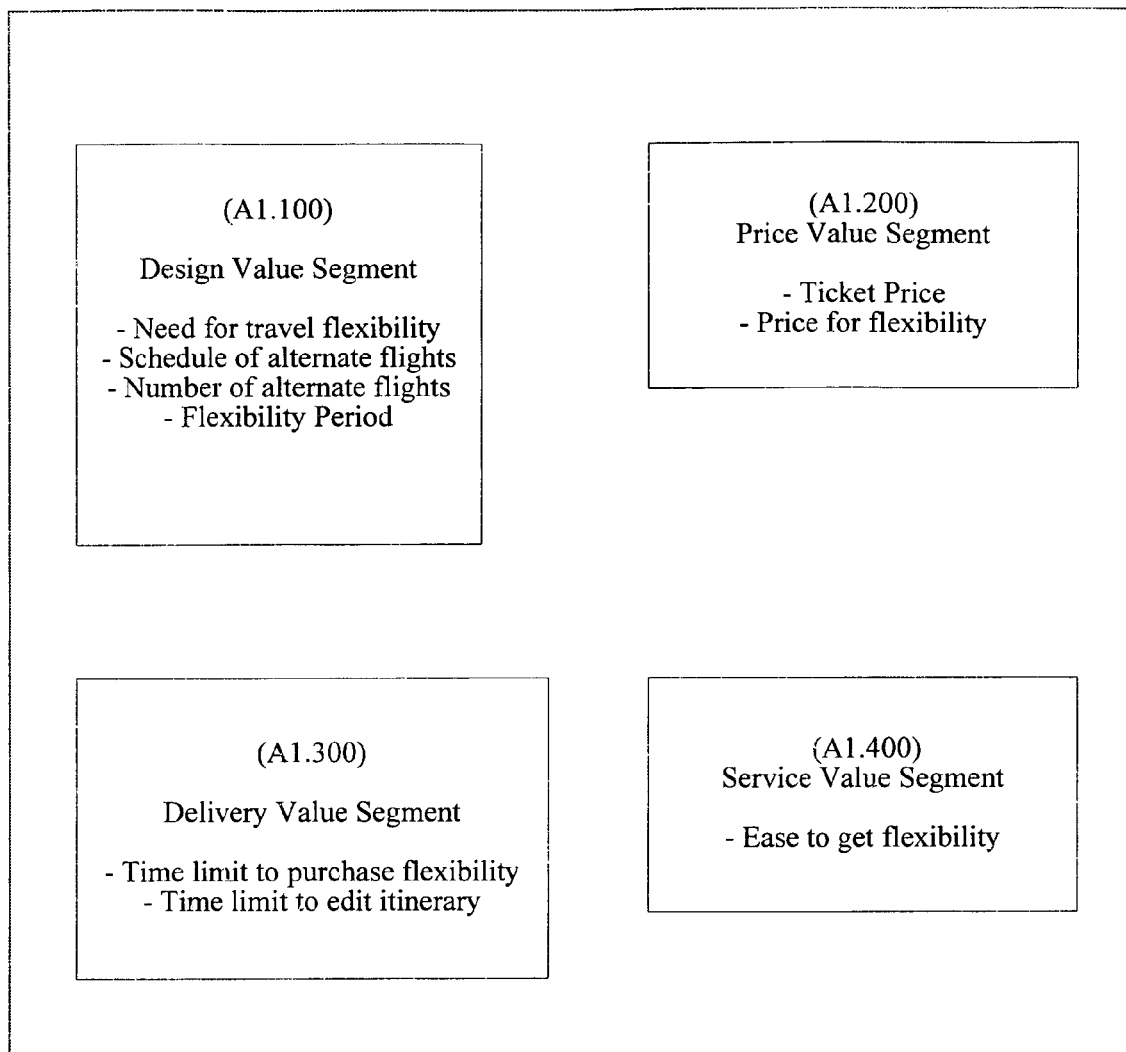

Fig. A2
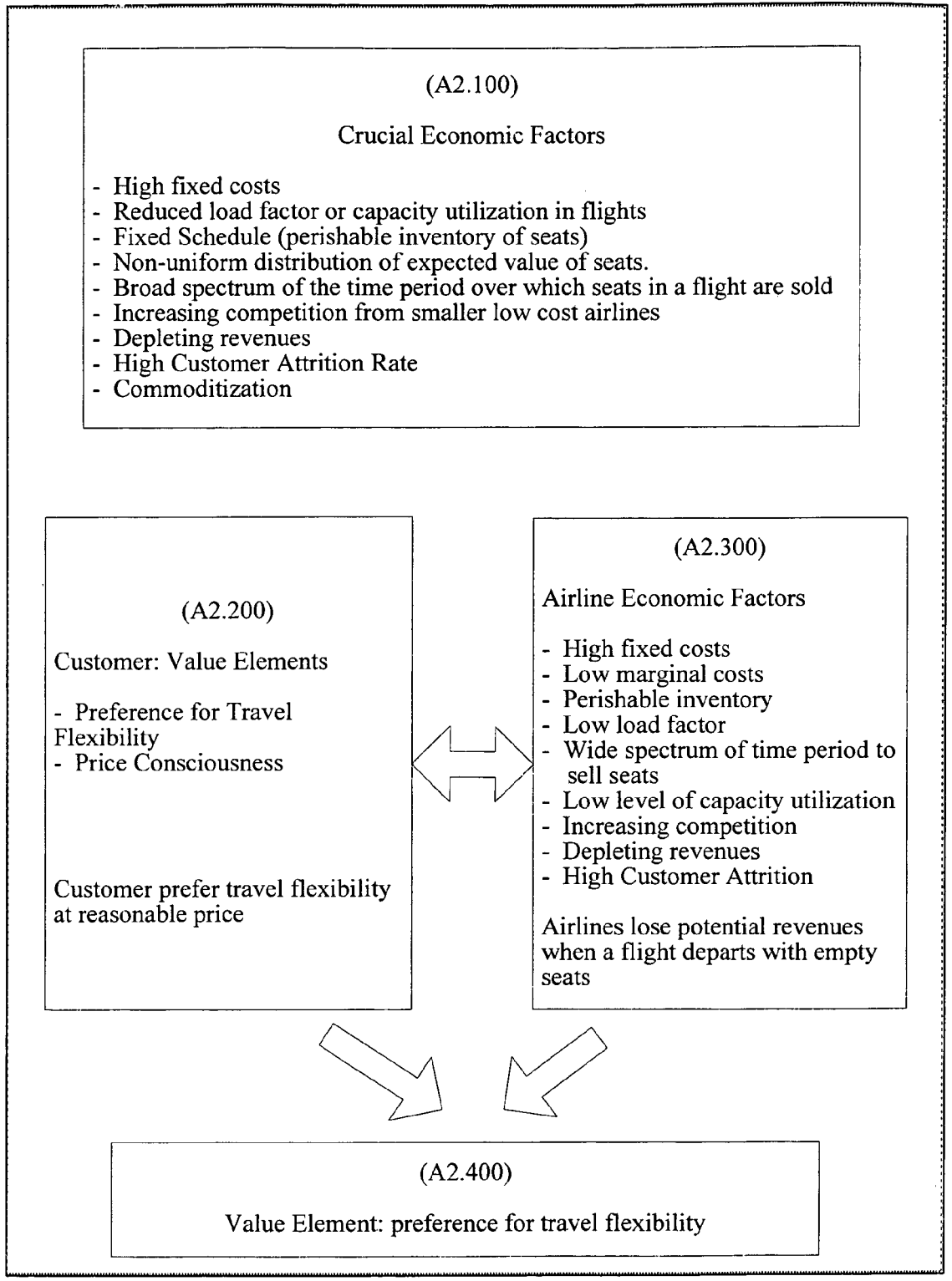

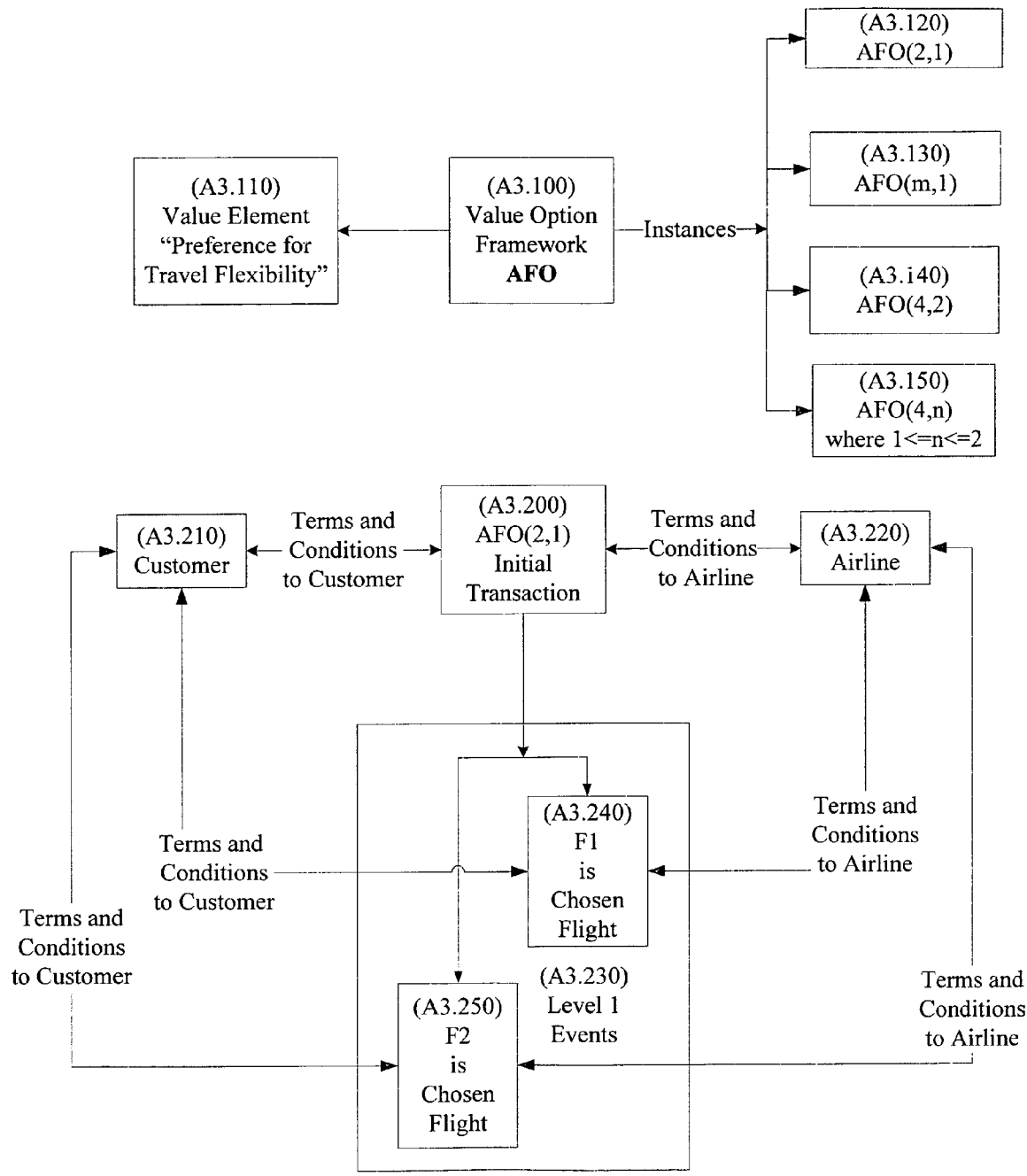
Fig. A3

Fig. A4

(A4.100) Flight          F1

| Departs | Arrives | Flight | Cabin |
|---|---|---|---|
| BOS | ATL | Alpha 661 | Coach |
| 23rd May | 23rd May | 0 Stops | |
| 2:00am | 5:00pm | | |

(A4.200) Flight          F2

| Departs | Arrives | Flight | Cabin |
|---|---|---|---|
| BOS | ATL | Alpha 427 | Coach |
| 25th May | 25th May | 0 Stops | |
| 4:30pm | 7:30pm | | |

(A4.300)

| | (1) | (2) |
|---|---|---|
| (1) | Ticket Purchase Date Time | 14th April 5:24 pm |
| (2) | AFO Purchase Date Time | 14th April 5:27 pm |
| (3) | Ticket Price Paid | $500 |
| (4) | AFO Price Paid | $45 |

Fig. A5

(A5.100)
| | |
|---|---|
| Default Flight | F1 |
| Notify Deadline | 7 DTD (of F1) |
| Exercise Price: | None |
| Default Exercise Price | None |

(A5.200)

Default Flight    F1
Default Exercise Price    $20
Notify Deadline    7 DTD (of F1)

|     | (1) Chosen Flight | (2) Exercise Price |
|-----|-------------------|--------------------|
| (2) | F1                | $10                |
| (3) | F2                | $20                |

(A5.300)

Default Flight    F1
Default Exercise Price    $40

|     | (1)                        | (2) | (3) | (4) | (5) |
|-----|----------------------------|-----|-----|-----|-----|
| (1) | Notify Deadline (DTD of F1)| 30  | 7   | 3   | 1   |
| (2) | Exercise Price             | $0  | $20 | $30 | $40 |

(A5.400)

Default Flight    F2
Default Exercise Price    $50

|     | (1)                                          |     | (2) | (3) | (4) | (5) |
|-----|----------------------------------------------|-----|-----|-----|-----|-----|
| (1) | Notify Deadline (DTD of F1)                  |     | 30  | 7   | 3   | 1   |
| (2) | Exercise price as a function of Chosen Flight | F1  | $0  | $20 | $30 | $40 |
| (3) |                                              | F2  | $10 | $25 | $35 | $50 |

Fig. A6

(A6.100) Flight      F1

| Departs | Arrives | Flight | Cabin |
|---|---|---|---|
| BOS<br>22nd May<br>11.00am | ATL<br>22nd May<br>2.00pm | Alpha 529<br>0 Stops | Coach |

(A6.200) Flight      F2

| Departs | Arrives | Flight | Cabin |
|---|---|---|---|
| BOS<br>23rd May<br>2.00pm | ATL<br>23rd May<br>5.00pm | Alpha 661<br>0 Stops | Coach |

(A6.300) Flight      F3

| Departs | Arrives | Flight | Cabin |
|---|---|---|---|
| BOS<br>25th May<br>4:30pm | ATL<br>25th May<br>7:30pm | Alpha 427<br>0 Stops | Coach |

(A6.400) Flight      F4

| Departs | Arrives | Flight | Cabin |
|---|---|---|---|
| BOS<br>28th May<br>4:30pm | ATL<br>28th May<br>7:30pm | Alpha 660<br>0 Stops | Coach |

(A6.500) Flight Departure Summary

| F1 | F2 | F3 | F4 |
|---|---|---|---|
| 22nd May<br>11.00am | 23rd May<br>2.00pm | 25th May<br>4:30pm | 28th May<br>7:30pm |

| | (1) | (2) |
|---|---|---|
| (1) | Ticket Purchase Date Time | 14th April 5:24pm |
| (2) | AFO Purchase Date Time | 14th April 5:27pm |
| (3) | Ticket Price Paid | $1,000 |
| (4) | AFO Price Paid | $125 |

(A7.200)

Default Flights      F1 and F3
Default Exercise Price      $50

| | | | (1) A | (2) B | (3) C | (4) D |
|---|---|---|---|---|---|---|
| (1) | Notify Deadlines | | A | B | C | D |
| (2) | Exercise Price as | F1 and F3 | $0 | $20 | $30 | $40 |
| (3) | function of Chosen Flight | F2 and F4 | $10 | $25 | $35 | $50 |

(A7.300)

Default Flights      F1      F4
Default Exercise Price      $20      $55

| | | | (1) A | (2) B | (3) C | (4) D |
|---|---|---|---|---|---|---|
| (1) | Notify Deadlines | | A | B | C | D |
| (2) | | F1 | $0 | $20 | N.A. | N.A. |
| (3) | Exercise Price as | F2 | $10 | $25 | $35 | $45 |
| (4) | function of Chosen Flight | F3 | $0 | $20 | $30 | $40 |
| (5) | | F4 | $5 | $15 | $35 | $55 |

Fig. A8

| (A8.100) | |
|---|---|
| *(1)* | *(2)* |
| (1) Ticket Purchase Date Time | 14th April 5:24pm |
| (2) AFO Purchase Date Time | 14th April 5:27pm |
| (3) Ticket Price Paid | $500 |
| (4) AFO Price Paid | $150 |

(A8.200)
Default Flights          F2
Default Exercise Price   $20

| | | | *(1)* A | *(2)* B | *(3)* C | *(4)* D |
|---|---|---|---|---|---|---|
| *(1)* | Notify Deadlines | | A | B | C | D |
| *(2)* | (A8.210) | F1 | $0 | $20 | N.A. | N.A. |
| *(3)* | Exercise Price | F2 | $10 | $25 | $35 | $45 |
| *(4)* | (when selecting the | F3 | $0 | $20 | $30 | $40 |
| *(5)* | First Chosen Flight) | F4 | $5 | $15 | $35 | $55 |
| *(6)* | (A8.220) | F1 | $505 | $520 | N.A. | N.A. |
| *(7)* | Exercise Price | F2 | $515 | $525 | $540 | $555 |
| *(8)* | (when selecting the | F3 | $505 | $520 | $535 | $550 |
| *(9)* | Second Chosen Flight) | F4 | $510 | $515 | $540 | $565 |

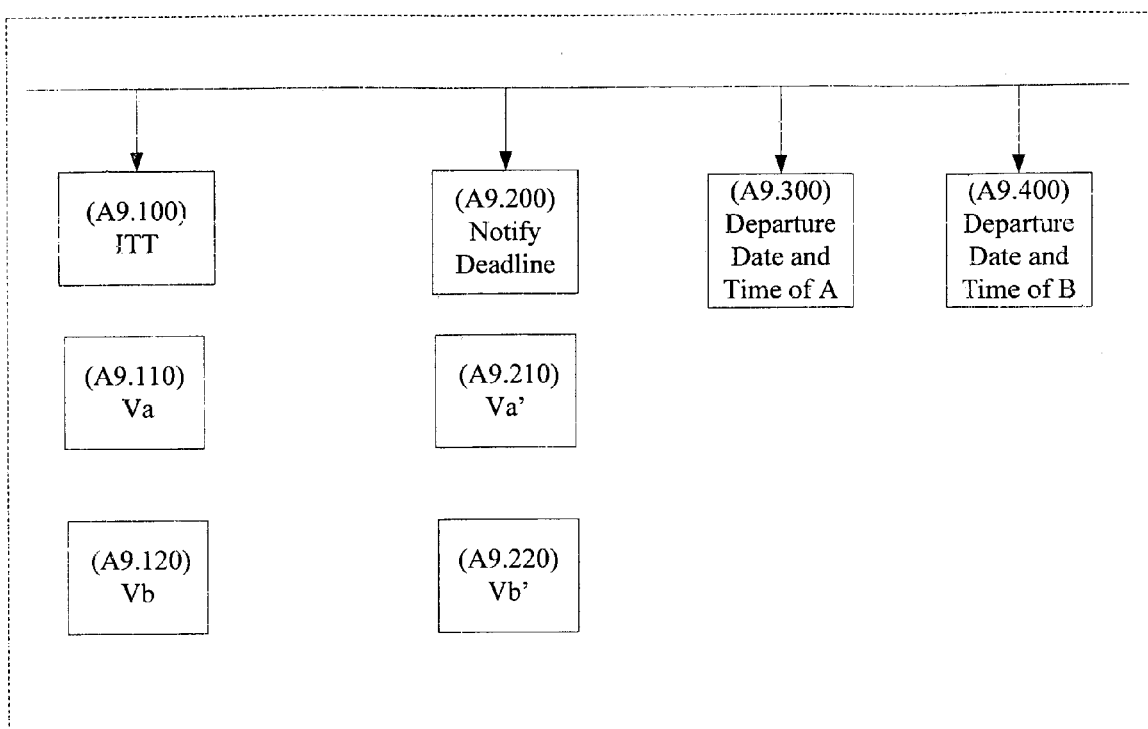
Fig. A9

Fig. A10
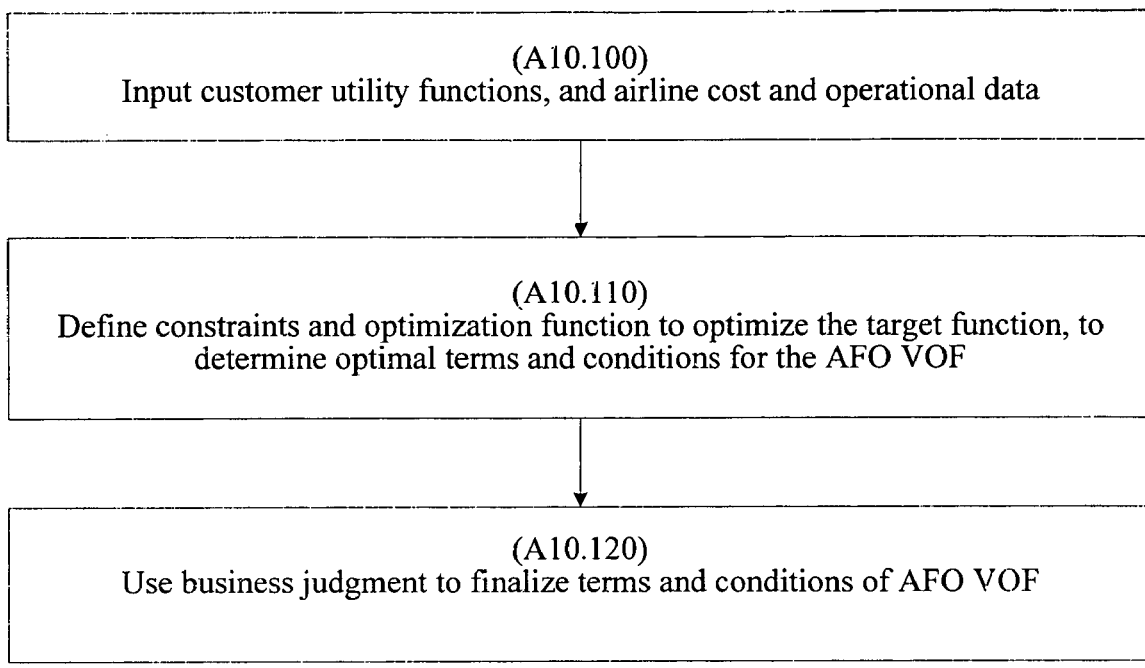

Fig. A11
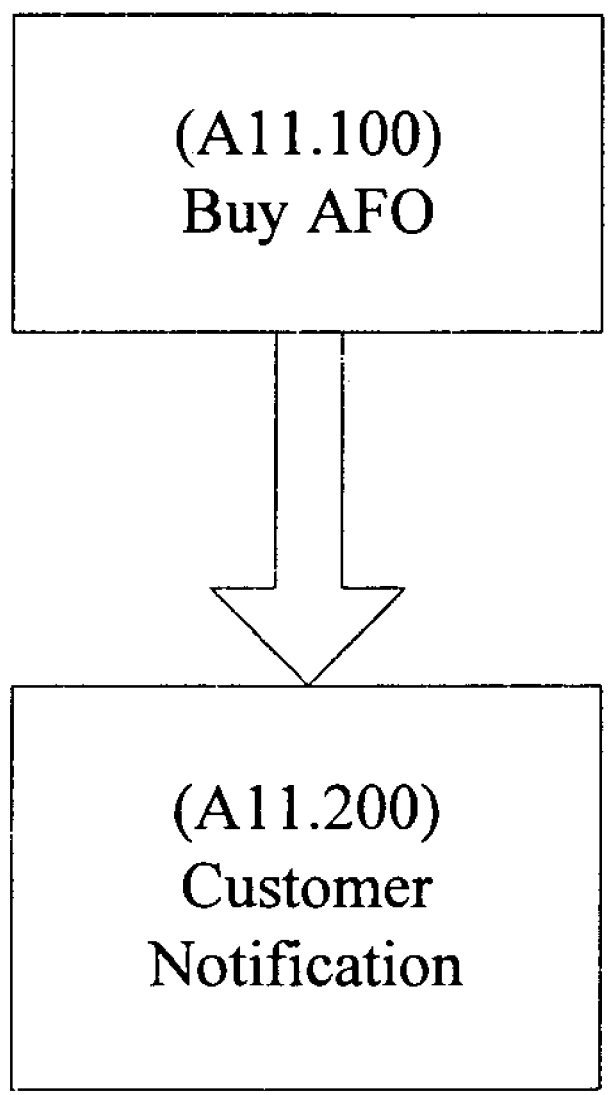

Fig. A12

AFO Itinerary 1 (A12.100)

Onward journey

| Flight | Departs | Arrives |
|---|---|---|
| Alpha993 Coach(U) | BOS 02 May 8:55am | ATL 02 May 11:57am |
| Alpha998 Coach(U) | ATL 02 May 1:00pm | LAX 02 May 3:07pm |

Return journey

| Flight | Departs | Arrives |
|---|---|---|
| Alpha893 Coach(U) | LAX 06 May 8:55am | BOS 06 May 12:15pm |

AFO Itinerary 2 (A12.200)

Onward journey

| Flight | Departs | Arrives |
|---|---|---|
| Alpha963 Coach(U) | BOS 04 May 8:55am | ATL 04 May 11:57am |
| Alpha969 Coach(U) | ATL 04 May 2:00pm | LAX 04 May 4:07pm |

Return journey

| Flight | Departs | Arrives |
|---|---|---|
| Alpha793 Coach(U) | LAX 07 May 9:55am | BOS 07 May 1:15pm |

Fig. A13

Onward journey (A13.100)

| (A13.110) Initial Flight Segment | Flight | Departs | Arrives |
|---|---|---|---|
| | Alpha567 Coach(U) | BOS 02 May 8:55am | ATL 02 May 11:57am |
| | Alpha678 Coach(U) | ATL 02 May 1:00pm | LAX 02 May 3:07pm |

| (A13.120) Option Flight Segment | Flight | Departs | Arrives |
|---|---|---|---|
| | Alpha123 Coach(U) | BOS 03 May 8:55am | LAX 03 May 12:07pm |

Return journey (A13.200)

| (A13.210) Initial Flight Segment | Flight | Departs | Arrives |
|---|---|---|---|
| | Alpha233 Coach(U) | LAX 06 May 8:55am | BOS 06 May 6:15pm |

Fig. A14

Onward journey (A14.100)

Leg 1

| (A14.110) Initial Flight Leg | Flight | Departs | Arrives |
|---|---|---|---|
| | Alpha493 Coach(U) | BOS 02 May 8:55am | ATL 02 May 11:57am |

Leg 2 (A14.200)

| (A14.210) Initial Flight Leg | Flight | Departs | Arrives |
|---|---|---|---|
| | Alpha398 Coach(U) | ATL 02 May 1:00pm | LAX 02 May 3:07pm |

| (A14.220) Option Flight Leg | Flight | Departs | Arrives |
|---|---|---|---|
| | Alpha253 Coach(U) | ATL 02 May 6:00pm | LAX 02 May 8:07pm |

Return journey (A14.300)

Leg1

| (A14.310) Initial Flight Leg | Flight | Departs | Arrives |
|---|---|---|---|
| | Alpha343 Coach(U) | LAX 06 May 8:55am | BOS 06 May 6:15pm |

Fig. A15

AFO Reservation

Search    Select AFO    Payment    Confirm

Your Itinerary

Onward Journey

| | Flight | Departs | | Arrives | | Enter Input to search for AFO flights |
|---|---|---|---|---|---|---|
| Original Flight | Alpha 993 Coach (U) | BOS | 8:55am May 2 | ORD | 11:57am May 2 | From BOS    Depart On [May ▼] [1 ▼] |
| | Alpha 892 Coach (U) | ORD | 1:00pm May 2 | ATL | 3:07pm May 2 | To [ATL]    +/- days [+/- 0days ▼] <br> Stops [1 ▼]    Depart Time [morning ▼] |

( ▶ Search AFO Flights )

Return Journey

| | Flight | Departs | | Arrives | | |
|---|---|---|---|---|---|---|
| Original Flight | Alpha 964 Coach (U) | ATL | 9:55am May 7 | ORD | 11:50am May 7 | Click here to Get AFO Flight for Return Journey |
| | Alpha 857 Coach (U) | ORD | 1:00pm May 7 | BOS | 4:07pm May 7 | |

Fig. A16

AFO Reservation

Search    Select AFO    Payment    Confirm

Your Itinerary

Onward Journey

| | Flight | Departs | | Arrives | | Enter Input to search for AFO flights | | | |
|---|---|---|---|---|---|---|---|---|---|
| Original Flight | Alpha 993 Coach (U) | BOS | 8:55am May 2 | ORD | 11:57am May 2 | From | BOS | Depart On | May ▼ 1 ▼ |
| | Alpha 892 Coach (U) | ORD | 1:00pm May 2 | ATL | 3:07pm May 2 | To Stops | ATL 1 ▼ | +/- days Depart Time | +/- 0days ▼ morning ▼ |

▶ Search AFO Flights

Return Journey

| | Flight | Departs | | Arrives | | |
|---|---|---|---|---|---|---|
| Original Flight | Alpha 964 Coach (U) | ATL | 9:55am May 7 | ORD | 11:50am May 7 | Click here to Get AFO Flight for Return Journey |
| | Alpha 857 Coach (U) | ORD | 1:00pm May 7 | BOS | 4:07pm May 7 | |

Select AFO Flight for Onward Journey                                        *price per person includes taxes and fees

| AFO Flight | Departs | Arrives | AFO Notify Deadline / AFO Price* |
|---|---|---|---|
| Alpha 674/625 Stop 1 | 9:00am 1 May BOS | 3:07pm 1 May ATL | Notify Deadline<br>April 28 6:00pm $25 Select — April 30 11:00am $50 Select — May 1 9:00 am AFO Flight Departs — May 2 8:55 am Original Flight Departs |
| Alpha 443 Nonstop | 10:00am 1 May BOS | 1:00pm 1 May ATL | Notify Deadline<br>April 28 6:00pm $25 Select — April 30 8:00am $45 Select — May 1 10:00 am AFO Flight Departs — May 2 8:55 am Original Flight Departs |
| Alpha 333/369 Stop 1 | 11:00am 1 May BOS | 7:05pm 1 May ATL | Notify Deadline<br>April 28 6:00pm $30 Select — April 30 8:00am $40 Select — May 1 11:00 am AFO Flight Departs — May 2 8:55 am Original Flight Departs |

Fig. A17

AFO Reservation

Search    Select AFO    Payment    Confirm

Your Itinerary (Includes AFO Flight on Onward Journey)

Onward Journey          See Details

|  | Flight | Departs | | Arrives | | AFO Summary | |
| --- | --- | --- | --- | --- | --- | --- | --- |
| Original Flight | Alpha 993 Coach (U) | BOS | 8:55am May 2 | ORD | 11:57am May 2 | Select Your *Chosen Flight* By Apr 30 11:00am | AFO Price $50 |
|  | Alpha 892 Coach (U) | ORD | 1:00pm May 2 | ATL | 3:07pm May 2 | If you don't Select, your *Chosen Flight* will be | Original Flight ▼ |
| AFO Flight | Alpha 674 Coach (U) | BOS | 9:00am May 1 | ORD | 11:57am May 1 | Edit AFO Deadline/Price ▼ | |
|  | Alpha 625 Coach (U) | ORD | 1:00pm May 1 | ATL | 3:07pm May 1 | ▶ Remove AFO Flight    ▶ Change AFO Flight | |

Return Journey

|  | Flight | Departs | | Arrives | | Enter Input to search for AFO flights | | | |
| --- | --- | --- | --- | --- | --- | --- | --- | --- | --- |
| Original Flight | Alpha 964 Coach (U) | ATL | 9:55am May 7 | ORD | 11:50am May 7 | From | ATL | Depart On | 05/07 |
|  | Alpha 857 Coach (U) | ORD | 1:00pm May 7 | BOS | 4:07pm May 7 | To Stops | BOS / 1 ▼ | +/- days / Depart Time | +/- 0 days ▼ / morning ▼ |

▶ Search AFO Flights

▶ Save & Purchase

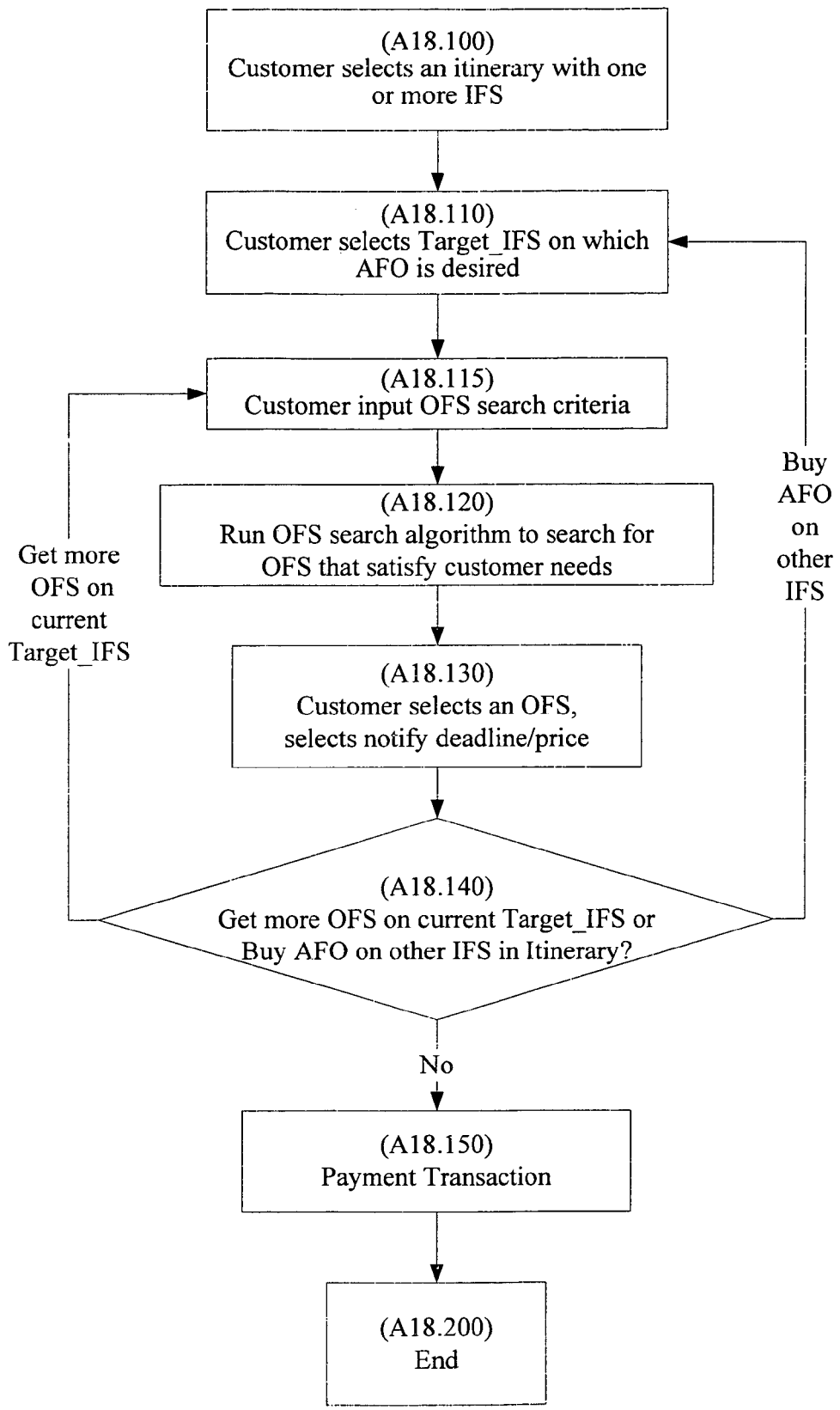
Fig. A18

Fig. A19
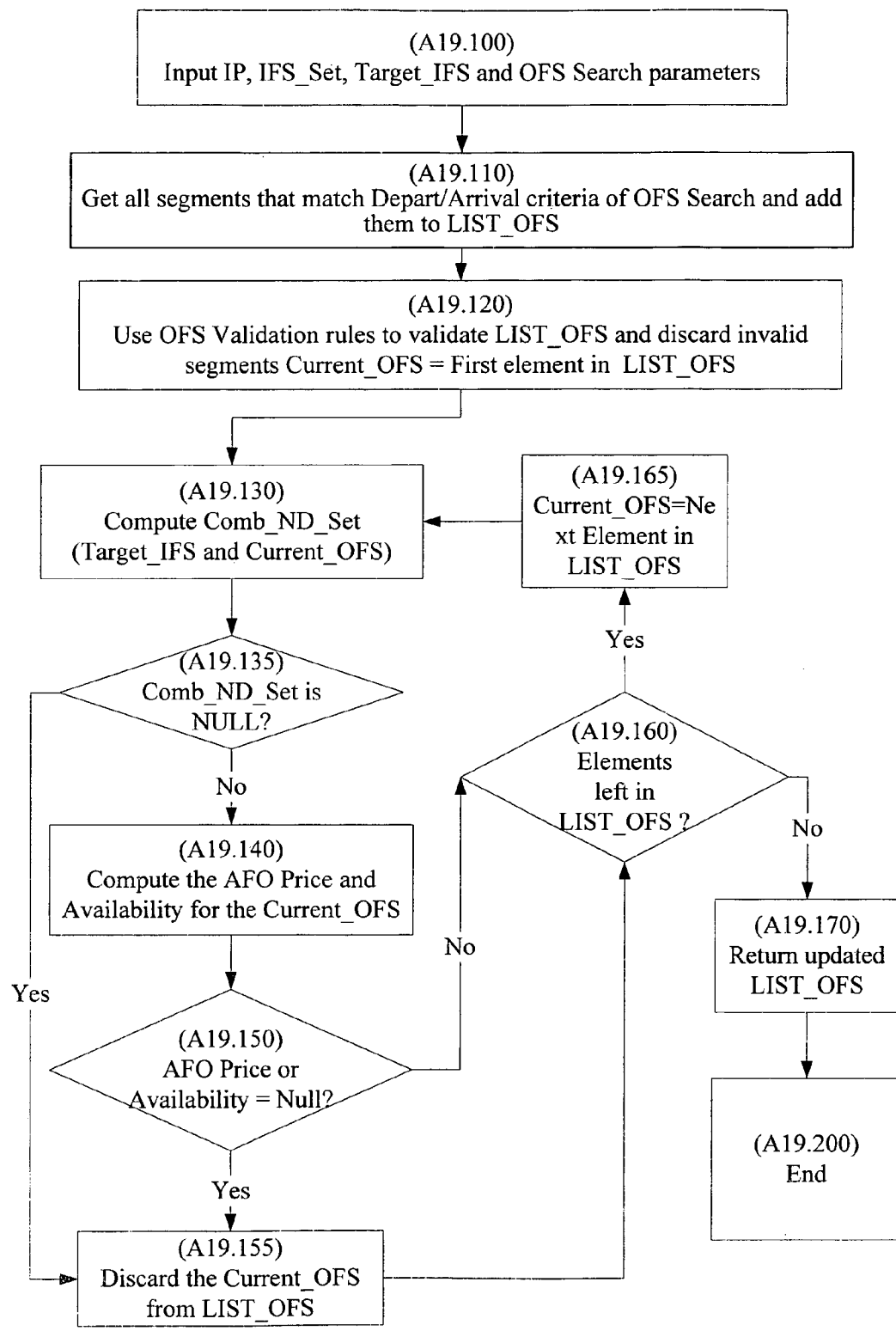

Fig. A20
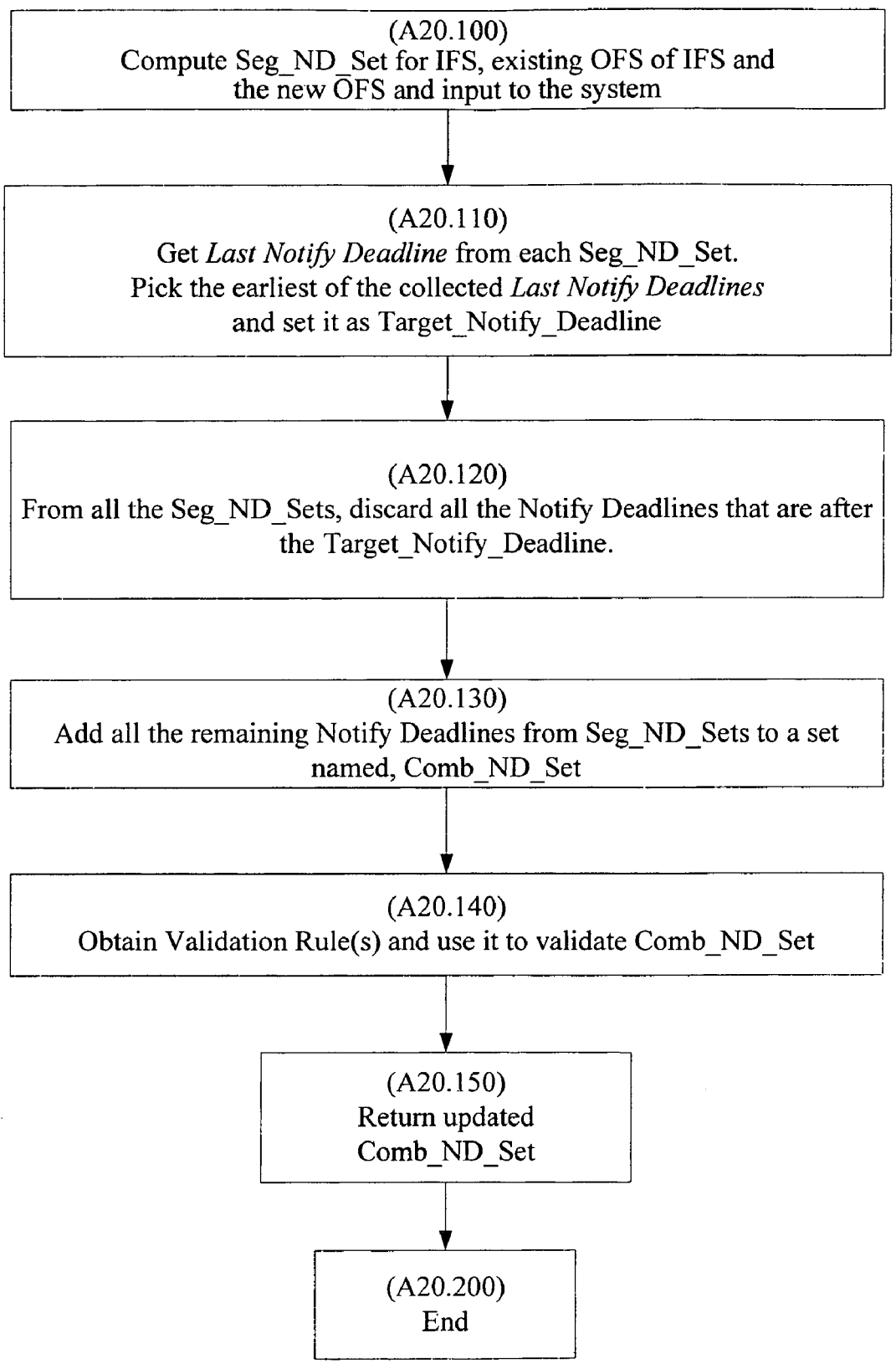

Fig. A21
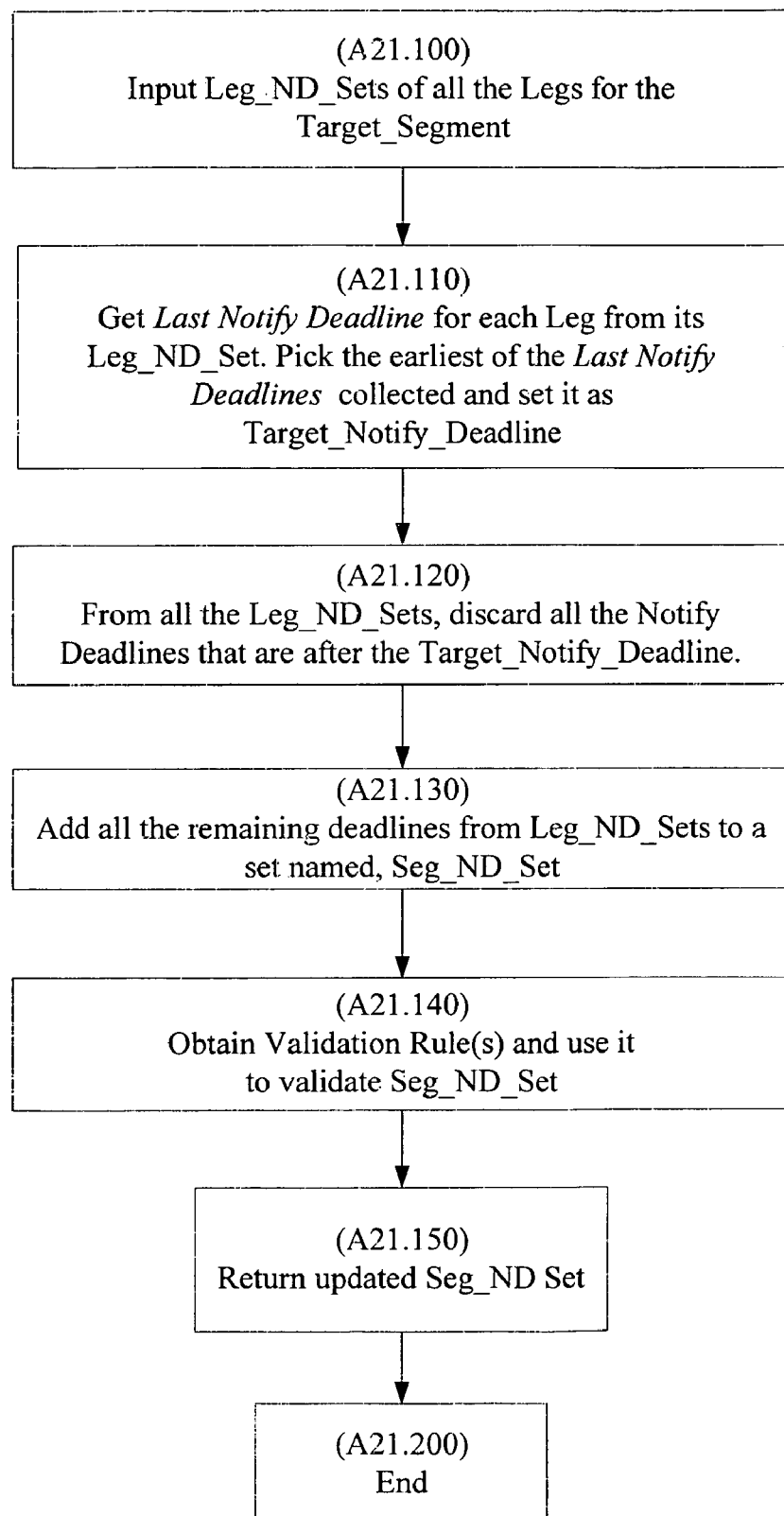

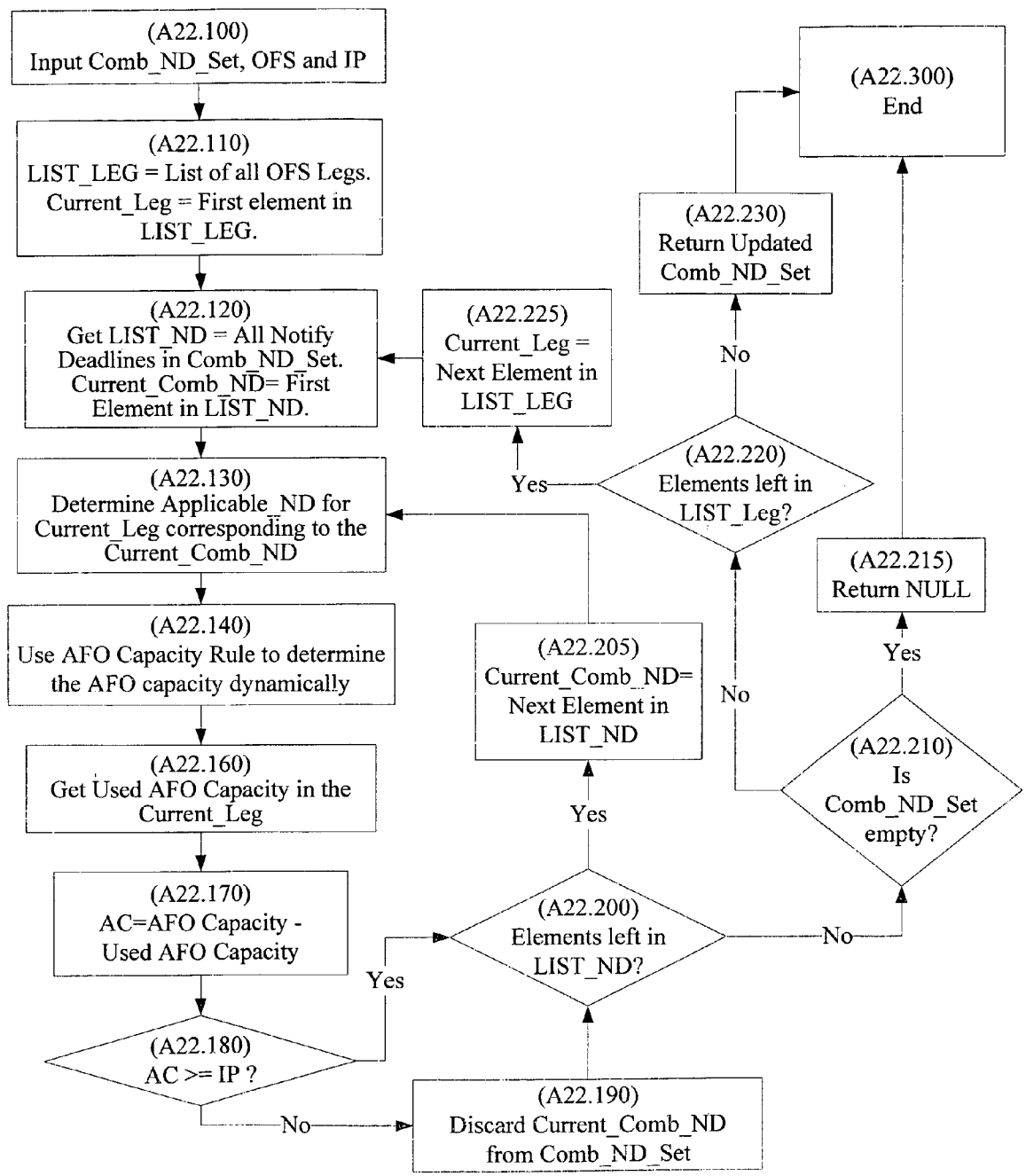
Fig. A22

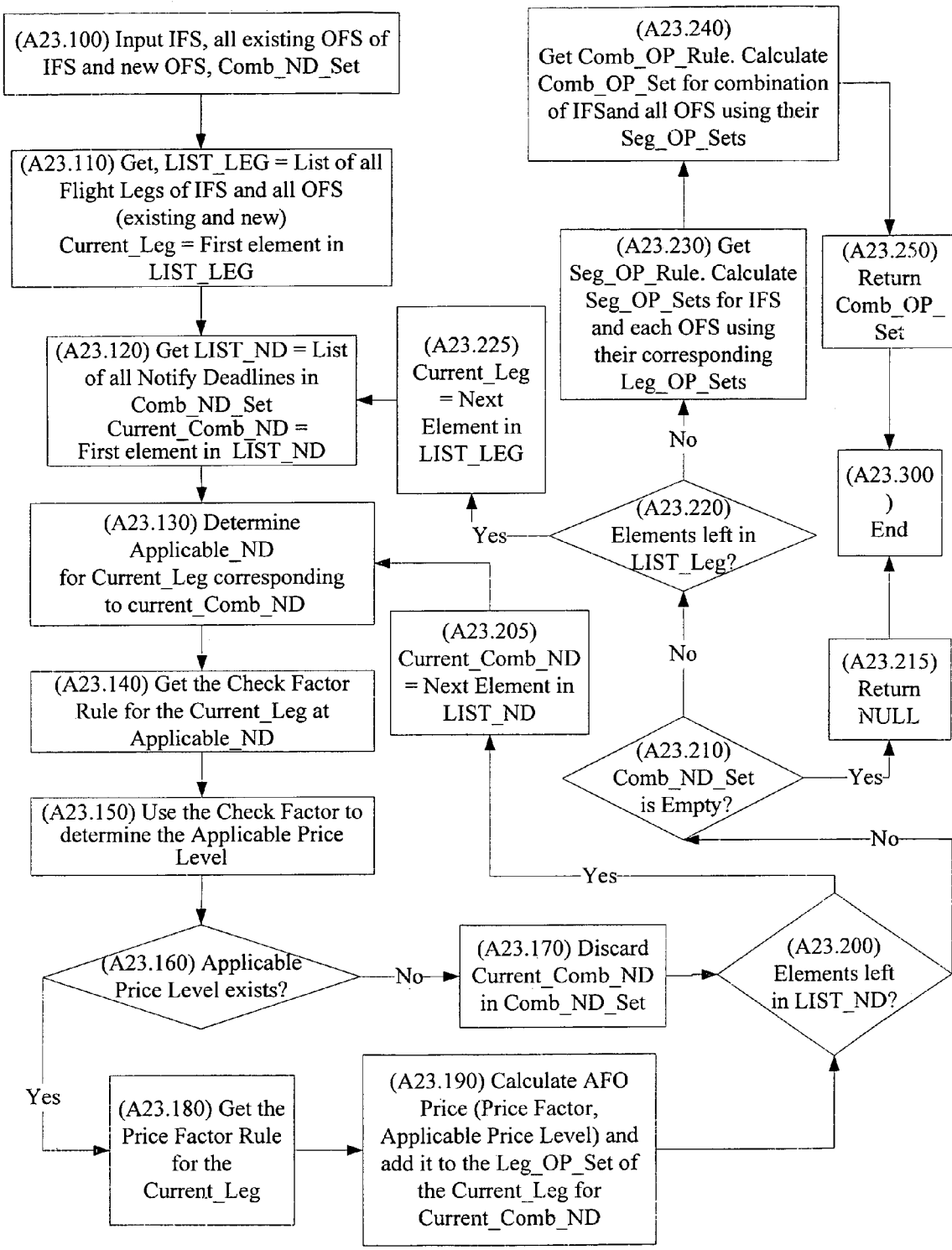
Fig. A23

Fig. A24
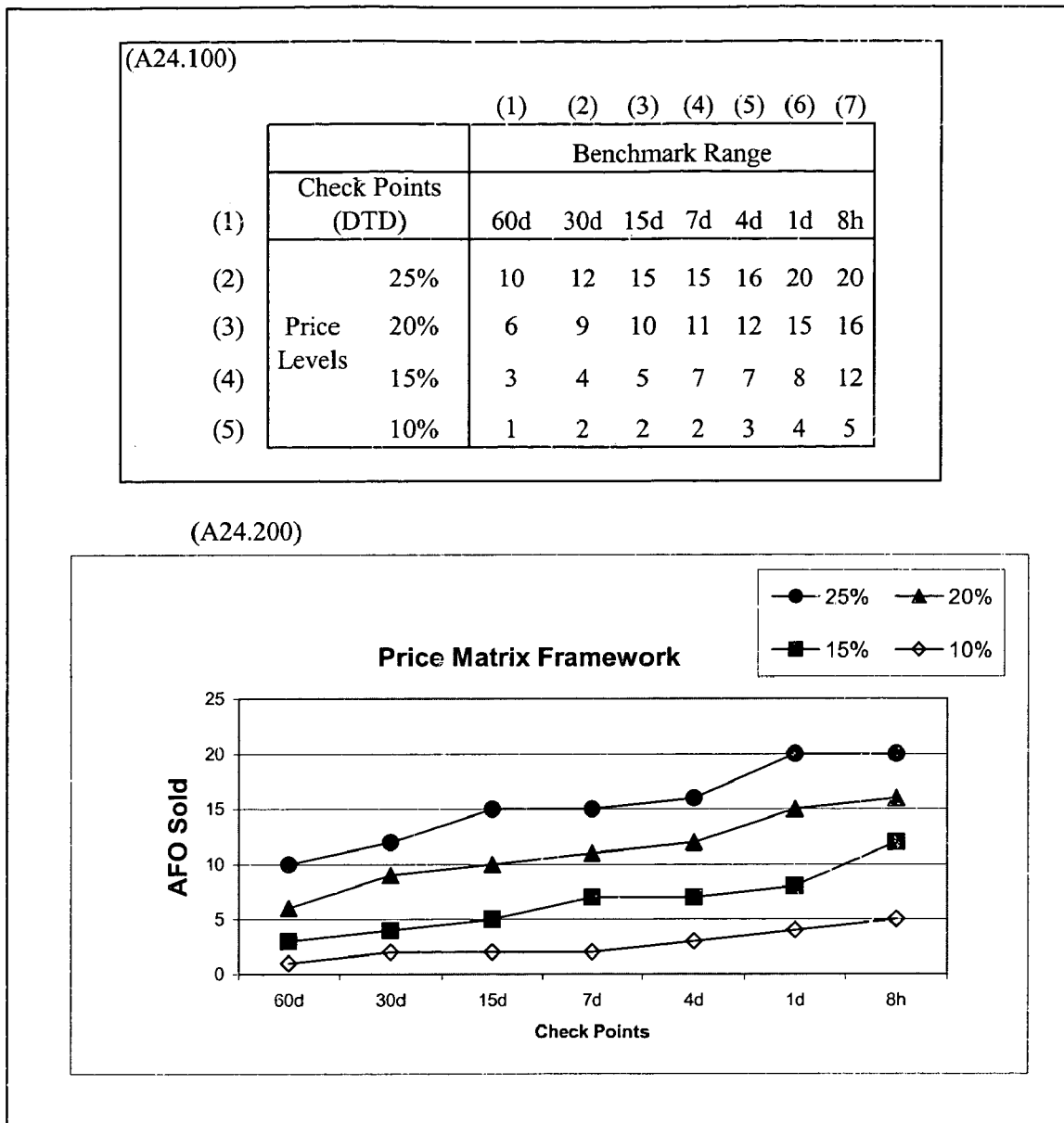

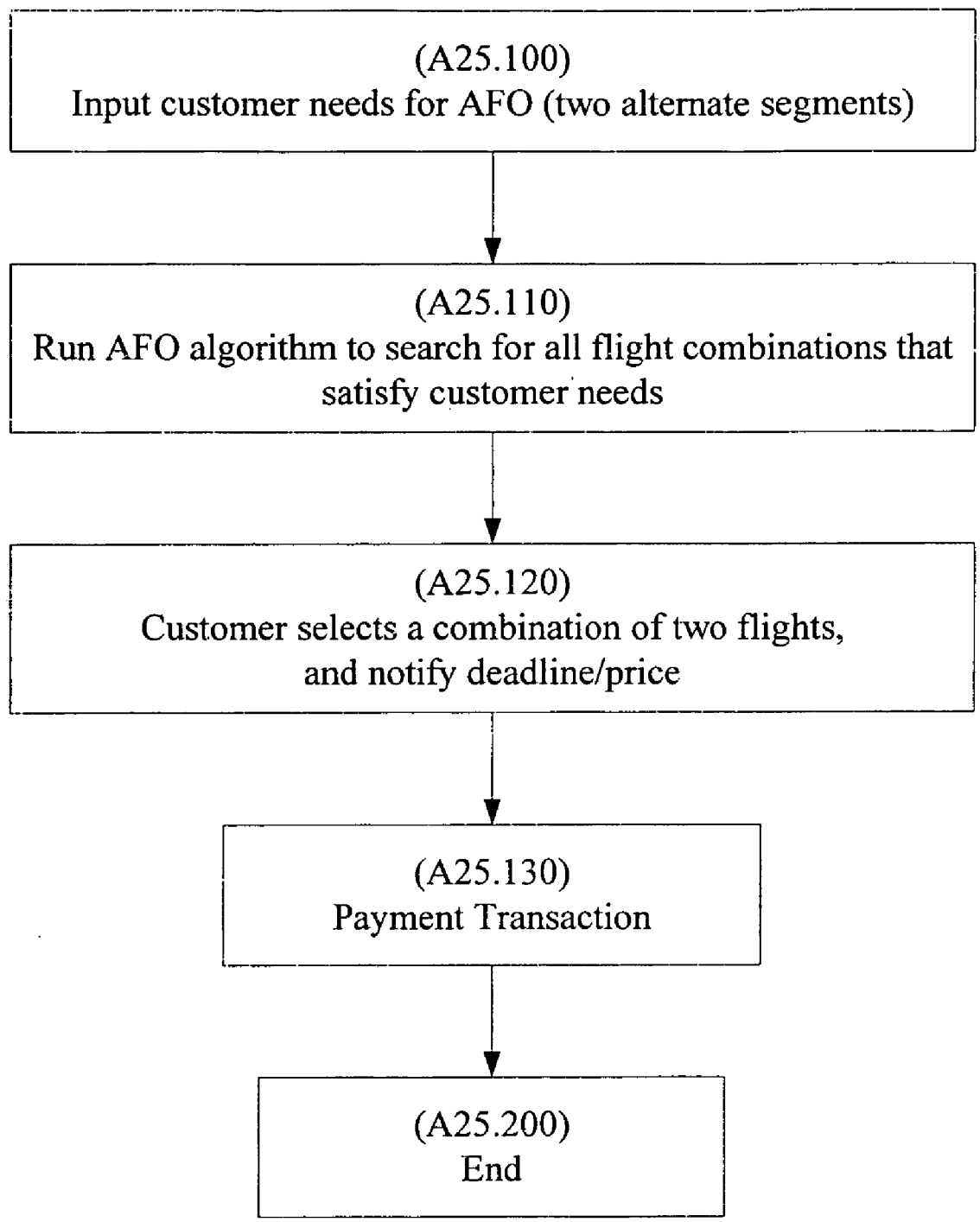
Fig. A25

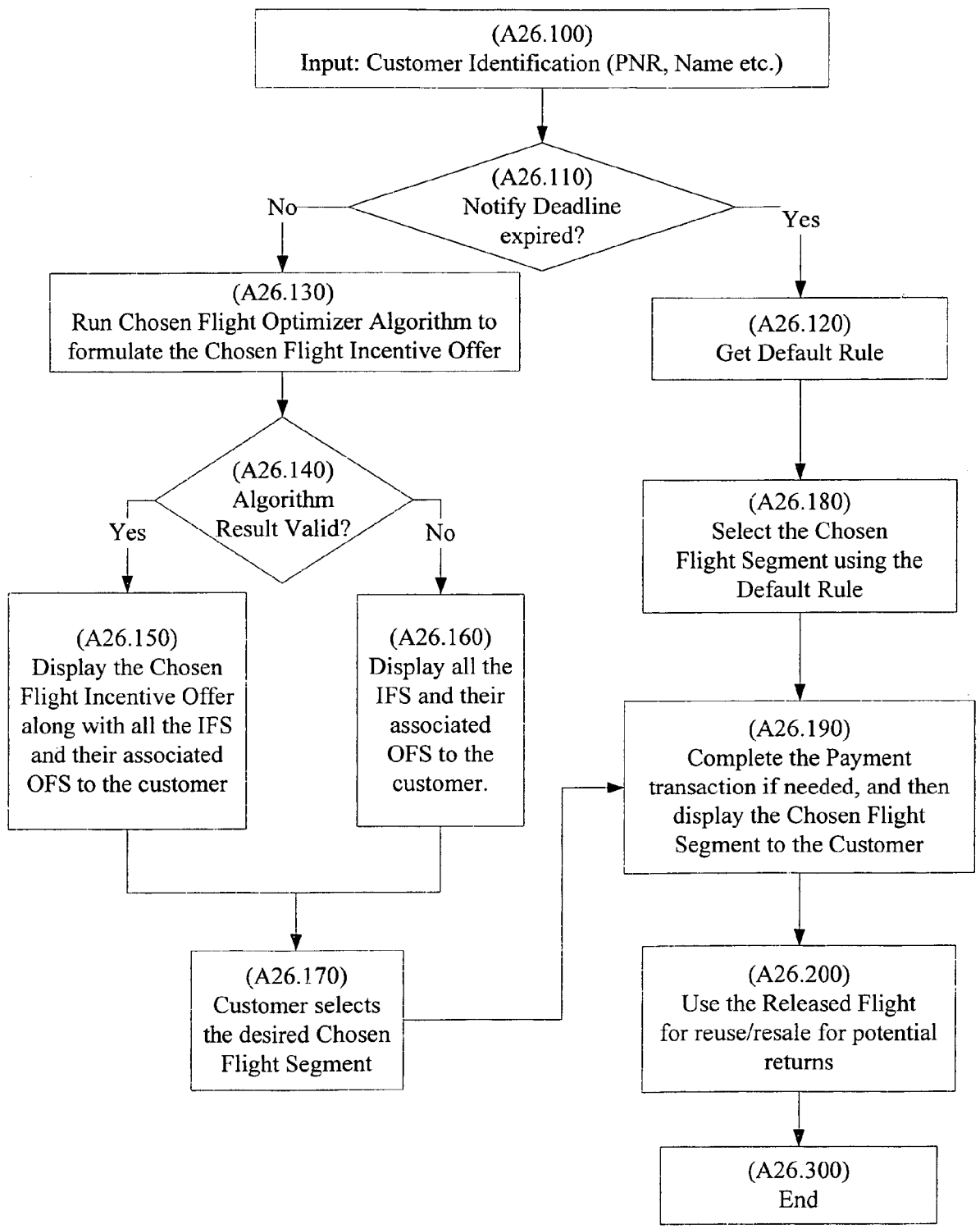
Fig. A26

Fig. A27
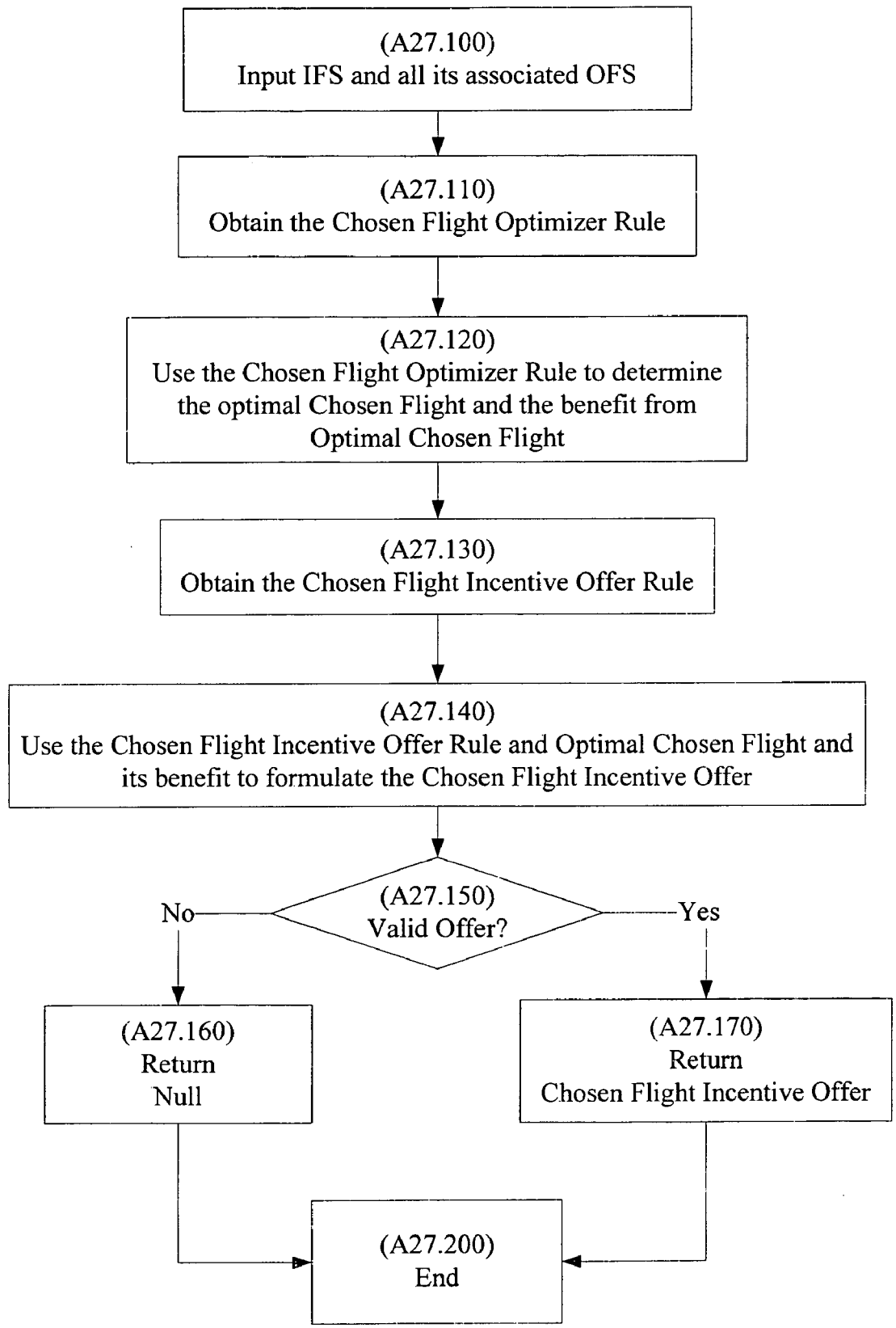

Fig. A28

AFO Reservation

Search    Select AFO    Payment    Confirm

Your Itinerary

Onward Journey (Include AFO Flight for Onward Journey)

| | Flight | | Departs | | Arrives | | Select Your Chosen Flight |
|---|---|---|---|---|---|---|---|
| Original Flight | Alpha 993 | Coach(U) | BOS | 8:55am May 2 | ORD | 11:57am May 2 | Select Chosen Flight [Select ▼]  ▶ Confirm Chosen Flight |
| | Alpha 892 | Coach(U) | ORD | 1:00pm May 2 | ATL | 3:07pm May 2 | |
| AFO Flight | Alpha 674 | Coach(U) | BOS | 9:00am May 1 | ORD | 11:57am May 1 | Select your Chosen Flight By: APR 30 11:00am |
| | Alpha 625 | Coach(U) | ORD | 1:00pm May 1 | ATL | 3:07pm May 1 | If You don't Change, Original Flight will be your Chosen Flight |

Return Journey

| | Flight | | Departs | | Arrives | | |
|---|---|---|---|---|---|---|---|
| Original Flight | Alpha 964 | Coach(U) | ATL | 9:55am May 7 | ORD | 11:50am May 7 | Click here to Get AFO Flight for Return Journey |
| | Alpha 857 | Coach(U) | ORD | 1:00pm May 7 | BOS | 4:07pm May 7 | |

Fig. A29

AFO Reservation

Search  Select AFO  Payment  Confirm

○ Round Trip  ● One Way

From  To
[BOS]  [ATL]  Number of AFO Flights: [2 ▼]

Departure dates

Day  Month  Time  Cabin
[2 ▼] [May ▼] [morning ▼] [Coach ▼]

Day  Month  Time  Cabin
[4 ▼] [May ▼] [evening ▼] [Coach ▼]

Number of Passengers: [1 ▼]

AFO Reservation

Search    Select AFO    Payment    Confirm

Select Your AFO Flight      *price per person includes taxes and fees

| S.No | Flight | Departs | Arrives | Ticket Price | AFO Notify Deadline / AFO Price* |
|---|---|---|---|---|---|
| 1 | Alpha 993 Coach(U) | BOS 8:55am 2 May | ATL 11:57am 2 May | $260 | Notify Deadline — April 28 6:00pm $25 Select / April 30 11:00am $50 Select / May 2 8:55am First Flight Departs / May 4 8:55am Second Flight Departs |
| 2 | Alpha 963 Coach(U) | BOS 8:55am 4 May | ATL 11:57pm 4 May | | |

| S.No | Flight | Departs | Arrives | Ticket Price | AFO Notify Deadline / AFO Price* |
|---|---|---|---|---|---|
| 1 | Alpha 263 Coach(U) | BOS 10:30am 2 May | ATL 2:00pm 2 May | $250 | Notify Deadline — April 28 6:00pm $25 Select / April 30 8:00am $45 Select / May 2 10:30am First Flight Departs / May 4 8:55am Second Flight Departs |
| 2 | Alpha 963 Coach(U) | BOS 8:55am 4 May | ATL 11:57am 4 May | | |

| S.No | Flight | Departs | Arrives | Ticket Price | AFO Notify Deadline / AFO Price* |
|---|---|---|---|---|---|
| 1 | Alpha 263 Coach(U) | BOS 10:30am 2 May | ATL 2:00pm 2 May | $270 | Notify Deadline — April 28 6:00pm $30 Select / April 30 8:00am $40 Select / May 2 10:30am First Flight Departs / May 4 2:00am Second Flight Departs |
| 2 | Alpha 189 Coach(U) | BOS 2:00pm 4 May | ATL 5:50pm 4 May | | |

Fig. A31

AFO Reservation

Search　　Select AFO　　Payment　　Confirm

Your AFO Flights

| S.No | Flight | | Departs | | Arrives | | Ticket Price | AFO Summary | |
|---|---|---|---|---|---|---|---|---|---|
| 1 | Alpha 993 | Coach(U) | BOS | 8:55am 2 May | ATL | 11:57am 2 May | $260 | Select your *Chosen Flight* By: Apr 30 11:00am | AFO Price $50 |
| 2 | Alpha 963 | Coach(U) | BOS | 8:55am 4 May | ATL | 11:57am 4 May | | If you don't select, your *Chosen Flight* will be [Select ▼] | |
| | | | | | | | | [Edit AFO Deadline/Price ▼] | |

[▶ Continue]

Fig. U1
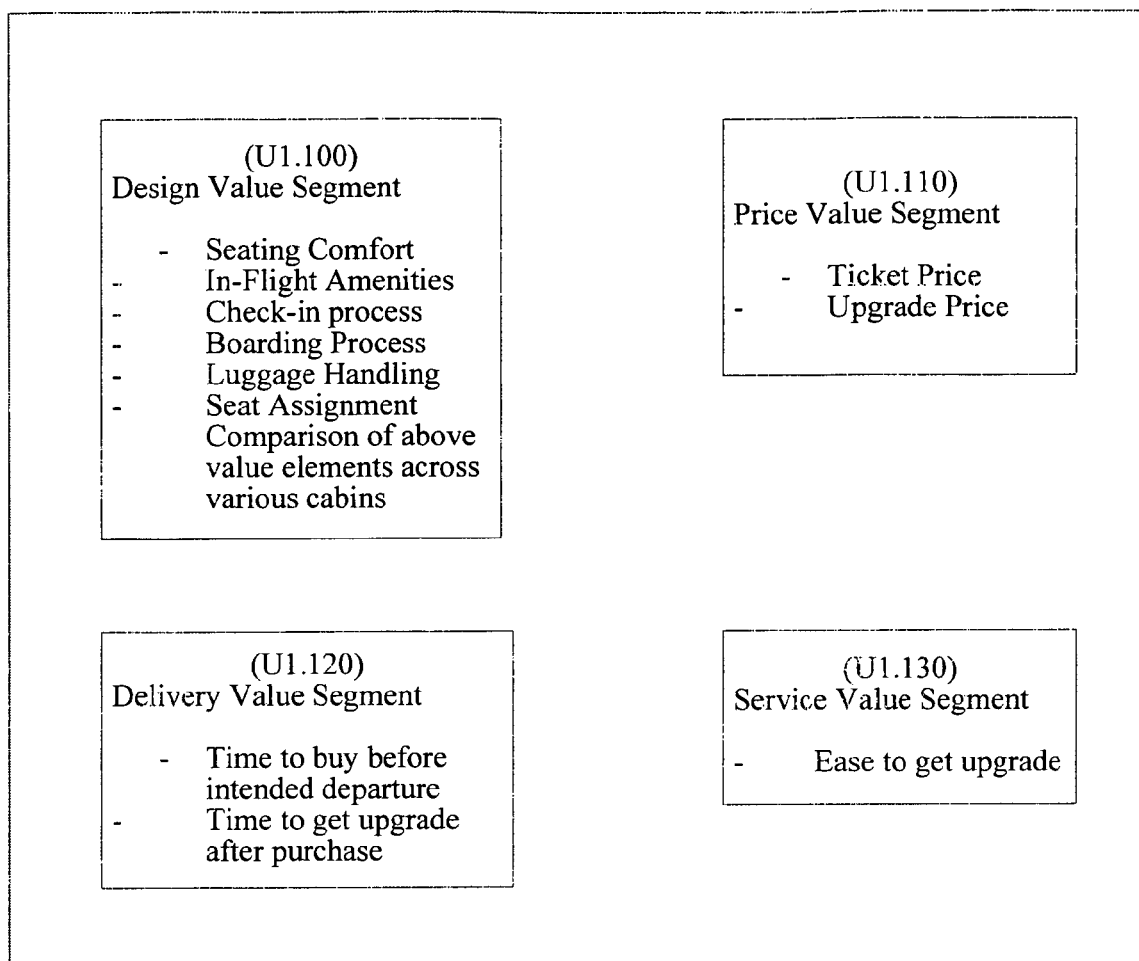

Fig. U2
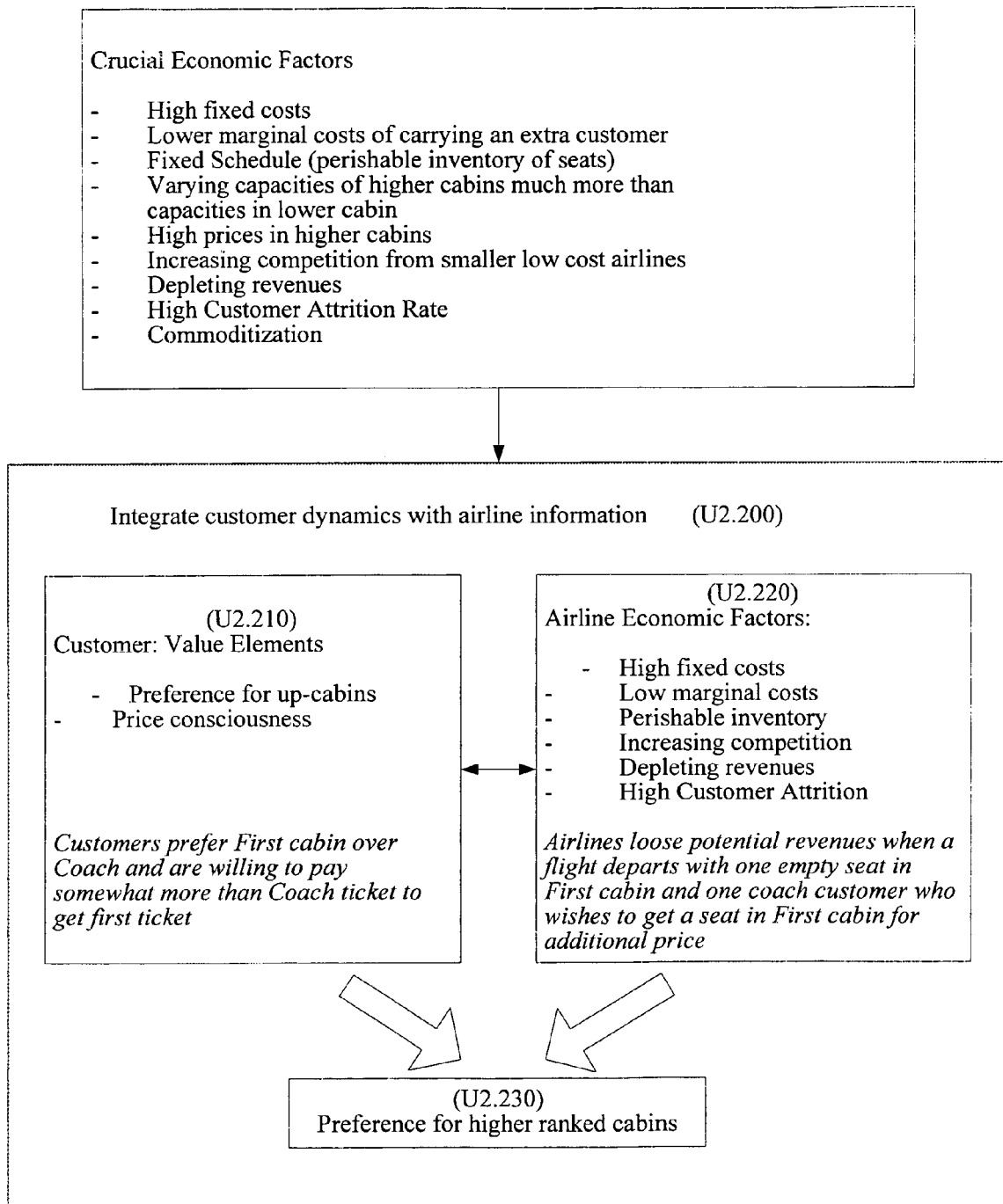

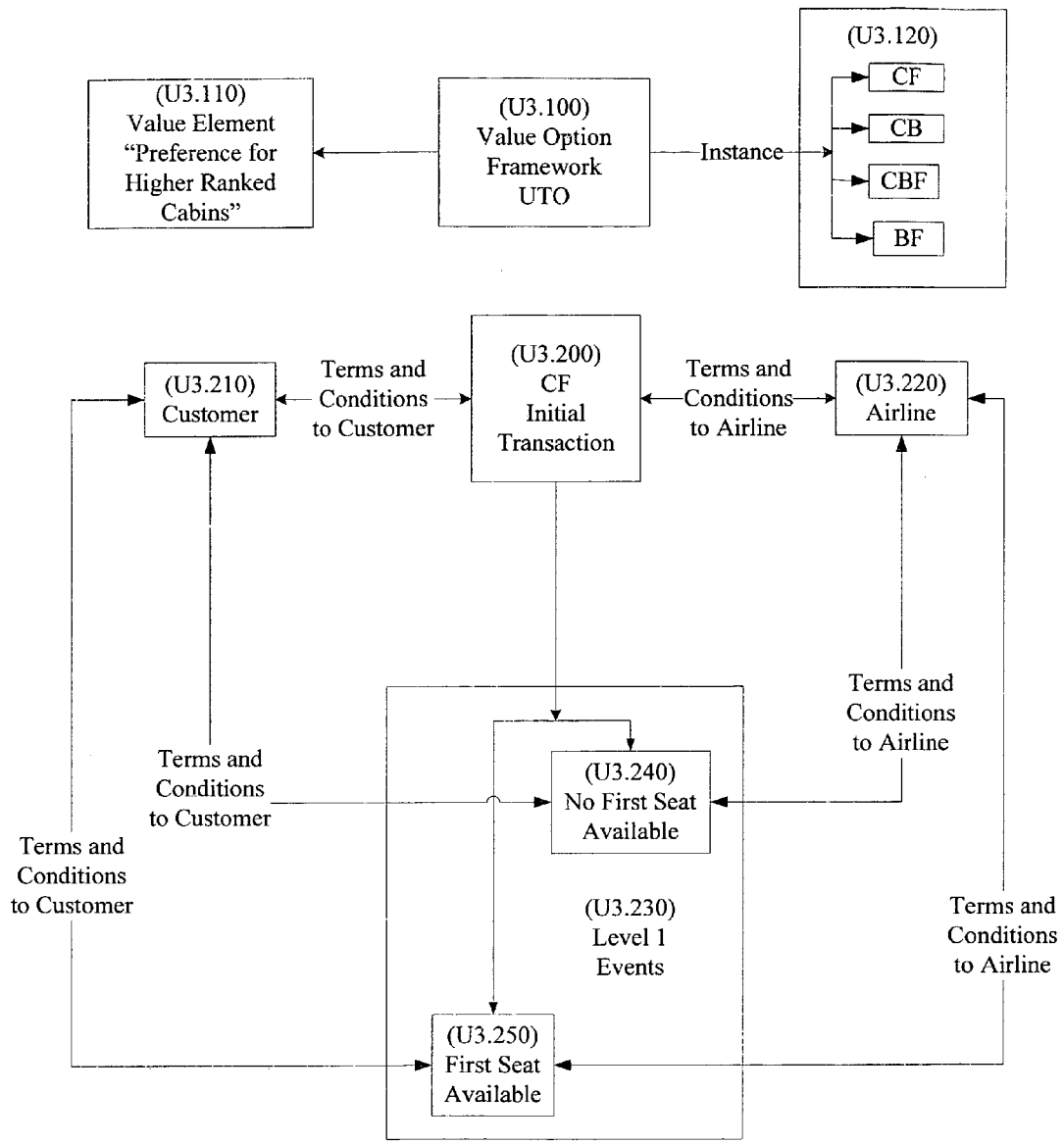
Fig. U3

Fig. U4

| UTO | Description | Base Cabin | Up Cabin |
|---|---|---|---|
| CF | Coach to First | Coach | First |
| CB | Coach to Business | Coach | Business |
| CBF | Coach to Business or First | Coach | Business, First |
| BF | Business to First | Business | First |

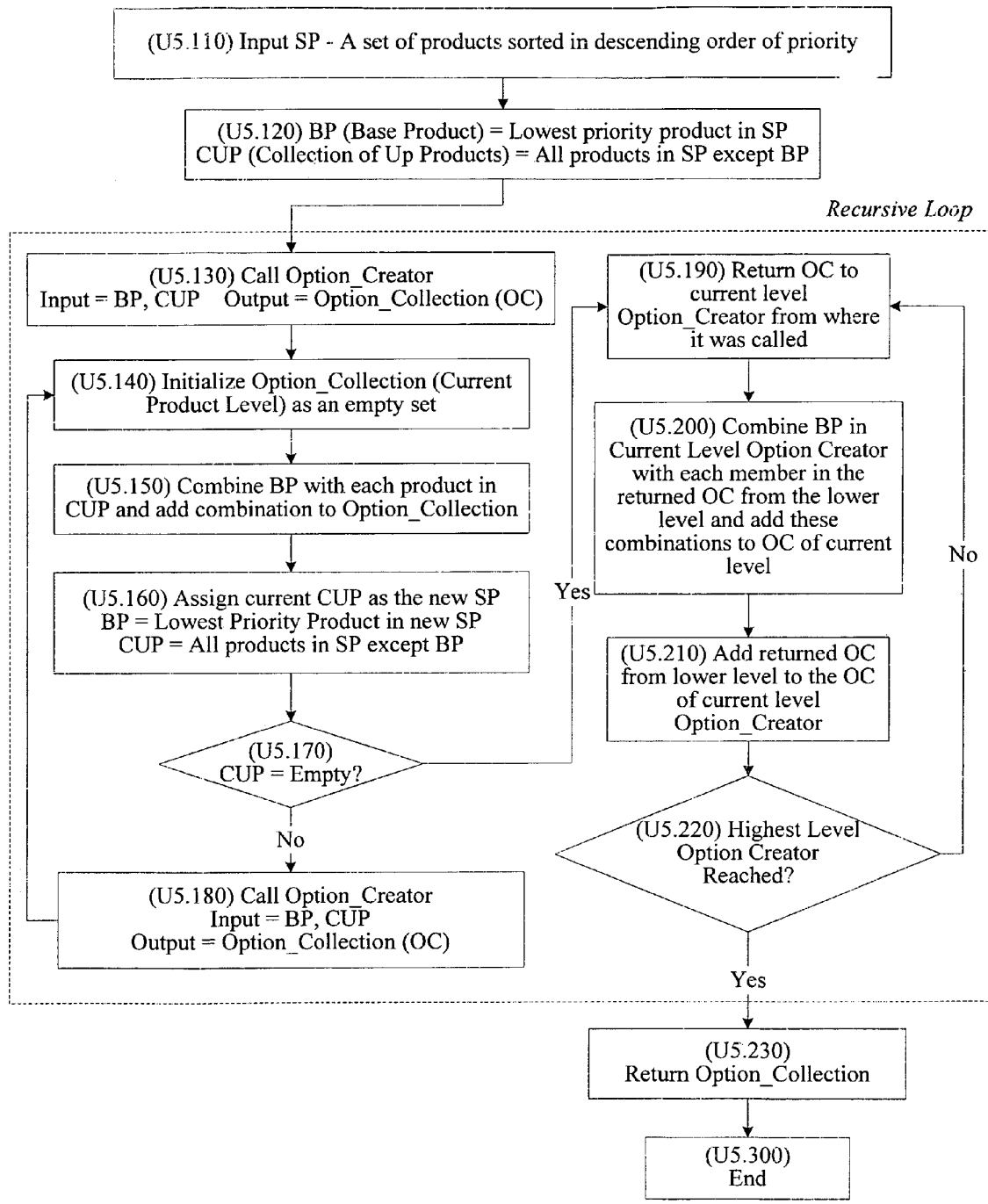
Fig. U5

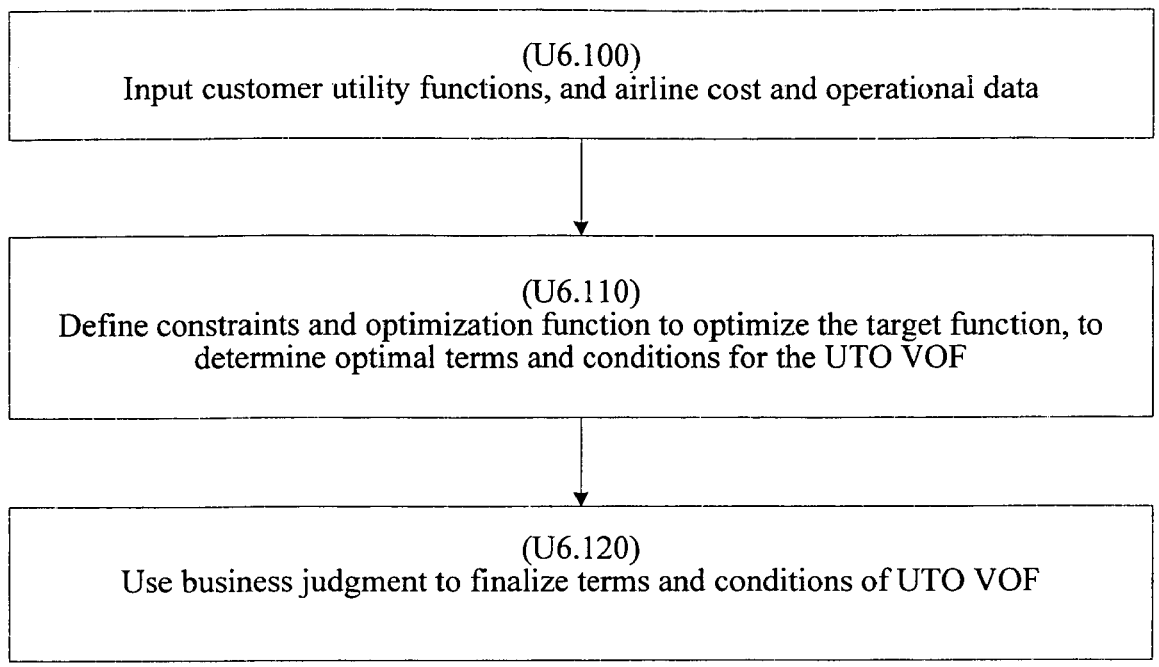
Fig. U6

Fig. U7

UTO Reservation

Select UTO   Payment   Confirm

Your Itinerary

Onward Journey

| Depart | | Arrives | | Flight # | Cabin & Class | Buy UTO |
|---|---|---|---|---|---|---|
| BOS | 8:55am May 2 | ORD | 11:57am May 2 | Alpha 993 | Coach (U) | ▶ Buy UTO |
| ORD | 1:00pm May 2 | ATL | 3:07pm May 2 | Alpha 892 | Coach (U) | ▶ Buy UTO |

Return Journey

| Depart | | Arrives | | Flight # | Cabin & Class | Buy UTO |
|---|---|---|---|---|---|---|
| ATL | 9:55am May 7 | ORD | 11:50am May 7 | Alpha 964 | Coach (U) | ▶ Buy UTO |
| ORD | 1:00pm May 7 | BOS | 4:07pm May 7 | Alpha 857 | Coach (U) | ▶ Buy UTO |

Fig. U8

UTO Reservation

Select UTO　　Payment　　Confirm

Select UTO On

| Departs | | Arrives | | Flight # | Cabin & Class |
|---|---|---|---|---|---|
| BOS | 8:55am May 2 | ORD | 11:57am May 2 | Alpha 993 | Coach (U) |

Partial Group Upgrade ☑

| Upgrade On | Option Price | Price Payable If Upgraded | | Select |
|---|---|---|---|---|
| Business | $3.00(USD) | $30.00(USD) | | ○ |
| First | $5.00(USD) | $60.00(USD) | | ◉ |
| Business/First | $4.00(USD) | Business $30.00(USD) | First $60.00(USD) | ○ |
| | | | No Option Selected | ○ |

▶ Save and Go to Summary

Fig. U9
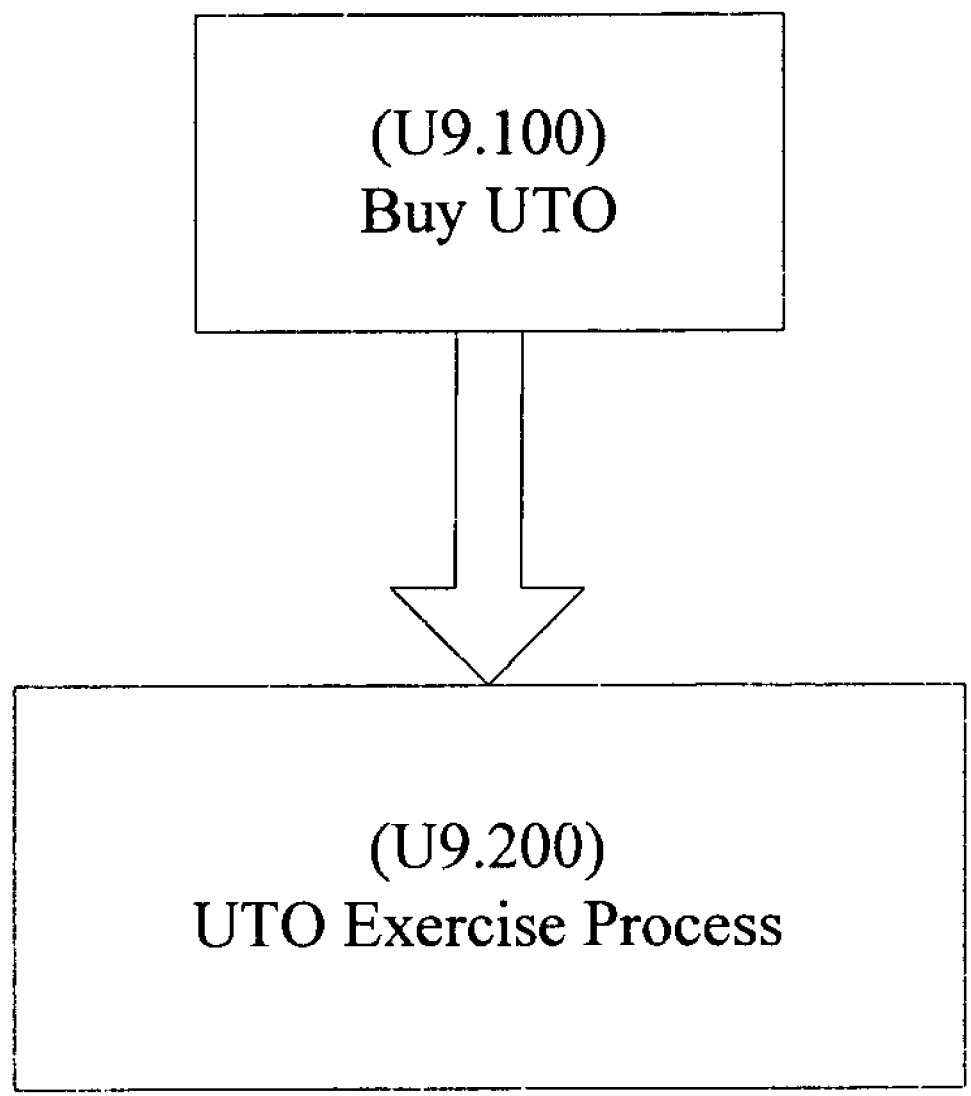

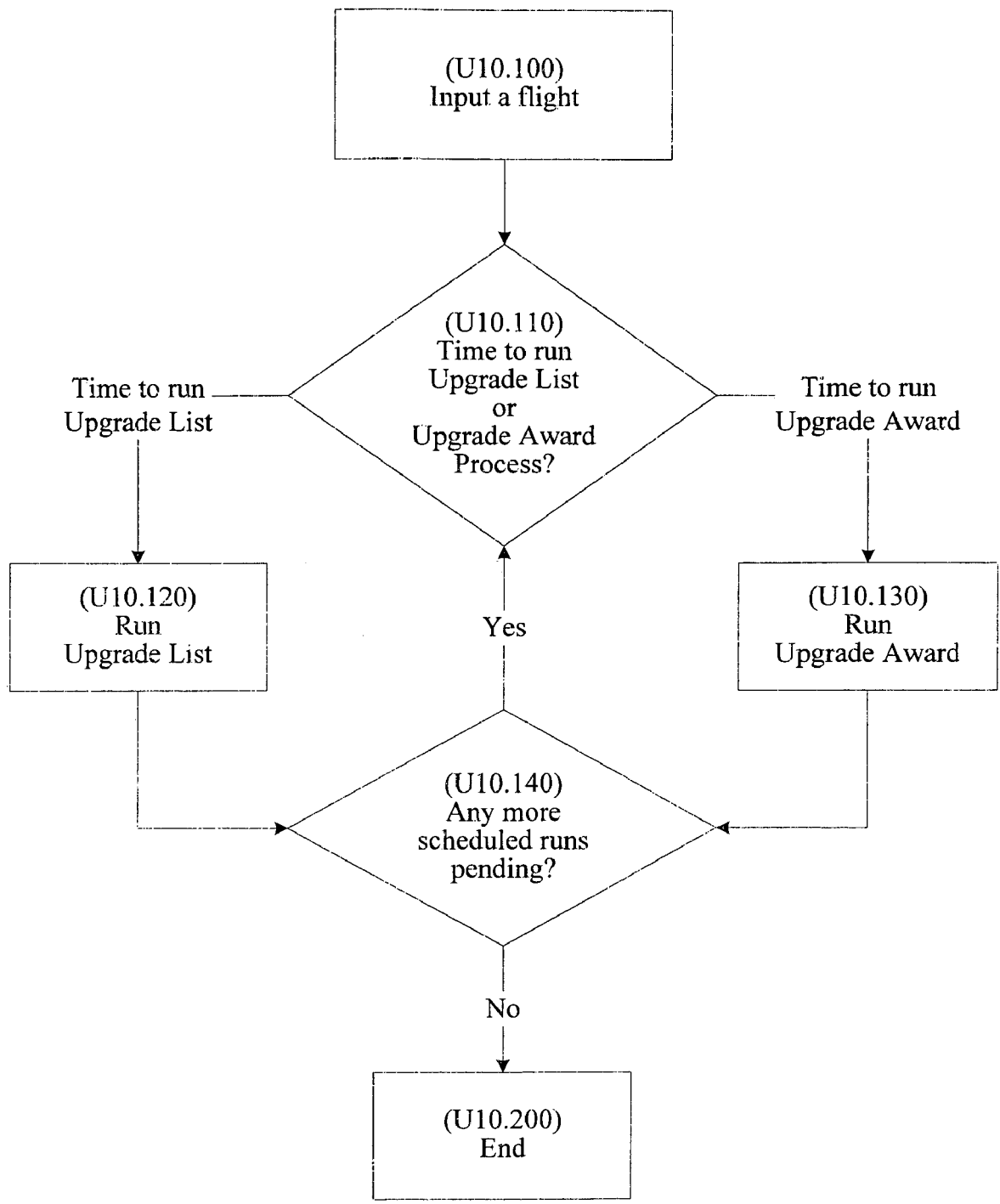
Fig. U10

Fig. U11
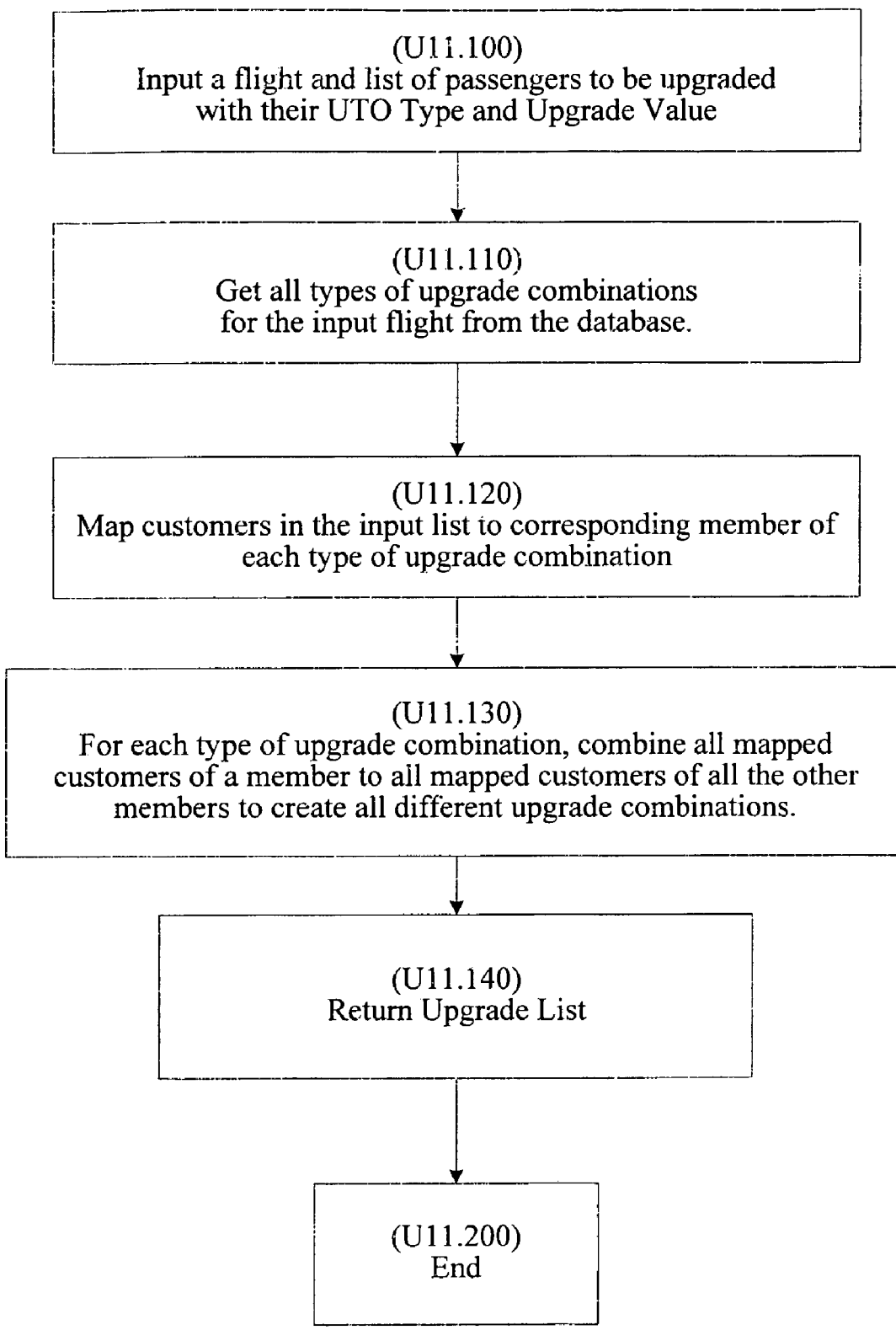

Fig. U12
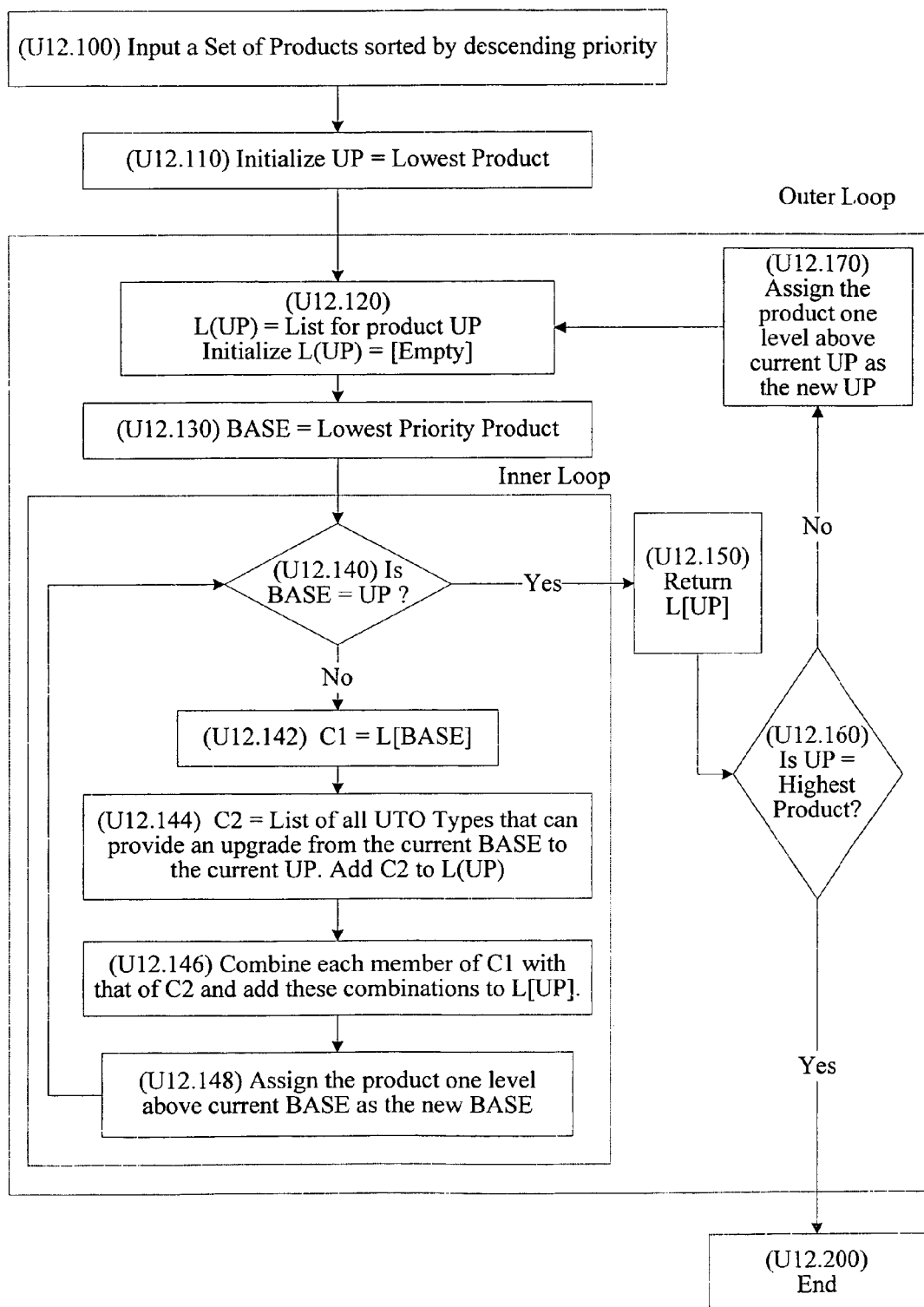

Fig. U13
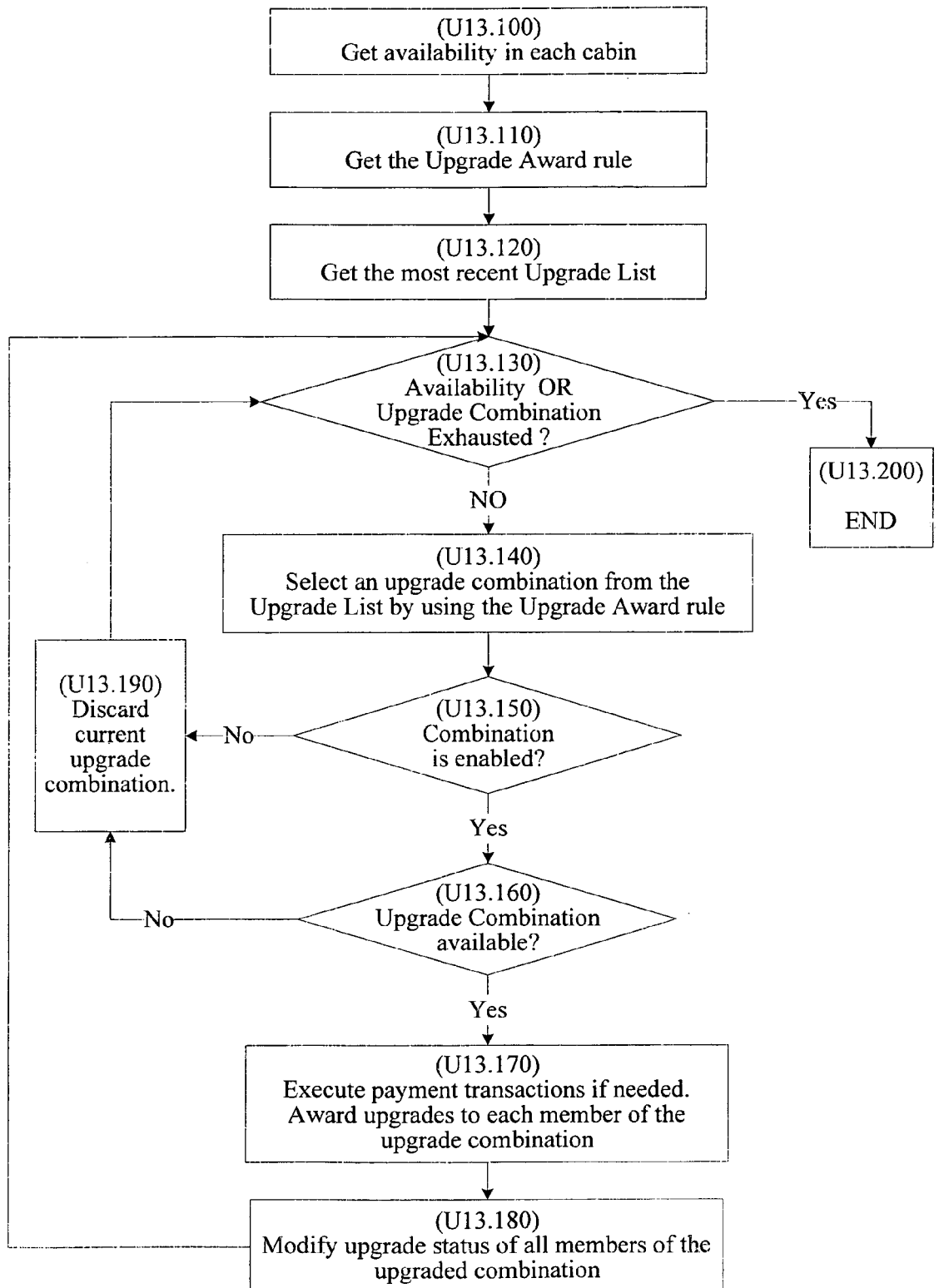

| | (1) | (2) | (3) | (4) | (5) | (6) | (7) | (8) |
|---|---|---|---|---|---|---|---|---|
| | UTO Type | Pax Type | Pax | Up Cabin | Payment | Upgrade Value | | Total |
| | | | | | | Soft Value | Upgrade Cost | |
| | CF | UTO | CF1 | F | $115 | $10 | $20 | $105 |
| | CF | UTO | CF2 | F | $105 | $10 | $20 | $95 |
| | CF | FRB | CF3 | F | $0 | $105 | $20 | $85 |
| | CB | FRB | CB1 | B | $0 | $75 | $10 | $65 |
| | CB | UTO | CB2 | B | $55 | $10 | $10 | $55 |
| | CB | FRB | CB3 | B | $0 | $55 | $10 | $45 |
| | CBF | UTO | CBF1 | B | $58 | $10 | $10 | $58 |
| | CBF | UTO | CBF1 | F | $117 | $10 | $20 | $107 |
| | CBF | FRB | CBF2 | B | $0 | $64 | $10 | $54 |
| | CBF | FRB | CBF2 | F | $0 | $112 | $20 | $92 |
| | BF | UTO | BF1 | F | $90 | $10 | $10 | $90 |
| | BF | FRB | BF2 | F | $0 | $95 | $10 | $85 |
| | SC | SBY | SC1 | C | $125 | $5 | $5 | $125 |
| | SF | SBY | SF1 | F | $255 | $20 | $25 | $250 |
| | SB | SBY | SB1 | B | $180 | $10 | $15 | $175 |

(U14.200)

(210)
CF
BF
SF
CBF (220)
CB-BF
SB-BF
SC-CF
SC-CBF
CBF-BF (230)
SC-CB-BF
SC-CBF-BF (240)
CB
CBF
SB (250)
SC-CB
SC-CBF (260)
SC

Fig. U15

| S. No. | (1) First | (2) Business | (3) Coach | (4) Value(F) | (5) Value(B) | (6) Value(C) | (7) Total Value |
|---|---|---|---|---|---|---|---|
| 1 | BF1 | CB1 | SC1 | $90 | $65 | $125 | $280 |
| 2 | BF2 | CB1 | SC1 | $85 | $65 | $125 | $275 |
| 3 | BF1 | CBF1 | SC1 | $90 | $58 | $125 | $273 |
| 4 | BF1 | CB2 | SC1 | $90 | $55 | $125 | $270 |
| 5 | BF1 | CBF2 | SC1 | $90 | $54 | $125 | $269 |
| 6 | BF2 | CBF1 | SC1 | $85 | $58 | $125 | $268 |
| 7 | BF1 | SB1 | | $90 | $175 | | $265 |
| 8 | BF2 | CB2 | SC1 | $85 | $55 | $125 | $265 |
| 9 | BF2 | CBF2 | SC1 | $85 | $54 | $125 | $264 |
| 10 | BF1 | CB3 | SC1 | $90 | $45 | $125 | $260 |
| 11 | BF2 | SB1 | | $85 | $175 | | $260 |
| 12 | BF2 | CB3 | SC1 | $85 | $45 | $125 | $255 |
| 13 | SF1 | | | $250 | | | $250 |
| 14 | CBF1 | | SC1 | $107 | | $125 | $232 |
| 15 | CF1 | | SC1 | $105 | | $125 | $230 |
| 16 | CF2 | | SC1 | $95 | | $125 | $220 |
| 17 | CBF2 | | SC1 | $92 | | $125 | $217 |
| 18 | CF3 | | SC1 | $85 | | $125 | $210 |
| 19 | | CB1 | SC1 | | $65 | $125 | $190 |
| 20 | | CBF1 | SC1 | | $58 | $125 | $183 |
| 21 | | CB2 | SC1 | | $55 | $125 | $180 |
| 22 | | CBF2 | SC1 | | $54 | $125 | $179 |
| 23 | | SB1 | | | $175 | | $175 |
| 24 | | CB3 | SC1 | | $45 | $125 | $170 |
| 25 | BF1 | CB1 | | $90 | $65 | | $155 |
| 26 | BF2 | CB1 | | $85 | $65 | | $150 |
| 27 | BF1 | CBF1 | | $90 | $58 | | $148 |
| 28 | BF1 | CB2 | | $90 | $55 | | $145 |
| 29 | BF1 | CBF2 | | $90 | $54 | | $144 |
| 30 | BF2 | CBF1 | | $85 | $58 | | $143 |
| 31 | BF2 | CB2 | | $85 | $55 | | $140 |
| 32 | BF2 | CBF2 | | $85 | $54 | | $139 |
| 33 | BF1 | CB3 | | $90 | $45 | | $135 |
| 34 | BF2 | CB3 | | $85 | $45 | | $130 |
| 35 | | | SC1 | | | $125 | $125 |
| 36 | CBF1 | | | $107 | | | $107 |
| 37 | CF1 | | | $105 | | | $105 |
| 38 | CF2 | | | $95 | | | $95 |
| 39 | CBF2 | | | $92 | | | $92 |
| 40 | BF1 | | | $90 | | | $90 |
| 41 | BF2 | | | $85 | | | $85 |
| 42 | CF3 | | | $85 | | | $85 |
| 43 | | CB1 | | | $65 | | $65 |
| 44 | | CBF1 | | | $58 | | $58 |
| 45 | | CB2 | | | $55 | | $55 |
| 46 | | CBF2 | | | $54 | | $54 |
| 47 | | CB3 | | | $45 | | $45 |

|  | First | Business | Coach |
|---|---|---|---|
| Availability | 3 | 1 | 0 |

(U16.200)

| Row No | S. No. | First | Business | Coach | Total Value |
|---|---|---|---|---|---|
| 1 | 1 | BF1 | CB1 | SC1 | $280 |
| 11 | 2 | BF2 | SB1 |  | $260 |
| 13 | 3 | SF1 |  |  | $250 |
| 44 | 4 |  | CBF1 |  | $58 |
|  |  |  | Total Upgrade Value |  | $848 |

Fig. U17

UTO Reservation

Select UTO  Payment  Confirm

Select UTO On

| Departs | Arrives | Flight # | Cabin & Class |
|---|---|---|---|
| BOS 8:55am May 2 | ORD 11:57am May 2 | Alpha 993 | Coach (U) |

Partial Group Upgrade ☑

| Upgrade On | Option Price | Highest Price Payable If Upgraded | | Select |
|---|---|---|---|---|
| Business | $3.00(USD) | ○ $ 30 (USD)<br>○ $ 35 (USD)<br>○ $ 40 (USD) | | ○ |
| First | $5.00(USD) | ○ $ 60 (USD)<br>○ $ 65 (USD)<br>○ $ 75 (USD) | | ○ |
| Business/First | $4.00(USD) | Business<br>⦿ $ 30 (USD)<br>○ $ 35 (USD)<br>○ $ 45 (USD) | First<br>⦿ $ 60 (USD)<br>○ $ 65 (USD)<br>○ $ 75 (USD) | ⦿ |
| | | | No Option Selected | ○ |

▶ Save and Go to Summary

Fig. U18
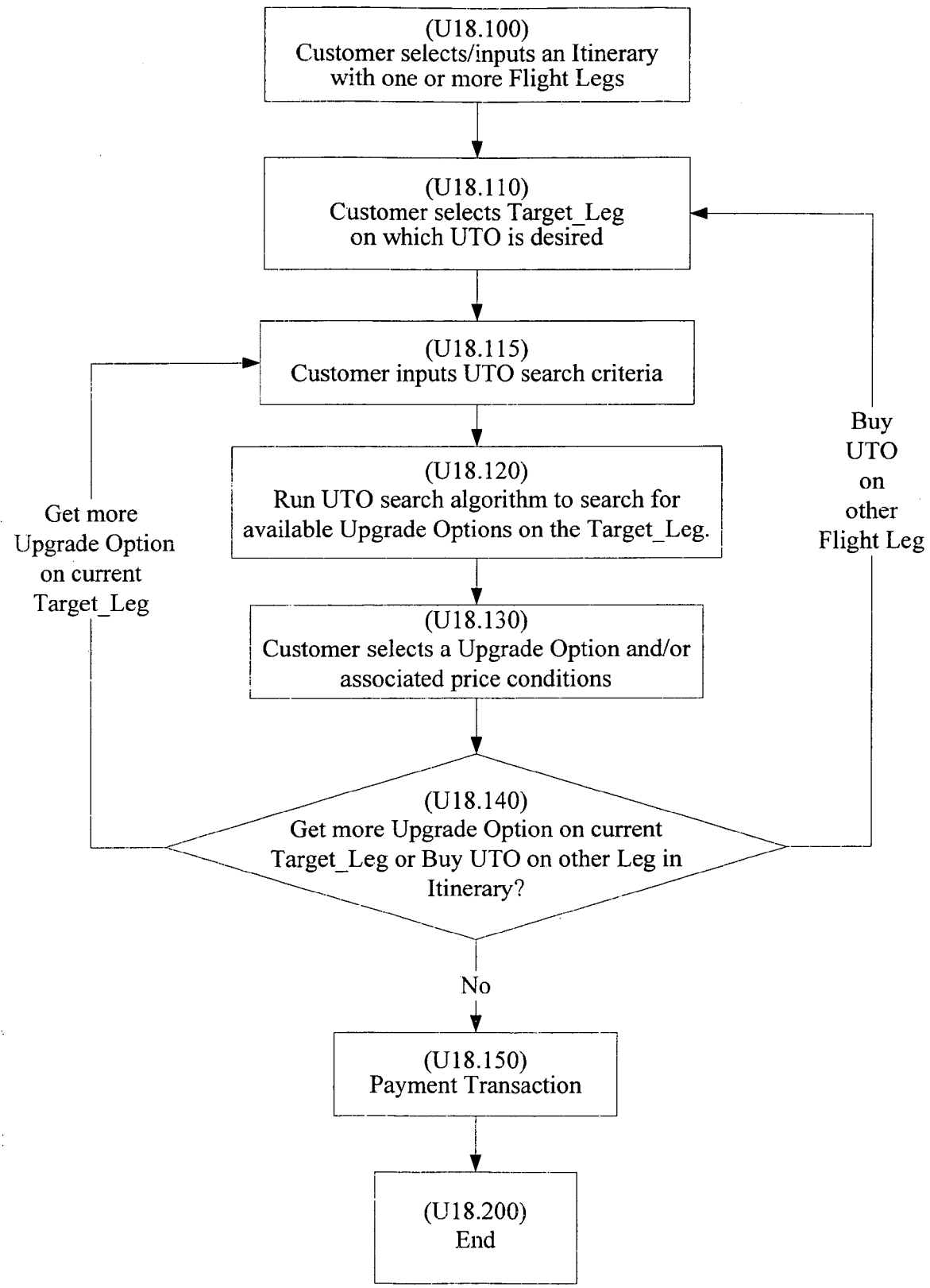

Fig. U19
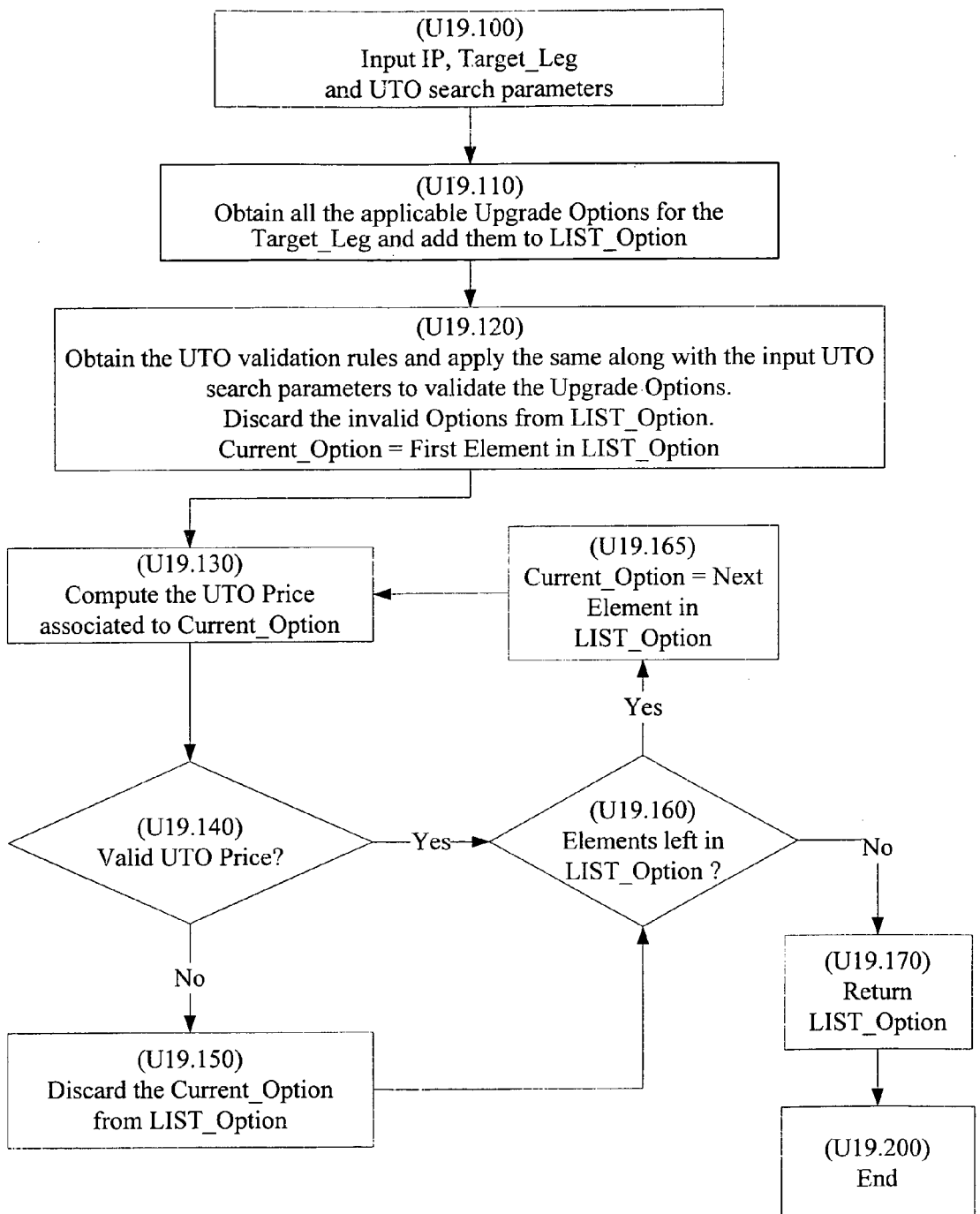

Fig U20
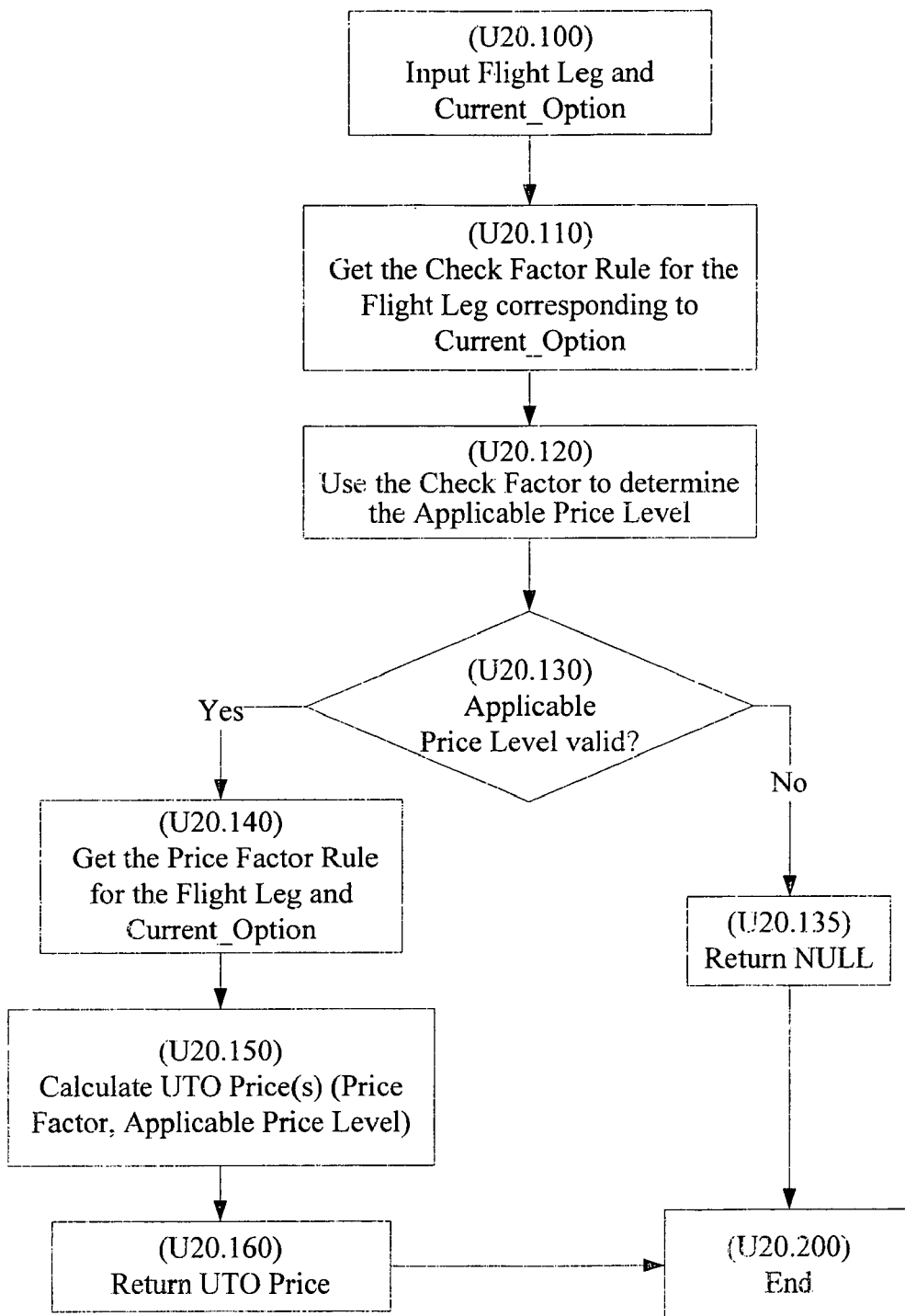

METHODS AND ASSOCIATED SYSTEMS FOR AN AIRLINE TO ENHANCE CUSTOMER EXPERIENCE AND PROVIDE OPTIONS ON FLIGHTS

CROSS-REFERENCE TO RELATED APPLICATIONS AND PRIORITY CLAIM

This application is a continuation-in-part, and claims the benefit under 35 USC 120, of U.S. patent application Ser. No. 10/973,802 filed Oct. 25, 2004 and titled "System For Concurrent Optimization Of Business Economics And Customer Value Satisfaction," and which, in turn, claims the benefit, under 35 USC 119(e) of prior provisional patent application Ser. No. 60/514,248, filed Oct. 24, 2003, titled "Real-Time Optimization Across Integrated Customer Preferences and Company Economics Through Formulation of Value Options That Maximize Value of Both Customer and Company," all of which are hereby incorporated by reference.

FIELD OF INVENTION

This invention relates to a system and method for matching customer preferences with vendor products and services in the airline or similar industries, and then dynamically managing the on-demand and optimally customized delivery of such business services or products. More particularly, it relates to methods and systems for customizing and optimizing a company's products and services to individual customers in way that concurrently enhances customer value and overall business performance.

BACKGROUND

Historically, "companies" (a term defined below) and their customers often have done business across a gap, so to speak. Product or service offerings by a company and the customers' desired product or service do not fully match. In part, this gap is a manifestation of the facts that (1) companies have an incomplete grasp of customer needs, their relative preferences and the pricing utilities customers attach to those preferences (which utilities, equating to the customer's willingness to pay, are dynamic) and (2) a company's costs, profits and inventory (which may control what it can offer on a timely basis) are also dynamic. However, it is also in major part a manifestation of the lack of information technology tools, which can close the gap. To collect dynamic customer and company data and then employ those dynamic data to close the gap is a complex technical problem.

Companies have developed many approaches to increase their internal efficiencies and productivities in order to maximize their gains and profits. With the advent of the computer, companies have, for example, embraced tools to optimize supply chain resources. They have, for example, focused on internal operations and the use of automated processes to integrate the discrete steps from the supplier to the finished goods inventory floor (or service delivery), improving efficiency. Yet still the end customer typically has been treated as an indistinct, static and detached entity—a statistical profile, in the aggregate—sitting behind a wall and creating demand for the rest of the supply chain. Manufacturers (whether of goods or services) have tried to influence the customer demand via indirect means of advertising and promotions. Beyond the influence that these indirect means can have on a customer's purchasing decision, the manufacturer and retailers have for the most part (at least in mass market situations) considered customer demand fluctuations as a given parameter that can't be altered or managed directly. Moreover, in industries where a company typically has an extremely large customer base (e.g., the airline industry, as discussed below), there has been no mechanism which a company could used to tailor its offerings to individual customers, except by providing multiple selections that are fairly static.

Generally, the customer is treated as an individual and sales terms are customized only when the cost of negotiation is justified—for very large transactions. Indeed, the basis for mass marketing a product or service arguably is the "cookie cutter" approach of "one size fits all" transactions. As is said of the genius of Henry Ford in marketing the Model T automobile: the customer could have any color . . . so long as it was black.

With the advent of the global Internet, some providers of goods and services have sought ways to improve their sales and profitability by, for example, directing incentives and rewards to loyal customers enrolled in affinity marketing plans. They have surveyed the customers in efforts to improve product offerings, and they have accordingly modified their offerings. But still, with a take it or leave it approach. "Here are my sale terms and product offerings; buy or don't buy, the choice is yours." Automation has permitted much better targeting of customer groups, but the group still has to be large. For example, a higher end automobile dealer might use a mail campaign tailored to a specific Zip Code instead of a print ad in a regional or national media.

Many products and services, though, represent complex, multi-faceted offerings and customers weigh their preferences for product features differently at different times. A customer might care more about cost one day and more about availability or delivery time or warranty if queried a few days or weeks later, to use some basic trade-offs as examples. Generally, a company's product consists of many value elements, (explained later) all of which are bundled together to be sold as a single product. But, not every customer values all the aspects of a product equally or needs all. Every customer places a different value (which may be a function of time and situation) on each aspect of a product. With features bundled together in a product, companies end up either incurring costs to sell something to a customer that he does want or lose a customer because the extra undesired value elements forced the product price too high for the customer.

Many companies offer several levels and kinds of products and services with different features sets and price ranges to suit different customer segments. This is evident in several industries such as the airline, car rental, hotel, cruise, travel, special events, automobiles and others. For example, airlines offer non-stop and connecting flights and for a same flight offer multiple flight "cabins" or "classes" (defined below) such as first, business and coach. Car rental companies offer several levels of rental cars such as economy, full size, luxury or SUV. Hotels and cruises offer different types of rooms and suite packages. Special events like sports games and concerts offer variety of seating (front rows, middle section, rear, balcony). Automobile manufacturers offer multiple cars and several grades for the same car model, such like LX, EX and EXL. Real estate developers offer all kinds of homes and optional upgrades to them. Title objective behind offering multiple levels and types of products and services is to cater to the different customer segments with varying needs and financial capacities, and thus to maximize revenues and profitability. A company typically uses consumer demand forecasts to build product quantities to match demand. However, companies' forecasts often prove imperfect, leading to shortage or excess supply in one or more product types.

The underlying problem is both that customer demands are incompletely understood and that such demands can change quickly, whereas a company's productive capacity or service often does not have the same dynamic time frame and is supported by a relatively fixed (in the short term) capacity and supply chain.

As explained above, customers have varied needs and preferences and they evaluate products accordingly. In a customer's frame of mind, products with higher perceived satisfaction (utility) values generally are ranked higher than those with lower perceived utilities. Generally, products that (most customers would) rank higher are also higher priced. Therefore, customers would want to buy a higher ranked product only to the extent that the additional value and incremental price satisfies their individual utility dynamics. Many times customers cannot buy their desired product and have to content themselves with a lower-ranked product because of high price or unavailability. The price component may involve budget constraints or a perception that the higher rated product is over priced. Consider a company that sells two products A and B, where most people rank product A higher than product B and consequently or otherwise, A is also priced higher than B. What happens, when company face an excess supply of A? The situation becomes trickier when products in question are perishable in nature and of high monetary value. The company faces the dilemma of either to lower the price and face future revenue dilution, or to write off its unused capacity/excess supply for A. Advertisements and marketing campaigns can help to stimulate demand but not in the short term. In these situations, when it is difficult or not feasible to generate more demand, or even otherwise, a good solution is to upgrade the mix, or in other words, to upgrade the current customers to products rated higher than those bought currently. In the above example, there might be several customers who have bought B but would be willing to buy (or, rather switch to) A if A were offered to them at price and on terms that suit them. However, there is currently no mechanism for implementing this method in a mass market situation. In other words, there are no systems or methods available to do this optimally in a mass market situation, let alone while concurrently maximizing the benefit to the company. If the company were to have some knowledge of its customers' intentions, the company could be more exacting in its ordering, staffing and delivery. Inefficiencies thus would be reduced, revenue and profitability would be increased and the company would then be able to reduce its price to the customer while simultaneously improving profits.

The airline industry is an excellent example of one in which customer utilities vary considerably, and wherein it is appreciated that customers will pay for different levels of service. However, current ticketing and other support systems are inadequate to offer customization of service offerings commensurate with a customer's preferences and utilities.

An airline flight typically offers several levels of service through different cabins like coach (or economy), business and first. Most domestic flights in the United States have only two cabins, coach and first. There are some domestic flights that have either one cabin (by definition, all coach) or three cabins (coach, business and first). Airlines may use different names to refer to these cabins (explained elsewhere). The idea behind creating different cabins in an airplane is to provide different levels of service to its passengers, ranging from regular (economic) service in the coach cabin to most luxurious (and most expensive) level of service in the first cabin. The services differ in areas including, but not limited to, seating space and comfort, in-flight amenities and food service, priority-check-ins and luggage handling, reservation services and frequent flyer benefits. In a flight with three cabins, the first class cabin is usually the most expensive and luxurious, followed by the business class cabin and the coach class cabin. For these reasons, most airline passengers value the first or business class travel experience more than the coach class travel experience. Some first cabin fares may be as high as 5-10 times a discounted coach fare for the same Itinerary.

For simplicity, let us consider the discussion for a flight with only two cabins, first and coach. A detailed case with a greater number of cabins is presented later. High prices for the first class cabin often result in lower demand, leading to the existence of unsold seats in the first cabin. However, airlines seldom opt to reduce the Ticket Price for first class significantly to stimulate and increase demand. Rather, they try to use unsold seats to offer upgrades to selected passengers in coach. Airlines know that many passengers in coach would love to travel in the first cabin and, hence, they try to increase customer loyalty and offer first cabin upgrades to selected coach passengers, as an added benefit. Airlines have created several programs to offer these upgrades, such as frequent flyer award upgrades, elite traveler upgrades, corporate upgrades and staff upgrades.

In the frequent flyer mile award upgrade program, a passenger enrolled in a frequent flyer program may be able to use his or her accrued frequent flyer miles to purchase a first cabin upgrade. Certain frequent flyer passengers with extremely high travel frequency earn "Elite" (or special) status and become eligible to receive a certain number of first cabin upgrades for free. Airlines also create different upgrade programs for their corporate customers, both as a customary gesture and in exchange for return of frequent flyer miles. Airlines also offer upgrades to their staff, either for free (as employment incentives) or for frequent flyer miles. Some airlines have begun to sell first cabin upgrades for $35-$50 at airports ("Check-in Upgrades").

All these mentioned upgrade programs try to enhance the customer mix, or in other words, try to utilize the unsold first and business cabin seats to generate monetary or non-monetary benefits for the airline. However, none of these programs provides a solution that can optimally utilize all of the unsold first cabin seats. Even today, after using all sorts of upgrade programs, there are flights that still fly with empty first and business cabin seats. This occurs even though, there are coach passengers willing to pay somewhat more than the coach fare to get the otherwise empty first cabin seat. This clearly indicates that the existing upgrade programs are not very effective in tackling the situation.

The frequent flyer miles, elite, staff and corporate upgrade programs do not generate direct cash benefit for the airline. Also, only a select group of passengers are eligible to use these benefits. Frequent flyer miles and elite programs can be used by only those who have accrued high mileage and/or have earned "elite" status. Only airline staff can use the staff upgrade programs. Only some executives from a few corporations, who have arrangements with an airline, can benefit from the corporate upgrade programs. The check-in upgrade program does generate direct cash benefit but it is quite limited in its reach to passengers and in the potential revenues it can generate. In most instance, when a flight flies today with some empty first class seats, there are passengers traveling in coach who would want to take those unsold seats, at some price and/or on some terms that would bring direct or indirect benefit to the airline. However, there is no mechanism today to match the unmet needs and preferences of those coach passengers with the availability of unsold first cabin seats, much less to do so optimally (i.e., concurrently maximizing benefits for the airline and for the individual passengers' travel utility).

There are several factors contributing to this circumstance, as follows.

Varying passenger value: The relative value for travel in first class over coach varies from passenger to passenger. Even for the same passenger, the relative value changes from one trip to another (and even from one flight to another on the same trip) depending on rip duration, travel needs, budget, logistical factors and other personal or business constraints or needs. A business traveler may want to travel in the first cabin for all his trips to enjoy its luxury if his/her company pays for it. However, the same executive may desire to fly the cheapest coach ticket for all his personal (self-funded) trips. It has not been easy so far to accurately estimate a passengers' relative value in real time (or in quasi-real time).

Revenue dilution: If an airline chose to lower prices for the first cabin, it could, as a practical matter, probably fill all or nearly all of its first cabin seats, but that may cause heavy revenue dilution. Increasing the number of seats sold due to a reduction in unit Ticket Price may not necessarily increase the total ticket sales revenue. Hence, it may not be economically viable for the airlines to reduce the price for the first cabin seats. As is evident from the number of tickets purchased at regular first cabin fares, a level of demand exists for the high priced first class tickets. However, that demand varies and is often not sufficient to fill all first cabin seats.

Uncertain seat availability: It is very uncertain and difficult to predict at the outset exactly how much demand exists for first cabin seats at the given travel prices. Consequently, it is difficult for an airline to know accurately the capacity sold and unsold until the last few minutes prior to departure. The problem becomes worse as several booked first cabin passengers do not finally turn up for the flight (so-called "no shows") or cancel their trips at the last minute.

Last-minute upgrade logistics: The exact availability of first cabin seats can be known only minutes before departure, once the airline stops taking any additional passengers for the first cabin. At that point, however, an airline doesn't have much time to find potential passengers and process upgrades to fill the unused first cabin seats. They are under the gun to fly on schedule. A short delay in the departure of one flight can reverberate throughout the system and delay several other flights, leading to huge costs and customer ill-will (probably much more than the additional revenue earned from additional passengers).

Based on the above, there is no currently existing upgrade program that can (optionally or even roughly) match airline inventory with passenger travel utility to fill first cabin seats. There is no systematic method or system available that allows an airline to optimally utilize the unsold first class seats, let alone while concurrently maximizing the benefit to passengers (as a whole).

Similarly one can point to examples in many other industries, such as hotels, car rental, cruise, special events, automobile rentals and so forth. In the hotel industry, for example, deluxe or royal suites (i.e., the higher-rated and more expensive rooms) often don't get booked as frequently as other rooms, because of inadequate demand at existing high prices. The hotels do not currently have an optimal way to deal with this situation.

Consider another situation that affects an interaction between the customer and the company. While buying products, many times, customers are unsure of their exact needs or expect their needs to change (after purchase and before they utilize the product). In such cases, customers may prefer to have some flexibility to alter their purchases to accommodate their needs. In several industries, customers have to select and confirm the products at the time of purchase. Some industries do allow customers to return or change their purchased orders within a defined time frame and with or without penalties. For industries where products sold are of high value and/or perishable nature, change penalties are quite high or changes are not allowed. For example, airline ticket booking, hotel reservation, car rental, automobile sales, special events, real estate and so forth.

In the airline industry, customers usually buy tickets one to four weeks in advance (of the premeditated travel date) and are often unsure of their exact travel plans at the time of purchase. But, customers may not want to wait until the last minute (or till they determine their exact plans) to book flights as the flights may become unaffordable or unavailable as the departure date approaches. So, customers try to make the purchase decisions based on their best estimate of travel plans, and hope that their reservations would match their eventual travel needs. Such guess work often creates problems, as needs change and customers end up with bookings at variance with their desires.

On the other side of the screen, often, companies face unequal supply-demand proposition for their products. For many products, the supply keeps ahead of the demand even after all sorts of advertisements and marketing strategies. Companies are not able to efficiently utilize the surplus supply (especially in case of products that are perishable or prone to quick obsolescence), causing millions of dollars in lost opportunity and costs. Continuing with the airline example, most US airlines experience an average load factor of less than 80% or only about 80% of the seats get used. The rest 20% seats fly empty and contribute almost nothing (if any) to the incoming revenue. A significant portion of this surplus capacity could be used to satisfy the unfulfilled flexibility needs of at least some customers, who may have wanted to alter their bookings to include one or more flight that had a surplus capacity. However, today, travelers who want to change their flights are unable, hesitant or unhappy to do so because of efforts required, change fees, higher fares, unavailability of desired flights (or fares) or any combination of such factors. A good chunk of these customers would be willing to pay more (as per their needs) to get desired seats. But the entire change process creates an embarrassing situation for a customer and seldom drives a satisfactory experience. This represents a mismatch in customers' needs and airline's offering. In a nutshell, airline has perishable seats that customers desire but the current system does not allow the customer to get that seat at a price that would benefit both.

Today, airlines do not have any mechanism to allow such flexibility or changes in customer tickets at an individual level at conditions that would optimally satisfy both the parties. Instead, airlines try to deal with all such customers in a rather mechanistic way (or one cancellation/change policy) leading to unsatisfied customer demand and unused airline capacity. Besides the airline industry, there are several other industries (as mentioned above) that either do not allow flexibility or follow processes that involve high costs and/or demand significant efforts on the customer's end.

What is needed is a mechanism that allows customers to satisfy their need for flexibility at terms that con currently benefit both companies and their customers. With respect to the airline example, there is a need to provide flexibility to the customers in way that also benefits the airline. However, currently companies don't provide any such mechanism. In fact, companies try to resist changes in purchases as they a not able to handle it and it creates further chaos. They put high astronomical fees (change fees, to stop customers from making frequent changes.

Indeed, there is no system or method available that can be applied to all the above industries, and many more, and help companies to match the availability of their products to their customers' preferences, let alone while concurrently maximizing the benefits to both the company and its customers.

A technology platform (i.e., system) and methodology thus are needed for customizing, in an optimal way, a match between a company's cost and ability to provide flexibility to customers in buying products/services with the individual customers' relative preferences and utilities. In the airline industry example, a technology platform (i.e., system) and methodology thus are needed for customizing, in an optimal way, a match between an airline's cost and ability to provide travel flexibility to customers with the individual customer's preferences and utilities for travel flexibility.

A technology platform (i.e., system) and methodology thus are needed for customizing, in an optimal way, a match between the availability and pricing of higher ranked products/services with the individual customers' relative preferences and utilities. In the airline industry example, a technology platform (i.e., system) and methodology thus are needed for customizing, in an optimal way, a match between the availability and pricing of unsold up cabin seats (or higher ranked products) with the individual passenger's relative travel preferences and utilities for up cabins (or higher ranked products).

More particularly, a system and methodology are needed which support customization of service offerings in the airline and similar industries. Such customization preferably will address the different preferences customers have for flight scheduling, service upgrades, and responses to a variety of contingencies.

If such a match could be made, both company and customer would benefit. The customer would be more satisfied and the company (both in short term and long term) will be more profitable. A win-win scenario is created rather than a zero sum game.

SUMMARY

In response to recognition of this need, there is shown herein a system and method that allows businesses to determine their customers' preferences (implicitly or explicitly, in advance or in quasi-real-time) and to dynamically integrate these preferences with internal company economics to concurrently maximize value for both customers (i.e., their purchase utilities) and the company (i.e., its profitability).

A framework of systems and methods are shown that allows businesses to determine their customers' preferences (implicitly or explicitly, in advance or in quasi-real-time) for flexibility in purchasing products and to dynamically integrate these preferences with internal company operations to concurrently maximize value for both customers (individually or as a group, their purchase utilities) and the company (i.e., its profitability).

A set of systems and methods are shown that allows businesses to determine their customers' preferences and ranking for products (implicitly or explicitly, in advance or in quasi-real-time) and to dynamically integrate these preferences with internal company operations (across ranked products) to concurrently maximize value for both customers (individually or as a group, their purchase utilities with respect to ranked products) and the company (i.e., its profitability).

In general, it is an aspect of the system and method that a business determines a customer's preferences (flexibilities and associated relative utilities) in great detail and in real-time or quasi-real time from direct inquiries (explicitly) and/or past interaction (implicitly), before or while engaging in a sales transaction. When a sales transaction is formed, those preferences are then integrated with internal company operations and economics (costs, capacities, constraints, inventories, etc.). Values are then determined for product or service options to be offered to the customer based on integrated (i.e., aggregated) customer preferences and company economics. On one hand, these value options allow companies to reward or charge customers for their flexibilities with respect to preferences. On the other hand, these value options enable companies to maximize their revenue and/or profitability by unbundling their products and services, and best matching the offerings with a customer's expressed preference/cost tradeoffs. Since the customer gets something matching more closely his or her preferences than a "one size fits all" or small, fixed choice approach, customer purchase utility is increased and the customer is pleased to receive a product or service tailored to the customer's preferences. A company may charge for the purchase of some product options. So, customers pay for options made available to them and the company does not have to invest in offering everyone features that only a minority of customers want.

Accordingly, there is shown a system for collecting such customer preference information and pricing corresponding options and presenting options to the customer, receiving customer choices, and completing a sale. The collection steps may be implemented over the global Internet and its World Wide Web. However, other communication media may be used, as well, for all or part of the system or steps. For example, customer information may be taken over the phone or in person or via any other means. And a sale can similarly be completed by telephone or in person.

The system may also provide after-sale follow-up and implement execution of option terms purchased by the customer. An engine may be provided for this purpose. The engine may be a processor(s) that is programmed to execute a suitable event response algorithm. For example, if an airline customer at the time of purchasing a ticket were offered an optional feature that in the event of a flight cancellation the customer will be automatically re-booked on the next available flight, and if that option were purchased, then upon the occurrence of a flight cancellation, the system may respond automatically by executing the purchased option term procedure which will re-book the passenger as per the individual's preference. Each procedure for event response (related to a purchased option) may be custom programmed to implement the desired operations of the company or there may be provided a library of procedures generally applicable to an industry. The library procedures may be used by the company with or without customization. The detection of the contingency triggering the procedure may in some instances be made automatic, as by interconnection with the company's information management systems, or it may be externally or manually supplied.

Also shown are a number of novel products generated by the disclosed methodology, and related algorithms which may be implemented on the disclosed platform or any other suitable platform, thus constituting new methods and systems. Two value option frameworks (VOFs) and their associated methods and systems for delivery of these VOFs are presented in detail, the Alternate Product Option (or APO) VOF and the Upgrade Product Option (or UPO) VOF. Detailed demonstrations for applying these two VOF in the airline industry are shown. Specifically, there are shown airline tickets which, via the system, may be coupled to or include a variety of options including, without limitation, the Alternate Flight Option (or AFO) and the Upgrade Ticket Option (or UTO).

Other features and advantages of the invention will be apparent from the following description and the appended claims.

BRIEF DESCRIPTION OF THE DRAWING

FIG. 18 [label "prior art"] is a screen shot of a web screen showing a conventional reservation of an airline trip;

FIG. 19 is a simulated screen shot illustrating how an airline would interact with a customer related to the STS value option framework;

Figure 1:
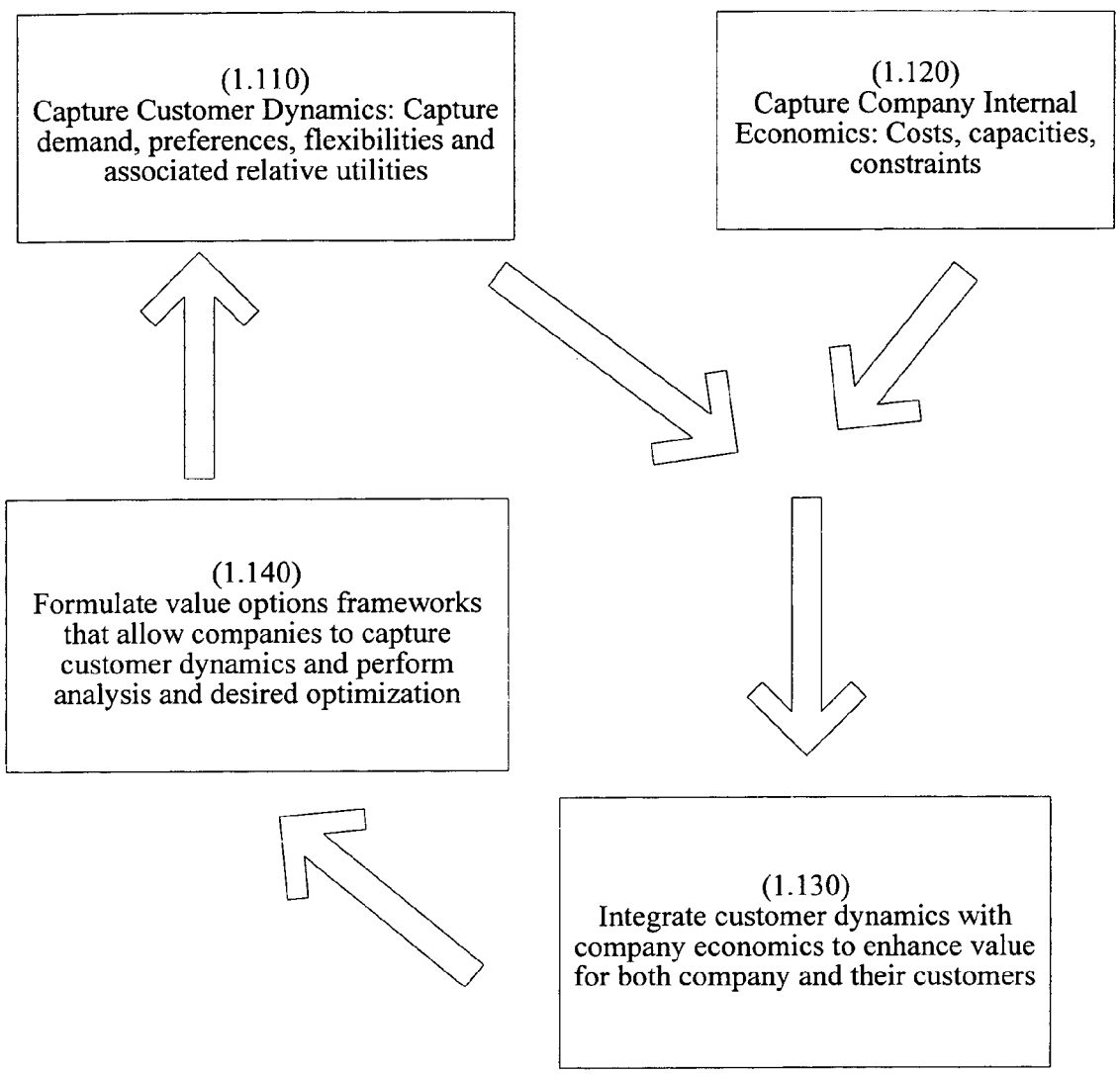
FIG. 1 is a diagrammatic illustration, in a high-level flow chart, of a method of achieving the optionally customized sale of goods or services as taught herein.

FIG. A1 is a diagrammatic illustration of an exemplary set of value segments and their value elements in the context of AFO-VOF in the airline industry;

FIG. A2 is a diagrammatic illustration of airline economic factors and mapping between customer dynamics and airline economic factors;

FIG. A3 is a partially-diagrammatic, partially-flow diagram representing the structure for creating an AFO Value Option Framework;

FIG. A4 is a diagrammatic representation of AFO Flights and Initial Transaction associated with an example of AFO (2, 1) instance;

FIG. A5 is a diagrammatic representation of various scenarios depicting different terms and conditions associated with an example of AFO (2, 1) instance;

FIG. A6 is a diagrammatic representation of AFO Flights and Flight Departure Summary associated with an example of AFO (4, 2) instance;

FIG. A7 is a diagrammatic representation of the Initial Transaction and various scenarios depicting different terms and conditions associated with an example of AFO (4, 2) instance;

FIG. A8 is a diagrammatic representation of the Initial Transaction and various scenarios depicting different terms and conditions associated with an example of AFO (4,n) (where 1<=n<=2);

FIG. A9 is a diagrammatic illustration of AFO time line used in a model to analyze AFO applicability;

FIG. A10 flow chart illustrating optimization of AFO value option framework;

FIG. A11 is a diagrammatic illustration, in a high level flowchart, of a process for AFO VOF implementation;

FIG. A12 is a diagrammatic representation of AFO implementation at the Itinerary Level;

FIG. A13 is a diagrammatic representation of AFO implementation at the Segment Level;

FIG. A14 is a diagrammatic representation of AFO implementation at the Leg level;

FIGS. A15, A16 and A17 are simulated screen shots of three web screens illustrating how Initial Interaction between an airline and a customer may take place in the AFO VOF;

FIG. A18 is a flowchart that expands Act 100 of FIG. A11, illustrating a high level algorithm for the "Sequential Buy AFO" process;

FIG. A19 is a flowchart that expands Act 120 of FIG. A18, illustrating an algorithm to search for AFO Flights (or Option Flight Segments);

FIG. A20 is a flowchart that expands Act 130 of FIG. A19, illustrating an algorithm for computing "Comb_ND_Set" for a combination of IFS and one or more OFS;

FIG. A21 is a flowchart that expands Act 100 of FIG. A20, illustrating an algorithm for computing "Seg_ND_Set" of a Flight Segment;

FIG. A22 is a flowchart that partially expands Act 140 of FIG. A19, illustrating an algorithm for computing Availability for offering AFO in a Flight Segment;

FIG. A23 is a flowchart that partially expands Act 140 of FIG. A19, illustrating of an algorithm for computing AFO Price for a combination of IFS and one or more OFS;

FIG. A24 is diagrammatic illustration and representation of a Price Matrix framework applied to compute AFO price for a Flight Leg;

FIG. A25 is a flowchart of an algorithm for the "Concurrent Buy AFO" process, an alternative process to FIG. A18;

FIG. A26 is a flowchart that expands Act 200 of FIG. A11, illustrating an algorithm for the "Customer Notification" process;

FIG. A27 is a flowchart that expands Act 130 of FIG. A26, illustrating the Chosen Flight Optimizer algorithm;

FIG. A28 is a simulated screen shot of a web screen illustrating how interaction between an airline and a customer may take place in the Customer Notification process related to an AFO VOF;

FIGS. A29, A30 and A31 are simulated screen shots of three web screens illustrating how Initial Interaction between an airline and a customer may take place in the Concurrent Buy AFO process;

FIG. U1 is a diagrammatic illustration of an exemplary set of value segments and their value elements in the context of UTO-VOF in the airline industry;

FIG. U2 is a diagrammatic illustration of airline economic factors and mapping between airline dynamics and company economic factors;

FIG. U3 is a partially-diagrammatic, partially-flow diagram representing the structure for creating a UTO Value Option Framework;

FIG. U4 is a diagrammatic representation of different UTO instances that may be created for a flight with three cabins;

FIG. U5 is a flowchart of an algorithm to create UTO options for a given number of entities;

FIG. U6 is a flowchart illustrating optimization of UTO VOF;

FIGS. U7 and U8 are simulated screen shots illustrating how Initial Interaction between an airline and a customer may take place in the UTO VOF;

FIG. U9 is a diagrammatic illustration, in a high level flowchart, of a process for UTO VOF implementation;

FIG. U10 is a diagrammatic illustration, in a high level flowchart, of an algorithm for the UTO Exercise process in UTO VOF implementation;

FIG. U11 is a flowchart that expands Act 120 of FIG. U10, illustrating an algorithm to create "Upgrade List" for a given set of entities and a list of upgrade-enabled passengers;

FIG. U12 is a flowchart that expands Act 110 of FIG. U10, illustrating an algorithm to create types of upgrade combinations for a given set of products;

FIG. U13 is a flowchart that expands Act 130 of FIG. U10, illustrating an algorithm for the "Upgrade Award" process in UTO VOF implementation;

FIGS. U14, U15 and U16 are diagrammatic illustrations of a practical example of the UTO Exercise process in UTO VOF implementation, displaying the inputs to the process and types of, upgrade combinations in FIG. U14, the generated Upgrade List in FIG. U15 and list of Upgrade Awards in FIG. U16;

FIG. U17 is a counterpart of FIG. U8 when a variable price strategy is illustrated in the UTO-VOF;

FIG. U18 is a flowchart that expands Act 100 of FIG. U9, illustrating an algorithm for the "Buy UTO" process;

FIG. U19 is a flowchart that expands Act 120 of FIG. U18, illustrating an algorithm to search for UTO value options);

FIG. U20 is a flowchart that expands Act 130 of FIG. U19, illustrating of an algorithm for computing UTO Price for a Flight Leg and UTO value option.

DETAILED DESCRIPTION

Selected illustrative embodiments according to the invention will now be described in detail, as the inventive concepts are further amplified and explicated. These embodiments are presented by way of example only. In the following description, numerous specific details are set forth in order to provide enough context to convey a thorough understanding of the invention and of these embodiments. It will be apparent, however, to one skilled in the art, that the invention may be practiced without some or all of these specific details. In other instances, well-known features and/or process steps have not been described in detail in order to not unnecessarily obscure the invention. One should not confuse the invention with the examples used to illustrate and explain the invention. The features and advantages of the invention may be better understood with reference to the drawings and discussions that follow.

The terms and definitions given below are needed to understand the following sections. Some of the key terms used in the description have been put in italics to enhance the readability.

The method and system taught herein connect customers directly to a manufacturer or service provider and the rest of the supply chain, herein referred to as "channel partners." The term "manufacturer" is intended to include vendors of services as well as vendor of goods. Hereafter, the manufacturer and channel partners will be collectively referred to as a "company" or "companies" and all of those terms will be appreciated to include sole proprietorships, partnerships, corporations or any other legal entity or combination thereof. The term "entity" includes "entity" or "entities" and all of those terms will include individual(s), group of individuals, company, companies, sole proprietorships, partnerships, corporations or any other legal entity or combination or consortium thereof. The term "airline" or "airlines" includes, but is not limited to, an airline, an airline's business partner, an entity which deals with an airline or an airline's business partner, a travel agent, an online travel agent, an option aggregator, any entity forming a part of the chain of commerce related to airline and/or travel industry, or any combination of any two or more of the above. The term "product" refers to a product or service provided by a manufacturer or a provider. For example, in the airline industry, a flight seat is a product that the airline sells to its customers. The term "customer" here implies an entity buying or entering into a contract to buy a company's product or service. The term "customer" may also refer to a passenger or any entity buying or entering into a contract to buy an airline's product or service. The term "optimize" is not intended to require achievement of a mathematical minimum or maximum, but to refer to enhancement.

The term "flight" refers to a single flight, a group of flights, flights with zero or more stops or any combination of the above. The term "Itinerary" refers to a list of flights included in a single travel trip of a customer. An Itinerary may consist of one or more "Segments" (defined below). An Itinerary can be a one-way trip (one Segment), a round-trip (two Segments) or a multi-city trip (two or more Segments). A round-trip Itinerary has two Segments back and forth between two places. Consider a trip from A to B and then back from B to A. This is an example of a round-trip Itinerary. A One-Way Itinerary has only one Segment (such as travel from A to B). A Multi-City Itinerary refers to an Itinerary with two or more Segments between two or more places. For example, travel from A to B and then from B to C, where A-B and B-C represent the two Segments between 3 places. Another example may be from A to B, B to C, and then C to D (three Segments: A-B, B-C and C-D).

The term "Flight Segment" (or "Segment", in short) refers to a part of an itinerary between a customer's intended origin and destination. A Segment may consist of one or more "Flight Legs". The term "Flight Leg" (or "Leg", in short) is the most fundamental unit of an Itinerary and is defined by a single takeoff and landing of a flight. In a round-trip Itinerary (A to B and B to A), there may be 2 Flight Legs from A to B (customer flies from A to C and then C to B, two connecting flights), and similarly two Flight Legs from B to A (customer flies from B to D and then D to A, two connecting flights). When a customer flies from A to B and the plane takes a stop in between at C, it is still considered to be two Flight Legs (A-to-C and C-to-B) even though the customer may/may not change planes between A and B and/or an airline may or may not use the same flight number to refer to the entire Segment from A to B. In the airline industry example, capacity of a flight refers to the total number of seats in the flight. The term "Ticket Price" here implies a price that an airline would charge in the absence of any Value Option Framework.

The term "transaction" here implies to do, to carry or to conduct an agreement or exchange. The exchange may or may not involve a price in terms of monetary value from customer side. The parties participating in the transaction may have obligation(s) from various terms and conditions. In other words, transaction may also imply an action or activity involving two parties or things that reciprocally affect or influence each other. A transaction is an agreement between the customer and the airline for exchange of any goods or services.

The term "related transactions" here refers to one or more transactions that are related to each other. In a Value Option Framework, the successful interaction between the participants may happen through a number of transactions in sequence, where each of the transactions in the sequence may (or may not) depend upon the outcome of the previous transaction, and, this may create a chain of "related transactions". However, at least one transaction in a set of related transactions must be related to all the other transactions. The connection or reference between the transactions may be direct or indirect and/or implicit or explicit. The related transactions may be contingent to each other or rely or require the aid of the other to support. The transactions may be fully and/or partly related to each other to be construed as related transactions. For example, the price of a transaction may be modified if the customer has already bought a product in a previous transaction, which makes the two transaction related to each other. IN another example, the customer is given availability in a flight since he or she has already purchased a ticket in another flight; which makes both the transactions related to each other. For the transactions to be called as related transactions, some dependency and/or nexus between the transactions has to be established. The transactions may become related transaction in one or more transactions.

The term "default" here implies a situation or condition that turns up in the absence of active intervention from the users in a contract. In such situation, a particular setting or value (termed "Default Settings" or "Default Value") for one/more exchange variables is/are assigned automatically. These Default Settings/Default Values remain in effect unless intervened.

The term "payment" here implies the act of paying or the state of being paid. The term "payment" here implies an amount of money or any other consideration paid at a given time or which has been received in the past but for which the benefit of the same is realized now, may be in part or in totality. "Payment" may also refer to a transfer of something of value to compensate for goods or services that have been, or will be, received. Payment may be made in cash, on credit or by transfer of miles or any other consideration. The payment can be from company to customer or from customer to company or both.

The term "significant period of time" here implies a time period that is large enough with respect to the total utility time for the customer that it may affect the behavior of a transaction.

The term "anytime" or "any other time" here refers to any point of time that lies between a time period starting from the initial interaction of a customer with an airline (for any ticket purchase or any other event) for a particular journey and ending when the said customer completes the said journey and/or any other journey related to the said journey.

Some aspects of possible embodiments of the invention were described in full detail in incorporated-by-reference patent application Ser. No. 10/973,802 and discussions of these will be omitted or abridged herein. Such aspects are nonetheless intended to be part of this application and reference to these may prove helpful for a fuller appreciation of the invention.

General Method Description: Kernel

Referring now to FIG. 1, there is shown a high-level flowchart style diagram of a method to achieve the optimally customized sale of goods or services to "close the gap." It involves the following steps or acts: In Act 1.110, certain inputs are captured, including customer dynamics and important value segments, their demand, preferences, flexibilities and associated relative utilities. Company economics and important economic factors such as, for example, costs, capacities and constraints are captured in Act 1.120. The customer information from Act 1.110 and the company economics from Act 1.120) are then in Act 1.130, "integrated" in a way that will permit optimization of value for both the company (i.e., its profitability) and customers (i.e., their individual and collective purchase utilities). In Act 1.140, value options are formulated that permit the capturing of individual customer preferences in way that can be used in the optimization/customized sale process illustrated. These same steps can be used in one or more permutations or combinations or iteratively.

At a high level, the system is operated and the method of FIG. 1 is executed to (1) to dynamically interact with the customers to determine detailed customer demand for the product and options, (2) receive a real-time assessment of company economics, i.e., capacities, constraints, and costs, (3) optimize across demands and preferences of all customers, and company economics, and (4) formulate value options for customers.

To take advantage of this system, a company has to obtain information about customer demand and preferences before a purchase, in a structured manner that can be easily understood and translated into satisfaction for customers and also can be used to optimize internal operations for companies. This data can then be integrated with the company's internal resources and capacities to enhance and improve its operations. A company can both better serve its customers and enhance its internal gains (for example, obtaining some or all of higher revenues, lower costs, higher capacity utilization, and improved service levels). A company can "optimally customize" its products and processes to enhance the value for customers, while simultaneously maximizing its business profitability. Customers also benefit from the fact that they spend less time researching products, can be assured that their priorities are known in case of change or contingency events occurring, can enhance their purchased products/services and get more perceived value for their purchase price. A company may develop reward/insurance incentive programs with its customers that permit optimization of company operations, using one or more reward or payment programs in a way that increases the company's internal profitability as well as satisfies customer preferences.

Figure 2:
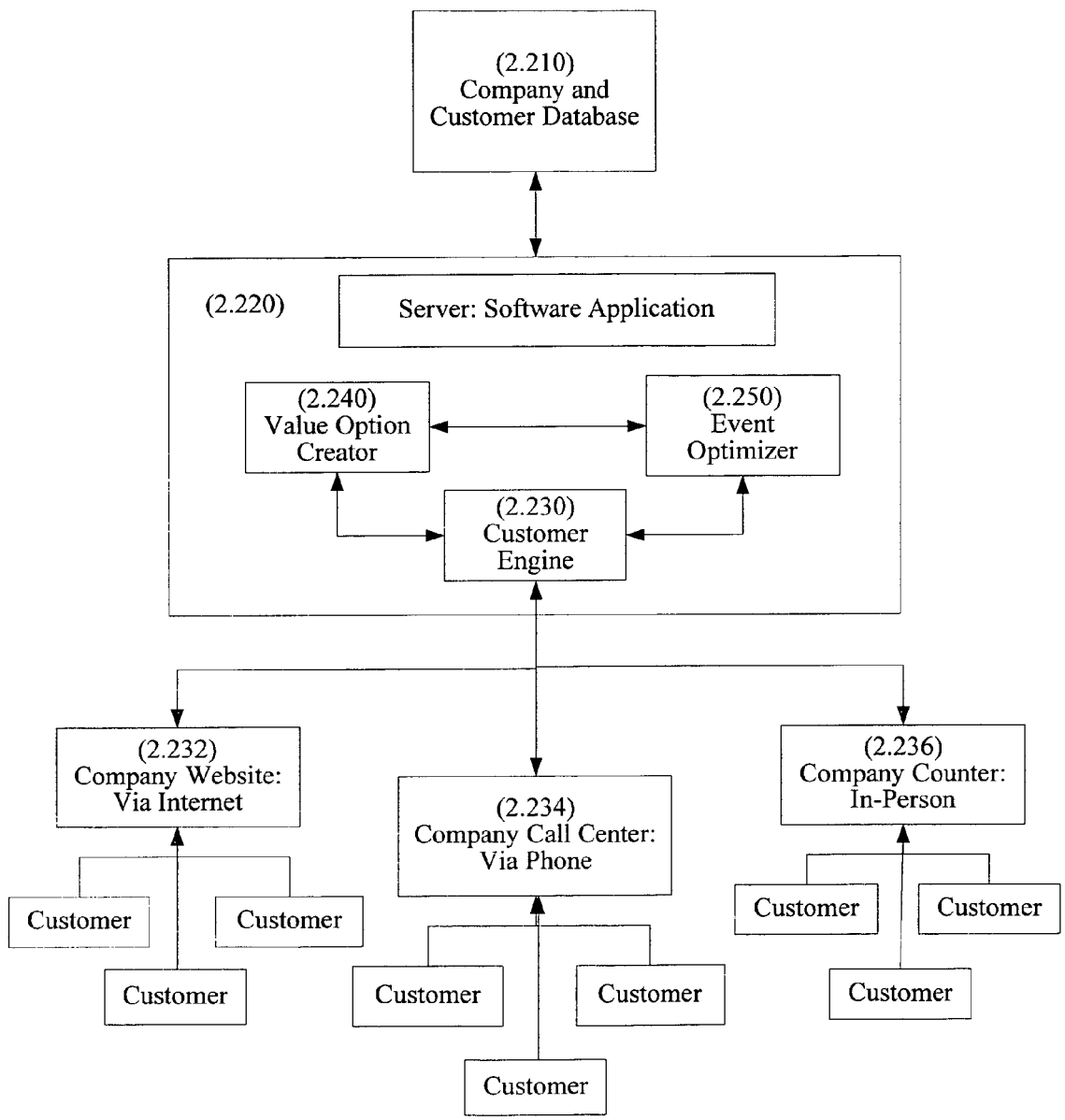
FIG. 2 is a block diagram of a system as taught herein for practicing the discussed method.

At a high level, a block diagram of a typical system for implementing this methodology is shown in FIG. 2. The data for driving the system, from both the customer side and the company side, is stored in a database shown in Box 2.210 (or multiple databases), which may be of any suitable database design and may be a commercially available database product configured for this application. The "heart" of the system is a platform, typically a server(s), shown in Box 2.220, which provides the processing capability to implement three modules, shown in Boxes 2.230, 2.240 and 2.250. The Customer Engine module (shown in Box 2.230) controls the interfacing with the customer via whatever media are selected by the company. For example, the company may use one or more of a web site (shown in Box 2.232), a call center (shown in Box 2.234) and/or live customer service "counter" personnel (shown in Box 2.236) (e.g., at a point-of-sale location). The Value Option Creator module (shown in Box 2.240) is a software program(s) that performs the functions of allowing a company to design, create and configure different value option frameworks and corresponding value options that can be offered to customer to capture their needs and preferences in detail and in a way that can be used to optimize across company operations. The Event Optimizer module (shown in Box 2.250) comprises a program or programs that (a) monitor company business performance and provide information about capacities that are available and underutilized, as well as other relevant factors that may vary from installation to installation; and (b) monitor for the occurrence of events related to the value options which customers have bought, and which then execute pre-designed protocols when a related event occurs (e.g., a re-booking algorithm is activated when a flight cancellation event occurs).

EXAMPLE A

Furniture Industry

Figure 3A:
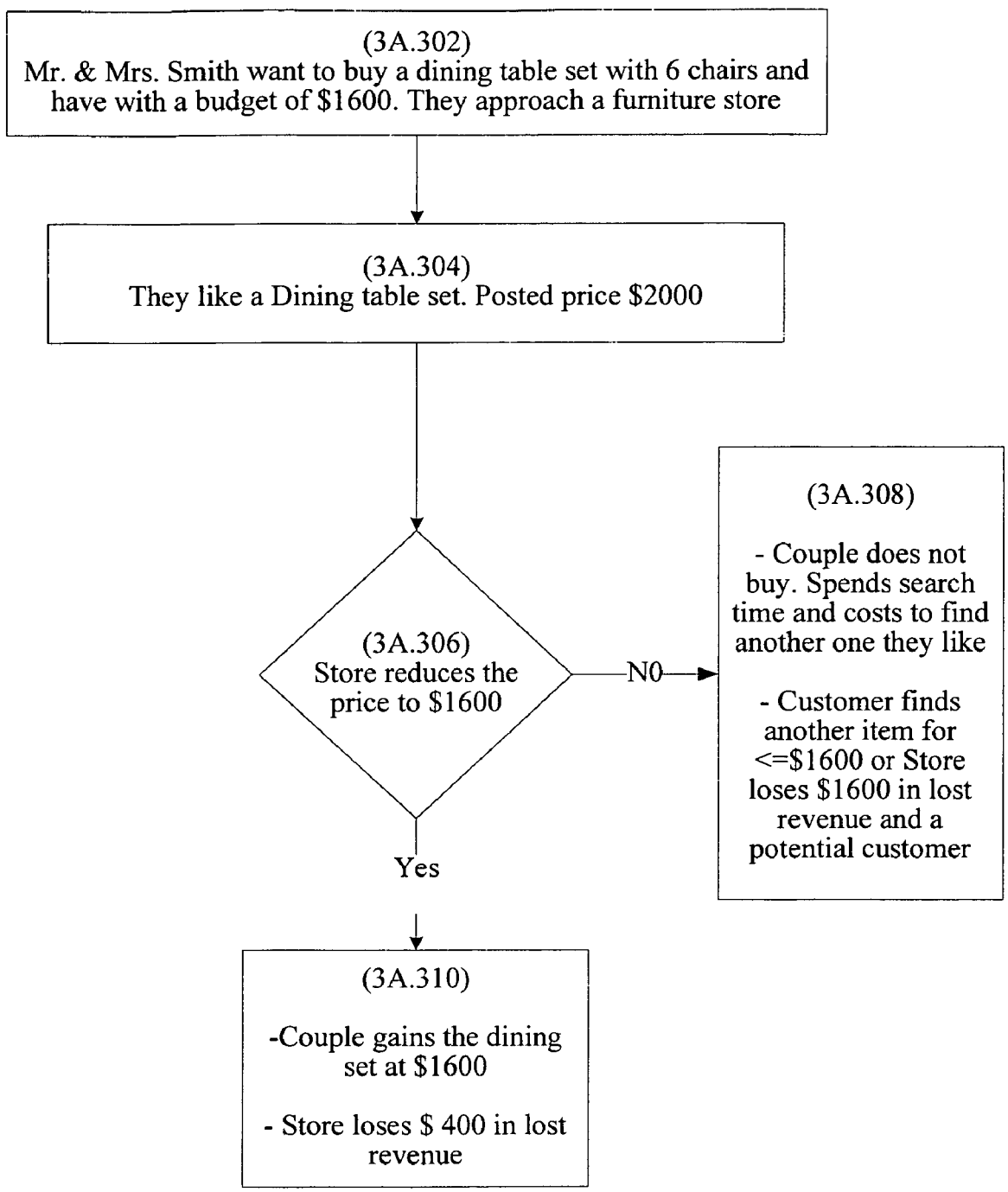
FIG. 3A is a flow chart of a prior art furniture sale transaction.
Figure 3B:
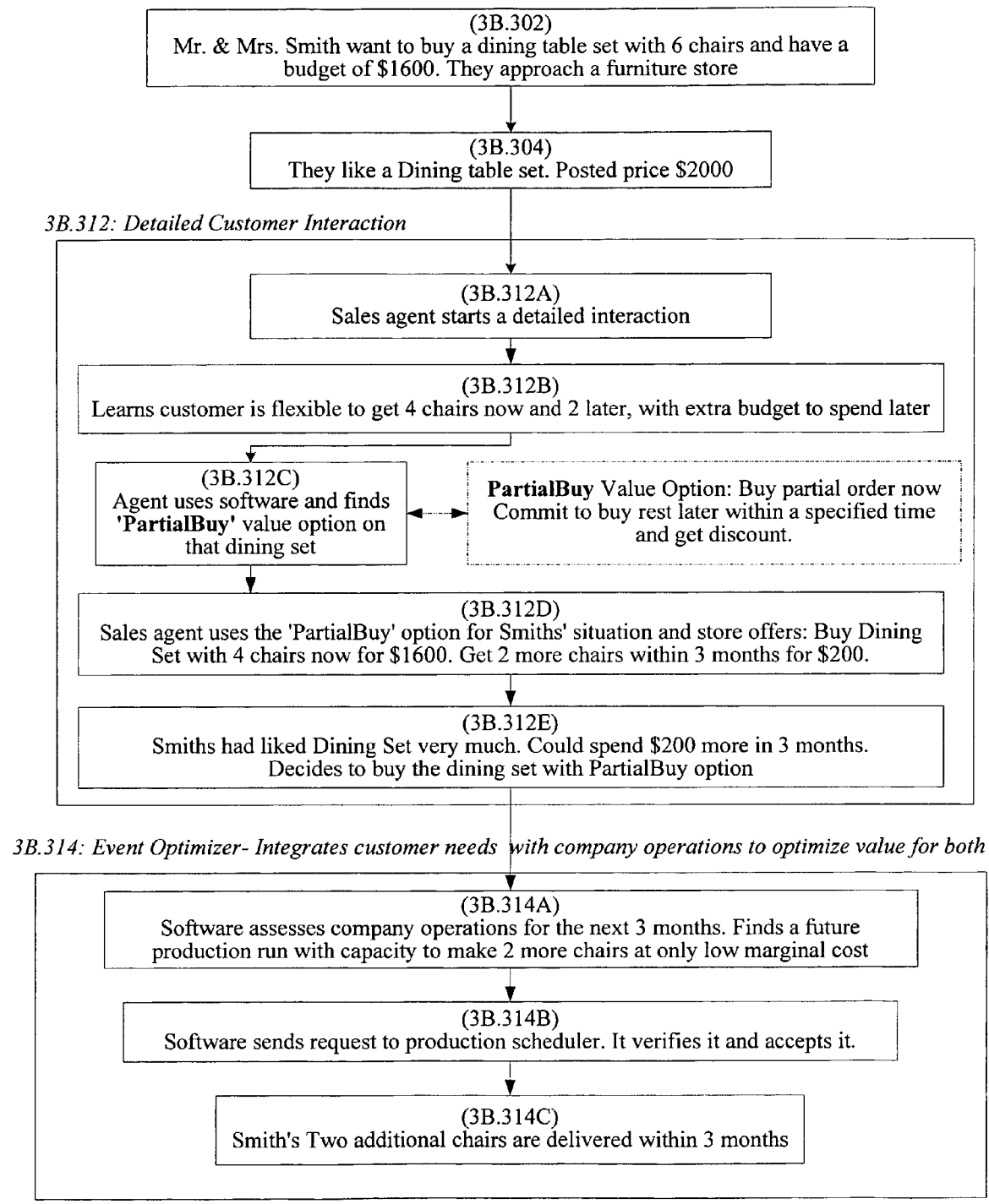
FIG. 3B is a flow chart of an alternative way of providing for more beneficial transaction that is shown in FIG. 3A, for the same parties.

As a first example which may be helpful, consider the typical prior art situation of FIG. 3A and its counterpart under the new regime taught herein and shown in FIG. 3B.

Turning to FIG. 3A, we posit that Mr. & Mrs. Smith were shopping for a dining table set with six chairs. The couple had a budget of only $1600. They walked into a furniture company store. Act 3A.302. There liked a particular dining set which carried an asking price of $2000. Act 3A.304. In the current world, (either one of the two things could happen: (a) the Smiths don't buy this dining set and search for another one, possibly at a competitor store, leading to loss in revenue for this store, Act 3A.308, or (b) the store owner could reduce the price (if possible) to offer the dining set at $1600 and make the sale to Mr. & Mrs. Smith, Act 3A.310. This latter alternative would provide satisfaction to Mr. & Mrs. Smith but would make the store owner lose $400 in planned revenue.

Now, let us understand, in connection with FIG. 3B, how the furniture company could have used the inventive system and method to improve its profitability while concurrently maximizing the satisfaction for the customer (Mr. & Mrs. Smith).

Act 3B.312 Detailed Customer Interaction: Using system (shown in FIG. 2) or the like, the company undertakes a detailed interaction with the Smiths. Let us assume that this is done via a direct salesperson-customer conversation, just to have a context. As shown in FIG. 3B, this activity involves a number of sub-steps (which shall nonetheless be called steps). In Act 3B.312A, the store sales agent (salesperson) starts a detailed interaction with the couple. During the interaction, the agent asks questions to learn that the Smiths could be flexible; that they are willing to get only 4 chairs now and to buy two more later, within a reasonable period of time. Act 3B.312B. He also learned they would have an extra budget to spend later. The sales agent uses a software tool to scan the sales options that have been established by the company, stored in the database (shown in Box 2.210), based on Smiths' needs, and picks the PartialBuy option on the dining set. Act 3B.312C. In the PartialBuy option, if a customer buys a partial order and commits to buying the rest of the order within a specified time period, the customer gets a discount. Upon selection of the PartialBuy option on the dining set that the Smiths liked, the Customer Engine provides to the Smiths an offer to sell them the dining set with 4 chairs at $1600, if they commit to buying two more chairs for $200 within three months. Act 3B.312D. This offer may be created in various ways. It may be based on choices the store management previously made and stored in the system, for example, but preferably it is generated in quasi-real time from current company data, as in the example discussed below. The Smiths had liked the dining set a lot and definitely wanted to buy it. Further, they could afford to spend an extra $200 in another three months for the two additional chairs. Hence, they decided to accept the company's offer with the PartiaIBuy option. Act 3B.312E. The sales agent executes the transaction successfully.

Act 3B.314: Event Optimizer—

The Event Optimizer, it will be recalled, integrates customer information with company operations to enhance value for both. The operation of the Event Optimizer is exemplified in Act 3B.314, which comprises three sub-steps. In this example, the Event Optimizer is designed to assess company operations over a three-month period, but that interval is arbitrary. In this example, the event optimizer software assesses the company operations for the next three months. ACT 3B.314A. In so doing, the software determines there is a future scheduled production run with additional capacity to make two more chairs at low marginal costs. The Event Optimizer module sends a request for two more chairs to the production scheduler (Act 3B.314B), which verifies it and confirms it.

An added advantage could be that the company may be able to consolidate more orders for the particular chairs within the next 3 months, to generate further economies of scale.

The furniture company built two more chairs in the scheduled run and delivered those to Smiths. Act 3B.314C.

Using the above system and method, the Smiths were able to purchase the product they wanted within their budget and time flexibilities, and it maximized their overall purchase utility. Although they paid $200 more than planned, they obtained the product they wanted and saved the extra search time and costs to look elsewhere. The returns to the furniture company included the generation of higher revenue ($1800 as opposed to $0 in one case and $1600 in another case) than otherwise was possible. Secondly, the company also saved certain costs including inventory, storage, overhead, sales and marketing costs on the additional two chairs, which consequently increased the company's profit margin. The company increased their capacity utilization by building two additional chairs. The company also benefited from the fact that they were able to become an important part of the Smiths overall buying experience and by positively affecting their buying decision. Note that the purchase of the dining set is really a subset of the Smith's decorating their house. Instead of working on one purchase decision at a time, the company's overall intent is to tap into the whole decorating scheme and sell the full range of products, not just tables and chairs. A typical dining room has much more furniture. By working with the customer on the entire purchasing decision, the company benefits in the short run by planning better with a known demand and in the long run by selling an entire room instead of a few components. In a later example, we focus on a trip package not a single plane trip. Finally, the furniture company benefited from adding another satisfied customer to their customer base, which could lead to higher repeat business in the future and provides free word-of-mouth marketing.

Thus, both the furniture company and the customer benefited at the same time. As repeated elsewhere the details of an Event Optimizer will be specific to the transactional optimization being implemented.

EXAMPLE B

The Airline Industry

Let us consider another example, this time from the airline industry, of how a customer and a company can both benefit at the same time, by closing the gap between them. The traditional approach of FIG. 4A will be contrasted with the new teaching of FIG. 4B.

Figure 4A:
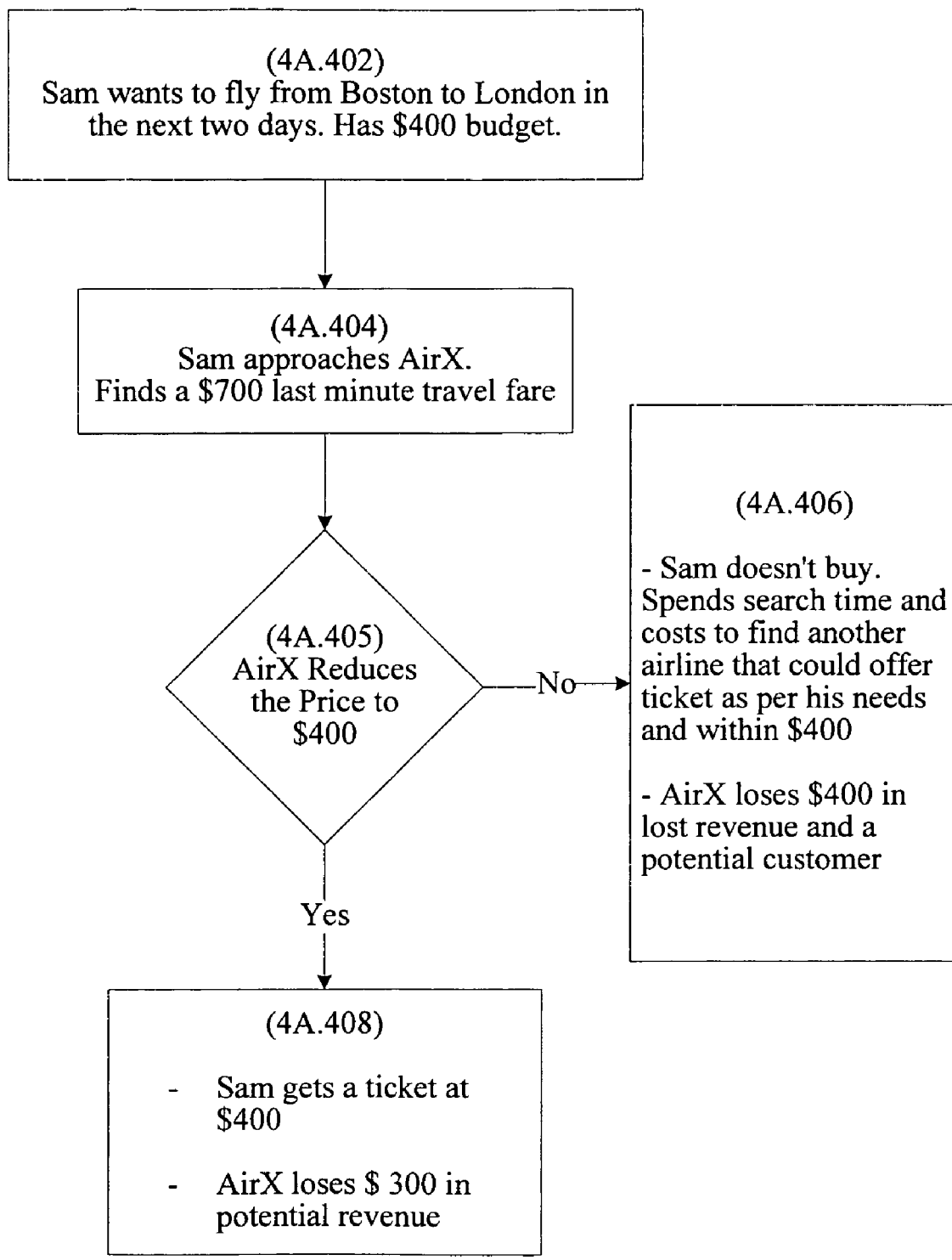
FIG. 4A is a flow chart of a prior art airline ticket sale transaction.
Figure 4B:
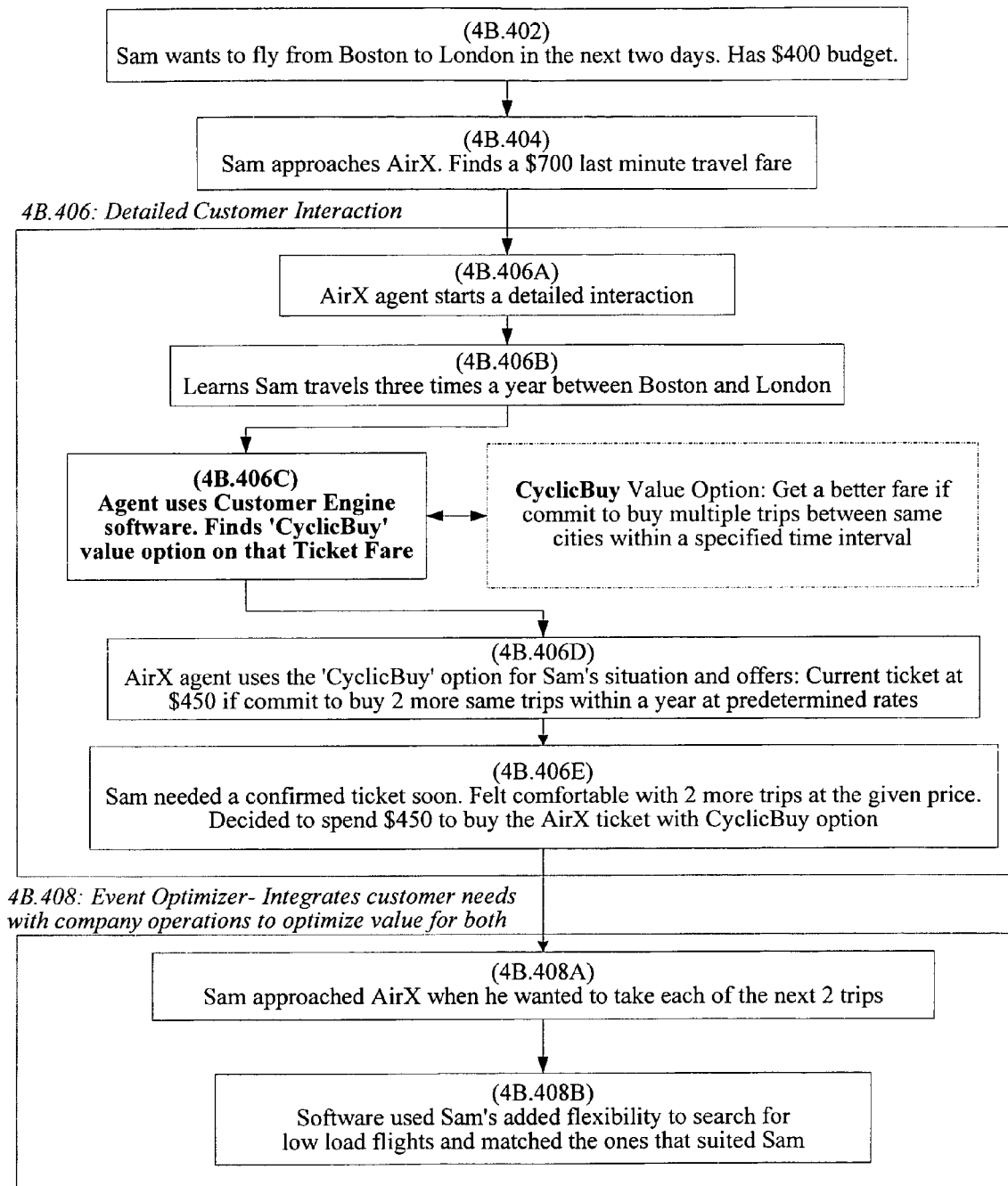
FIG. 4B is, by contrast, a flow chart of one alternative way of providing for the sale of an airline ticket using a CyclicBuy option as target herein.

As shown in FIG. 4A, in Box 402, Sam wants to travel from Boston to London within the next two days and has a $400 budget. Sam approaches an airline, e.g., AirX, for an airline ticket from Boston to London. Act 4A.404. Within the current business conditions, i.e., last minute travel, Sam is likely to find very high prices for tickets, say $700. If Sam had booked the ticket at a 14- or 21-day advanced purchase, he might have gotten a ticket at a much lower price, say $400. In this situation, the company (AirX) and Sam are playing a zero-sum game. Either Sam could leave AirX and approach another competitor, who might offer him a cheaper rate (Acts 4A.405, 4A.406), or AirX could potentially lose profit (if someone else were willing to buy the $700 ticket) by offering Sam a discount to gain Sam's business (Acts 4A.405, 4A.403).

The method taught above can change the outcome of this situation. Using, for example, the computer network arrangement similar to FIG. 2, via a software application 2.230 running on a web server 2.220, a detailed interaction with Sam is begun. This is a structured interaction. Act 4B.406A. From this interaction, the Customer Engine 230 administers a questionnaire or survey which is designed to elicit information useful in constructing options to offer Sam. The possible options are stored in database 210. From this survey, AirX learns about Sam's demand in great detail (Act 4B.406B) before quoting Sam a price for the airline ticket. For example, AirX learns that Sam travels about three times between Boston and London each year.

The Customer Engine 2.230, in response to the agent query (this may be a human agent or a software agent) analyzes the value option frameworks available from the Value Option Creator 2.240 and picks the CyclicBuy value option that suits Sam's situation. Act 4B.406C. In the CyclicBuy option, a customer can get a better fare if he commits to buying multiple trips between the same cities within a specified interval. The Customer Engine runs the CyclicBuy value option on the ticket that Sam wants and finds one or more value options for Sam. For example, AirX offers Sam a flight for $450 if he commits to flying AirX on two more similar trips within that year, at predetermined rates. Act 4B.406D. Let's assume Sam wanted to get a confirmed ticket soon, and he felt comfortable about making two more trips within the next year at given rates. He decides to buy the AirX ticket at $450 along with the CyclicBuy option. Act 4B.406E.

So, what happens when Sam is ready to make the two additional trips? This is where the Event Optimizer module comes in. The Event Optimizer engine figures out how best to meet Sam's need and satisfy the company's contractual obligation to Sam while doing so in the way most advantageous to the company. That is, there usually will be multiple ways to meet Sam's need but some are more profitable than others. The module decides which to deliver.

Sam begins by approaching AirX for a ticket. Act 4B.408A. Since Sam is free of the burden of searching for air fares, he saves time and aggravation. The Event Optimizer module uses Sam's needs and flexibilities and integrates the same with AirX's schedule, availability, costs, load factors and other relevant considerations, to determine low load factor flights that also satisfy Sam's needs and meet the company's commitments to Sam. Act 4B.408B. The choices are presented and Sam picks one or the system makes the selection and informs Sam of the arrangements.

In this way, the situation turns from a zero-sum to a non-zero sum game. Sam gains purchase utility value: he gets to his destination with his requirements met (design, price, delivery, and service) and with reduced effort and aggravation. AirX makes more revenue and profits, i.e., AirX fills three seats profitably while Sam travels three times at a competitive and acceptable cost. AirX was able to increase its capacity utilization and also balance its load to fill flights with low load factors.

Process to Use the New System and Method in an Industry

With those examples as background, it would be useful now to describe in detail how this system and method may be used in any particular industry. (Industries and companies best suited to use and benefit from the invention are those with large numbers of customers and wherein those customers would have varied utilities for aspects of a product offering, if those aspects were unbundled and some made optional.)

To get maximum benefit from the herein disclosed system and method requires the use of human judgment. It should be emphasized, therefore, that there is shown a "platform" technology and a variety of non-exhaustive ways of using the platform. Those who make use of this platform in their companies will make decisions and exercise their judgment so that each instantiation or practice is likely to be unique, at least to a degree. In addition to disclosing the platform, via the given examples we also disclose certain instantiations of the system and method which themselves are believed to have value but the system and method are not intended to be limited to these instantiations except as they may be expressly claimed.

Using the discussed system and method in any industry involves a two-staged approach. The selection of an industry is assumed. The industry provides a context. Starting in FIG. 5, in the first stage of the method, a set of value options frameworks (to be associated with a company's offerings) is created. It is immaterial, for the current discussion, how one obtains the information used to construct a value options framework. Implicitly or explicitly, a value options framework reflects some sort of analysis of customer dynamics and company economics. In simplest form, a value options framework is a listing of optional components of a product offering and associated charges. Thus, to construct a value options framework for a particular type of transaction, one needs to arrive (however one chooses) at a list of components the customer may select when buying a product, and their prices. For example, in a simple case there may be delivery options and warranty options and maybe training options. In another example, a car dealer might offer equipment and color options. Each option is assigned a price, whether statically, quasi-statically, or dynamically. Static pricing is assigned at very infrequent intervals. Dynamic pricing (determined by an algorithm invoked by the Event Optimizer is assigned either on an on-demand basis for a particular transaction or at frequent intervals so as to yield pricing based on near (i.e., quasi) real time company performance data. Quasi-static pricing would be somewhere between the former two situations, such as pricing done quarterly or monthly based on then-current information about the company. Pricing may involve running financial analyses based on known data to optimally set the conditions and pricing in the value options framework associated with the company offerings.

Figure 17:
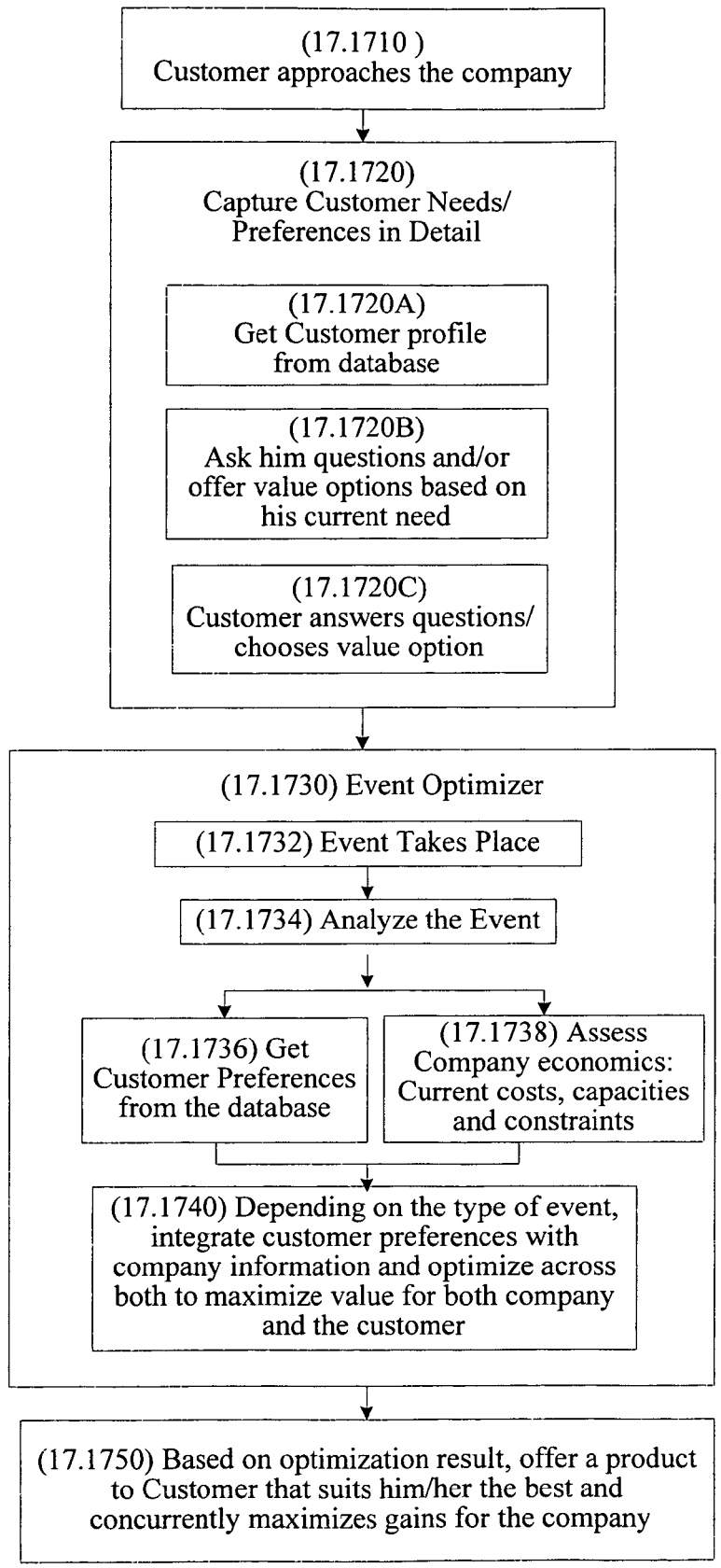
FIG. 17 is a flow chart of a process to implement value options framework.

The second stage, as depicted in FIG. 17, involves a detailed interaction with the customer who has approached the company (Act 17.1710). Approaching the company may involve accessing a web site or calling a call center or any other way of commencing a transaction. The interaction (Act 17.1720) occurs in a structured format to capture the customer's expressed needs, preferences, flexibilities and relative utilities. As a preliminary matter, it is possible the customer may previously have registered a profile containing default selections of needs, preferences, etc. So, the database 2.2.10 is interrogated to determine whether a profile exists and, if so, to retrieve it (Act 17.1720A). The customer is presented with questions and/or value options (Act 17.1720B) and in response he/she supplies answers and select options that suit him/her (Act 17.1720C).

The second Act in the second stage is executed by the Event Optimizer module 2.250. A summary of the algorithmic flow of the Event Optimizer presented in Box 17.1730. The Event Optimizer is alerted to, or detects, the occurrence of an event (shown in Box 17.1732 and 17.1734) for which an event-response procedure (program) has been pre-stored. Each event-response procedure is designed by the company to effect selected action(s) in response to detection of its corresponding event. Depending on the nature of the event, an event-response procedure may invoke an optimization algorithm (shown in Box 17.1740), assess the company operations (possibly in real time) and analyze, across company operations (shown in Box 17.1738) and customer information (shown in Box 17.1736), potential results to determine results that concurrently maximize the benefits for the company and the customer. The optimization may or may not modify the company product offerings to better suit the customer while simultaneously maximizing the company operations (shown in Box 17.1750). Both of the stages and the steps involved will now be discussed in detail.

First Stage: Formulation of Value Option Framework

Figure 5:
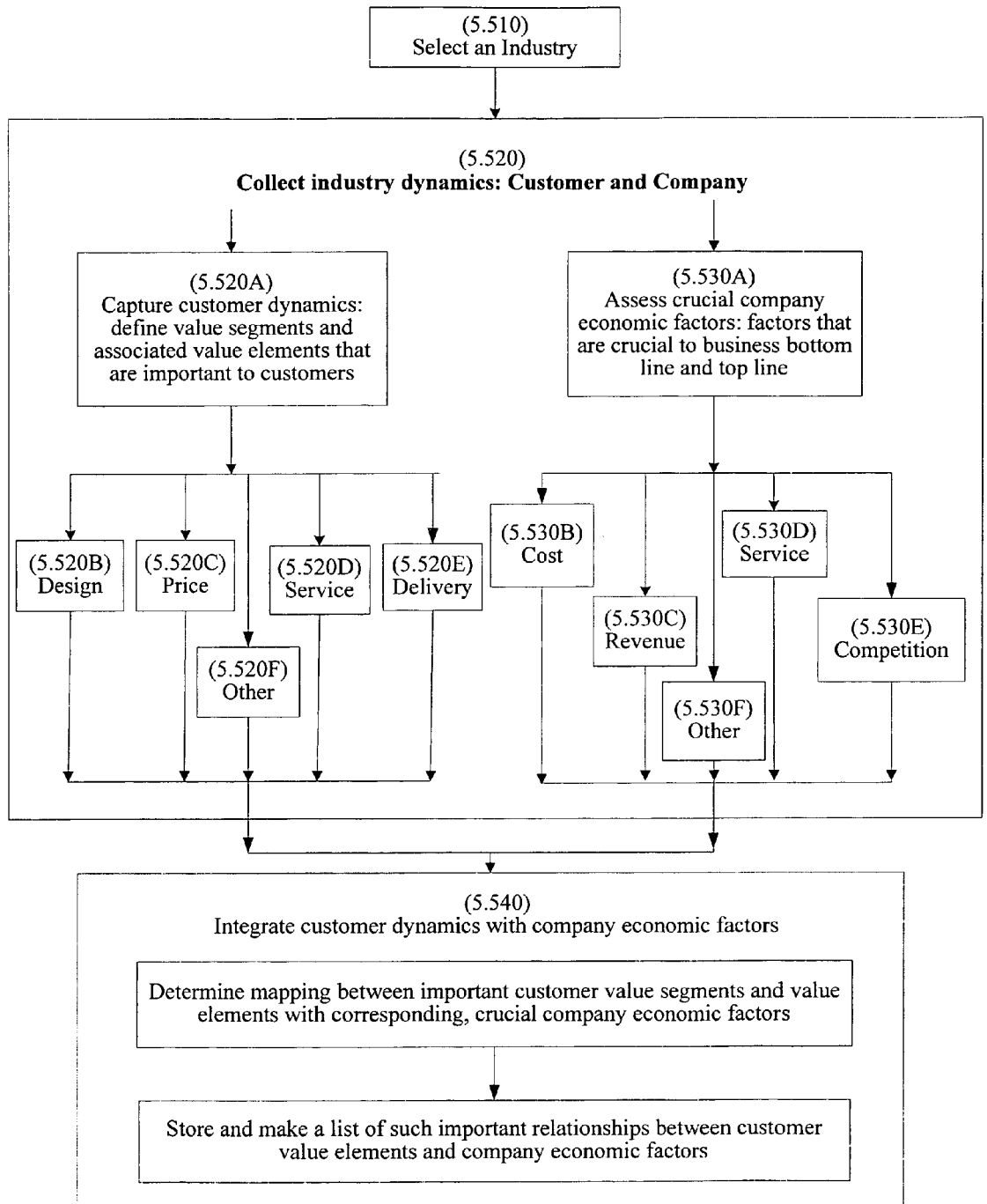
FIG. 5 is a flow chart of a method to create a value options framework showing collection of industry and customer dynamics.

Turning to FIG. 5, it will be assumed that the inventive method and system are to be adapted to a particular industry or company. One may develop a generic instance for tin industry or particularize it to an individual company. Some considerations will inherently be generic to an industry. Thus, to formulate a value options framework, one begins by selecting the industry. Act 5.510. Next, the customer and company dynamics are captured. Act 5.520. To capture customer dynamics, one needs to understand the value segments and value elements that are important for the customer. To assess company dynamics, one needs to assess the economic factors that are crucial to the company's profitability and performance. The details are explained below along with a Act-by-Act detailed example from the airline industry.

Capturing Customer Dynamics—Act 5.520A

Figure 6A:
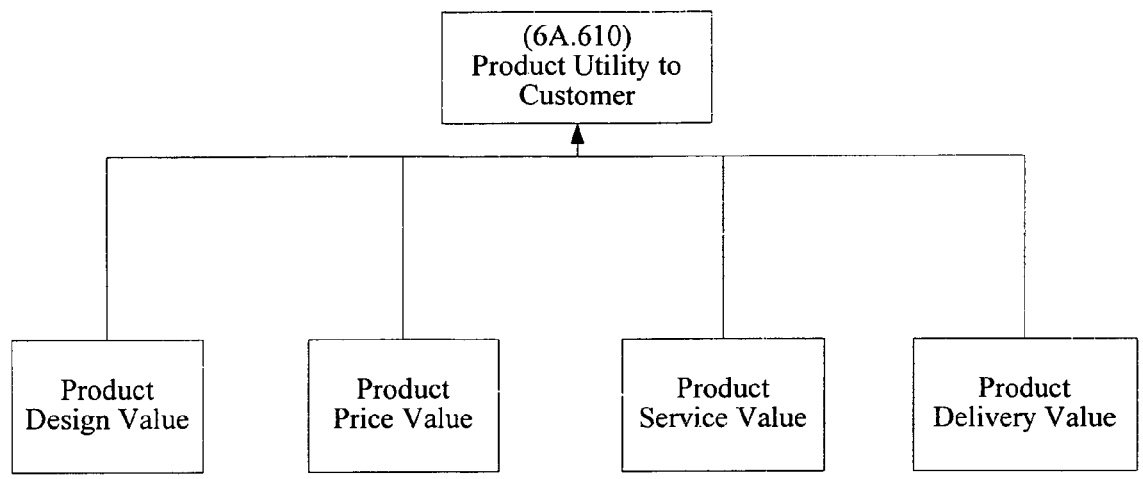
FIGS. 6A and 6B are diagrammatic illustrations of the relationship between overall product utility and contributions thereto as perceived by a customer.
Figure 6B:
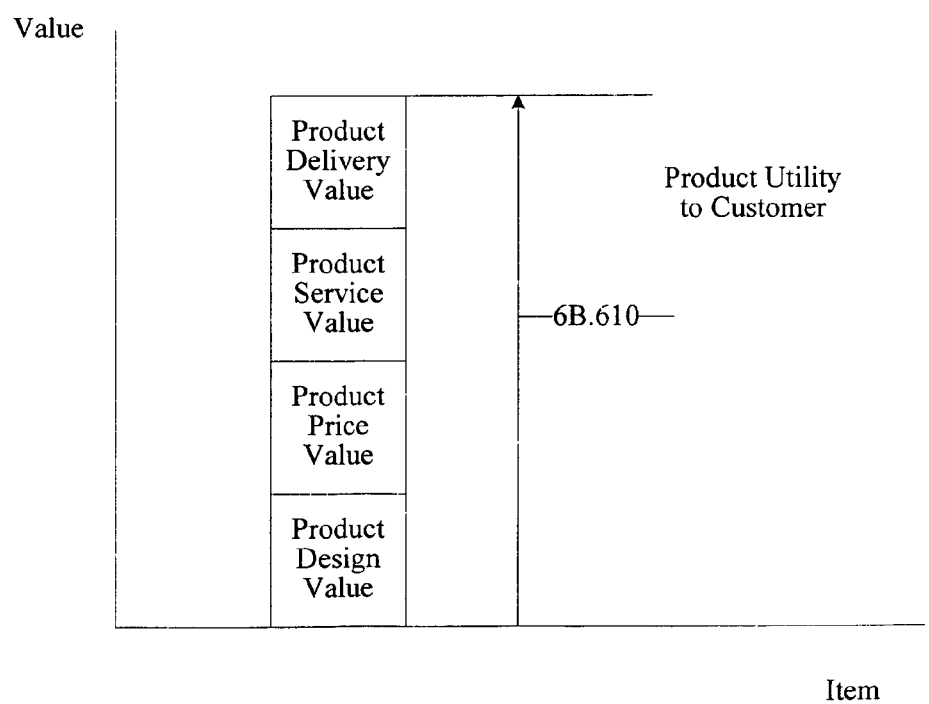

A customer derives certain utility by purchasing a particular product. The purchase utility value, typically, can be separated into many value segments. Individual customers value these segments (which include core qualities of the offering as well as options and contingent options i.e., options dependent on options) from the perspective of what is important to the customer through the whole buying and usage experience, starting from, searching for a product, placing a particular order and using the product throughout its lifecycle. To go further, it will be helpful to define two terms: value segment and value element. A "value element" is a distinct aspect/characteristic of a product's buying and usage experience that may affect the utility of the product to the customer. A "value segment" is a particular category of such value elements. While value segments may vary from industry to industry and will have to be selected by the individual or team that implements a particular instance of this system and method, for many industries, the four most important value segments are (a) product design value, (b) product delivery value, (c) product price value, and (d) service value. See boxes 5.520B to 5.520E. These value elements are shown in FIGS. 6A and 6B, which are simply alternative views of the same information and will be discussed below. It should be noted, however, that these value segments are just provided for illustration purposes. Industries that can benefit from the system and method of the invention may have more or fewer than the listed value segments and/or a different list of value segments. Each value segment may have one or more value elements. Further, the actual number of value elements in each value segment may vary with the industry, the level of detail in the business model, and even the customers. The system implementer can choose the number of value elements in each value segment.

Total Value for Customers:

A customer derives unique value from each value segment; the total utility value of the product to a customer (shown in FIGS. 6A and 6B) is the combination of values derived from each of the value segments. A customer would benefit the most if the total expected value of his/her utility were maximized. Another important aspect to note is that every customer also has an acceptable range (e.g., equals, exceeds, or disappoints, minimum or maximum) for each individual parameter value. Even if a particular product has high overall value, a customer may not desire the product if it scores below the minimum level (i.e., low enough to reject the product) for any one or more of the value segments or value element. Mathematically, the concept may be expressed as:

$$TU(Cj, Pk) = \sum_{i=1}^{n} Ui(Cj, Pk)$$

where,

TU (Cj, Pk)=Total Utility for Customer (Cj) from, buying and using a product (Pk)

Ui (Cj, Pk)=Utility derived from value element (i) of Product (Pk) for Customer (Cj)

n=Number of value elements

For the four value segments defined above, the above formula can be transformed into:

$$TU(Cj,Pk)=Uds(Cj,Pk)+Udl(Cj,Pk)+Us(Cj,Pk)+Up(Cj,Pk)$$

Where:

TU (Cj, Pk)=Total Utility for Customer (Cj) from product (Pk)

Uds (Cj, Pk)=Design Utility value of Product Pk to customer Cj

Udl (Cj. Pk)=Delivery Utility value of Product Pk to customer Cj

Us (Cj, Pk)=Service Utility value of Product Pk to customer Cj

Up (Cj, Pk)=Price Utility value of Product Pk to customer Cj

Each of the utility functions depends on the particular product and the customer in concern.

Much work has been done on utility analysis and multi-attribute utility analysis and how to build such utility functions, in the academic and corporate world. Using a utility analysis model is not a requirement for a user to effectively use the system and method taught above. It may help to further increase the benefit derived from using the system but it is not necessary. It is, however, important to understand the concept of utility to be able to better use the system and method taught herein.

Figure 7:
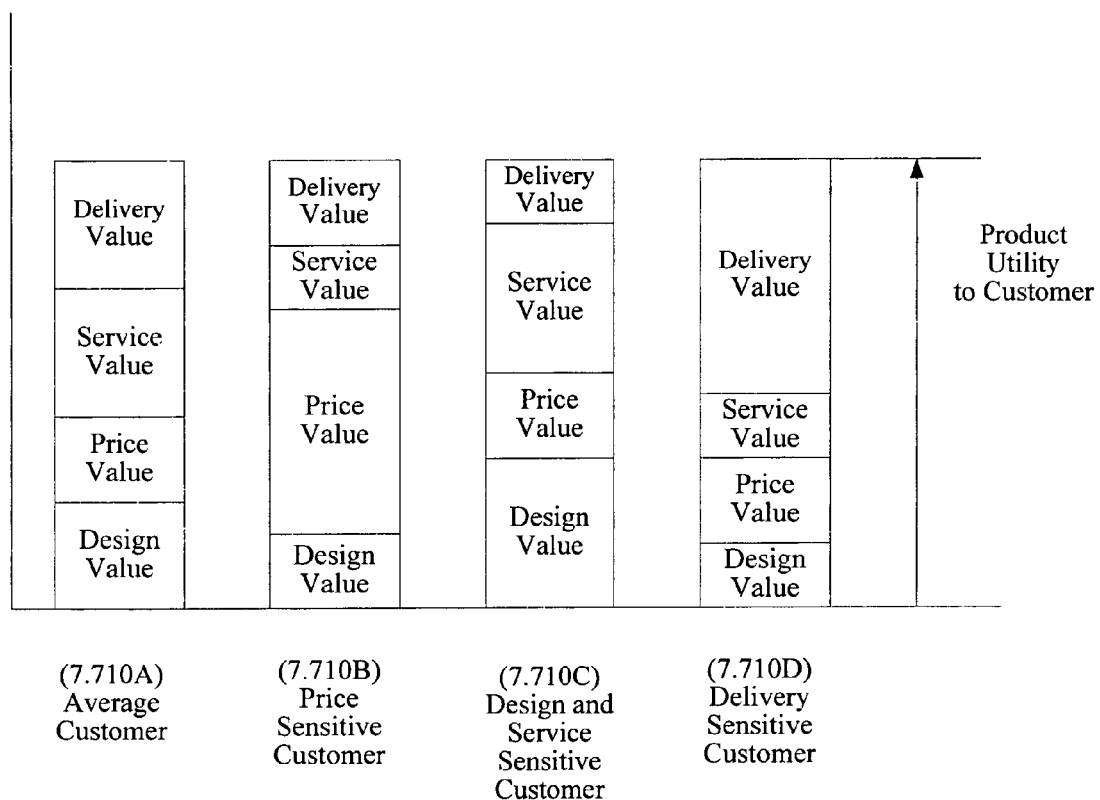
FIG. 7 is a diagrammatic illustration of the perceived utilities of a product by four customers.

Concept of Tiered Value Perception:

Different customers may derive different utility from different aspects of the same product. As shown in FIG. 7, four different customers 710A-710D may compute to the same (total) overall utility even though they assign different utility values to each of the value segments. For example, a human resource manager, who has scheduled interviews with candidates, would value the timely ticket to his destination much more than a vacationer, who may be flexible. Consequently, the company needs, in some way, to define and learn about these value parameters for individual customers, along with relative preferences and utilities associated with each parameter. This will be illustrated below using the previously listed value segments. A web-based questionnaire is one excellent way to collect this information. The collected information is then stored in a customer profile or Itinerary in a database, such as database 2.210.

(a) Product Design Value:

The "product design" segment refers to the value elements relating to the design features and characteristics of a product that the customer actually buys. The airline industry will be used as an example or case study. For example, in the airline industry, product design for an airline ticket would include value elements (as shown in Box 8.810A) such as total flight duration, number of intermediate connections, departure and arrival time, and route. Each customer places his or her own values on these different design value elements. For example, one customer, a vacationer, may value the particular departure date more and may not be too concerned about the departure time. Another customer, a businessperson, may value arrival time more than departure time, in order to get to a meeting. The company thus collects information on the product design needs of the customers.

(b) Product Delivery Value:

The "product delivery" segment refers to the value elements relating delivery or time-frame related aspects like, for example, lead-time and delivery schedule from the time the customer places an order. In the airline industry, for example (as shown in Box 8.810C), one value element for an airline ticket could be lead-time between placing an airline ticket order on a website or with a travel agent and getting ticket confirmation or ticket in hand, e.g., e-ticket or paper ticket. Another delivery value element could be the amount of time between the order confirmation and actual departure date (or, in other words, how long before the actual departure date the customer needs to order the ticket—e.g., 7 days, 14 days or more than 21 days) to get the desired value. Again, each customer may place his or her own values on each of these value elements. The company collects detailed information on the product delivery needs of the customers.

(c) Product Price Value:

The "product price" segment refers to the groups of value elements related to the price a customer pays to buy/use a product. Value elements in this segment may include total product price, delivery costs, warranty or after-sales service costs, and any other relevant costs incurred by the customer in buying and using the product. Some times, addition of all these price elements is also termed total cost of ownership (TCO). A customer derives maximum price value by paying the most desired price for a product. Any price paid either lower or higher than the desired price may change the value the customer gets from the price of the product. In the airline industry (as shown in Box 8.810B), for an airline ticket, the product price would include the cost of the ticket, taxes, any fees, delivery charges, cancellation or change costs as incurred by the passenger. The company collects information on the product price needs of the customers.

(d) Service Value:

The "service value" segment refers to a group of valve elements related to the service a customer receives from pre-sales and post-sales services offered by the company to facilitate the use of the products sold. Pre-sales services include services provided by a company to help its customers decide and choose products based on their requirements. Post-sales or after-sales service refers to the warranty, product support, maintenance support and other relevant activities that may help a customer to use the product effectively. For example in the airline industry (as shown in Box 8.810D), pre-sales services include providing access to detailed flight information, as well as various methods of payment and of booking tickets. The post-sales services in the airline industry would include services like check-in, flight status reporting, management of flight cancellation or flight delays, customer service and administration of frequent flyer programs. Individual customers have different requirements for both pre-sales and post-sales services and thus place different values on such services. A customer will derive maximum service value from a product if the services provided by the company completely match or exceed those desired by the customer. The company utilizing the invention collects information not only on the service needs of its customers, but also on customer preferences on different possible events that might occur during or after the purchase. For example, in the airline industry, such information could include customer preference in case of flight cancellation or delay. For example, the customer could be asked to indicate whether the customer is insistent on taking the next available flight or if the customer is flexible and able and willing to wait longer (each decision may be a function of cost, or other factors).

Summary of Capturing Customer Dynamics:

Based on the method described above, the first Act for a company-user is to establish the value segments and value elements it will present to the customer for the customer's decision. It may establish these value segments and value elements in any way it chooses, but a preferable way is to analyze the value segments and value elements that are important to customers by doing market research. Such market research may, for example, include conducting focus groups with customers, via questionnaires, or using other techniques familiar to marketing professionals. An industry expert may choose to avoid such research and, instead to rely on experience.

Figure 8:
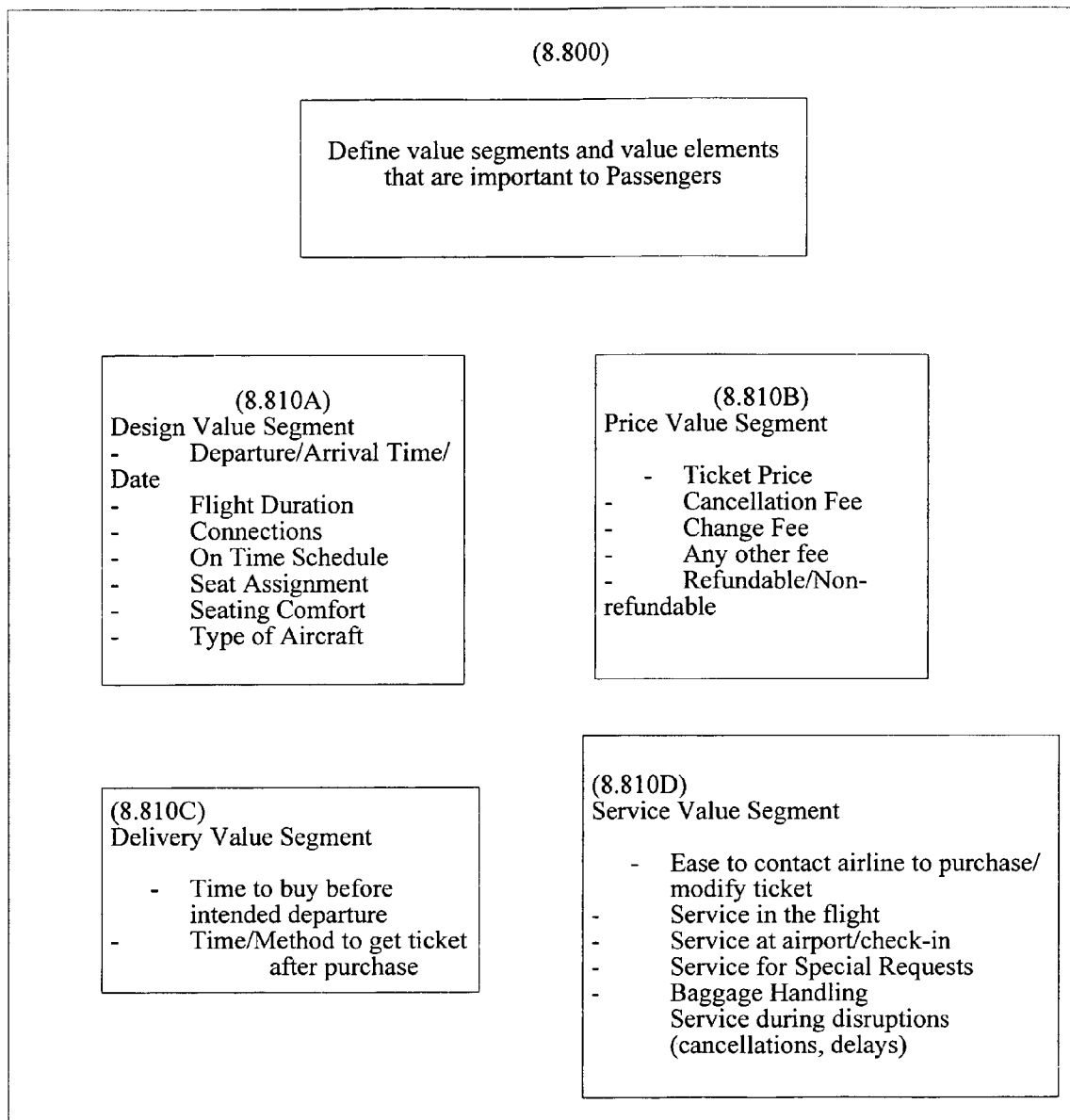
FIG. 8 is a diagrammatic illustration of an exemplary set of value segments and their value elements in the airline industry.

FIG. 8 provides an example of how this method could be used in the airline industry to capture relevant passenger dynamics, Act 8.800 An analysis is shown for various illustrative value segments 8.8110A-8.810D that matter to customers in the airline industry. In the design value segment 8.810A, important value elements include, but are not limited to, departure/arrival time and date, flight duration, connections, on-time schedule, seat assignment, seating comfort and type of aircraft. In the price value segment 8.810B, important value elements may include, but are not limited to, Ticket Price, cancellation or change fee, refundable or non-refundable ticket and any other fees. In the delivery value segment 8.810C, value elements may include, but are not limited to, the time a ticket must be bought prior departure and the time and methods for getting the ticket. Similarly, important value elements in the service value segment 8.810D may include, but are not limited to, the ease of contacting the airline to purchase or modify a ticket, service during the flight, service at airport/check-in, service for special requests, baggage handling, and service during disruptions (e.g., flight cancellation, long delays, overbooking, diversions).

(2) Assessment of Company Economics:

The next Act in the first stage, as shown in FIG. 5, is to assess the crucial economic factors that affect the bottom-line and top-line of the company, Act 5.530A. For example, these factors may include but are not limited to revenues, fixed costs, inventory, available and scheduled capacity, constraints on product availability and total and marginal values for current direct and indirect product (and/or services) costs. For illustration purposes only, FIG. 5 shows the grouping of such factors into five major categories 5.530B-F, including costs, revenue, service, competition and other.

Figure 9:
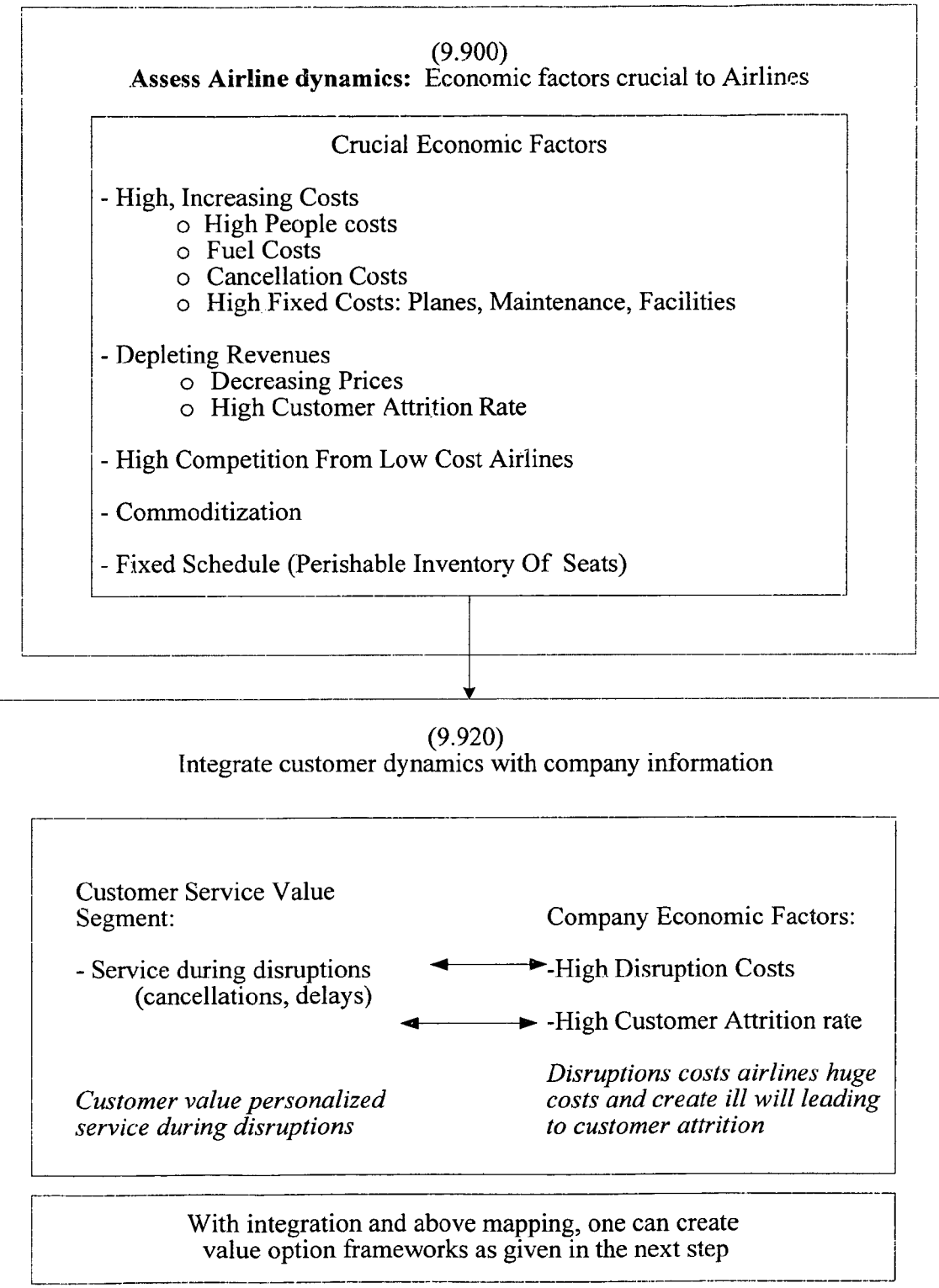
FIG. 9 is a diagrammatic illustration of collecting airline dynamics and integrating the same with customer dynamics.

Continuing with the airline industry example, an assessment 9.900 of the crucial economic factors, as indicated in FIG. 9, may reveal these factors to include (but not be limited to) high and increasing costs consisting of high human resources costs, high fuel costs, disruption costs, high fixed costs (planes, facilities and maintenance), depleting revenues due to decreasing Ticket Prices, increased competition from low cost carriers, high customer attrition rate, and commoditization of the airline industry. One may dig deeper into details like load factors, seats booked, available seats on different flights, costs per passenger mile, marginal costs per passenger mile, costs of alternate earners and so forth. It might be beneficial if a company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer Dynamics with Company Economic Factors:

A third Act, shown in Box 540 of FIG. 5 and Box 920 in FIG. 9, is to take the information collected from the previous two steps, analyze this data and find important value segments and elements that directly affect the crucial economic factors for the company. This operation involves creating a mapping between company factors and customer value segments, to establish direct and indirect relationships between the two.

FIG. 9, in Act 920, illustrates an example of this mapping in the airline industry. For example, customers value personalized service during a disruption (flight cancellations, delays, diversion, overbooking). Yet disruptions create huge costs for airlines and generate ill-will, leading to loss of goodwill and high passenger attrition rate. Some other examples are mentioned later.

Figure 11:
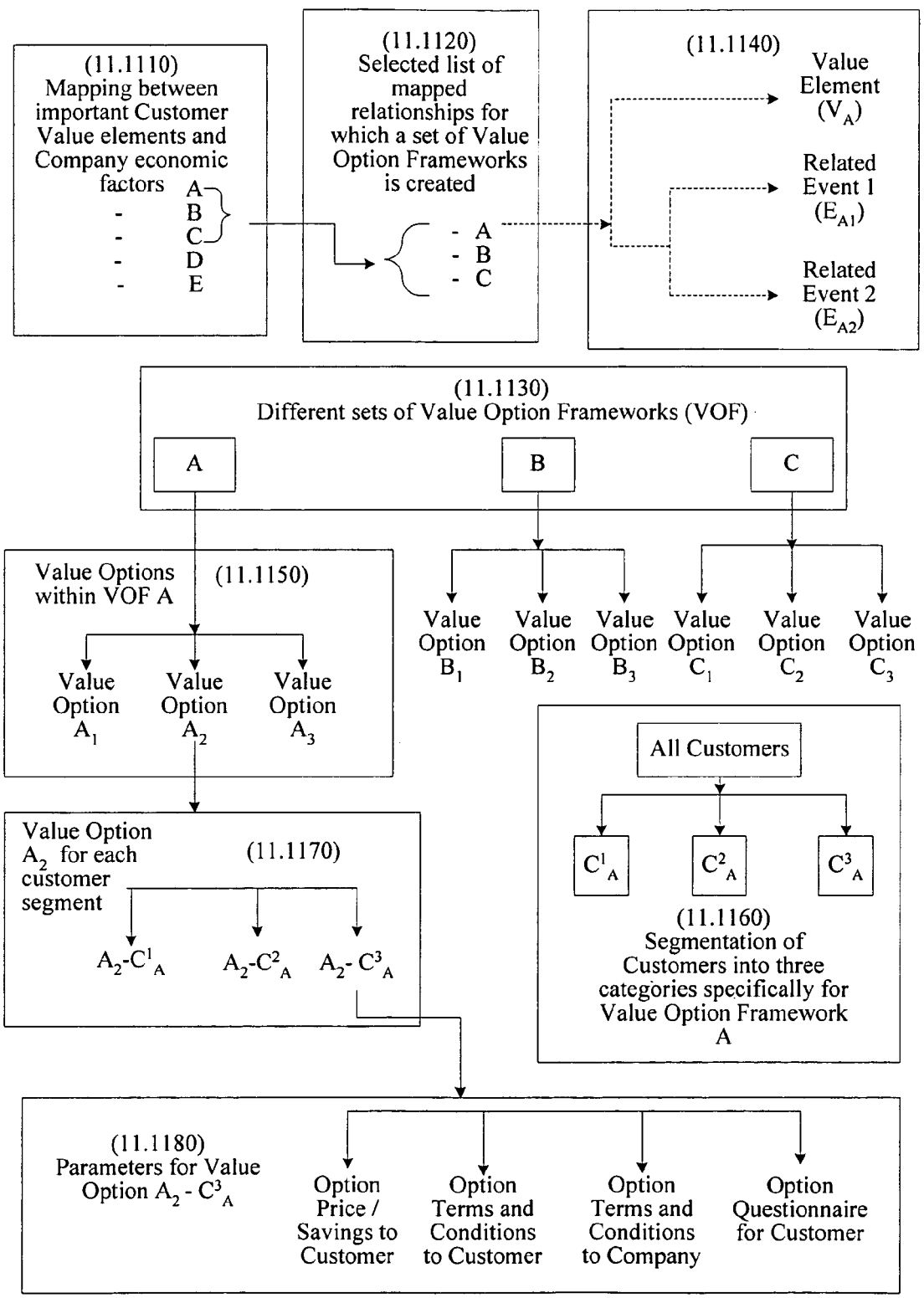
FIG. 11 is a partially-diagrammatic, partially-flow diagram representing the steps of a process for creating a value option framework.

(4) Formation of Value Options Framework:

The formation of a value options framework involves certain steps illustrated in FIG. 11. The value options framework is formed around important mapped value elements, allowing capture of detailed individual, customer-level data expressing needs, preferences, flexibilities and relative utilities so as to positively impact the company operations, while simultaneously enhancing the overall product utility for the customer. Since a correspondence has been drawn between those value elements and the corresponding economic factors, we are assured there is significance for both the customer and the company. A value option framework (VOF) must allow the company to capture a customer's demand, preferences, flexibilities and relative utilities at an individual level in a format that can allow that information to be used to produce a cost savings or revenue enhancement for company operations while concurrently enhancing customer utility. The structure of a value option framework is defined in detail later.

The process to create a value Option framework is shown in greater detail in FIG. 11. Act 9.920, above, generated a list of mapped relationships. In Act 11.1110, the process starts from that list. From this list, the company may select a list of mapped value elements which fulfill the criteria listed above, Act 11.1120, and a value options framework is built around those value elements. One could build a value options framework around almost every mapped relationship, so the decision criteria to chose or reject any such relationship is simply pragmatics. It is probably to be desired to limit the number of relationships to keep the value options framework manageable, computationally and otherwise. In FIG. 11, there are three VOFs shown at 11.1130, namely A, B and C. The number of value option frameworks shown is for illustration purposes only and could be fewer or more, depending on factors such as the industry selected and user discretion. As explained in detail later, each value option framework is related to a corresponding value element and one or more related event(s). For illustration purpose, in the Box 11.1140, value option framework A is related to a value element $V_A$ and two related events, $E_{A1}$ and $E_{A2}$. In most situations, after the initial interaction between the customer and company related to a particular value element, one or more related events (or a series of events) would take place. The structure of a value option framework is defined below in detail.

Figure 12:
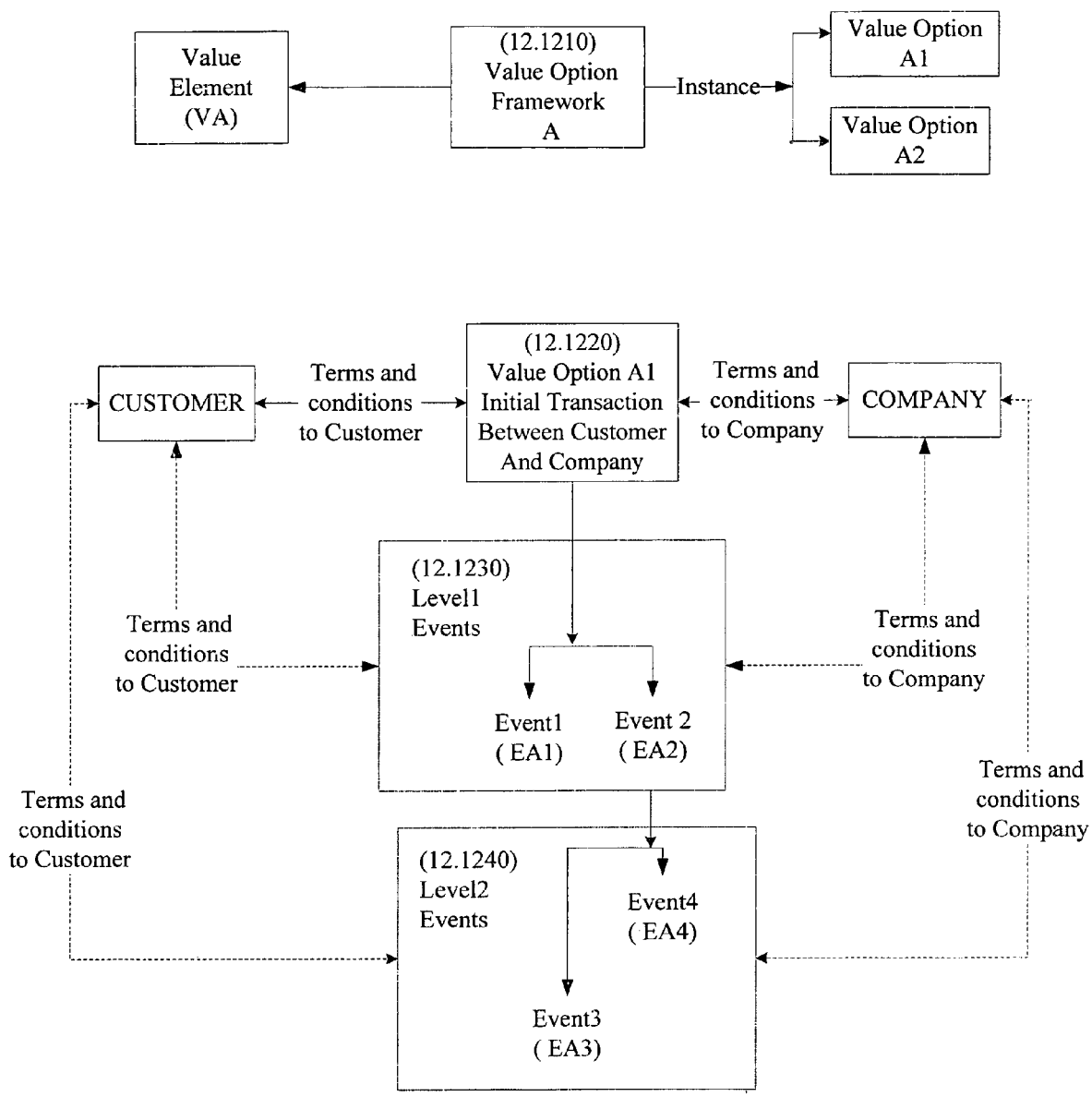
FIG. 12 is a diagrammatic representation of the generic structure of a value options framework.

Structure of a Value Option Framework:

FIG. 12 defines the structure of a Value Option Framework. The Box 12.1210 shows a value option framework A. Every value option framework may be related to one or more value elements. As show in the Box 12.1210, value option framework A is related to value element $V_A$. One can create one or more instances of a value option framework as shown by the two value options ($A_1$ and $A_2$). The Box 12.120 shows the initial interaction between the customer and company where the company offers the value option $A_1$ to the customer. Every value option has an initial costs/savings and other benefits and conditions to the customer; and revenue/costs and other benefits and conditions to the company. The Initial Transaction is successful if the customer selects the given value option. Every successful transaction may be succeeded by one or more related events (or a series of events as shown by the Boxes 12.1230 (Level 1 events) and 12.1240 (Level 2 events). Just like the Initial Transaction, each event may also have costs/savings and benefits and conditions to the customer, and revenue/costs and benefits and conditions to the company, as shown by the linked arrows from Event $E_{A3}$ to both the customer and company. If a particular event takes place after a successful transaction, the corresponding costs/savings and benefits and conditions are applied to both the company and customer.

Consider, again, the process of formulating a value option framework. For each value option framework, the company-user also preferably categorizes its population of customers into one or more segments based on one or more criteria. Customer segmentation is based on customer behavior and needs. Individual customers are not necessarily segmented or grouped; a particular customer may fall within different customer segments at different times. It is the customer behaviors and needs that are segmented. To provide an example, in the Box 1160 in FIG. 11, all of the company customers are categorized into three customer segments, namely, $C^1_A$, $C^2_A$, $C^3_A$ for the value option framework A. The number of customer segments could vary depending on the industry and value option framework, and this method does not put a limit on the number of customer segments. The number of customer segments shown is for illustration purposes only and could be fewer than or more depending on industry selected, value option framework and user discretion. Further, a company may segment its customers differently for different value option frameworks or they may use the same customer segmentation for a few or all value option frameworks. The customer segmentation is done because the customer behavior can be subdivided into different groups and customer showing similar behavior could be dealt in a similar fashion.

After formulating one or more sets of value option framework(s) around the selected value elements, the user creates one or more value options for each set of value option frameworks. In FIG. 11, the value option options $A_1$, $A_2$ and $A_3$ are created in box 11.1150 for the value option framework A. The number of value options shown is for illustration purposes only and could be fewer or more depending on industry selected, value option framework and user discretion.

For each value option created, the user defines parameters for option pricing, benefits and conditions to the customer, as well as revenue, costs and option conditions to the company, under which the option would be used. If necessary, a user may also need to create a separate questionnaire to be completed by customers, pertaining to each value option.

As shown in FIG. 11, the user creates value options for each particular customer segment. Act 11.1170. In FIG. 11, the structure for value option conditions for Value Option $A_2$ tailored to customer segment $C^3_A$ is shown in the Box 11.1180. Similarly, the user creates conditions and parameter values for each value option for each customer segment.

For one type of value option, one or more parameters for different customer segments may be the same. Across multiple value options (within the same value option framework), one or more parameter values may be the same for one or more different customer segments. It is possible that one or more value options may not be valid for a particular customer segment or a sub-segment within a customer segment.

Figure 13:
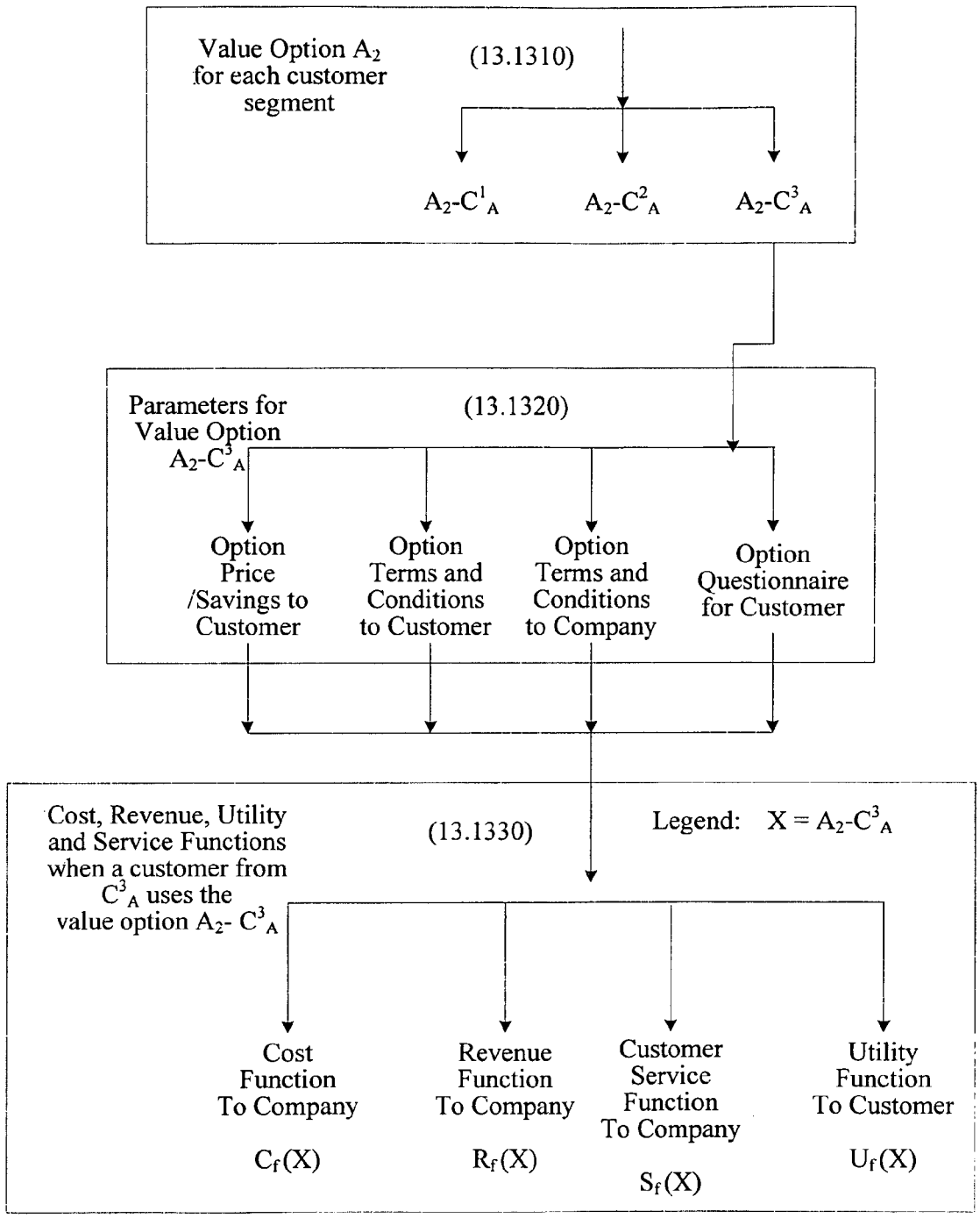
FIG. 13 is a diagrammatic illustration showing creation of a value option framework indicating how cost, revenue, utility and service functions.

Turning to FIG. 13, for each value option created for a specific customer segment, the user creates the following functions as shown in the Box 13.1330. (The number and type of functions shown is for illustration purposes only and could be fewer than or more depending on the industry selected, the value option framework and user discretion.) First, there is a Cost Function to the company, $C_f(X)$. This function expresses the cost elements to the company related to usage of a specific value option. For illustration purposes, FIG. 13 displays the cost function $[C_f(A_2-C^3_A)]$ to the company when a customer (within customer segment $C^3_A$) selects the value option $A_2$. This function expresses the costs to the company initially when the user selects the value option A2, and also for each of the related events if and when those related events take place. Next, there is a Revenue Function to the company, $R_f(X)$. This function expresses the revenue elements to the company related to usage of a specific value option. For illustration purposes, FIG. 13 displays the revenue function $[R_f(A_2-C^3_A)]$ to the company when a customer (within customer segment $C^3_A$) uses the value option $A_2$. This function expresses the revenue to the company initially when the user selects the value option A2, and also for each of the related events if and when those related events take place. Then there is a Customer Service Function to the company. This function expresses the customer service function to the company related to usage of a specific value option. For illustration purposes, FIG. 13 displays the customer service function $[S_f(A_2-C^3_A)]$ to the company when a customer (within customer segment $C^3_A$) uses the value option $A_2$. This function expresses the customer service level a company provides initially when the user selects the value option $A_2$, and also for each of the related events, if and when those related event take place. Finally, there is a Utility function to the customer: This function expresses the utility to the customer from use of a specific value option. For illustration purposes, FIG. 13 displays the utility function $[U_f(A_2-C^3_A)]$ to a customer (within customer segment $C^3_A$) when he or she uses the value option $A_2$. This function expresses the utility to a customer initially when he/she selects the value option $A_2$, and also for each of the related events if and when those related events take place.

To obtain the overall costs, revenue and service benefit for a particular value option framework, all the individual functions for each value option-customer segment combination are combined to determine the total overall costs and revenue benefits to the company and the service and utility benefits to customers. Benefits from all the value option frameworks can be simply added together to calculate total overall benefit values to the company.

Example of Formulating a Value Option Framework in the Airline Industry

Figure 14:
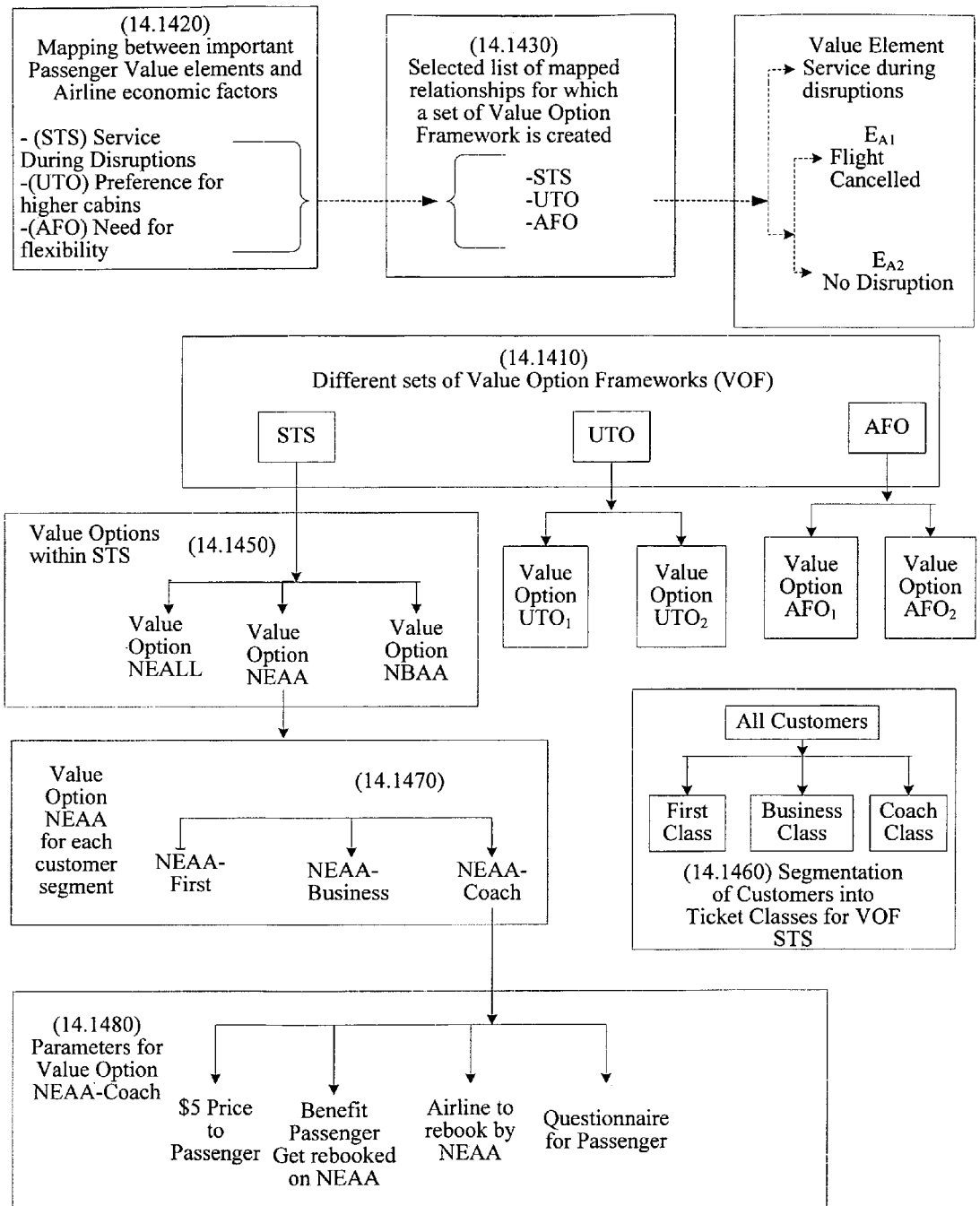
FIG. 14 is a diagrammatic illustration of the development of a value options framework within the airline industry.

As shown in the Box 1410 in FIG. 14 three value option frameworks are created, namely, Smooth Travel Service Value Options (STS), Upgrade Ticket Option (UTO) options and Alternate Flight Option (AFO) options. The UTO framework is related to the value element "preference for higher ranked products," whereas the Alternate Flight Option framework is related to the value element "preference for travel flexibility". Details on UTO and AFO VOFs are provided later.

The STS framework is created based on a value element "Service during disruptions." More specifically, as at 14.1420, a mapping is performed between important passenger value elements and airline economic factors. From that mapping, selected list is created of mapped relationships for which a set of value option frameworks will be created, as at

14.1430. The value element "service during disruptions" is extracted, as at 14.1440 and three value options within STS are created as instances of the STS framework, at 14.1450.

The STS framework provides three smooth travel service options to passengers when they buy their original tickets, to enable passengers to tailor the service provided to them in the event of a flight cancellation. FIG. 14 at box 1440 shows the related events to the STS framework. One related event is "no disruption," and the other is "flight cancellation".

Each of the three STS value options is geared to provide a different level of services if a passenger faces a flight cancellation. If a customer selects the NEALL option (Next Earliest Available Flight on All Airlines), he is rebooked on the next earliest available flight from all different carriers operating out of the passenger's original departure airport. If a customer selects the NEAA option (Next Earliest Available Flight on Original Airline), he is rebooked on the next earliest available flight from the passenger's original carrier operating out, of the passenger's original departure airport. If a customer selects the NBAA option (Next Best Available Flight on Original Airline), he is rebooked on the next best available flight from the passenger's original carrier operating out of the passenger's original departure airport.

Structure of STS Value Option Framework

Figure 15:
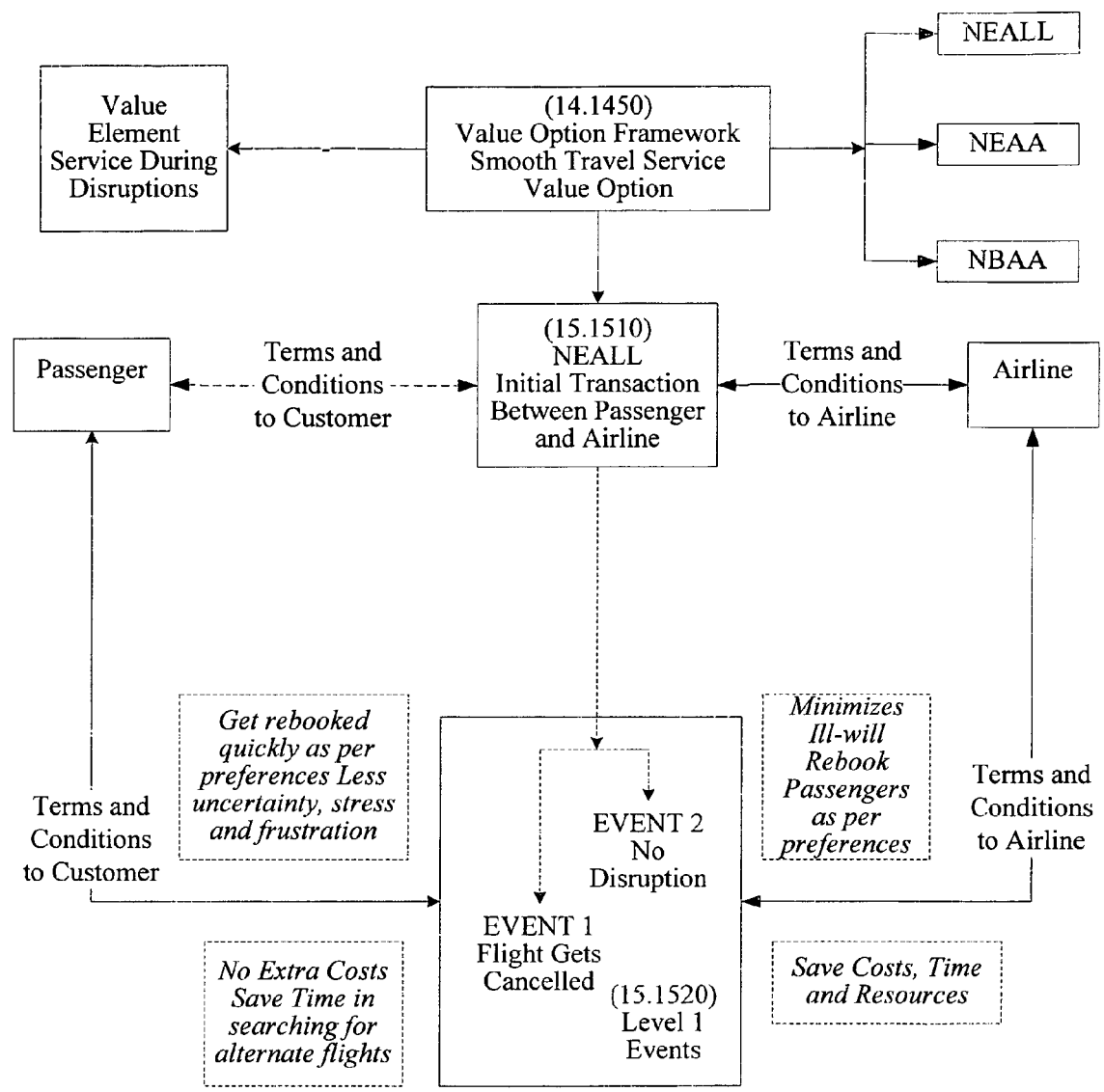
FIG. 15 is a diagrammatic illustration of the Structure of the STS Value Option framework for the airline industry with the NEALL selection.

FIG. 15 displays the structure of an illustrative STS value option framework for the airline industry and, in particular, the NEALL option indicated at Box 15.1510. In a successful Initial Transaction for NEALL, a passenger pays $X to the airline to select the NEALL option, and in return receives the airline's service commitment to rebook him on the next earliest available flight on all carriers, if the original flight gets disrupted or cancelled. The company, on the other hand, gets to know the relative flexibilities in passengers travel needs as some passengers purchase this option and others don't. The assumption here is that passengers make a logical decision to choose the NEALL option if their travel is very time sensitive or if they want the highest level of certainty in their travel. Once the Initial Transaction is successful, there could be two possible related events as shown by the Box 15.1520, namely, 1) the flight goes smoothly without disruption (shown by $E_{A2}$) and 2) the flight gets cancelled (shown by $E_{A1}$). If $E_{A1}$ happens, then the passengers who had selected the NEALL option are automatically rebooked as per the conditions of the NEALL option. This leads to savings and benefits to the airline as well as benefits to the customer. As shown, there are no additional costs for the customer as a result of this event; in fact, he or she saves search time and effort on looking for alternate flights. The customer gets rebooked quickly and in accordance with the preferences generating those benefits. The company can better optimize its re-bookings and may possibly reduce its overall costs generating a cost benefit. The costs, revenues, benefits and conditions shown here are for illustration purposes only and, actual values could be different depending on specific values selected by the user for value options, passenger behavior, airline schedule and some other factors.

Figure 16:
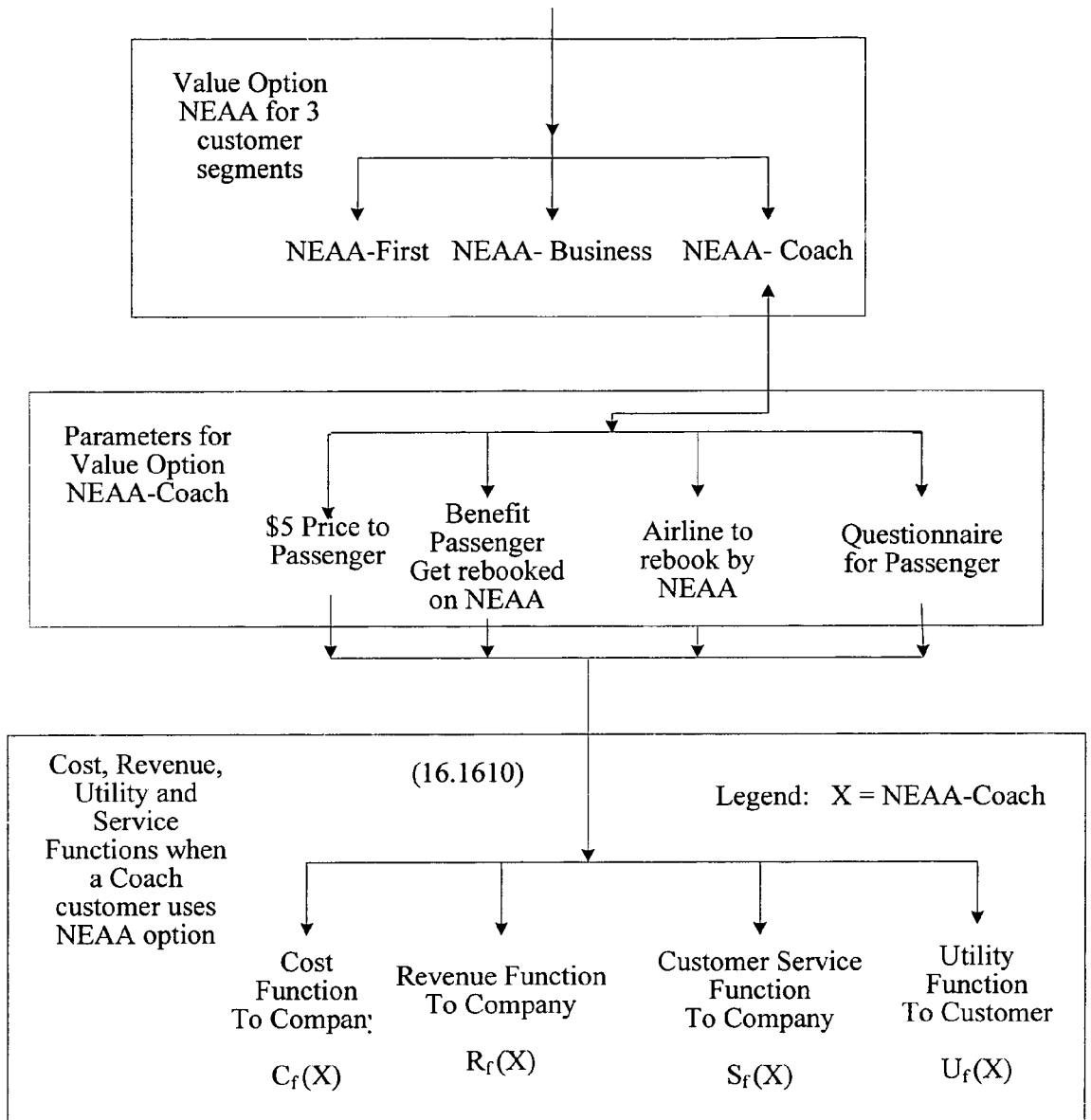
FIG. 16 is a diagrammatic illustration of how the cost, revenue, utility and service functions are structured for the NEAA-coach value option.

Turning back to FIG. 14, the next Act, as shown in Box 14.1460, is to categorize all the passengers of the airline into three segments for example, based on the ticket class. It is assumed the airline has three ticket classes in operation, namely, first class, business class and coach class (clearly, fewer or more classes can be accommodated). Then the three value options are created for each of the three customer segments, leading to total of 9 value options. For the sake of simplicity, Box 14.1470 shows only the three value options for the NEAA value option for each customer segment. The next Act is to assign different parameter values of each value option related to pricing, benefits and conditions to customer and company for the Initial Transaction and for each of the two related events. For the sake of simplicity, the Box 14.1480 shows this Act only for the NEAA-Coach value option. Turning to FIG. 16, the Box 16.1610, shows the different costs, revenue, service and utility function for the company and the customer.

A cancelled flight reduces an airline's capacity, while the demand builds up; this leads to a natural supply and demand problem. In most situations, after a flight is cancelled, the cancelled passengers cannot all travel at the same time because there may not be seat availability to permit this solution. Currently, an airline spends a lot of resources and time in sorting through the list of passengers and rebooking all of them. This leads to long waiting times, uncertainty, stress and frustration for passengers. This problem could be solved if an airline could use the new method and system taught above to determine in advance the passengers' relative flexibilities and then rebook them accordingly, while minimizing airline costs. The value option listed in FIG. 14 can help an airline to determine relative flexibility at an individual customer level. A software application based on the architecture, as explained in FIG. 2, can be used to capture this additional customer information and then an Event Optimizer module can rebook passengers according to their needs and while minimizing the costs for the airline. Handling passengers in such an efficient and effective fashion creates goodwill for the airline, and they could easily charge a premium for certain value options while offering other options at no cost to customer.

Figure 10:
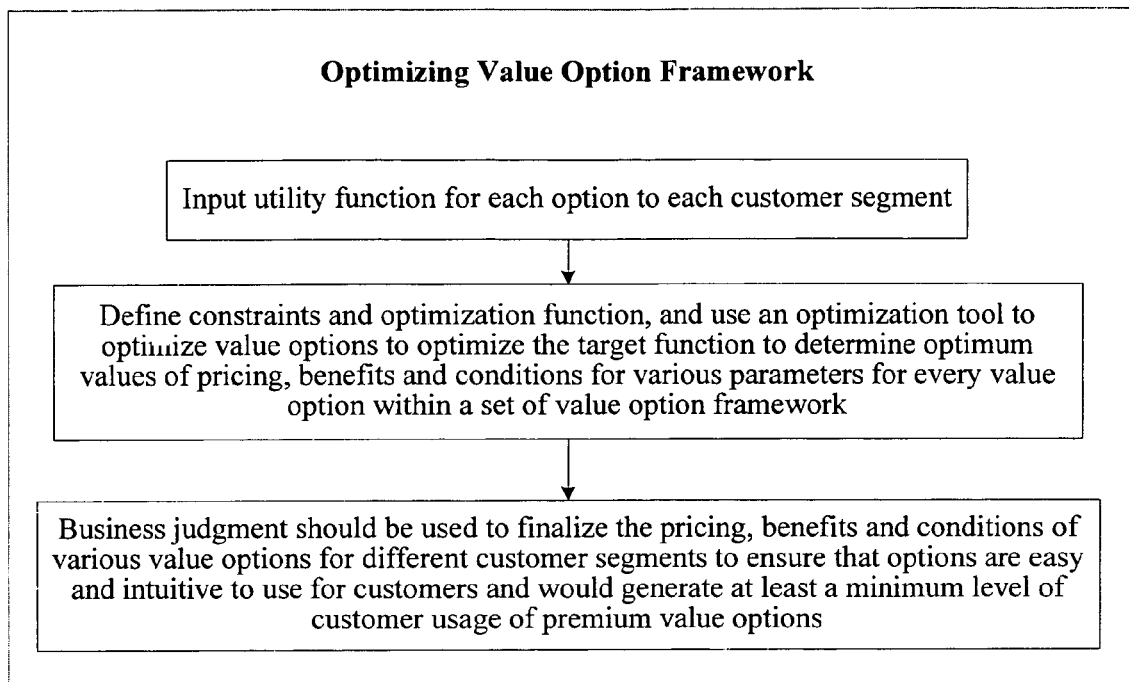
FIG. 10 is a flow chart illustrating optimization of a value option framework.

5) Optimization of Value Options:

As an optional last Act in the first stage, as shown in FIG. 10, a financial analysis may be performed on the value option framework using the existing company and customer data to determine optimum pricing values and conditions of the value options. In other words, a company using the system and method can build utility functions based on cost and benefit equations of various options, and then can optimize across any one or combination of such functions. Any standard non-linear constrained optimization software tool can be used to run iterations to determine optimized pricing and benefit values for different value options. Using standard sensitivity and scenario analysis techniques, a user can run what-if scenarios to determine the robustness of the value option framework. These types of analyses can help a user to take a better decision in choosing the final parameter values for value options. It is not necessary to perform this optimization to generate benefit from the new method and system taught above. A user would tend to generate benefit even if no or little optimization is performed at this level. However, performing optimization at this level may tend to increase the benefit derived.

Second Stage: Using Value Option Framework

After completing the first stage of the method, the user has been able to create important value option frameworks and specific value options within those frameworks. The user has also segmented customers and prepared a questionnaire, if needed, to be associated with each specific value option that may be applicable to each customer segment. The company is fully prepared now to use a structured format consisting of value options and questionnaire to interact with its customers in real time to generate benefits for both customer and company.

The second stage of the new system and method, as depicted in FIG. 17, involves using the value option framework to interact with the customer to capture his or her requirements in detail. Once the customer selects a particular option, the system moves to the Event Optimizer stage, 17.1730, where the system reacts based on the event that may take place. The Event Optimizer, depending on the event, invokes an optimization algorithm, assesses the company operations in real time and optimizes across company operations and customer information to produce results that concurrently maximize the benefits for the company and the customer. The optimization may or may not modify the company product offerings to better suit the customer while simultaneously maximizing the company operations. Both of these steps will now be discussed in detail.

1. Dynamic Interaction to Determine Customer Demand in Detail (Act 17.1720):

In this Act, the company interacts with its customers in a structured format asking questions and/or offering value options. Preferably, this interaction occurs using a web-based data collection system. As stated above while an Internet based interaction is probably the most cost-effective approach to data collection, other methods may be employed, if preferred, or a combination of methods may be used.

On a browser, which accesses the seller's (i.e., company's) web site, a series of questions are presented to the customer and the customer supplies answers. These questions may also present value options and ask the customer to answer and select the options that suit them the best, enabling the company to determine detailed preferences and flexibilities in customer needs. The questions/value options are supplied from the database 2.210 based on the value options framework created in the first stage to deal with different customer segments.

Continuing with the airline example, FIGS. 18 and 19 display web pages that provide a real world example of how the interaction may take place between the customers and the airline when using the new system and method. FIG. 18 shows the summary of an Itinerary purchased or selected by a customer on an airline's website. After selecting the Itinerary, the customer may click the "Buy STS" link that takes the customer to a web page (shown in FIG. 19), where a list of STS options are presented to the customer, who can then select the desired STS option.

These value options allow the passenger to tailor the services in event of a flight cancellation. Each of the presented value options provides some benefit and costs to the passenger. There may be a default option that provides the standard service at no cost to the passenger. If the passenger does not select any option, the system may select default. The prices and conditions listed for each value option displayed on the web page may be a function of the profile of the customer who is accessing the page and the ticket he has selected so far. If a customer does not select any particular value option, the software automatically may select and assign the default option (the default option is Silver_AA as shown in FIG. 19) to the passenger's Itinerary. If the user selects any of the other two premium options, then he pays the option price listed in front of those options at the time of booking of the ticket. In this fashion, the value options enable the airline to determine relative flexibility in individual passengers' travel needs.

Figure 20:
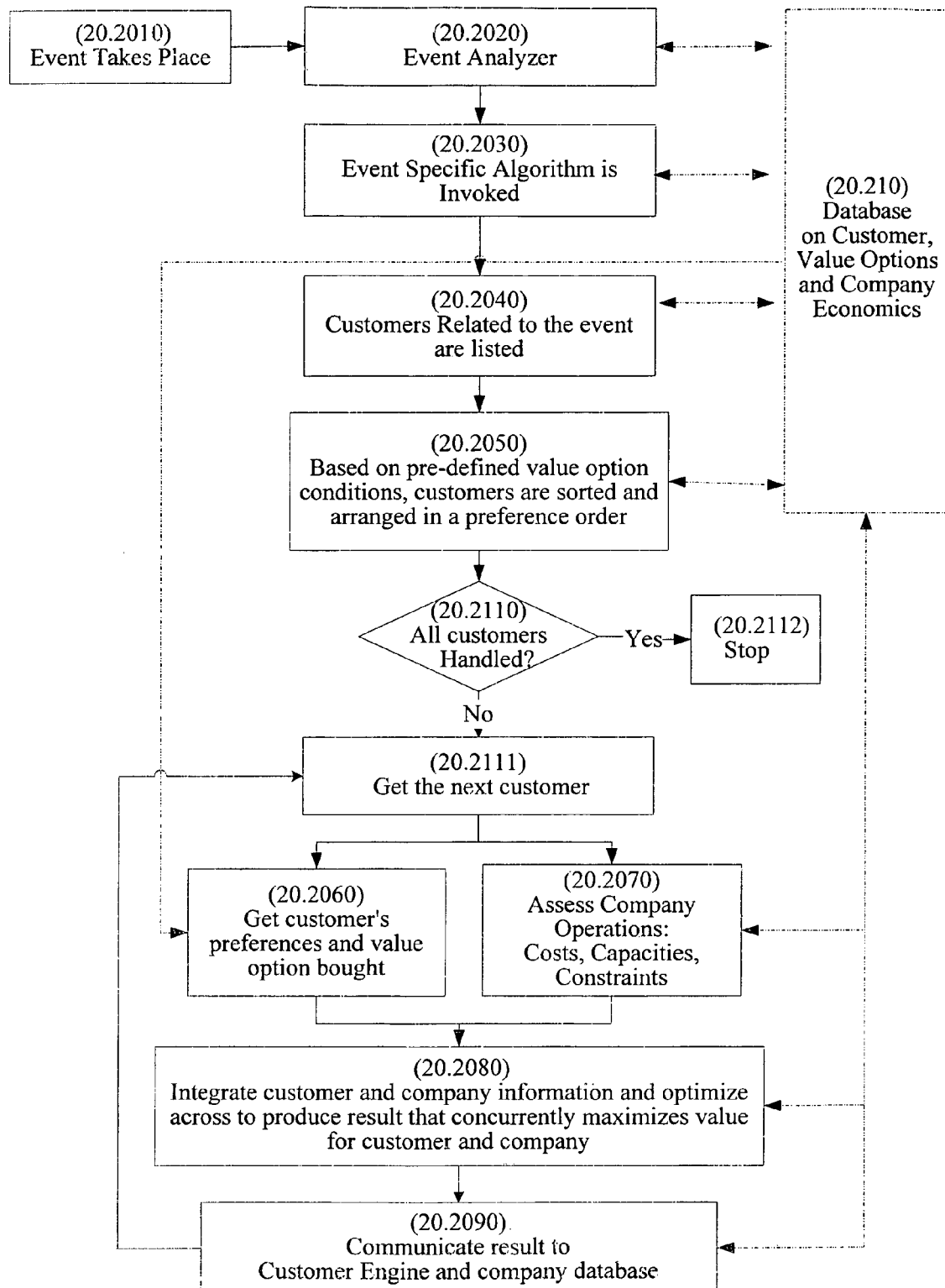
FIG. 20 is a diagrammatic illustration showing generally how an event is processed by the system and method shown, to fulfill a company's obligations to its customers as shown herein, delivering optimized results to the company and the customers.

(2) Event Optimizer:

Once the customer selects a value option, the system goes to the Event Optimizer phase where different steps are executed depending on the event that may occur. The event(s) is (are) related to the value option selected in the first Act. Turning to FIG. 20, the typical Event Optimizer architecture is shown. An Event Analyzer 20.2020 is a module that receives notifications of events and notes when a monitored event occurs. Event Optimizer 20.2010 analyzes the event and invokes an optimization algorithm specific to the event that is detected. Using that algorithm, the Event Optimizer collects the information on related customers and assesses the company operations in real time. A third Act takes the information collected from the previous two steps and uses pre-determined criteria to optimize company operations along with customer demand. In this Act, the various scenarios are generated which optimize the total product value for the customer and profits and gains for the company. More details on the Event Optimizer are provided in the System Architecture section.

A user may create a value option framework, which includes a series of events. In this case, the Event Optimizer, after optimizing the result for the first event, may offer the results to the customer. The customer may or may not accept the results. If the customer does not accept the result the Event Optimizer may move on to handle other subsequent related events, and may again come back to the customer with more results. This process could be repeated several times depending on industry selected, the configuration and type of value option framework, and customer behavior. Some of the value option framework examples that may follow this pattern are listed later. These include value option frameworks such as, for example, a target price option, a cyclic buy option and a volume buy option.

The Event Optimizer may be better understood with the help of the ongoing airline industry example. The Event Optimizer in the airline flight cancellation example invokes the optimization algorithm, called the Rebook Optimizer, since it optimizes the rebooking for cancelled passengers. Details on the Rebook Optimizer are provided in the system architecture section.

Summary of Second Stage

In the second stage of the new method and system, the company interacts with the customer in a structured format to capture customer needs, preferences, flexibilities and relative utilities in detail. The next stage involves an Event Optimizer as explained above. The customers associated with the event are enlisted and sorted by pre-defined criteria. The Event Optimizer collects customer information from the database and also assesses company operations in real time before integrating this information to produce one or more optimized results that concurrently maximize the benefits for the customer and company.

Continuing the airline example, if the customer flight is cancelled or about to get cancelled, the Event Optimizer is invoked. The Event Optimizer analyzes the cancelled flight event, and invokes the rebook algorithm. The rebook algorithm collects all the related cancelled passengers and their information and assesses the airline operations (flight status, availability, costs etc.) in real time. Passengers are sorted in a Preference order based on pre-defined criteria. The rebook algorithm then integrates the individual passenger preferences with the airline operations information and optimizes across the data to produce one or more optimized itineraries that satisfy individual passenger needs as well as concurrently maximizing gains for the airline. In this fashion, both the airline and passenger benefit at the same time by using the new system and method.

System Architecture: To Use and Implement an Instance of the Method

The system architecture as shown in FIG. 2 may be used to implement the new system and method taught above.

The Value Option Creator allows the user to create and configure different value options that can be offered to the customers to capture their needs and preferences in detail and in a way that can be used to optimize across company operations. The Event Optimizer allows the company to optimize across company operations and customer needs when an event is triggered to provide a product offering that maximizes both customer utility and company profitability. A company would use the Customer Engine to interact with its customers via different channels. Each of these three sections is defined below in detail.

Customer Engine

The Customer Engine provides different interfaces that a company maintains at different channels, which are utilized to interact with the customers. These channels may include but are not limited to the company's website via the Internet, the company's call center via phone, and the company's retail outlet via in-person. The Customer Engine enables the company to ask questions and to offer value options to customers in a pre-configured structured format. The Customer Engine generates its interfaces based on the data stored in the database and populated by the Value Option Creator. The customers provide their responses and select value options that suit them. The Customer Engine then communicates back and stores customer responses and selections in the database. The Customer Engine also may communicate the optimized results to the customer as and when generated by the Event Optimizer.

An example of the Customer Engine interface to deal with the STS framework in the airline industry is provided in FIGS. 18 and 19. It provides customers buying tickets on an airline's website with different SmoothTravelService value options.

Value Option Creator (VOC)

The Value Option Creator allows a company to design, create and configure different value option frameworks and corresponding value options that can be offered to a customer to capture his or her needs and preferences in detail and in a way that can be used to achieve optimization across company operations. A company would use the Value Option Creator module to perform some or all of the following:

Develop various value option frameworks based on selected value elements and corresponding company economic factors.
  segment customers by one or more criteria. A customer segment may include one or more customers.
  Develop costs, revenue and service functions based on a company's operations prior to using the herein-described system and method. The company may prefer to express cost elements in a real-time (i.e., up to date) dynamic fashion in order to be able to fully assess the profitability or contribution of each product sale opportunity.
  Develop various value options within each value option framework.
  Configure each value option differently (or keep it the same) for different customer segments. This involves choosing pricing, benefit conditions and the proper questionnaire for each value option for different customers.
  Develop costs, revenue and service functions after the user (company) has designed and configured various value option frameworks.
  To measure in real time or in quasi-real time the value benefit created for the passenger and/or company by implementing the new system and method in part or in full.
  Optimize each value option framework and associated value option to determine optimized pricing and benefit schemes for the value options in order to maximize the benefit for both the company and customers. What-if scenarios may be run to test the robustness of the value option frameworks' models.

The Value Option Creator (VOC) intakes the cost functions (marginal and total), revenue functions, utility functions, customer segments, capacity (scheduled and available) functions and other economic factor functions of the company. The VOC can be configured to store various customer value segments on which a user may want to build value option framework and associated value options. A user can also enter the constraints and ranges to perform pricing optimization to determine optimum pricing and the benefits of various options.

Ideally, a user may be able to create a Value Option Creator that is industry-and company-independent and can be used in several industries. Due to time and resource constraints, however, it is perfectly satisfactory for a user to build a less scalable and flexible industry-specific Value Option Creator.

Event Optimizer

The Event Optimizer allows the company to optimize its "bottom line" across company operations and customer needs, when an event is triggered. This is achieved by providing a product offering that maximizes both customer utility and company profitability. A suitable system architecture (i.e., overall flow) for the Event Optimizer in shown in FIG. 20. The following describes each Act in detail:

The Event Optimizer may start its functioning when a particular event is triggered (i.e., occurs and is detected at the time of purchase or later), Act 20.2010. The Event Analyzer (20.2020) analyzes the type and category of the triggered event by matching it with the list of events listed in database 20.210. Once the event type is determined, the Event Analyzer searches the database for an optimization algorithm that is associated with the triggered event, and executes that algorithm (Such algorithms, naturally, have been developed and stored in the database at an earlier time.) The algorithm collects from the database a list of the customers that are associated with the triggered event, Act 20.2040, and sorts them based on pre-defined criteria listed in the value option framework associated with the event, Act 20.2050. The first customer is taken from the sorted list and his or her preferences and value option selection are retrieved from the database. Act 20.2060. The algorithm then makes a real-time assessment of the company operations to get up-to-date costs, capacities and constraints. Act 20.2070. The information collected in the above two steps is then integrated (Act 20.2080) and, based on a pre-defined criteria, the algorithm optimizes across the company information and customer preferences to produce one or more results that concurrently maximize the benefit for both the company and the customer. The results are preferably communicated to the Customer Engine and to database 20.210, Act 20.2090. These steps are repeated until all the customers have been taken care of Steps 20.2110-12.

Figure 22:
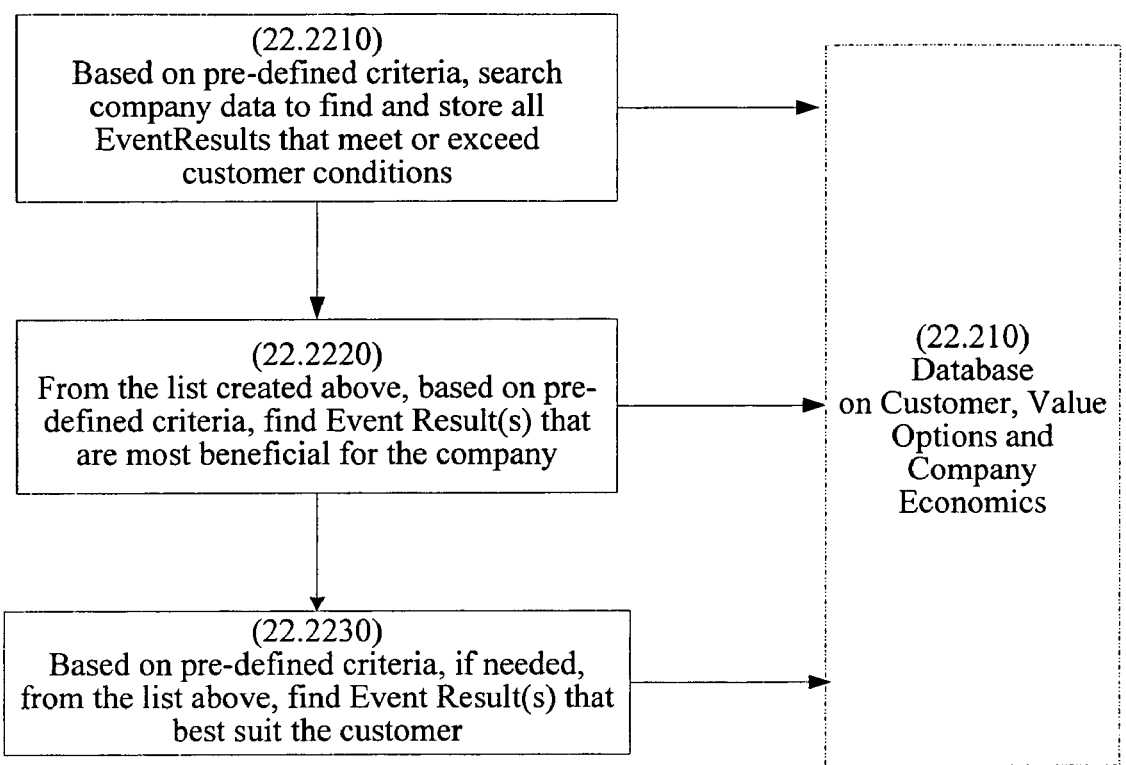
FIG. 22 is a flow chart expanding Act 2080 of FIG. 20.

FIG. 22 expands the Act 20.2080 to show the detailed sub-steps. The first Act (Act 22.2210) is to search the company data, based on pre-defined criteria, to determine and store all EventResults that meet or exceed the customer conditions (based on the value option selected and other preferences). An EventResult is a potential resultant output of an event to the customer and the company. The next Act 22.2220 is to determine from the stored list, those EventResults that are most beneficial to the company. If needed, another Act (22.2230) is performed to determine from the selected EventResults from the Act 22.2220, those results that best suit the customer.

Depending on the event type and related value option framework, the event-specific algorithm may communicate optimized results to the customer one or more times, depending on the algorithm and customer behavior.

Figure 21:
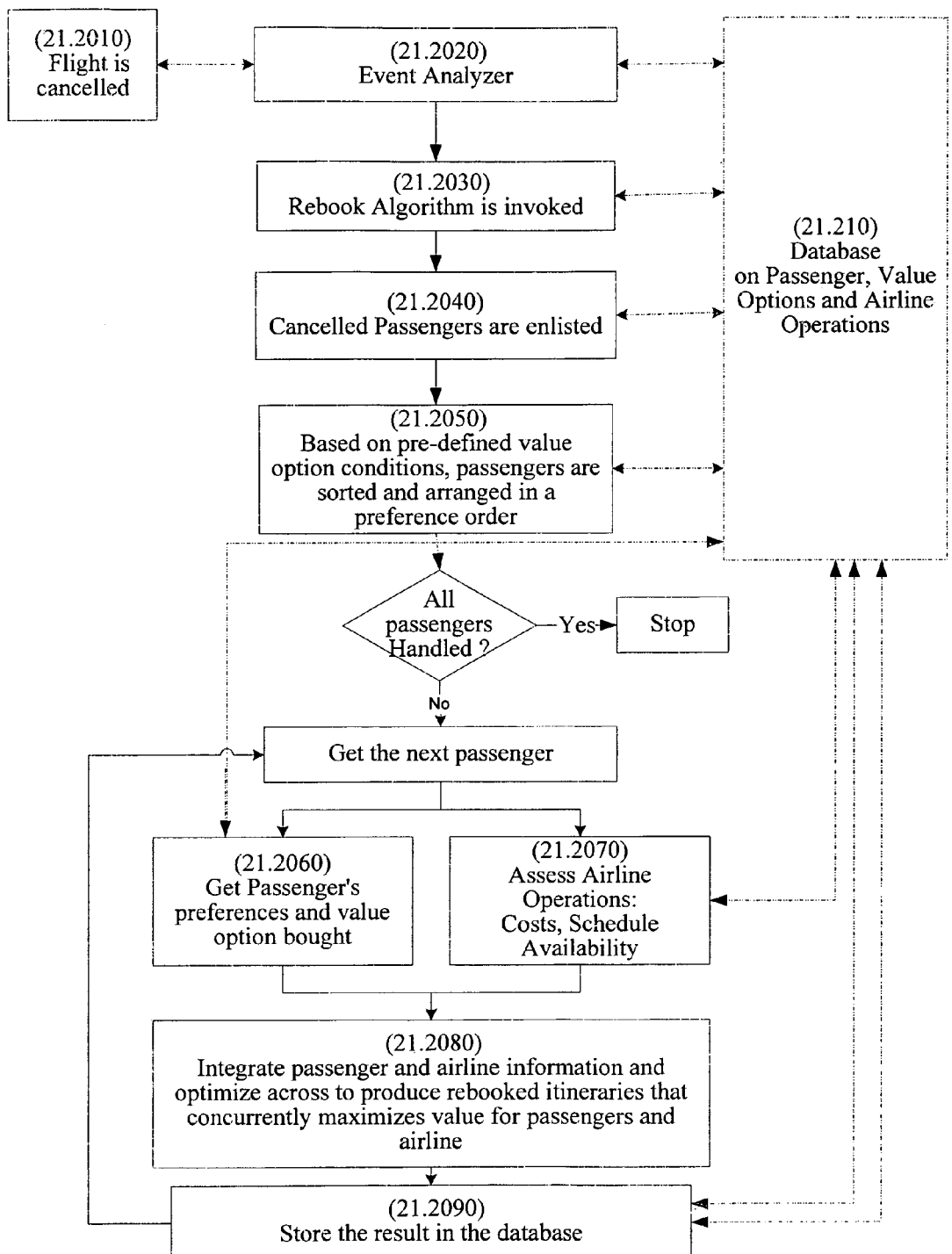
FIG. 21 is a counterpart to FIG. 20 dealing specifically with flight cancellation and rebooking.

Tuning to FIG. 21, there is shown a detailed view of how an Event Optimizer would work in case of the STS framework example in the airline industry. There are two events associated with the STS framework, a flight executes smoothly or gets cancelled. If the cancellation event happens (Act 21.2010), the Event Analyzer 21.2020 analyzes the event and searches for the associated optimization algorithm, which in this case is the Rebook Optimizer (called simply "rebook" from here on) 21.2030. Once invoked, the Rebook Optimizer searches for all the passengers on the cancelled flight (21.2040) and sorts them (21.2050) using pre-defined criteria. The Rebook Optimizer determines the personal preferences and value option selections for the first passenger in the list (21.2060) and assesses the airline operations in real time or quasi-real-time (21.2070), including flight status, seats booked, available seats on different flights, costs per passenger mile, marginal costs per passenger mile, costs of flight cancellation and other pre-assigned parameters. In the next Act 21.2080, the Rebook Optimizer operation integrates the real time airline information with the passenger preferences and value option selection and optimizes across both to produce one or more optimized rebooked itineraries. On one hand, the rebooked itineraries meet or exceed the benefits provided to the passenger through the selected value option. Concurrently, on the other hand, the Rebook Optimizer optimizes the costs and schedule for the airline. In this fashion, both she passenger and the airline benefit at the same time. After rebooking one passenger, the rebooking procedure moves on to the next passenger in the list and performs the same above steps until all the passengers are rebooked optimally. Finally, the results are communicated to the passengers through the Customer Engine, and to database 21.210 (Act 21.2090).

In the above STS example, there could be several ways to implement the rebooking algorithm. For example, in some cases, the rebooting procedure may generate more than one Itinerary for the passenger. The Customer Engine may then present all those itineraries to the passenger, for selecting one that best fits his/her needs. In another case, the Rebook Optimizer may only generate one optimized Itinerary; hence, the passenger does not get a choice. In this case, if the passenger does not like the rebooked Itinerary, he/she can always approach the airline via other means (customer service desk/check-in counter at the airport or reservation call center) to get his rebooked Itinerary modified manually.

Benefit of Using the System and Method

Factoring the customer preferences into a scheduling model keeps efficiencies high and costs low for the company. By rewarding customers for their cooperation and actions, companies can allocate expenses as rewards instead of incurring pure losses with accompanying ill will and inefficiencies.

By maximizing total value for its customers, a company can greatly improve its overall business prospects. The company can look to build very high customer retention rates and also increase the number of new customers gained per unit time. It can help to increase the overall sales and thus help increase the overall business value. The company may distribute a portion of additional value gained back to its customers to further strengthen its relationships with them, if it wishes.

A company may encourage customers to "opt in" to this system and provide the customer's preferences by giving rewards to customers to provide these preferences and commit early. The value options may be created and priced to motivate customers to make choices that both satisfy their needs and simultaneously allow the company to improve its operations.

Through this method, a new efficient approach is introduced for managing customer relationships, sales cycles, marketing, customer service, market research and customer feedback. It eliminates manual, time-consuming processes and replaces those with an efficient, automatic process.

This method further adds new dimensions to business parameters like inventory. Previously, for a company, inventory was either "Committed" or "Available." This method adds a new dimension of "flexibility." With the customer preferences and needs taken beforehand, we add the dimension of flexibility to the inventory. For example, a booked flight seat would conventionally be called committed inventory. But now within the new methodology, if the ticket-holding passenger is flexible, his ticket could fall into a pool of flexible inventory availability, which could be soled to other passengers if necessary.

Another advantage is that the method creates a new type of inventory, called customer inventory. Once the method had been used for some period of time, a company, by using its powerful value option framework, would be able to capture its customers' and potential customers' future needs in advance. In other words, within the realm of company product offerings, the company would collect information on which customers want to purchase what products, when and with what specifications or parameters. Combining this individual customer data across thousands of customers would generate a customer needs and preference database with appropriate classification and parameters. The needs (and/or preferences) of this database could be classified as customer inventory wherein the items in inventory are the needs of several groups of customer with similar needs. Once the company has built such a database, they can use the customer inventory as and when needed in optimizing their internal operations to maximize value for both the company and the customers.

The method allows a company to move from a knowledge-based system to an expert system, which optimizes the decisions based on customer preferences and company economics. The method allows the companies to market a whole new paradigm of, services and products surrounded around their original product offerings. This is achieved by unbundling formally bundled components of existing products, into components offered to the customer. This allows the customers to choose product features they wish to purchase and saves the company from making investments and costs in providing product components to those who don't want or desire those components.

In summary, it can be said this method accomplishes the following: (1) makes a business more attractive to customers by enabling customers to express their preferences; (2) makes a business more efficient and reduces costs; (3) allows a company to handle problems and disruptions in a quick, efficient manner to generate high customer satisfaction and keep their costs low (4) helps a company to increase and strength its customer base, improve sales per customer, and customer retention, and (5) helps to increase the value customers gain from the purchased products.

In general, companies that will tend to benefit from this method will have numerous customers. They may also be characterized by one or more of the following: high-valued perishable products or services, high fixed-cost operations, and inventory that provides many issues (considerations or purchasing alternatives) for the purchaser. The following industries, at least, meet such a profile: airlines, hotels, automobiles, furniture, insurance, computer hardware, and travel (e.g., vacations, car rentals, cruises). There may be several other industries that may benefit by using the new system and method.

As a case in point, let us consider the airline industry. In order to reduce costs and increase operational efficiency, airlines have traditionally focused on optimizing within the boundaries of their internal operations. To increase revenues, airlines have employed indirect means of advertising, frequent flyer programs and blanket promotions, and have used gross demand based yield management systems to influence the customer demand indirectly at the gross level. End-customer demand has never been considered a factor that could be optimized to reduce costs or to increase revenues. End-customers have been treated as a distinct and detached entity, creating demand at a gross level, rather than as an integrated participant.

The above-discussed method concentrates on the overall value of the transaction for the parties involved, rather than simply on the specific product or service, and can optimize value across airline operation (i.e., costs, capacities and constraints) and passengers (i.e., demand, preferences and relative utilities) to maximize value for both.

Airlines have developed certain static on-demand solutions such as e-tickets, e-check-in, kiosks and Internet ticketing. These solutions speed up the processes and reduce costs but fail to integrate the customer in a dynamically optimized and more meaningful way. Under the herein described method and using the system shown herein for supporting implementation of same, the airline can negotiate in real time with the customer and is able to match customer preferences to the airline's needs under optimal financial conditions (i.e., having the flexibility to achieve lowest cost, best utilization). Thus, the method and system permits the airline to influence and alter demand by offering incentives or by modifying its offering to sell a seat that might otherwise go unfilled.

The new method allows an airline to attract more passengers at higher margins (revenue management), offer better value-added services to accomplish several goals such as to attract more customers (to increase yield, customer satisfaction, customer retention and customer base), efficiently manage flight disruptions such as cancellations, delays and overbooking (to reduce disruption costs and avoid passenger dissatisfaction), improve load balancing and operational efficiency (to reduce operational costs and increase margins), improve security environment by reducing airport congestion and overcrowding (to reduce security delays and costs) or a combination of the above or any other goals.

Currently, in the event of a flight cancellation or other disruption, customers barrage travel agents and airline telephone operators with calls, and flock to customer service desks where they are processed sequentially to satisfy customer needs, without much concern for the overall resulting cost. With the above-described method, the airline flight booking system is programmed in advance to deal automatically with re-bookings in the event of a disruption. Customers then can be processed automatically by the airline reservation system, based upon the participating customer's preference profile, selected incentive schedule, seat availability and seat cost. A new boarding pass and Itinerary can be picked up at a kiosk in the airport. Human agents may still be needed to make adjustments for some customers, but the overall need for expensive customer service intervention is greatly reduced. Customers gain greater certainty in and control over their travel schedules and airlines avoid an overwhelming critical mass of customers standing in lines grumbling and generating ill-will, while reducing costs.

Some value option frameworks related to the invention were described in fill detail and incorporated by reference patent application Ser. No. 10/973,802 and discussions of these will be omitted or abridged herein. Such aspects are nonetheless intended to be part of this application and reference to these may prove helpful for a fuller appreciation of the invention. A few value option frameworks will now be described in detail. Airlines may use these VOFs to learn about customer demand and preferences and then integrate that data with their internal operations to maximize their profitability.

(1) Alternate Product Option (APO) Value Option Framework

The creation and utilization (in two stages or acts) of another value option framework will now be discussed. This is the Alternate Product Option (APO) VOF. A company may implement an APO VOF in any industry. The airline industry is assumed herein to demonstrate the system and methodology of the APO VOF. Selection of an industry provides a context and makes the understanding smoother and easier. Within the airline industry, the customer need for travel flexibility (defined below) is used as the targeted value element. With respect to the selected value element (i.e., customer need for travel flexibility) in the airline industry, the APO VOF may be appropriately termed Alternate Flight Option (AFO) VOF. A few other examples of applying the APO VOF within the airline industry and other industries are presented in short after the detailed AFO VOF demonstration.

The first stage in the APO VOF involves steps (or acts) of: capturing customer dynamics, assessing company operations and economic factors, integrating customer dynamics with company economic factors, formulating the VOF and optimizing the VOF. The second stage involves carrying out a dynamic interaction with the customer and then executing an Event Optimizer process. The specific detailed steps with respect to the AFO VOF will now be discussed. A detailed demonstration of an AFO VOF is presented followed by a summarized illustration for the more generic APO VOF.

First Stage: Formulation of APO Value Option Framework (1) Capturing Customer Dynamics FIG. A1 shows an analysis of the value elements that are believed to matter to customers in relation to an AFO in the airline industry. In the design value segment, shown in Box A1.100, important value elements include, but are not limited to, need for travel flexibility, time and schedule of alternate flights and number of alternate flights allowed on a given ticket. In the price value segment, shown in Box A1.200, important value elements may include, but are not limited to, Ticket Price and cost to receive a desired level of flexibility. In the delivery value segment, shown in Box A1.300, important value elements may include, but are not limited to, how close to scheduled departure the customer may edit his/her Itinerary easily and favorably, and how long before departure the ticket must be purchased to obtain flexibility. In the service value segment, the important value elements may include, but are not limited to, the ease of getting desired flexibility as shown in Box A1.400. It may be important to estimate the relative preferences and utilities of these value elements to different types of customers.

The customer need for travel flexibility is subjective in terms of the length of the "flexibility period" and the "travel plan variation". The term "flexibility period" refers to the time period during which a customer wants to keep his plans flexible. Some customers may desire a flexibility period that extends up to a few hours before the earliest intended departure, whereas, some others may only want it up to a few days or weeks before the desired travel date. The term "travel plan variation" refers to the extent to which a customer expects the travel plan to change. It may be expressed in terms of potential time periods for departure, arrival and stay, range of depart and/or arrival cities, flight services/amenities needed during travel and so forth. Customers are concerned of change/cancellation fees, unavailability of desired flights, the efforts required and the hassles involved in making Itinerary changes. Full fare tickets do allow changes at no cost to the customer, but only a few customers can afford to buy them or are willing to pay for them. Also, full fares do not guarantee an alternate flight and a customer may still be constrained by unavailability of a desired other flight. Many customers would be willing to pay for flexibility. However, the price a customer can pay is subjective and may differ from customer to customer; or even for the same customer, may differ from one trip (or circumstance) to another.

Similarly, an analysis of important customer value elements with respect to their needs for flexibility in buying products may be performed for any industry under the APO VOF. The customer need for flexibility is subjective in terms of the length of flexibility period and the extent of variation in customer need. The term "flexibility period" herein refers to the time period during which a customer may enjoy the flexibility; in selecting and/or purchasing products. The needs of the customer may vary within a defined range. This range is termed "extent of variation in need". Many customers would be willing to pay for additional flexibility. However, the price they pay is subjective to the individual needs of the customers and the circumstances around.

(2) Assessment of Company Economics

An assessment of the crucial economic factors of an airline, as indicated in Box A2.100, may reveal the factors to include, but not be limited to, high fixed costs, reduced load factors, the low capacity utilization (load factors) across a number of airline flights, the perishable nature of airline seats, the expected value of seats in different flights, the broad spectrum of time period over which the seats in a flight are sold, increased competition from low cost carriers, the need to develop competitive advantages against low cost carriers, customer attrition rate, and commoditization of the airline industry.

Similarly, as part of the APO VOF, an assessment of the crucial economic factors of a company may be performed, to determine the factors that affect the profitability, growth and goals of the company. It might be beneficial if a company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer Dynamics with Company Economic Factors

FIG. A2 also illustrates an example of how a mapping can be done, between customer and company profiles, for the AFO VOF in the airline industry. There is a preference for travel flexibility among customers. On the other hand, if a flight takes off with one or more empty seats, that condition probably represents the loss of potential revenue for that airline. This is true even though no other potential customers have been turned away, simply because there may be one or more customers on other flights (of the same or different airline) willing to shift/switch to take those unfilled seats in the flight (in question) at appropriate price/terms. But, today they are not able to do so for one or more reasons mentioned above. An opportunity thus exists to concurrently generate an incremental revenue benefit for the airline from consumer surplus, and to maximize the purchase utilities for the customers. The AFO framework is created based on a value element "Preference for travel flexibility". More specifically, as shown in the interaction between the Box A2.200 and Box A2.300, a mapping is performed between important customer value elements and airline economic factors. The value element "preference for travel flexibility" is extracted, as shown En Box A2.400 and an AFO Value option framework is created.

When applying the APO VOF in any industry, a similar mapping and integration may be performed between the customer dynamics and company economic factors. On one hand, the customers desire flexibility and are willing to pay for it accordingly. On the other hand, if a company has surplus products or capacity, that condition probably represents the loss of potential revenue (and/or opportunity cost) for that company. This is true even though no other potential customers have been turned away, simply because there may be one or more customers, who halve purchased other products of the same or a different company and are, willing to switch to the unused surplus products (or capacity) at appropriate price/terms. But, today they are not able to do so for one or more reasons as mentioned above.

An opportunity, as mentioned above, thus exists to concurrently generate an incremental revenue benefit for the company from consumer surplus, and to maximize the purchase utilities for the customers. The APO framework is thus created based on a value element "Preference for flexibility".

(4) Formulating the "APO" Value Option Framework

Structure of AFO Value Option Framework in the Airline Industry

FIG. A3 displays the structure of an AFO value option framework (shown in Box A3.100) in the airline industry. The AFO value option framework is related to the value element "preference for travel flexibility", as shown in Box A3.110.

The first event in the AFO VOF is referred to as "Initial Transaction", shown by Box A3.200, in which the customer (shown by Box A3.210) and the airline (shown by Box A3.220) transact on an AFO value option. There may be one or more Events (shown by Box A3.230) that follow the Initial Transaction.

In a successful Initial Transaction for an AFO, the customer receives an option to fly on up to 'n' out of 'm' selected flights (said 'm' flights termed "AFO Flights"). The 'n' flights that the customer decides to fly on are termed "Chosen Flights". After each of the 'n' Chosen Flights is defined (or selected or chosen), the customer has the right to fly (or can fly) on the said Chosen Flight. Apart from the 'n' Chosen Flights, the remaining 'm-n' flights are termed "Released Flights". The seats released (if any, that were probably held or blocked for said customer) on the Released Flights may be sold to others or used for other purposes. The seats on the Released Flights in relation to said option may be reused by the airline before, after, at or any combination thereof, the time the Released Flights and/or Chosen Flights are defined (or selected).

Numerically, the value of 'm' is greater than or equal to 1 and the value of 'n' may vary from '0' to 'm' depending upon the specific implementation of the AFO framework, both m and n being whole numbers. To provide flexibility, the value of n may be limited to less than the value of m, or n<m (i.e., n<=m−1); however, in some situations, n may be equal to m. The value of 'n' may or may not be known (or defined) at the time of the Initial Transaction. The value of 'n' may be defined after the Initial Transaction by the airline, the customer, another entity or any combination thereof.

The Initial Transaction may consist of one or more acts. The customer may select all AFO Flights concurrently (all together in one transaction) or sequentially (i.e., in multiple transactions). In the sequential case, a customer may select one or more flights in one or more transactions just before or much before (a few days/weeks/months) the Initial Transaction for AFO begins. The said selected flight(s) (let's say X number of them), thus, may be considered as part of said m AFO Flights of the AFO (m,n) transaction, and the customer may select only the remaining (m−X) number of AFO Flights during the Initial Transaction. All the transactions used to select all the AFO Flights of an AFO (m,n) instance are related to each other, and hence, are considered as related transactions (as defined earlier, i.e., each transaction may take into effect the result of one or more previous transactions with regards to selecting flights and/or in regards to other terms and conditions of the option contract).

In an AFO VOF, the sequential process may consist of a number of related transactions when all the AFO Flights are purchased one after another by paying a price in each (or some) transaction(s) or act(s). The price may include, but is not limited to, a monetary value, frequent flyer miles, travel coupons, other forms or any combination of the above. Here, the amount to be paid at any transaction may depend upon the amount(s) that has been paid in the previous (one or more) transaction(s). Consequently, each transaction may be related cumulatively to all the previous transactions. Hence, all the transactions are related. The transactions may be related due to a relationship during the Initial Transaction, one or more of the previously executed transactions, any other transaction or combination thereof.

The time when an Initial Transaction is completed (i.e., the customer receives the AFO option on said m flights) is referred to as the Initial Transaction Time (or ITT, in short).

One or more of said m flights may be selected, at one or more times, before, after, at, or any combination thereof, the time said option is delivered to the customer (or the customer receives said option). The term "selected" or select or selects refers to, without limitation, selecting, selecting and purchasing, purchasing or any combination thereof. The term "receiving" or "receives" here refers to, without limitation, purchasing, utilizing, receiving for free, receiving without requirement of a physical delivery or any combination thereof. The phrase "selecting a flight" for option purposes includes selecting one or more seats within the same or a different cabin (or a section or compartment) within the same flight. The term "Flights" or "Flight" may also sometime refer to one or more seats on said flight(s), when the context requires. The terms "flight" and "seat" are interchangeable as the context requires. The term "Flight" or "Flights" may also refer to a Flight Leg, a Flight Segment, an Itinerary, any combination of two or more flights or any combination of the above, when the context requires.

An airline may choose to create one or more instances of an AFO VOF based on factors including, but not limited to, number of AFO Flights, Chosen Flights or Released Flights, pre-determination of a number of Chosen Flights or Released Flights, flight schedule, other factors or any combination of the above. For example, a generic AFO formulation based on a combination of the number of AFO Flights (or m) and Chosen Flights (or n) would be AFO (m, n). Some AFO instances are shown in Boxes A3.120, A3.130, A3.140, and A3.150. In case the number of Chosen Flights is pre-determined, the AFO (4,2) instance implies that the customer selects 4 AFO Flights, on the condition that the can choose only two out of those four flights. When the number of Chosen Flights is not pre-determined, the AFO (4, 2) instance implies that the customer selects four AFO Flights, on the condition that the customer and may choose zero, one or 2 Chosen Flights. There may also be a minimum limit on n. For example, the AFO (4,n) (where 1<=n<=2) instance limits the customer to choose a minimum of 1 and maximum of 2 Chosen Flights out of the 4 selected AFO Flights.

The AFO (2,1) instance, two AFO Flights and one Chosen Flight, is used here as an example to demonstrate the details of the structure of an AFO VOF. Box A3.200 refers to the initial interaction between the customer and the airline, in which they transact on an AFO (2,1) value option. In a successful Initial Transaction for AFO (2,1), the customer selects two AFO Flights and can choose to fly on any 'one' of those two flights. The flight selected is the Chosen Flight and the one not selected is the Released Flight.

The Initial Transaction may have terms and conditions applicable to the customer or the airline or both. These terms and conditions may be set, preferably, to concurrently benefit both parties. The connections between Box A3.200 and A3.220, and Box A3.200 and A3.210 refer to the terms and conditions to the airline and the customer, respectively.

The AFO VOF may or may not include any constraints related to schedule or any other parameter of AFO Flights. For example, an airline may want to restrict AFO applicability and availability on flights that satisfy specific criteria. Some detailed models on AFO Flight applicability dynamics are presented later in the document.

The term "schedule", in the present context, refers to the characteristics of a flight including, but not limited to, airline related parameters, departure/arrival parameters, service and other miscellaneous parameters. The airline related parameters may include, but are not limited to, operating carrier entity (i.e, the airline that operates the flight), marketing carrier (an airline that sells the flight), any other carrier or intra/inter-carrier flight groups associated with the flight or any combination of the above. The departure/arrival parameters may include, but are not limited to, an airport and its location (city, state, country), date and time, seasonality, weather and other operational conditions, number of stops/connections, and so forth. The service and other miscellaneous parameters may include, but are not limited to, type of aircraft, flight duration, in-flight or other services such as number of cabins, types of seats, meal selection, check-in and luggage options, airport lounges and other facilities, and so forth.

The two AFO Flights may or may not include practically constrained flights. Practical constrains may include one or more constraints that will prevent a customer to fly on a given flight. Such constraints may include, but are not limited to, schedule conflicts, time constraints, location constraints and so forth. The time constraints may include, but not are limited to, constraints from departure and/or arrival times of the two AFO Flights. The location constraints may include, but are not limited to, due to the distance between the location of the departure and/or arrival airports of the two AFO Flights. In other words, it may or may not be practically possible for one customer to fly on both the selected flights due to at least one practical constraint. For example, one flight may be scheduled to be airborne when the other flight is scheduled to depart, thus not allowing any customer on the former flight to take the latter flight, or the distance between the departure airports of the two flights may prevent customers from flying on both flights (that depart within hours of each other). For example, a customer may receive an AFO to fly on each of the m selected flights that include at least one practically constrained flight, where it will not be possible for the customer to fly on all the m selected flights.

The two selected flights may or may not have the same origin and/or destination airports (or location).

The AFO VOF may or may not include any constraints on the AFO Flights based on their ticket Prices (defined elsewhere). For example, the airline may offer only those flights as AFO Flights whose Ticket Prices at or before the ITT are less than a specified value, or may add a constraint on the maximum, difference between the highest and the lowest Ticket Prices across a set of AFO Flights offered within a specific AFO.

A customer may select flights in several ways; through mutual agreement (i.e., directly from an interaction such as a flight reservation), or the airline may grant the AFO Flights to the customer without soliciting their interest or permission. For example, to enhance customer satisfaction or for any other purpose, an airline may grant alternate flights to customers based on the past customer behavior, interaction and so on.

The Initial Transaction may impose one or more conditions on the customer. A customer may be required to explicitly notify the airline prior to or no later than a given date and time (referred to as the Notify Deadline) regarding the Chosen Flight. For simplicity, it is assumed that whenever the term Notify Deadline is used in the following sections, the condition requires notification prior to the Notify Deadline. In case there is no such explicit notification condition, the act of the customer boarding (o; checking-in for) either of the two flights may serve as an implicit notification to the airline. In either case (explicit or implicit notification) the date and time when the Chosen Flight is selected is referred to as the Customer Notification Time (or the CNT, in short). In the current discussion, the explicit notification condition is assumed unless specifically mentioned otherwise.

An airline may determine one or more Notify Deadlines for a flight at one or more times (e.g., before, during, after the Initial Transaction or any combination thereof) using factors including, but not limited to, customer needs, expected seat value, airline profitability goals, any other factors or a any combination of the above. A model (presented later) to analyze AFO applicability may also be used to set Notify Deadlines. Customer factors should also be considered in determining the Notify Deadlines, such as the flexibility periods desired by customers, picking easy times (like 6:00 pm instead of 6:32 pm) to help the customer remember the deadline(s) or any other factor that may affect the behavior of a customer when purchasing and/or exercising (i.e., selecting the Chosen Flights) an AFO.

The AFO VOF may impose additional terms and conditions on the customer. A customer may or may not have to pay any price for receiving AFO Flights (i.e., there may or may not be any payment transaction related to the Initial Transaction and/or other event related to the AFO). A customer may be required to pay a price or fee related to AFO at one or more times. The price may include, but is not limited to, a set of one or more Ticket Prices, a set of one or more AFO Prices or any combination of the above. In the context of an AFO, the term "Ticket Price" of a flight refers to the price an airline would charge for a flight if there were no AFO implementation on the said flight. An airline may use the method of its choosing to decide on all the Ticket Prices for AFO. However, it may be advisable to charge a Ticket Price (T) comparable to the sum of Ticket Prices of the n Chosen Flights. One or more of the AFO prices may be embedded with the Ticket Price by using a separate fare class or enhancing features on a currently existing fare class. A customer may or may not be presumed to accept the AFO offer while displaying the embedded Ticket Price. These presumptions may or may not include soliciting prior interest of the customer regarding the AFO offer. In the case that the AFO price is merged with the Ticket Price, and where such price may or may not be separately identifiable, the customer may or may not be required to pay a separate price or fee for AFO.

The customer may be required to pay one or more prices during the Initial Transaction (which payment is referred to as an Initial Price), at the CNT (which payment is referred to as an Exercise Price) and/or at the time of checking-in or at any other time, which may or may not be pre-determined between the customer and the airline. The price may be a function of number of AFO Flights and/or Chosen Flights, specific flights selected for AFO Flights and/or Chosen Flights, Notify Deadline, one or more Ticket Prices and/or Expected Value (defined later) of the AFO Flights, any other factors of airline's choosing or any combination of the above. The price may consist of a monetary value or a soft value (e.g., frequent flyer miles, travel coupons or exchange of another service) or other consideration. The AFO Price may be fixed or variable, with or without bounds. The airline may set permissible range(s) or boundary limit(s) within which the AFO Price can vary, or it may offer the customer a set of prices to choose from. Since price conditions may depend upon various factors, which may or may not be variable, the same may be decided at anytime. The price conditions may be determined by the customer, the airline, a third entity, or any combination thereof at one or more times.

Different price strategies may be implemented in the AFO (2,1) instance. For example, a single Initial Price could make it attractive and easy for the customer to feel free to choose any flight as the Chosen Flight without worrying about any additional costs later. Some detailed models on pricing techniques are presented later in the document, by way of example.

In cases wherein an explicit notification condition is imposed, the Notify Deadline may be pre-determined or may be determined later (i.e., after AFO grant) by the airline, the customer or mutually by both. There may be one or more Notify Deadlines, where each Notify Deadline may have a different price associated to it. There are several ways to implement this condition. One way is given, as follows. The price associated to the First Notify Deadline (i.e., the earliest among the Notify Deadlines) may be charged if the customer notifies the airline of flight selection anytime before the First Notify Deadline. The price associated to the Second Notify Deadline (i.e., the second earliest among the Notify Deadlines) may be charged if the customer notifies the airline of flight selection after the First Notify Deadline and before the Second Notify Deadline. Similarly, different prices may be associated with other Notify Deadlines.

The customer may not be allowed to notify the airline after the Last Notify Deadline (i.e., the latest among the Notify Deadlines). This is done to facilitate the selection of the Chosen Flight before the Last Notify Deadline. As an operational measure, a condition may be imposed that if the customer fails unintentionally or intentionally to notify the airline before the Last Notify Deadline, then the airline may treat either of the two flights as the Chosen Flight. Another approach is for the airline/customer to designate one of the two flights as a Default Flight (during or after the AFO purchase) that will be selected as the Chosen Flight if the customer fails to notify the airline of a flight selection before the Last Notify Deadline. The airline/customer may (or may not) be allowed to change the Default Flight once it is selected. The Exercise Price (if any) in the Default case may or may not be equal to the Exercise Price for the Default Flight for the Last Notify Deadline as the airline may want to impose a penalty on the customer for failing to provide timely notification. In the current discussion, a single Notify Deadline is considered.

The exercise price may be a function of both the Notify Deadline and the Chosen Flight. In such situations, a customer may have to pay a unique price to select a particular flight as the Chosen Flight at a given time. One or more prices (initial or exercise or any other price) may be a negative value, which reflects that instead of the customer paying the airline, the airline shall pay a fee to the customer.

The AFO VOF may also include conditions imposed on or assumed by the airline. For example, the airline may be under a mandatory condition to hold a confirmed booking for the customer on both flights until the CNT passes to allow the customer to select either of the two flights as the Chosen Flight.

Once the Initial Transaction is successful, there may be at least two possible related events, as shown by Box A3.230. The two events are (1) that F1 is the Chosen Flight (as shown by Box A3.240) and (2) that F2 is the Chosen Flight (as shown by Box A3.250). Each of these two events may be associated with various terms and conditions on the customer and/or the airline. As explained above, the events may take place in two ways: either the customer selects the Chosen Flight according to his/her utility, or the airline selects the Chosen Flight based on pre-determined rules (e.g., if the customer fails to notify the airline before the Notify Deadline). In both situations, once the Chosen Flight is selected, the airline is free to reuse the seat in the Released Flight for potential revenue. The customer may have to pay an additional exercise price at the CNT depending on the terms and conditions of the option contract. Once the Chosen Flight is selected the airline and/or the customer may not change the Chosen Flight except within the bounds of the terms and conditions in the option contract. The airline or customer may have the right to enforce the Chosen Flight on the other party as per the terms and conditions of the option contract.

Once the Chosen Flight is selected, the seat(s) released in the Released Flight(s) may be re-used or resold by adding them back to the airline's inventory. The airline may sell these released seats as normal seats, may again offer them as AFO Flights or may choose to do both or may use for any other purpose.

The seat in the Released Flight is blocked for the period between the ITT and the CNT. This period is termed the "Blocking Period". If there is more than one Notify Deadline, the exact length of the Blocking Period is unknown, but the minimum and maximum lengths are known to be between the ITT and the First Notify Deadline and between the ITT and the Last Notify Deadline, respectively. In the case of implicit notification, the maximum length of the Blocking Period would be between the ITT and the departure time of the earlier of the two selected flights or the customer boarding (or check-in for) any of the two flights.

The above terms and conditions of the AFO VOF may be set in a way to concurrently benefit both the customer and the airline. The customer receives additional utility from the flexibility to choose a desired flight from among alternatives. The airline benefits from enhanced customer satisfaction (loyalty and repeat business), incremental revenue from the AFO Price and selling (reusing) the released seats, and other operational benefits.

An AFO VOF may include a right for the customer to fly on each of the m selected AFO Flights, along with a right for the airline to limit the flights (to fewer than m) on which the customer can fly if the airline notifies the customer on a stated Notify Deadline. The right may include the condition that the airline may notify the customer prior to or at the, prior to the, at or after the or after the stated Notify Deadline (which may be determined by the airline and/or or the customer during or after the Initial Transaction). To provide flexibility to the customers, the airline may offer (or allow) the customer to express their preferences regarding the Chosen Flight(s) before the stated Notify Deadline. If the customer fails to do so, the airline may or may not exercise their right to limit the customer to fly on fewer than (for example, at least one less) the earlier selected flights (i.e., m flights). The right may include the condition that the airline may limit the customer after the customer expresses his/her preference for the Chosen Flights. There may be a condition imposed on the customer to make at least one payment to the airline when the customer expresses his or her preferences for the Chosen Flights.

An AFO VOF may include an option for the customer to fly on up to n of the m selected AFO Flights, where n<m, along with a condition that the customer may be able to fly on all the m selected flights if there is at least one payment transaction between the airline and customer in relation the said AFO grant, and that such payment is made after the AFO is granted to the customer. This may provide additional flexibility to the customer. The customer may be limited to take the decision regarding flying on all the m flights before the departure of the penultimate flight. The said payment may be made in a separate transaction executed at any time after the Initial Transaction. The timing of the said payment may be predetermined. The customer may be able to select all the m flights together in one transactions.

The costs, revenues, benefits, terms and conditions shown here are for illustration purposes only and actual values could be different depending upon specific values selected by the airline for value options, customer behavior, airline schedule, Notify Deadline(s) and other relevant factors.

The AFO VOF structure presented above for the AFO (2,1) instance, can be extended to implement any other AFO instance. The following section presents a few illustrative examples for a few AFO instances including AFO (2,1), AFO (4,2) and AFO (4, n) (where n=1 or 2).

Examples of AFO VOF Structure

AFO (2,1)

FIGS. A4 and A5 demonstrate an illustrative practical example of using the AFO (2,1) instance. Consider a customer who interacts with an airline to get travel flexibility using AFO. Per Act A3.200, an Initial Transaction takes place between the airline and the customer. FIG. A4 displays some of the details of the Initial Transaction. The customer selects two AFO Flights, F1 (shown in Box A4.100) and F2 (shown in Box A4.200), and can choose to fly on either of them but not on both (i.e., select either of them as the Chosen Flight). The airline is under the condition to hold confirmed reservation for the customer on both F1 and F2 until the Chosen Flight is selected.

The customer pays an amount of $45 as the Initial AFO Price and $500 as the Ticket Price to the airline as part of the Initial Transaction. The Initial Transaction takes place on the 14$^{th}$ day of April (i.e., the ITT, shown in the second Tow of the Box A4.300). There is an explicit notification condition and the customer has to pick and notify the airline regarding the Chosen Flight.

The following text presents different cases to illustrate different types of terms and conditions that may be associated with the purchased AFO. Four different scenarios are considered with different conditions (shown in FIG. A5). In all the scenarios, the Notify Deadline is expressed in terms of the number of days to departure (DTD) of F1, the earlier of the two flights.

The first scenario, as demonstrated in the Box A5.100, displays a condition of the explicit notification without any exercise price. The customer needs to notify the airline regarding the Chosen Flight before 7 DTD (as shown by the Notify Deadline). The AFO Price charged during the Initial Transaction serves as the total direct incremental revenue for the airline and as the direct cost to the customer. There is no exercise price if the customer defaults.

The second scenario, as demonstrated by Box A5.200, displays a condition of the explicit notification with an exercise price that is a function of the Chosen Flight. The Notify Deadline is 7 DTD. If F1 is the Chosen Flight, then customer has to pay $10 (as the exercise price, as shown in the second column of the second row in the Box A5.200. If F2 is the Chosen Flight, then the customer has to pay $20 as the exercise price, as shown in the second column of the third row in the Box A5.200. F1 is the Default Flight and the exercise price in the Default case is $20. The total AFO Price charged to the customer (i.e., the direct incremental revenue to airline) may turn out to be $55 or $65 depending on the Chosen Flight.

The third scenario, as demonstrated in the Box A5.300, displays a condition of the explicit notification with an exercise price that is a function of the Notify Deadline. There are four Notify Deadlines associated with the AFO. The exercise price increases from $0 (for the First Notify Deadline of 30 DTD) to $40 (for the Last Notify Deadline of 1 DTD). If the CNT is before 30 DTD, then the customer pays nothing more to the airline as shown in the second column of the second row in the Box A5.300. If the CNT is after 30 DTD and before 7 DTD, then the customer pays $20 as the exercise price (shown in the third column of the second row in Box A5.300). Similarly, the customer pays an exercise price of $30, if the CNT is after 7 DTD and before 3 DTD, and an exercise price of $40, if the CNT is after 3 DTD and before 1 DTD (as shown by the next two cells in the Box A5.300). If the customer fails to notify before 1 DTD (the Last Notify Deadline), then the Default Flight F1 (shown in Box A5.300) will be selected as the Chosen Flight at an exercise price of $40.

The fourth scenario, as demonstrated by Box A5.400, displays a condition of the explicit notification with an exercise price that is a function of both the Notify Deadline and the Chosen Flight. Here, all the Notify Deadlines used in the third scenario are used in this; scenario as well. If the CNT is before the First Notify Deadline, then the customer pays nothing more to the airline if the Chosen Flight is F1, and pays $10 as the exercise price if the Chosen Flight is F2, as shown in the second column of the second and third rows in the Box A5.400, respectively. If the CNT is after the First Notify Deadline and before the Second Notify Deadline, then the customer pays an exercise price of $20 or $25 if the Chosen Flight is F1 or F2, respectively, as shown in the third column of the second and the third rows, respectively in the Box. A5.400. Similarly, the customer pays an exercise price of $30 for F1 or $35 for F2, if the CNT is after 7 DTD and before 3 DTD, and $40 for F1 or $50 for F2, if the CNT is after 3 DTD and before 1 DTD, as shown in the fourth and fifth columns of the second and the third rows in the Box A5.400, respectively. If the customer fails to notify before the Last Notify Deadline (i.e., 1 DAD), then the Default Flight, F2 (as shown in the Box A5.400), will be selected as the Chosen Flight. The exercise price is $50 in the Default case.

Per Act A3.230, either of the two events may take place; either F1 is the Chosen Flight or F2 is the Chosen Flight. Let us assume that the customer chooses the flight F1 as the Chosen Flight and notifies the airline with the CNT of 8 DTD in both the first and second scenarios and the CNT of 4 DTD in the third scenario. And in the fourth scenario, the customer fails to provide a timely notification.

In the first three scenarios, F1 is selected as the Chosen Flight, and the F2 seat is released by the airline to be used for further sales or other purposes. In the first scenario, the customer pays nothing more to the airline. In the second scenario, the customer pays $10 as the exercise price, and thus, a total of $55 as the total AFO Price to the airline. In the third scenario, the customer pays $30 as the exercise price, and thus, a total of $75 as the total AFO Price to the airline.

In the fourth scenario, the customer fails to notify the airline and hence, the Default Flight (i.e., F2) is selected to be the Chosen Flight. The customer pays $50 more as the exercise price and thus, a total of $95 is paid to the airline as the total AFO Price.

AFO (4,2)

FIGS. A6 and A7 demonstrate an illustrative practical example of the AFO (4,2) instance The customer selects four AFO Flights, F1, F2, F3 an Boxes A6 100 to A6.400 and can choose to fly on any two flights out of those four. The departure time all the AFO Flights are summarized in Box A6.500. Some of the details of the Initial Transaction are shown in FIG. A7. The customer pays an Initial AFO Price of $125 and a Ticket Price of $1000 at the ITT (i.e., on the 14$^{th}$ day of April, as shown in the second row of the Box A7.100). The customer has to notify the airline regarding his two Chosen Flights. Two separate scenarios are considered. A customer may select the two Chosen Flights together as a group (shown in Box A7.200) or individually (shown in Box A7.300).

Consider the former case when flights are selected as a group. As shown in Box A7.200, the customer can select either of the two two-flight groups (i.e., either F1-F3 or F2-F4). A set of four Notify Deadlines (A, B, C and D) along with the exercise price conditions are displayed (shown in Box A7.200). For example, the customer pays an exercise price of $30 to select the F1-F3 group, if the CNT is any time between B and C (as shown in Box A7.200). The Default Flight Group (F1-F3) is chosen at an exercise price of $50, if the customer fails to notify before the Last Notify Deadline, D.

When selecting the Chosen Flights individually (one flight at a time), the customer may choose both flights individually. A set of four Notify Deadlines and the exercise price conditions are displayed in the Box A7.300. All Notify Deadlines may or may not be associated with each of the related AFO Flights. For example, A and B are applicable to F1, whereas C and D are not, as shown by the symbol "N.A.", short for "Not Applicable", in the second row in the Box A7.300. There may be one or more reasons for a Notify Deadline to be not applicable to any flight. For example, the Notify Deadline may be after the flight departure or the airline may choose not to offer a Notify Deadline on a specific flight due to one or more reasons including, without limitation, too high AFO Price, customer utility reasons and expected load factor.

Before the Notify Deadline, B, the customer may select any of the four flights. Since F1 is a Default Flight, therefore, if the customer does not select two Chosen Flights or notify the airline about his/her desire to "not" take F1 as Chosen flight before B, then F1 will be selected as one of the Chosen Flights at an exercise price of $20. After B, the customer can only select one Chosen Flight (out of F2, F3 and F4). If the customer fails to do that before the D deadline, then F4 (i.e., the default flight) would be selected as the second Chosen Flight at an exercise price of $55.

AFO (4,n) (where n=1 or 2)

FIGS. A6 and A8 demonstrate an illustrative practical example of AFO (4,n) instance, where n is variable and may be equal to one or two. The customer selects four AFO Flights, F1, F2, F3 and F4 to the customer. Here, the flights from the previous example (AFO (4,2)) are used here, as shown in the Boxes A6.100 to A6.400. The customer can choose to fly on any 1 or 2 flights out of the 4 AFO Flights. Some of the details of the Initial Transaction are shown in FIG. A8. The customer pays an Initial AFO Price of $150 and a Ticket Price of $500 at the ITT (i.e., on the 14$^{th}$ day of April, as shown in the second row of the Box A8.100). A set of four Notify Deadlines along with exercise price conditions are displayed in Box A8.200.

Box A8.210, refers to Exercise Prices when selecting the first Chosen Flight. For example, the customer shall pay $10 to select F2 as Chosen Flight before A (shown by the first column in the third row in the Box A8.200). Box A8.220, refers to Exercise Prices when selecting the second Chosen Flight. For example, the customer shall pay $505 (as Exercise Price) to select F1 as the second Chosen Flight before A (shown in the first column in the sixth row in the Box A8.200). The Exercise Prices are much higher first the second Chosen Flight than for the first Chosen Flight. This may be because the Exercise Prices for the second Chosen Flight include a Ticket Price for the second flight (assuming the Ticket Price paid at the ITT (i.e, $500) accounts for only one flight). There is only one Default Flight (i.e., F2) as the customer must select at least one Chosen Flight.

The costs, revenues, benefits, terms and conditions shown here are for illustration purposes only and actual values could be different depending upon specific values selected and decisions taken by the airline for value options, AFO Prices, customer behavior, airline schedule, Notify Deadline(s) and other relevant factors.

Summary of AFO VOF Structure

The AFO VOF structure may be implemented in several ways depending upon the terms and conditions associated with the AFO contract. The structure presented above for the AFO (2,1) instance may be extended to implement other instances, for example.

The AFO concurrently optimizes value for both the airline and its customers. The customers receive enhanced travel flexibility and utility in terms of guaranteed availability of alternate flights at a (presumably low) known price with no hassles, whereas the airline receives a significant incoming revenue benefit. The airline gets to know the relative preferences and utilities for travel in alternate flights as some customers take this option and others don't. The presumption here is that customers make a logical decision to choose the AFO option if they prefer to have alternate flight flexibility and can afford to pay the AFO Price(s) (initial and exercise if any). The airline also benefits from higher customer loyalty as customers receive higher satisfaction from using the airline service, and can optimize its seat profitability by reusing/reselling the released seats at typically higher than average prices when those seats become available close to the day of departure.

APO VOF Structure in Any Industry

The formulation of the APO VOF structure in any industry would be similar to the structure mentioned above for the AFO VOF. In a successful Initial Transaction for an APO, a customer receives an option to choose up to 'n' of 'm' selected products (termed "APO Products"). The 'n' products selected by the customer are termed "Chosen Products". After each of the 'n' Chosen Products is defined (or selected), the customer has the right to use the said Chosen Product. Apart from the 'n' Chosen Products, the remaining 'm-n' products are termed "Released Products". The Released Products may be sold to others or used for other purposes. Numerically, the value of 'm' is greater than or equal to 1 and the value 'n' may vary from '0' to 'm' depending upon the specific implementation of the AFO framework, both m and n being whole numbers. To provide flexibility, the value of n may be limited to less than the value of m, or n<m; however, in some situations, n may be equal to m. As defined in the AFO structure, the value of 'm' and 'n' may be defined as per the specific implementation of an APO VOF. The company may incorporate the customer information and the data related to the APO into the sales, production, inventory or any combination of the above or other database or information system of the company.

The customer may select all APO Products concurrently or sequentially. All the transactions used to award all the APO Products of an APO (m,n) instance are related to each other, and hence, are considered as related transactions. A company may choose to create one or more instances of APO VOF based on any factors similar to those mentioned above or any other factors of company choosing. The Initial Transaction may have terms and conditions to both the customer and the company. These terms and conditions may be set to concurrently benefit both the parties. The APO VOF may or may not include any constraints related to schedule or any other related parameter of APO Products.

The Initial Transaction may impose one or more conditions on the customer. A customer may be required to explicitly or implicitly notify the company prior to a given set of one or more Notify Deadlines regarding the Chosen. Product. The customer may be required to pay a price related to the APO at one or more times (such as at the Notify Deadline(s), CNT, ITT or at any other times). The price may consist of one or more components, including, but not limited to, a set of one or more Product Prices and/or a set of one or more APO prices (such as Initial Price, Exercise Price or other prices). In the context of an APO, the term "Product Price" of a product refers to the price a company would charge for a Product if there were no APO implementation on the said Product.

The APO VOF may also include conditions imposed on or assumed by the company. For example, the company may be under mandatory condition to reserve the awarded APO Products until the CNT passes, to allow the customer to select the desired Chosen Products from the awarded APO Products.

Once the Initial Transaction is successful, there may be at least one related event, as mentioned in the AFO Structure. Each said event may be associated with various terms and conditions on the customer and/or the company. After the CNT, the company may reuse/resell the Released Product(s) for potential revenue and/or other purposes (such as selling again as APO Products or others). The company or the customers may have the right to enforce the Chosen Product(s) on the other party as per the terms and conditions of the option contract.

The above terms and conditions of the APO VOF may be set in a way to concurrently benefit both the customer and the company. The customer receives additional utility from the flexibility to choose a desired Product from among alternatives. The company benefits from enhanced customer satisfaction (loyalty and repeat business), incremental revenue from the APO Price and selling (or reusing) the Released Product(s), and other operational benefits.

Model to Analyze AFO Applicability and Pricing Dynamics

This section presents a model usable to study and analyze the dynamics of applying an AFO system to a given set of flights. The model helps to analyze the characteristics of a flight to determine the dynamics of AFO applicability and potential AFO returns that an airline can expect by applying an AFO to that flight (i.e., making the flight AFO-eligible). The following model is presented for the AFO (2,1) instance. However, it may be used for any other AFO instance.

Consider two flights A and B of an airline, as shown in FIG. A9. The illustrated model may be used by the airline to accomplish two objectives: a) analyze whether the said two flights can be offered together to a customer as part of an AFO transaction, and b) determine potential terms and conditions of the options contract with respect to A and B that would make the AFO offer a valuable proposition for both the customer and the airline. In the illustrated model, for simplicity, it is assumed that the customer needs one seat in a flight.

Academicians and researchers in the airline and other industries have long used the concept of expected value of a product (or a flight seat in the context of the airline industry). In general, the Expected Value (or EV, in short) of a flight seat (or flight, in short) implies the revenue (or value) expected, on average, by selling and/or using the flight (or flight seat) for any other purpose. An EV may depend on several factors like demand, seat capacity, competition, price and so forth. Different airlines use different methodologies to calculate an EV, based on their specific company dynamics. Airlines use different types of pricing mechanisms to price their tickets in order to generate value greater than or equal to the expected value of the seats. The calculation of EV and Ticket Price is not discussed or presented here. An airline may use a method of its choosing to calculate EV and Ticket Prices.

In AFO (2,1), an airline may block one seat in each of the two AFO Flights. During the Blocking Period, the airline may not be able to sell these seats to other customers. Therefore, the airline may lose a portion of the EV for one or both of these seats during the Blocking Period. The change in the expected value of a seat due to the Blocking Period is referred to as "$\Delta EVBP$", and can be expressed as the difference between the expected value when the Blocking Period ends, or EVBP(end), in short, and the expected value when the Blocking Period starts, or EVBP(start), in short. The change in the expected seat value may be defined, as follows, $$\Delta EVBP = EVBP(\text{end}) - EVBP(\text{start})$$

The EVBP(start) and EVBP(end) may be the same or different from each other as it depends on the factors that affect EV of a seat. For each of the two AFO Flights, the $\Delta EVBP$ may be positive or negative.

By way of example only, the illustrated model assumes that the AFO (2,1) transaction would involve one Ticket Price, and two AFO Prices, i.e., the Initial Price (paid during the Initial Transaction) and the Exercise Price (paid at the CNT). The Ticket Price may be charged to make up for the fact that the customer will use one flight (i.e., the Chosen Flight), thereby exhausting a seat from the inventory of that flight. So, the Ticket Price would compensate for the loss in expected value of the Chosen Flight during the Blocking Period and afterwards till the flight departs. The AFO Price is charged to cover for the loss (if any) in the expected value of the Released Flight during the Blocking Period and to make additional profit for the airline. The Released Flight is available for resale/reuse after the CNT.

The following model may be used to determine the appropriate Ticket Price and the AFO Prices.

Consider FIG. A9 and the equation M1 below, where the parameters, Va (shown by Box A9.110) and Vb (shown by Box A9.120), refer to the EV of flight A and flight B at the ITT (as shown by Box A9.100), respectively. It is assumed here that the customer selects both the flights at the ITT. If the customer selects a flight before the ITT, then the EV of the flight at the time the flight was selected would be needed for the analysis. The parameters, Va' (shown by Box A9.210) and Vb' (shown by Box A9.220), refer to the EV of flight A and flight B at the Notify Deadline (shown by Box A9.200), respectively. The parameters, T and Pi, refer to the Ticket Price and AFO Price, respectively, charged to the customer, prior to or at the ITT. The parameter, Pe(X, ND), refers to the exercise price associated with a Notify Deadline (ND) for a given flight (X). Since only one Notify Deadline is assumed here, the parameter, Pe(X), is used in place of Pe(X, ND), for simplicity.

The Chosen Flight is not known till the CNT. Consider the case, when the flight B (or B, in short) is the Chosen Flight. The following equation describes the total profit (from APO) to the airline (or TPA(b), in short).

$$TPA(b) = T + Pi + Pe(b) + \Delta EVBP(A) + \Delta EVBP(B) \quad (M1)$$
$$= T + Pi + Pe(b) + (Va' - Va) - Vb$$

In the above equation M1, the customer pays the price (T+Pi) prior to or at the ITT, and the price Pe(b) at the CNT. Since B is the Chosen Flight, it may be assumed that the seat in B is exhausted from the inventory and thus, the EV of B is zero at and after the CNT (assuming that the customer will hold on to the seat after the CNT and until departure). Therefore, $\Delta EVBP(B)$ would be equal to "0−Vb=−Vb". For the Released Flight (i.e., flight A), the $\Delta EVBP(A) = Va' - Va$, for the Blocking Period.

Similarly, consider the case, when the flight A (or A, in short) is the Chosen Flight. The following equation M2 describes the total profit to the airline (or TPA(a), in short).

$$TPA(a) = T + Pi + Pe(a) + \Delta EVBP(A) + \Delta EVBP(B) \quad (M2)$$
$$= T + Pi + Pe(a) - Va + (Vb' - Vb)$$

In the above equation M2, the customer pays the price (T+Pi) prior to or at the ITT, and the price Pe(a) at the CNT. Since A is the Chosen Flight, $\Delta EVBP(A)$ would be equal to "0−Va=−Va" (similar to the case illustrated above when B is the Chosen Flight). For the Released Flight (i.e., the flight B), the $\Delta EVBP(B) = Vb' - Vb$, for the Blocking Period.

For the airline to generate a profit from the AFO, both TPA(a) and TPA(b) should be greater than zero. The functions defined in M1 and M2 may be rearranged and two inequalities may thus be formed as below:

$$T+Pi+Pe(a)\cdot Va+(Vb'-Vb) \geq 0 \quad (M3)$$

$$T+Pi+Pe(b)-Vb+(Va'-Va) \geq 0 \quad (M4)$$

The above inequalities M3 and M4 provide a fundamental result that may be used to analyze a given set of flights for applicability and potential returns of the AFO. So long as the above inequalities are satisfied, the airline would be able to generate a direct incremental revenue benefit from offering AFOs on the selected flights.

It is important to ensure that ΔEVBP(A) and ΔEVBP(B) are not very high negative values. If they are, then it may require a high AFO Price to ensure a profit to the airline. In such situations, an AFO may become unaffordable and may lead to decreased customer participation. An airline may modify the associated Notify Deadline to control these values.

The two inequalities obtained above, M3 and M4, may be accommodated to include a margin of M % on the AFO Price. Here, the parameter, M, defines the total AFO profit as a percentage of the total AFO Price. The parameter, M, may or may not be a function of the Chosen Flight or another factor. Using M, two equations may be formed, as follows, $$T+[Pi+Pe(a)]*(1-M/100)-Va+(Vb'-Vb)=0$$

$$T+[Pi+Pe(b)]*(1-M/100)-Vb+(Va'-Va)=0$$

The following sections describes a few strategies that may be used during the implementation of an AFO system.

An airline may use any method of its choosing to decide on tire Ticket Price. The airline may charge either the Ticket Price of the Chosen Flight (or TC, in short) or that of the Released Flight (or TR, in short), any function of these two prices or any other prices. However, it is advisable to charge a Ticket Price (T) higher than The EV of the Chosen Flight (at the ITT). There are several ways to accomplish this goal. For example, the airline may charged the higher or the two Ticket Prices, TC and TR, prior to or at the ITT. If so, the airline may (or may not) provide a refund for the difference in the Ticket Prices if the lower priced flight is selected as the Chosen Flight.

Another approach may be to charge the lower of the two Ticket Prices (TC and TR) upfront and to charge the difference in the Ticket Prices later, if the higher priced flight is selected as the Chosen Flight. If the Ticket Price charged is lower than the EV of the Chosen Flight (at the ITT), then the AFO Price should be set to compensate for both the EVBP of the Released Flight, and the potential loss of the Ticket Price (i.e., the difference between the Ticket Price charged and the EV of the Chosen Flight at the ITT).

The AFO Price may be charged in zero, one, two or more payments. The zero payment approach refers to the situation when the AFO Price is embedded within the Ticket Price (i.e., not separately stated), and the customer only pays a given Ticket Price and no separate payment or charge is taken specifically for an AFO. The selection of Ticket Price and/or AFO Price should ensure that both TPA(a) and TPA(b) are positive.

The parameters, Ta and Tb, refer to Ticket Prices of A and B, respectively. Consider the case when the higher of the two Ticket Prices, Ta and Tb, is charged prior to or at the ITT, and only one AFO payment is charged at the ITT (i.e., no Pe(x) is charged). It is assumed that Ta>Tb, and thus, the functions for TPA(a) and TPA(b) reduce to the following:

$$TPA(a)=Ta+Pi-Va+(Vb'-Vb)$$

$$TPA(b)=Ta+Pi-Vb+(Va'-Va)$$

By definition of Ticket Price, Ta should be more than or equal to Va. Using the conservative case that Ta=Va, the above two inequalities reduce to:

$$TPA(a)=Pi+Vb'-Vb \geq 0$$

$$TPA(b)=Pi+Va'-Vb \geq 0$$

The above two inequalities may be combined in two ways, M5 and M6, as follows:

$$Pi+\text{Min}(Va',Vb')-Vb \geq 0, \quad (M5)$$

where, Min(Va', Vb') refers to the minimum of Va' and Vb'.

$$Pi+EV(\text{Released Flight at the } CNT)-EV(\text{Lower Priced Flight at the } ITT) \geq 0, \quad (M6)$$

The above two inequalities, M5 and M6, may be transformed into equations using a given margin, M %, that represents the profit margin an airline can expect to generate on the AFO Price.

$$Pi*(1-M/100)+\text{Min}(Va',Vb')-Vb=0 \quad (M7)$$

$$Pi*(1-M/100)+EV(\text{Released Flight at } CNT)-EV(\text{Lower Priced Flight at } ITT)=0 \quad (M8)$$

When Min(Va',Vb') or EV (Released Flight) is greater than Vb, this implies that the EV of the Released Flight is high enough that the airline could profit even with a zero or negative AFO Price (Pi). In such situations, an airline may use cash back or other types of coupons to motivate their customer to choose the lower valued flight as the Chosen Flight, and thus release the higher valued flights for potential high revenue sales.

There are some other special cases of the above equation M5. It may be helpful here to restate the basic assumption of the equation M5. The assumption is that the Ticket Price of the higher priced flight is charged to the customer.

Consider the situation when, Vb, the expected value of the lower priced flight (at the ITT), is lower than the AFO Price itself. In such flights, the airline is expected to generate a profit by selling AFO irrespective of the Notify Deadline and other terms. Such Flights may include, but are not limited to, flights with low expected load factors or demand. As a practical example, when the ITT is very close to the departure of a flight that has low expected demand, Vb for that flight may be low enough to warrant this situation.

In another situation, consider the case when the Blocking Period is small or set in a way that the expected values of seats do not change much during the Blocking Period. Thus, Vb=Vb' and Va=Va'. Using the assumption that Va>=Vb, the following result can be obtained:

Va'>Vb' or the Min(Va',Vb')=Vb'=Vb.

Thus, the inequality M5 reduces to, $$Pi \geq 0$$

Based on the above result, it may be concluded that when the Blocking Period is set so that it eliminates the change in expected values of both AFO Flights, then any AFO Price collected is expected to generate a profit for the airline. Thus, an AFO may be offered at relatively low prices for such flights. An airline may set such Blocking Period in several ways. In some situations at least, a short Blocking Period (of 1-2 days) starting at 1-2 weeks before or a mid-size Blocking Period (1-2 weeks) starting at 6 weeks before the departure may lead to a small or no change in the EVs of both the flights.

An airline may use the model specified above to decide on the terms and conditions of an AFO VOF that would make the AFO offer a valuable proposition for both the airline and its customers. Notify Deadlines, AFO Prices, Ticket Prices, AFO availability on flights and other terms and conditions may be decided based on an analysis done using the above model.

Model to Analyze APO Applicability and Pricing Dynamics in Any Industry

The model presented above may be applied for the APO VOF In any industry to study and analyze the dynamics of applying APO to a given set of products.

In general, the Expected Value of a product implies the revenue (or other value, e.g., costs savings or revenue plus costs savings) expected, on average, by selling and/or using the product for any other purpose. Companies use different types of pricing mechanisms to price their products in order to generate value greater than or equal to the expected value of their products. The calculation of EV and Product Price is not discussed or presented here. A company may use a method of its choosing to calculate EV and Product Prices.

The following model presents a set of equations for the generic APO(m,n) instance. The customer selects m products and can choose any n products out of those m. The customer may select the Chosen Products in many ways, where each such combination of Chosen Products along with associated conditions is termed "Chosen Product Group". A Chosen Product Group may include the combinations which may have the same exact set of products but may differ in terms of one or more associated conditions such as price, Notify Deadline(s) or others. For example, two combinations would be different when the Chosen Products are the same but the CNTs are different, leading to different Exercise Prices.

The following inequality is presented as a general function for the $t^{th}$ Chosen Product Group.

$$Si + \sum_{j=1}^{n} Pe(j, t) + \sum_{i=1}^{m} \Delta EVBP(i, t) >= 0$$

where, k=total number of Chosen Product Groups,

Si=Sum of the all prices paid prior to or at the ITT, including all Product Prices and APO Prices, Pe(j,t)=Exercise Price paid for selecting the product 'j' as the Chosen Product within the $t^{th}$ Chosen Product Group, and ΔEVBP(i,t)=change in the EV of Product 'i' across the Blocking Period, within the $t^{th}$ Chosen Product Group.

A set of k number of inequalities should be created, similar to the above inequality, for each of the Chosen Product Groups (i.e., from 1 to k), which would together represent the APO dynamics. A company may then use and solve a system of k inequalities to determine optimal price, notify deadline, capacity and other conditions for the APO VOF.

A company may use the model provided above to decide on the terms and conditions of an APO VOF that would make the APO offer a valuable proposition for both the customer and the company. Notify Deadlines, APO Prices, Product Prices, APO availability on products and other terms and conditions may be decided based on an analysis done using the above model.

5) Optimization of APO VOF

As mentioned earlier (shown in FIG. 10), in the form of an optional last step in the first stage, a financial analysis may be performed using the existing company and customer data to determine the optimal terms and conditions of the APO VOF. 'What-if' scenarios may be executed to determine an optimal pricing strategy. The company may want to divide customers using one or more criteria and design separate APO VOF for each customer segment. FIG. A10 displays the corresponding acts for the AFO VOF. In Act A10.100, a set of functions including customer utility function, cost and operational data functions of the airline are input to the system. Next, in Act A10.110, an optimization function and its constraints need to be defined to determine the optimal terms and conditions for the AFO VOF. Next, in Act A10.120, business judgment may be utilized to finalize the terms and conditions that may or may not be the same as the optimal terms and conditions.

Second Stage: Using the APO Value Option Framework

After completing the first stage of the method, the company has created an APO VOF and specific options within that framework. The company has also segmented customers and designed options accordingly. The company is fully prepared to use a structured format consisting of one or more APO value options to interact with its customers in real time to generate benefits for both the company and its customers. The second stage of the APO VOF is now presented. A detailed demonstration for the second stage of the AFO VOF is presented first followed by a summarized illustration of second stage of the APO VOF.

The implementation of the AFO VOF between the airline and its customer takes place through two high level acts, as shown in FIG. A11. In Act A11.100, the 'Buy AFO' process, an interactive event between the customer and the airline's web server, runs to carry out the Initial Transaction of the AFO VOF. In this Act, a number of algorithms, the details of which are presented later, may be executed (e.g., availability, AFO Price, Ticket Price and Notify Deadlines) on the company's, server to optimally calculate the terms and conditions of the AFO VOF to concurrently benefit both the airline and the customer. In Act A11.200, the customer notification process (explained later) is executed. In this process, the customer selects the Chosen Flight. The process may also consist of one or more event optimizer algorithms that may help to optimally select the Chosen Flight and/or to optimally reuse the Released Flight.

As explained above, the Buy AFO process may be implemented via the Sequential (shown in FIG. A18) or the Concurrent (shown in FIG. A25) process. There are many ways to do the Sequential process. For example, in one implementation of the Sequential process, a customer may have already purchased seat(s) on a flight or an Itinerary with one or more Segments (each with one or more Legs) before the Initial Transaction begins. The said flight may also be referred to as the Initial Flight. The said Itinerary may be referred to as the Initial itinerary. The Segments within the Initial Itinerary may be referred to as the Initial Segments or the Initial Flight Segments (or IFS, in short). The Legs within each IFS may be referred to as the Initial Legs or the Initial Flight Legs (or IFL, in short). In this way, the customer may then purchase an AFO (i.e., purchase one or more AFO Flights) on the said Initial Flight. Similarly, the customer may purchase an AFO (i.e., purchase one or more, AFO Itineraries) on the Initial Itinerary. The customer may purchase an AFO on any Initial Flight Segment (or IFS), i.e., purchase one or more AFO Segments (also referred to as the Option Flight Segments or OFS, in short). The customer may purchase an AFO on any Initial Flight Leg (or IFL), i.e., purchase one or more AFO Legs (also referred to as Option Flight Leg or OFL, in short). The two events (one for the Initial Flight and the other for the Initial Transaction) may be executed with a minimal (one just after another) or a significant time gap (e.g., few minutes, hours, days and so forth) in between them.

The AFO VOF may be implemented at different levels of flights including, but not limited to, Itinerary, Segment and Leg. Illustration of these three levels is given through the example as shown in FIGS. A12, A13 and A14, respectively.

When implementing an AFO (2,1) at the Itinerary level, the customer selects two separate itineraries and has the option to choose either of them as the Chosen Itinerary (equivalent to Chosen Flight). FIG. A12 displays a practical example. A customer may select two itineraries as part of an AFO, shown in Boxes A12.100 and A12.200. In AFO Itinerary 1, the customer leaves on the $2^{nd}$ and returns on the $6^{th}$ of May as shown in Box A12.100. In AFO Itinerary 2, the customer leaves on the $4^{th}$ and returns on the $7^{th}$ of May as shown in Box A12.200. The customer may choose either of the two itineraries as the Chosen Itinerary.

When implementing an AFO (2,1) at the Segment level, the customer selects two separate Flight Segments and has the option to choose either of them as the Chosen Flight Segment (or CFS, in short, equivalent to Chosen Flight). FIG. A13 displays a practical example. A customer purchases a round-trip Itinerary with two IFS as shown in Boxes A13.100 and A13.200. After purchasing the ticket, the customer buys an AFO on the Onward Journey (from BOS to LAX, i.e., the first Initial Flight Segment), as shown in Box A13.120. As per the IFS, the customer departs on the $2^{nd}$ of May (shown in Box A13.110), whereas in the associated OFS, the customer departs on the $3^{rd}$ of May (shown in Box A13.120). So, the customer may select either the IFS or the related OFS as the Chosen Flight Segment for the onward journey.

When implementing an AFO at the Leg level, the customer selects two separate Flight Legs and has the option to choose either of them as the Chosen Flight Leg (or CFL, in short, equivalent to Chosen Flight). FIG. A14 displays a practical example. Consider an Itinerary with two Segments, onward journey and return journey, as shown in Boxes A14.100 and A14.300, respectively. The customer purchases an AFO (i.e., gets one OFL) on the Leg2, shown in Box A14.200, in the onward journey. The IFL for Leg2 departs at 1:00 PM and the OFL for Leg2 departs at 6:00 PM on the $2^{nd}$ of May (shown in Box A14.210 and A14.220, respectively). Thus, the customer may select either the IFL or the associated OFL as the Chosen Flight Leg (or CFL, in short) for Leg2 in the onward journey.

An airline may choose to implement an AFO at any level(s). In a specific AFO interaction between a customer and the airline, the implementation level should be the same for all AFO Flights, Chosen Flights and Released Flights. For example, if AFO is implemented at the Itinerary level, then all the AFO Flights would refer to AFO Itineraries; Chosen Flights would refer to Chosen Itineraries: and Released Flights would refer to Released Itineraries.

1. 'Buy AFO'—Dynamic Interaction to Capture Customer Demand

In the Buy AFO process, a customer interacts with an airline's server to buy an AFO. The interaction may take place (for example) via phone; in-person or on a website. The Sequential Buy AFO Process is presented first along with its detailed algorithms, followed by a short summary of the Concurrent Buy AFO Process.

Sequential Buy AFO Process

There are several ways to implement the Sequential process. The following presents an example of the Sequential Buy AFO Process when an AFO is bought at the Segment level. It is also assumed here that the customer first purchases an Initial Itinerary with one or more IFS, and then opts to buy an AFO to select one or more OFS (Option Flights Segments) on the desired IFS.

As an instance of the Sequential Buy AFO process, a customer has purchased an Itinerary (with one or more flights) and then requests purchase of an AFO through the interactive interface of the web pages as shown in FIGS. 18, A15, A16 and A17. FIG. 18 displays the summary of the purchased Itinerary, which is made of two Segments: BOS to ATL (onward journey) and ATL to BOS (return journey). Clicking on the marketing banner representing "Buy AFO", the customer is linked to the Web page shown in FIG. A15 and a Buy AFO interaction begins.

The series of web pages in FIGS. A15, A16 and A17 may (for example) be displayed in a customer's browser by a company's web server, to facilitate the interaction between the customer and the airline when the customer comes to purchase an AFO (during or after the Initial Itinerary is purchased). The Initial Itinerary and two corresponding IFS are displayed in FIG. A15. The customer may choose to purchase an AFO on any IFS by clicking the "Click here to Get AFO Flight" link corresponding to that IFS. Once the link is clicked, the 'Search AFO Flights' section appears (shown in FIG. A15), where the customer may enter the search criteria for OFS and then click on the "Search AFO Flights" button. After the click, the Buy AFO algorithm running "behind the scenes" on a server of the company qualifies the availability, applicability and price conditions on all the OFSs (Option Flight Segments) available and displays them in the screen as shown in FIG. A16. For each of the OFSs, a set of one or more Notify Deadlines and the corresponding AFO Prices are shown in the form of "Select" buttons (shown in the "AFO Notify Deadline/AFO Price" section in FIG. A16). The customer may select any desired OFS (along with the Notify Deadline and AFO Price) by clicking on a "Select" button associated with any of the Notify Deadlines displayed in the corresponding row. Once the customer clicks the "Select" button, he/she is hyperlinked to the web page as shown in FIG. A17, where the summary of the IFS and the selected OFS is shown.

Next, the customer may choose to get more OFS on the same IFS, or to get an AFO on another IFS in the Initial Itinerary. To purchase another OFS on the current IFS, the customer may do the OFS search again by entering the search criteria in the 'Search AFO Flights' section, and then choosing a desired OFS from the displayed OFS results. To purchase an AFO on another IFS, the customer may select the desired IFS, and then repeat the OFS search and selection process for that IFS. Once all the desired OFSs have been selected, the customer clicks the "Save & Purchase" link (shown in FIG. A17) to make a payment and complete the purchase.

The following presents an algorithmic illustration of the Sequential Buy AFO process mentioned above. Consider FIG. A18. In Act A18.100, the customer selects (and/or purchases) an Itinerary (with one or more IFS). Next, in Act A18.110, the customer reaches an interactive interface of the airline's web server to a Buy AFO page, where the customer selects an IFS (referred to as Target_IFS) on which an AFO is desired. Next, the customer inputs the OFS search criteria for the current Target_IFS in Act A18.115.

Next, on clicking the "Search AFO Flights" button, control goes to Act A18.120, where the OFS search algorithm is executed to search for an OFS. The OFS search algorithm returns a list of valid OFSs, along with a list of Comb_NDs (defined elsewhere) and associated AFO Prices. The details of the OFS search algorithm are presented later. Next, the search results are displayed for the customer, who then selects the desired OFS and one or more associated Comb_ND(s)/AFO Price(s), as shown in Act A18.130.

Next, in Act A18.140, a test is performed to determine whether the customer wants to select more OFSs on the current Target_IFS or on another IFS. If the customer wants to get an OFS on another IFS, control loops back to Act A18.110, where the customer selects another IFS as the Target_IFS, and then the process is repeated again for the new Target_IFS. If the customer wants to get more OFSs on the current Target_IFS, control loops back to Act A18.115, where the customer enters the OFS search criteria, and then the process is repeated for the new OFS search criteria. If the customer does not want to buy any more OFSs, control goes to Act A18.150, where the customer pays the price for the AFO using a credit card, direct bank account debit or any other payment transaction mechanism. Next, the algorithm ends in Box A18.200.

The airline may take a commitment from the customer for the payment of the AFO price, which may include taking pre-authorization from the said customer to charge the customer's debit or credit card, to do direct bank account debit or for any other means.

OFS Search

The following algorithm (shown in FIG. A19) determines and validates an OFS for a given set of conditions including, but not limited to, availability, Notify Deadline and price.

In Act A19.100, the number of customers (IP), IFS_Set (containing all the IFS in the Initial Itinerary, and all the OFSs, (if any) already selected/purchased along with Comb_ND_Set(s) and Comb_OP_Set(s), for each IFS), Target_IFS and the OFS Search parameters are input to the system. The details on Comb_ND_Set and Comb_OP_Set are provided later. The number of customers refers to the number of passengers for which this process is run. The OFS search parameters include, but are not limited to, date, time and airport/city (location) for departure and arrival, number of connections, class of service, Notify Deadline, AFO Price and so forth. A customer may be allowed to input Notify Deadline and/or AFO Price on the basis of which valid OFSs (that satisfy the given criteria of Notify Deadline and/or AFO Price) may be searched for and displayed for the customer. In another example, a customer may be asked to input the origin and destination related parameters, and then a set of Notify Deadlines and AFO Prices may be computed for the flights that match the given criteria. In yet another example, a customer may input both the origin and destination and Notify Deadline and/or AFO Price inputs and then a search may be performed for valid OFSs. In another example, a customer may input to the system, one or more flights, and/or inputs to search for one or more additional flights (e.g., origin and destination, price etc.) to search for OFS that may be combined with one or more input flights (by the customer) to constitute the total set of flights for an AFO. In such situations, an airline may also validate the flights input by the customer to determine if the said flights are eligible to be AFO Flights.

Next, control goes to Act A 19.110, where an OFS Search is performed for the given criteria. The search may be best performed using a processor that may calculate results in optimal time. The order in which search parameters are executed may be optimized to reduce the search time, however, it may or may not affect the final outcome. An airline may select any order of its choosing. An airline may select the order based on the server hardware used, AFO VOF parameters, other company operational information or any other factor. In the current discussion, the following order has been assumed: computation of Notify Deadline, availability and price. The details are presented in the following sections. In Act A19.110, Flight Segments are determined that match the search criteria related to departure/arrival location and dates, and the resulting Segments are added to a list termed LIST_OFS.

Next, in Act A19.120, a list of OFS validation rules is obtained from the airline's AFO VOF database and the rules are used to validate all the Segments in the LIST_OFS. Segments that do not satisfy the rules are discarded. Validation rules may include, but are not limited to, a Maximum Connection Rule, a Maximum Ticket Price Rule, a Time Synchronization Rule, and so forth. A Maximum Connection Rule discards the Segments that have more connections than specified. A Maximum Ticket Price Rule discards the Segments for which the available Ticket Prices are higher than the Ticket Price paid by the customer for the Target_IFS. A Time Synchronization Rule validates, the Segments on the basis of departure and arrival times. For example, when a Target_IFS is for the onward journey of a round-trip Itinerary, this rule only validates those Segments, which arrive at least X minutes before the departure of the earliest Segment (among IFS and all associated OFS) for the return journey. An airline may choose to implement one or more of the above or any other validation rules to further qualify the Segments in the LIST_OFS. As a last Act in Act A19.120, the first element in the updated LIST_OFS is set as the Current_OFS.

Next, control goes to Act A19.130, where a Set of Comb_NDs is computed for the combination of the Target_IFS, all the existing OFS of the Target_IFS and the Current_OFS, and added to a set called Comb_ND_Set. Next, in Act A19.135, a test is performed to determine whether the Comb_ND_Set obtained in the previous Act is Null. If so, control goes to Act A19.155. If not, control goes to Act A19.140, where the AFO availability and AFO Price for the Comb_ND_Set are determined. Detailed additional algorithms to compute Comb_ND_Set, Availability and AFO Price are discussed in the later sections. Next, in Act A19.150, a test is performed to determine whether the AFO Availability or the AFO Price is Null. If so, control branches out to Act A19.155. If not, control branches out to Act A19.160.

In Act A19.155, the Current_OFS is discarded from the LIST_OFS, and control goes to Act A19.160, where another test is performed to determine if any element is left in the LIST_OFS. If so, control goes to Act A19.165. If not, control goes to Act A19.170.

In Act A19.165, the next element in the LIST_OFS is set as the Current_OFS and control loops back to Act A.19.130 to repeat the process for the new Current_OFS In Act A19.170, the updated LIST_OFS is returned as the search result, and then the algorithm ends in Box A.19.200.

Computation of Notify Deadlines

An airline may set one or more Notify Deadlines for a Flight Leg using one or more factors (as mentioned earlier). Once Notify Deadlines have been set for each flight, the next Act is to create a framework to compute Notify Deadlines for a group of flights (such as a Segment, an Itinerary or any other group) by using the Notify Deadlines for each of the flights in the group. The following sections present an example of a framework and an algorithm that may be used to obtain a set of Notify Deadlines applicable to a group of flights. An airline may use any framework and algorithm of its choosing to obtain the same.

A set of Notify Deadlines associated with a Leg, a Segment and a combination of two or more Segments is called Leg_ND_Set, Seg_ND_Set and Comb_ND_Set, respectively. Each element in the Leg_ND_Set, Seg_ND_Set and Comb_ND_Set is termed Leg_ND, Seg_ND and Comb_ND, respectively. The following sections describe the algorithms that may be used to calculate the Comb_ND_Set for a given combination of one IFS, all the existing OFSs of the IFS and a given new OFS. The Comb_ND_Set is computed by combining the Seg_ND_Sets of the IFS and all the OFSs (existing and new). A Seg_ND_Set is computed by combining the Leg_ND_Sets of all the Legs under that Segment. The computation may be performed using a processor that may calculate results in optimal time.

Calculation of Comb_ND_Set

FIG. A20 shows an algorithmic flow chart to compute a Comb_ND_Set. In Act A20.100, the Seg_ND_Sets for IFS, all the existing OFSs of the IFS and the new OFS aye computed and taken as input parameters. The algorithm to compute a Seg_ND_Set is provided later. Next, in Act A20.110, the Last Notify Deadline is selected for each Segment from its Seg_ND_Set. The earliest of all the collected Last Notify Deadlines is chosen and set as the Target_Notify_Deadline.

Next, control goes to Act A20.120. All the remaining Notify Deadlines that are after the Target_Notify_Deadline are discarded from all the Seg_ND_Sets of all the Segments. Next, control goes to Act A20.130, where the remaining Notify Deadlines from all the Seg_ND_Sets are added to a set termed Comb_ND_Set.

Next, in Act A20.140, a list of validation rules is read from the airline's database and applied to validate the Comb_ND_Set. The rules are used to validate all the Comb_NDs in the Comb_ND_Set. Comb_NDs that do not satisfy the rules are discarded. The rules may be based on various airline factors such as customer utility, flight parameters and so forth. For example, a validation rule may only select those Notify Deadlines (or Comb_NDs) that belong to the earliest departing Segment, as it may make it easier for the customer to remember the deadlines. An airline may also formulate rules that may modify some or all of the Comb_NDs based on a given structure of time slabs. For example, consider a time slab structure with 3 time slabs: 2:01 pm to 10:00 pm, 10:01 pm to 6:00 am, and 6:01 am to 2:00 pm. An airline may use a rule that resets the value of the Comb_NDs that fall in the first and third slabs to 8:00 pm and 8:00 am, respectively, and discards the Comb_NDs that fall in the second slab. Such a rule may simplify the Comb_NDs offered to the customers, and make it easier for them to remember and/or use a Notify Deadline.

Next, in Act A20.150, the updated resulting Comb_ND_Set is returned. The algorithm ends in Box A20.200.

If the OFS search is run for an IFS, on which the customer has previously selected OFS, then the airline may use the Comb_ND_Set, computed in the previous OFS search run, as a Seg_ND_Set for the combination of the IFS and its existing OFSs. This may save some computation time when computing the new Comb_ND_Set. The computation may be performed using a processor that may calculate results in optimal time.

Calculation of Seg_ND_Set

FIG. A21 shows the flow chart to compute a Seg_ND_Set. In Act A21.100, the Leg_ND_Sets of all the Legs of the Target Segment (for which Seg_ND_Set is to be computed) are taken as the input parameters. Next, in Act A21.110, the Last Notify Deadline is selected for each Leg from its Leg_ND_Set. The earliest of all the collected Last Notify Deadlines is chosen and set as the Target_Notify_Deadline.

Next, control goes to Act A21.120. All the remaining Notify Deadlines that are after the Target_Notify_Deadline are discarded from all the Leg_ND_Sets. The control goes to Act A21.130, where the remaining Notify Deadlines from all the Leg_ND_Sets are added to a set termed Seg_ND_Set.

Next, in Act A21.140, a list of validation rules is read from the airline's database to validate the Seg_ND_Set. The rules may be based on various airline factors such as customer utility, flight parameters and so forth. For example, a validation rule may only select those Notify Deadlines that belong to the earliest departing Leg, as it may make it easier for the customer to remember the deadlines. These rules may be similar to the validation rules mentioned in the algorithm to compute Comb_ND_Set. Next, in Act A21.150, the updated resulting Seg_ND_Set is returned. The algorithm ends in Box A21.200. The computation may be performed using a processor that may calculate results in optimal time.

Available Capacity Check

The AFO assailable capacity for an OFS may depend on one or more factors including, but not limited to, Notify Deadline, AFO Price, expected seat value and so forth. A detailed model has been presented above to help an airline define availability, price and Notify Deadline dynamics for a flight.

The following presents an example of an algorithm that may be used to determine the AFO availability for a given OFS. The algorithm shall determine the Notify Deadlines within the Comb_ND_Set on which the AFO is available for the given OFS. FIG. A22 shows the logical flow to determine the AFO availability in an OFS. The computation may be performed using a processor that may calculate results in optimal time.

In Act A22.100, a Comb_ND_Set, IP (number of incoming passengers) and an OFS are taken as the input parameters. Next, in Act A22.110, a list termed LIST_LEG is created and initialized. All the Legs in the OFS are added to the LIST_LEG list. The first element in the LIST_LEG list is set as the Current_Leg. Next, in Act A22.120, another list termed LIST_ND is created and initialized. All the Notify Deadlines in the Comb_ND_Set are added in the LIST_ND list. The first element in the LIST_ND list is set as the Current_Comb_ND. Next, control goes to Act A22.130, where an applicable Notify Deadline, termed Applicable_ND, is calculated for the Current_Leg with respect to the Current_Comb_ND.

The Applicable_ND for a Leg is the Notify Deadline (within its Leg_ND_Set) that is closest to and after the Current_Comb_ND. This is done to calculate the EV (of the Flight Leg) at the Current_Comb_ND. Since the Applicable_ND lies on or after the Current_Comb_ND, the EV at the Applicable_ND is expected to be equal to or lower than the EV at the Current_Comb_ND. This is based on the assumption that the probability to sell the seats (normally) decreases as the departure time nears. Thus, the realized AFO Profits (based on the Current_Comb_ND) may turn out to be higher than calculated profits (based on the Applicable_ND). The realized EV of the Released Flight at the Current_Comb_ND is expected to be higher than or the same as the EV used (at the Applicable_ND) while calculating the expected profit.

Next, in Act A22.140, an AFO Capacity rule is read from the airline's database, and then used to calculate the AFO Capacity for the Current_Leg in real- or quasi-real-time. The airline may create any rule of its choosing to calculate the AFO Capacity for a flight. For example, the following presents a rule based on the model described earlier.

An AFO Capacity rule might be to offer an AFO on only those seats of a flight for which the expected value (at the ITT) is less than or equal to Vb, where Vb is defined below. Hence, the AFO capacity is the total number of seats that have EV<=Vb at the ITT. The following is the rearranged version of the equation M7 (described earlier).

$$Vb = Pi^*(1 - M/100) + \mathrm{Min}(Va', Vb')$$

The 'b' here represents the OFS flight, and hence, Vb and Vb' refer to the EV at the ITT and the Current_Comb_ND, respectively, for the OFS, and Va' refers to the EV of the IFS at the Current_Comb_ND. M is the Price Margin and Pi is the associated AFO Price to be paid at the ITT.

An airline may choose to offer the same or different AFO capacities (for a flight) at different Notify Deadlines. In the latter case, the capacities across different Notify Deadlines may be additive in one or more ways. For example, a flight may have two Notify Deadlines, n1 and n2 (n1 is after n2), with AFO capacity of 5 and 5, respectively. It is possible that AFO Capacity may be additive from n1 to n2, resulting in cumulative capacity of 5 and 10 for n1 and n2, respectively. This implies that the flight has a total of 10 seats to offer as AFO Flight seats, out of which 5 seats may be offered at n1, and up to 10 seats may be offered at n2. So, if 2 seats have been used for AFO for the n1 deadline (Used AFO Capacity for n1=2), only 3 seats in n1 or 8 seats in n2 are available as AFO capacity.

Continuing with the available capacity check algorithm, the AFO capacity for the Current_Leg at the Applicable_ND is determined in Act A22.140. Next, in Act A22.160, Used AFO Capacity (the total number of seats in the flight on which an AFO has been sold but not exercised) is calculated for the current Application_ND.

Next, in Act A22.170, Available Capacity (AC) to offer an AFO in the Current_Leg is determined by subtracting the Used AFO Capacity from the AFO Capacity. The control then goes to Act A22.180, where a test is performed to determine whether AC is greater than or equal to the number of incoming customers (IP) desiring an AFO. If so, it implies that AFO capacity is available at the Current_Comb_ND for the Current_OFS and control goes to Act A22.200. If not, it implies that the available AFO capacity is insufficient to account for the IP at the Current_Comb_ND for the Current_OFS and control goes to Act A22.190.

In Act A22.190, the Current_Comb_ND is discarded from the Comb_ND_Set and the Comb_ND_Set is thus updated. The control then goes to Act A22.200.

In Act A22.200, a test is performed to determine whether more elements are left in the LIST_ND list that have not yet been processed. If so, control goes to Act A22.205. If not, control goes to Act A22.210.

In Act A22.205, the next element in the LIST_ND list is set as the Current_Comb_ND. The control then loops back to Act A22.130, where the process (Acts A22.130 to A22; 180) is repeated for the new Current_Comb_ND.

In Act A22.210, a test is performed to determine whether the Comb_ND_Set is empty (in other words if all Notify Deadlines have been discarded from the Comb_ND_Set). If so, it implies that the Current_OFS does not have sufficient AFO capacity available at any associated Comb_ND, and thus, the OFS is discarded and a NULL result is returned in Act A22.215. The algorithm then ends in Box A22.300. If not, then control goes to Act A22.220, where a test is performed to determine whether any more Legs are left in the LIST_LEG list. If so, control goes to Act A22.225, where the next element in the LIST_LEG list is set as the Current_Leg, and then control loops back to Act A22.120 to repeat the processing for the new Current_Leg. If not, this means, there is available AFO capacity on the OFS and the updated restarting Comb_ND_Set is returned in Act A22.230) and then the algorithm ends in Box A22.300.

AFO Price Calculation

An airline may set AFO Prices for a Flight Leg using any of the factors or models mentioned above or any other method of an airline's choosing. A detailed model was presented earlier on pricing techniques for a flight. Once the AFO Prices have been set for each flight, the next Act is to create a framework to compute AFO Prices for a group of flights (such as a Segment, an Itinerary or any other group) by using AFO Prices for each of the flights in the group. The following presents an example of an algorithm that may be used to calculate AFO Price for a given combination (or group) of one or more AFO Flights, as shown in FIG. A23. The computation may be performed using a processor that may calculate results in optimal time.

The parameters Leg_OP refer to an AFO Price (corresponding to a Notify Deadline) associated with a Leg. Similarly, Seg_OP and Comb_OP refer to AFO Price (corresponding to a Notify Deadline) associated with a Segment and a combination of two or more Segments, respectively. A set of Leg_OPs, Seg_OPs and Comb_OPs is termed Leg_OP_Set, Seg_OP_Set and Comb_OP_Set, respectively. The following sections describe the algorithms that may be used to calculate the Comb_OP_Set for a given combination of one IFS, all the existing OFSs of the IFS and one or more new OFS. The Comb_OP_Set is computed by combining the Seg_OP_Sets of the IFS and all the OFSs (existing and new). A Seg_OP_Set is computed by combining the Leg_OP_Sets of all the Legs under that Segment.

In the present context, the algorithm helps to calculate the Comb_OP_Set for a combination of an IFS, all existing OFS of IFS and one or more new OFS.

The price algorithm is based on a price framework as shown in FIG. A24. The framework consists of one or more Price Levels. A Price Level is a reference value used in conjunction with price rules (referred to as Price Factor Rule) to calculate an AFO Price. For example, consider the price rule (or Price Factor Rule) that defines the AFO Price as a percentage of the Ticket Price of an associated IFS. In this case, a user defines one or more values or percentages (as Price Levels) such as 10%, 15%, 20% and 25%, that would be used to calculate the AFO Price (as shown in FIG. A24).

The framework includes a matrix of Check Points and Check Factor Rules to determine the Price Level applicable (referred to as Applicable Price Level) to calculate the AFO Price under a given set of conditions. Check Points are simply predefined points on the time scale (as shown in Box A24.100). A Check Factor Rule represents a checking rule to determine the Applicable Price Level in the framework. An airline may set a Check Factor Rule to compare the real time system statistic with its expected targets at various Check Points. A Check Factor Rule allows an airline to define a function for every Price Level that specifies a unique valid range of a System Parameter within which a Price Level acts as the Applicable Price Level.

For example, a Check Factor Rule may increase the AFO Price as the value of Used AFO Capacity (or AFO Sold, in short) approaches the value of AFO Capacity in order to optimize the overall revenue for the airline. To accomplish this objective, the rule defines steps to compare the value of AFO Sold with the value of AFO Capacity for a given fight to determine the Applicable Price Level. When the value of AFO Sold approaches the AFO Capacity, then a Price Level with a higher price value among others is selected as the Applicable Price Level. If the value of AFO Sold is much less than the value of AFO Capacity, then a Price Level with a lower price value among others is selected as the Applicable Price Level. An example is shown in Graph A24.200. Four line graphs (marked by the circle, triangle, square and diamond shaped dots) are drawn for the four Price Levels (25%, 20%, 15% and 10%, respectively) across all of the seven Check Points. The area between the X axis and line graph for the 10% Price Level (the lowest one, marked by the diamond shaped dots) represents the valid range for the 10% Price Level. Similarly, the area between the line graphs of 10% (marked by the diamond shaped dots) and 15% (marked by the square shaped dots) Price Levels is valid range for the 15% Price Level and so on. Consider an example. On 15 DID (or 15 days prior to departure of the flight) an AFO Sold value of 12 lies within the valid range for the 25% Price Level (which spans from 10 to 15). Therefore, the Applicable Price Level is 25% and the AFO Price shall be calculated using the 25% Price Level. It is assumed here that the Price Factor is a percentage of Ticket Price of IFS. Thus, in the example, the AFO Price=25% of Ticket Price of IFS.

An airline may define all the related variables and rules including, but not limited to, the Price Factor Rules, the Check Factor Rules, Price Levels, Check Points for all flights on which AFO is offered to the customers. The same should be stored in a database. This data would be needed to compute the AFO Price in the price algorithm given below:

In Act A23.100, an IFS, all the existing OFSs of the IFS and one or more new OFS(s), and the Comb_ND_Set are taken as the input parameters to the algorithm. Next, in Act A23.110, a list termed LIST_LEG is created and initialized. All the Legs in the IFS and all the OFSs (existing and new) are added to the LIST_LEG list. The first element in the LIST_LEG list is set as the Current_Leg.

Next, in Act A23.120, another list termed LIST_ND is created and initialized. All the Notify Deadlines in the Comb_ND_Set are added to the LIST_ND list. The first element in the LIST_ND list is set as the Current_Comb_ND.

Next, control goes to Act A23.130, where the Applicable_ND is calculated for the Current_Leg with respect to the Current_Comb_ND. Next, in Act A23.140, a Check Factor Rule associated with the current Leg at the current Applicable_ND is read from the airline's database. The airline may use any Check Factor Rule of its choosing. Next, in Act A23.150, the Check Factor Rule is used to determine the Applicable Price Level.

Next, in Act A23.160, a test is performed to determine whether a valid Application Price Level was obtained. If so, control goes to Act A23.180. If not, control goes to Act A23.170, where the Current_Comb_ND is discarded from the Comb_ND_set, and then control goes to Act A23.200.

In Act A23.180, a Price Factor Rule associated for the current Leg at the current Applicable_ND is read from the airline's database. Next, in Act A23.190, the AFO Price of the Current_Leg corresponding to the Current_Comb_ND is calculated using the Applicable Price Level and the Price Factor Rule obtained. AFO Price so calculated is added to the Leg_OP_Set of the Current_Leg for the Current_Comb_ND, and then control goes to Act A23.200.

In Act A23.200, a test is performed to determine whether more elements are left in the LIST_ND list. If so, then control goes to Act A23.205, where the next element in the LIST_ND list is set as the Current_Comb_ND. Control then loops back to Act A23.130 to repeat Acts A23.130 to A23.160. If not, then control goes to Act A23.210.

In Act A23.210, another test is performed to determine whether the Comb_ND_Set is empty. If so, control goes to Act A23.215, where a Null value is returned, and then the algorithm ends at Box A23.300. If not, then control goes to Act A23.220, where a test is performed to determine whether more elements are left in the LIST_LEG list. If so, control goes to Act A23.225, where the next element in the LIST_LEG list is set as the Current_Leg, and then control then loops back to Act A23.120 to repeat the process for the new Current_Leg. If not, then control goes to Act A23.230, where a Seg_OP_Rule is read from the airline's database and applied to calculate Seg_OP_Set for each input Segment (IFS and all OFSs) is calculated using the Leg_OP_Sets of all the Legs of the said Segment. An airline may use any Seg_OP_Set Rule of its choosing. Seg_OP_Rules may be defined to calculate Seg_OP as the sum, average, highest, lowest or any other function of Leg_OPs of all the Legs at a given Comb_ND. Similarly, a Comb_OP_Set consists of one or more Comb_OPs (defined as AFO Price for a combination of Segments at a given Notify Deadline), and is calculated using one of the pre-determined rules, termed Comb_OP_Rules, to combine the Seg_OPs of all the Segments in the combination. An airline may use a Comb_OP_Rule of its choosing. Comb_OP_Rules may be defined similar to the Seg_OP_Rules.

Next, in Act A23.240, the corresponding Comb_OP_Rule is read from the airliners database and applied to calculate the Comb_OP_Set by using the Seg_OP_Sets of IFS and all the OFS. Next, control goes to Act A23.250, where the Comb_OP_Set is returned. The algorithm ends in Box A23.300.

Accounting Among Flights

If there is more than one Leg within a Segment (OFS or IFS) or more than one Segment within an Itinerary, then the airline may need to use accounting rules to account for parameters across levels. For example, when a customer selects the Chosen Flight, there is a need to account for and distribute the Ticket Price and/or AFO Price charged to the customer across all the Legs of the Chosen Flight Segment and Released Flight Segment. An airline may define the rules of its choosing to do accounting of revenue and any other required parameter as needed.

Concurrent Buy AFO Process

As explained above, in the Concurrent Buy AFO process, a customer selects all the AFO Flights concurrently in one transaction. The series of web pages in FIGS. A29, A30 and A31 (for example) could be displayed in a customer's browser by a company's web server, to facilitate the interaction that may take place between the customer and the airline when the customer buys AFT Flights through the Concurrent Buy AFO process. In FIG. A29, the customer enters the search criteria including, but not limited to, origin and destination, the number of AFO Flights and the corresponding departure dates for each flight. Next, on (clicking the "Go" button, the Buy AFO algorithm running "behind the scenes" on a server of the company qualifies the availability, applicability and price conditions on all the AFO Flights available. The available AFO Flights are displayed for the customer in a, screen as shown in FIG. A30. It is assumed here that the customer entered two as the number of desired AFO Flights, and therefore, the AFO Flights are displayed in sets of two flights, and the customer can select any one set. A specific flight may be present in more than one set of AFO Flights. For example, as shown, the flight Alpha 963 is displayed in two different sets, first with flight Alpha 993 and second with flight Alpha 263.

For each set of the AFO Flights, a Ticket Price and one or more Notify Deadlines and the corresponding AFO Prices are shown in the form of a "Select" button (shown in the "AFO Notify Deadline/AFO Price" section in FIG. A30. The customer may select a desired set of AFO Flights (along with the Notify Deadline and AFO Price) by clicking on the "Select" button associated with the desired Notify Deadline displayed in the corresponding row. Once the customer clicks a "Select" button, he/she is hyperlinked to the web page as shown in FIG. A31, where the summary of the selected AFO Flights is displayed. Next, the customer clicks a "continue" button (shown in FIG. A31) to get more AFO Flights or to make a payment and complete the transaction for the already selected AFO Flights.

An algorithmic illustration of the Concurrent Buy AFO process is displayed in FIG. A25. Consider a customer who wants flexibility in his trip and wants two AFO Flight Segments. In Act A25.100, the customer needs for AFO are input, including, but not limited to, a search criteria for two Flight Segments according to customer's utility (may be similar to the search criteria defined above for the Sequential Buy AFO process).

Next, in Act A25.110, the Concurrent AFO search algorithm is run to determine the combinations of two Flight Segments that satisfy the customer's need. A list of such search results is displayed for the customer along with the associated terms and conditions including but not limited to, Notify Deadlines, AFO Price and Ticket Price for each such combination. The AFO algorithms defined above for the Sequential Buy AFO process clay also be used for the Concurrent AFO process.

Next, in Act A25.120, the customer selects a desired set of two flights and the associated conditions such as AFO Price/ Notify Deadline. Next, in Act A25.130, the (customer pays the price for AFO (if any) using a credit card, direct bank account debit or any other payment-transaction mechanism. Next, the algorithm ends in Box A25.200.

Second Stage: Application of Generic APO VOF in an Industry

The implementation of the APO VOF between a company and its takes place through two high level Acts (similar to the AFO VOF as shown in the FIG. A11). In the first act, the 'Buy APO' process, which is similar to the 'Buy AFO' process shown in Act A11.100, is an interactive event between a customer and the company's web server that runs to carry out the Initial Transaction of the APO VOF. In this Act, a number of algorithms may be executed on the company's server to optimally calculate the terms and conditions of the APO VOF, including, but not limited to, availability, APO Price, Product Price and Notify Deadlines, to concurrently benefit both the company and the customer. In the next Act, (similar to the Act A11.200), an event called customer notification takes place. At this event, the customer selects the Chosen Product and an event optimizer algorithm may be run.

Buy APO—Dynamic Interaction to Capture Customer Demand

Similar to the Buy AFO process, the Buy APO process may be implemented via the Sequential (similar to the FIG. A18) or the Concurrent (similar to the FIG. A25) process, where each of these two processes may be implemented in one or more ways. A company may sell either a single product or a collection of products. A collection of one or more Products is termed Product Set. To provide a context, it is assumed that a customer always buys a Product Set with one or more Products. The Product Set is defined to enable a condition that a customer may want APO on a collection of two or more products. For example, a company awards two APO Product Sets, A and B, where the Product Set A contains the products, P1, P2 and P3, and the Product Set B contains the products, P4 and P5, to a customer, who can choose either of the two Product Sets. A company may define one or more additional levels of Products if needed. A company may implement APO at different levels, including, but not limited to, Product and Product Set. In a specific APO interaction between a customer and the company, the implementation level should be the same for all the APO Products, Chosen Products and Released Products.

Consider an example of the Sequential Buy APO Process. In an implementation of the Sequential process, a customer may have already purchased a Product Set before the Initial Transaction begins. In such situations, the said Product Set and the included Products may also be referred to as the Initial Product Set (or IPS, in short) and the Initial Products, respectively. In the said implementation of Sequential process, the customer may then purchase APO on the said Initial Product (i.e., purchase one or more APO Products). Similarly, the customer may purchase APO on the Initial Product Set i.e., purchase one or more APO Product Sets (also referred to as Option Product Sets or OPS, in short).

The algorithm to run the Sequential Buy APO process mentioned above would be similar to the algorithm shown in FIG. A18 for the Buy AFO process. The computation may be performed using a processor that may calculate results in optimal time. The terms Product, Product Set and a group of Product Sets purchased by a customer, are analogous to the terms used in the Buy AFO process, i.e., Flight Leg, Flight Segment and Itinerary, respectively. Thus, the terms IPS and OPS are analogous to the terms IFS and OFS, respectively. A customer may purchase one or more OPS on an IPS using an algorithm similar to the one in FIG. A18. The algorithm searches for a valid OPS for a given search criteria and displays the search results. The customer selects the desired OPS and associated Price and Notify Deadlines.

The algorithm to search for OPS, similar to Act A18.120, may be expanded to an algorithm similar to the one in FIG. A19, where a set of valid OPS along with their associated APO Price and Notify Deadlines are determined. An Act similar to the Act of A19.130 (and expanded through FIG. A20 and further though FIG. A21) may be used to compute the Comb_ND for an IPS, all the existing OPSs of the IPS and the new OPS. An Act similar to the Act it 19.140 (and expanded through FIG. A22 and FIG. A23) may used to determine the APO availability for a new OPS and compute the Comb_OP for al. IPS, all the existing OPSs of the IPS and the new OPS. The methodology to determine Notify Deadlines and APO Prices at Product Level may be similar to the ones used for that at the Flight Leg Level. The Price Framework (shown in FIG. A24) used in the AFO Price algorithm may be used in the APO Price algorithm as well. However, the rules and parameters including the Price Factors, Check Factors, Price Levels and Check Points may be set according to the specific company and product dynamics.

(2) Event Optimizer

After the completion of the Buy AFO process, the next stage is the Event Optimizer stage, where the customer notification process is executed as shown in Act A11.200. In this process, a customer selects a Chosen Flight. The process may also consist of one or more event optimizer algorithms that may help to optimally select the Chosen Flight and/or to optimally reuse the Released Flight.

APO Exercise Process

In the Customer Notification (or CN, in short) process, a customer interacts with a company's server to select the Chosen Product. The interaction may take place (for example) via phone, in person, on a website or via any other communication mechanism. An illustrative process of the CN Process on a website for the AFO VOF is described below. It should be noted, however, that the Customer Notification process may be performed using any rule/method as desired. The following process helps to optimize (increase) the benefits generated.

Customer Notification (or CN) Process

The primary objective of the CN process is to select (or define) the Chosen Flight. The customer interacts with an airline server that runs the CN process, to select the Chosen Flight. If the customer fails to notify the airline of the Chosen Flight before the Notify Deadline, the Chosen Flight is decided based on the terms and conditions set before in the Initial Transaction of the AFO purchased by the customer.

FIG. A28 demonstrates an illustrative example of a web interface that may be run on the airline's web server to support the CN interaction between the airline and the customer. The customer may select the Chosen Flight using the dropdown menu in the first row of the "Select Your Chosen Flight" section in FIG. A28. In the same section of FIG. A28, the Notify Deadline and the Default Chosen Flight are also displayed in the second and third rows, respectively.

FIG. A26 depicts an algorithmic illustration of an example of the customer notification process in AFO. In Act A26.100, a customer enters input parameters, such as PNR, Last Name, purchase date and so forth to retrieve the data from the airline database for the purchased Itinerary and AFO Flights. Next, in Act A26.110, a test is performed to determine whether the Notify Deadline has expired or not. If so, then control goes to Act A26.120. If not, then control goes to Act A26.130.

In Act A26.120, a Default Rule is read from the airline's database. A Default Rule defines a criteria to select the Chosen Flight if the customer fails to provide a timely notification (i.e. before the Notify Deadline) to the airline regarding his/her decision of the Chosen Flight. An airline may use a Default Rule of airline's choosing. An airline may use a rule to choose a flight with the lower expected value, earlier departure date, lower load factor or any other factor. Next, in Act A26.180, the Default Rule, thus obtained, is used to select the Chosen Flight Segment, and then control goes to Act A26.190.

In Act A26.130, an algorithm termed Chosen Flight Optimizer algorithm (referred to as CFO algorithm or CFO, in short) is executed to formulate the Chosen Flight Incentive Offer (or CFIO). The purpose of the CFO algorithm is to determine flights (among the AFO Flights) that would be most optimal to be selected as the Chosen Flights for the airline, and thus creates Chosen Flight Incentive Offers to motivate the customer to select the said optimal flights as the Chosen Flights. Further details of the CFO algorithm and the Chosen Flight Incentive Offer are presented later. If should, however, be noted that an airline may choose to run Act A26.130 at one or more times (during or before the CN process), with or without any solicitation from the customer. For example, an airline may formulate one or more Chosen Flight Incentive Offers and send them to customers who have purchased AFO but not yet selected their Chosen Flight via email, phone, mail or any other communication channel. The objective here may be to target the AFO customers who don't have strong preferences on any of their AFO Flights (to select them as the Chosen Flight), and thus, may be persuaded easily to select the said optimal flight in lieu of small incentives. The resulting benefits, however, may be huge for the airline, especially from the situations when one or more of the Released Flights can be resold for high potential revenues. By helping to create a shift of AFO customers from high value flights to low value flights, AFO may help an airline to optimize flight demand across high and low load flights to generate an overall higher benefit.

Continuing with the CN algorithm, next, in Act A26.140, a test is run to determine whether the result of the CFO algorithm is a valid result (i.e., a valid CFIO was obtained). If so, control goes to Act A26.150, where the Chosen Flight Incentive Offer thus obtained, along with a list of all the IFSs and their associated OFSs purchased by the customer is displayed for the customer, and then control goes to Act A26.170. If not, control goes to Act A26.160, where a list of all the IFSs and their associated OFSs purchased by the customer is displayed for the customer, and then control goes to Act A26.170.

In Act A26.170, the customer selects the desired Chosen Flight. The customer may or may not accept the Chosen Flight Incentive Offer while taking the decision regarding the Chosen Flight. Next, control goes to Act A26.190.

In Act A26.190, a payment transaction (if any) is completed, and then the Chosen Flight is displayed to the customer. The payment transaction may be related to the AFO purchased by the customer (such as a payment of an AFO Exercise Price) and/or to the CFIO (e.g., the airline making a cash rebate payment, as part of the CFIO, to the customer). Next, in Act A26.200, the Released Flight Segment(s) is (are) then made available for further sale or reuse for any other purpose. The algorithm, then ends in Box A24.300. The computation may be performed using a processor that may calculate results in optimal time.

Chosen Flight Optimizer Algorithm (or CFO)

The CFO algorithm helps to determine flights (among the AFO Flights) that would be most optimal to be selected as the Chosen Flights for the airline. The CFO algorithm also computes the potential benefit to the airline if the said optimal flight(s) are selected (by the customer or by default) as the Chosen Flight(s). Once the optimal Chosen Flight(s) and their potential benefits to the airline are determined, the next objective of the CFO algorithm is to formulate one or more incentive offers (referred to as Chosen Flight Incentive Offer or CFIO, short) to motivate a customer to select the said optimal flights as the Chosen Flights. The CFIO may contain a cash back offer or other incentive for a customer if he/she selects the said optimal flight as the Chosen Flight. A CFIO may also include one or more flights (other than the flights already associated to the said AFO) as choices for the customer. In such cases, if customer selects the offered flights, then the airline may be able to shift the demand load from the flights related to the AFO to other low load factor flights.

FIG. A27 presents an illustrative example of a CFC algorithm. In Act A27.100, an IFS and all the associated OFSs of the IFS are input to the system. In Act A27.110, the Chosen Flight Optimizer Rule is obtained from the airline's database. An airline may choose any Chosen Flight Optimizer Rule of its choosing. For example the rule may be to give preference to the flight with the lower expected value, earlier departure date, lower load factor or any other rule of airline's choosing. If a lower expected value flight is selected as the Chosen Flight, then the higher expected value flight is released as the Released Flight, thus, creating potential opportunity for a higher benefit to the airline (as compared to the released of the lower value flight). Next, in Act A27.120, the rule, thus obtained, is used to determine the most optimal flight within the AFO Flights, and compute potential benefit to the airline. The airline benefits from being able to reuse the Released Flight(s) for one or more purposes including potential sales as AFO Flights and/or regular flights.

Next, in Act A27.130, a Chosen Flight Incentive Offer Rule is read from the airline's database. An airline may choose any Chosen Flight Incentive Offer Rule of its choosing. For example, the rule may be to formulate an incentive offer that includes a cash back of amount $X (to the customer) if the potential benefit (to the airline) from the said optimal flight is more than $Y. The rule may also include the condition to not include any incentive offer in case the said benefit is less than $Y. Thus, the rule may or nay not create a valid incentive offer for the customer depending on the conditions and AFO Flights (purchased by the customer).

Next, in Act A27.140, the Chosen Flight Incentive Offer rule, thus obtained is used to formulate one or more valid offers for the customer. Next, in Act A27.150, a test is performed to determine whether a valid offer was created. If so, the Chosen Flight Incentive Offer, thus created is returned in Act A27.170. If not, a Null value is returned in Act A27.160. Then, the algorithm ends in Box A27.200.

Customer Notification Process for any Industry

The CN process for an APO VOF in any industry would be similar to that of the AFO VOF in the airline industry. The primary objectives of the CN process is to select the Chosen Product. The Customer interacts with a company's server that runs the CN process, to select the Chosen Product. The interaction may take place (for example) via phone, in-person, on a website or via any other communication mechanism. In case, the customer fails to notify the company of his/her decision regarding the Chosen Product before the Notify Deadline, the Chosen Product is decided based on the terms and conditions set before in the Initial Transaction of the APO purchased by the customer. The algorithms for the CN process and the Chosen Product Optimizer would be similar to the corresponding algorithms for the AFO. The specific rules, however, may be different depending on the industry and company dynamics. A company may use the Released Products for potential sales or any other purpose. The company may formulate the Chosen Product Incentive Offers based on a rule of its choosing, to attempt to persuade APO customers to select targeted products as the Chosen Products.

Other Applications of APO in the Airline Industry

There are several other situations where the customers require flexibility. In such situations the APO VOF (or more specifically, the AFO VOF) may be used to provide flexibility to the customers. Some of these instances are given below.

AFO may be used for a flexible travel package program. Many customers wiggle through several vacation plans before finalizing on a particular one, and often, by the time the customer are ready to decide, the desired packages are no longer available or become unaffordable. In such situations, customers could be offered AFO Travel packages, where the customer selects two or more vacations packages (e.g., two packages for Hawaii and Bahamas), and are given the option to choose any one up to a given Notify Deadline. In this way, customers get flexibility at a (presumably low) known price. And the airline and other participating partners like hotels and/or car rental compares may get additional revenue and enhanced customer satisfaction.

In another example, an AFO may be implemented for the airline cargo services. Customers are given an option to book cargo capacity for two or more flights and then allowed to choose (with or without an explicit Notify Deadline) the ones they want to use.

A customer may desire flexibility with respect to a flight cabin (such as travel in Coach cabin or the First cabin). An AFO VOF may be implemented to enable a customer to get an option to fly on any one of the Coach or the First cabins of the same (or different flights), and to choose either of them depending upon the need at that time.

In another version of AFO implementation, a customer may select all flights that belong to a specified time period. The customer may select any flight out of those flights as the Chosen Flight. In other words, instead of receiving specific flights, a customer may receive an option to fly on any flight (of the airline) within a specified AFO Time Period, and the customer may select any flight (as Chosen Flight) that belongs to the said AFO Time period. For example, a customer may purchase an AFO (on the $28^{th}$ of April) to get an option to fly on any flight (of the airline) that flies from Boston to Atlanta, and departs between 6:00 pm on the $4^{th}$ of May and 11:00 am on the $5^{th}$ of May (i.e., the AFO Time Period). There may be a Notify Deadline on the $3^{rd}$ of May, prior to which the customer may choose any desired flight that satisfies the above conditions of the option contract) as the Chosen Flight. The customer needs to notify about the Chosen Flight prior to the said Notify Deadline.

Application of APO VOF in Other Industries

APO VOF may be implemented in any industry where the customer desire flexibility. Specifically, industries with significant gap between the purchase time and the time when products are delivered and/or utilized may be able to create significant benefits from an APO VOF. There are many other industries, such as hotels, car rental, cruise, special events, automobile sales and so forth, where an APO VOF may be applied successfully to generate benefits for both companies and their customers.

An APO VOF may be implemented in the hotel industry to provide flexibility in booking rooms across one or multiple hotel properties. A business executive who is unsure about his travel plans is likely to need flexible bookings on multiple days and/or at multiple locations. As the travel plans stabilize, the executive may notify the hotel about his/her Chosen Booking.

Similarly, the APO VOF may be implemented in the car rental industry to provide flexibility to rent one or multiple cars at multiple locations and/or for multiple rental periods. As travel plans finalize, the customers may select the final product of their choice. In this way, a customer receives flexibility and the car rental companies receive higher revenue and enhanced customer satisfaction.

An APO VOF may be applied to create flexible scheduling of various programs, soaps, advertising, live shows etc. in the media industry (e.g., television, radio, print media, web media, online advertising). A customer may select two or more time slots for showing a particular item/event and before a Notify Deadline, the customer (e.g., a production company for the corresponding event) may select the Chosen Time Slot and notify the media company (e.g., a TV channel, a website for an advertising agency or a marketing consultancy etc.). The customer needs may change due to one or more reasons between the grant of the APO for selected time slots and the selection of the Chosen Time Slot.

In another example, an APO VOF may be applied in buying products online or otherwise such as premium cars, special quality of ornaments, cloths and so forth. In such an APO, customers may have the flexibility to order two or more products (for example two models of premium cars), and to notify the provider (i.e., a car manufacturer) regarding their decision of the Chosen Product before a given Notify Deadline.

The APO VOF may be used in the special events or entertainment industry. A customer may select an APO on two or more selected products such as tickets for an event, an arena, a stadium or a theatre hall or any other event, for two or more time slots (or events), and to notify the provider regarding his/her decision of the Chosen Product before a given Notify Deadline under the terms and conditions of the option contract. In the real state industry, a customer may receive an option on two or more properties (For example at pre-construction time) and have the flexibility to select the Chosen Property before a Notify Deadline within the terms and conditions of the option contract.

An airline may also combine two or more VOFs together to create synergies and/or better value propositions for both airline and the customers. The AFO and UTO VOFs (defined elsewhere) may be combined together in one or more ways. For example, a customer may take UTO and AFO on two flights, F1 and F2. Specifically, the customer selects coach seats in both flights F1 and F2 under the AFO option contract and can select any of the two up to a given Notify Deadline. The customer then also purchases the CF (Coach to First) UTO on both F1 and F2 so that he could get upgrades to First cabin. The customer may decide to select that flight (as the Chosen Flight) on which the airline shall award the cabin upgrade under the UTO contract.

Business Model to Implement AFO

Different business models may be used to implement an AFO VOF. For example, an airline may choose to implement an AFO VOF individually or in conjunction with one or more partners and/or other companies.

In another implementation of AFO, an airline may allocate some seat inventory to another entity. The term "allocation of seat(s)" or "allocation of seat inventory" "allocation of flight(s)" implies, without limitation, assigning one or more seats of one or more flights to an entity for any purpose or use by the entity either exclusively or non-exclusively. For example, an entity may use the allocated seats to offer to AFO to customers and/or to sell the seats as regular seats. An allocation of seat may be conditional. For example, one of the conditions may require a return of at least one allocated seat after a specified time period and/or other consideration(s).

The customer may select or purchase one or more flights from the airline or/and the said entity and then interact with the said entity to purchase one or more AFO Flights in relation to the said (already purchased) flights. The said entity may also receive seat allocation from more than one airline, and thus, offer flights from multiple airlines to a single customer during the Initial Transaction for AFO.

An airline may choose to allocate one or more seats on one or more flights to another entity (referred to as "Option Aggregator" or OA, in short). The OA may use those seats and operate a service to offer AFOs to the airline customers. A customer may select one or more flights from the OA, and then receive an AFO on those selected flights from the OA. Another approach would be for a customer to select one or more flights from the airline and then receive the AFO option on those selected flights from the OA. In another example, a customer may select one or more flights from both the airline and the OA, and then receive the AFO option on those selected flights from the OA. It is also possible that the customer receives an AFO from the airline or both from the airline and the OA on a given set of selected flights.

The OA and the airline may simultaneously offer AFOs to the airline customers, i.e., a customer may either approach the airline or the OA to receive an AFO on desired flights. In another model, the OA may operate as the sole provider of the AFO to all the customers of an airline. In a yet another model, the OA and the airline may choose to work together and jointly offer AFOs to the airline customers. The OA or the airtime may offer and sell AFOs to customers using either or both of the Sequential or the Concurrent Buy AFO processes.

An, OA may be able to offer AFO on flights from one or multiple airlines. An OA may receive allocation of flight seats from two or more airlines. A customer may purchases one or more flights from one or more airlines and/or from the OA, and then receive an AFO option on those selected flights from the OA. Even if the OA may not be entitled to or does not receive seat allocation from an airline, it may still be able to formulate an agreement with that airline to offer AFOs on the flights of that airline. Thus, a customer may be able to receive an AFO on flights from multiple airlines, giving the customer more flexibility and variety to choose from. For example, a customer may receive an AFO on two flights from two different airlines and can choose to fly on either of them within the terms and conditions of the option contract. This may provide a lot of flexibility for the customers, especially when the customer itineraries include destinations only served by a few airlines. An OA may be able to thus create a multi-airline AFO VOF Framework, which may tremendously enhance the flexibility for the customers. All the participating airlines that allocate seats to and/or partner with the OA to offer AFO may also gain from an overall increase in the total spending by the consumers, enhanced overall customer satisfaction and/or other operational benefits. Either or both of the OA and the airline may process the tickets for the Chosen Flights associated with an AFO purchased by the customer. A customer may receive tickets from the OA or the airline for the flights related to the AFO grant. An entity (the OA and the airline) may process tickets for the flights offered only by that entity or by either of the two entities.

The OA and the airline may engage in a business agreement to implement an AFO program. The business agreement may divide the total benefit generated by the AFO program between the two parties using any mechanism or criteria as desired. The total AFO Revenue Benefit may be shared between the two parties. The airline may allocate seats to the OA. One or more airlines may allocate only few or may allocate their entire seat inventory to the OA to offer those seats to the customers by way of regular and/or AFO seats. The OA may offer those seats as AFO Seats to customers. In return, the OA may offer a lending revenue or fee to the airline for all or a portion of the seats allocated. This lending fee may be given only for the seats that the OA is able to utilize or for all the allocated seats. The lending fee may be a lump sum amount, may depend upon the number of seats allocated or may depend on one or more factors as desired. The agreement may include a provisional where the OA may return the allocated seats back to the airline at a certain time and date. There may be one or more conditions associated with the return of unused AFO seats and/or seats from the Released Flights, including, but not limited to, returning the same seat, returning a higher value seat and so on.

An OA may include, but is not limited to, a traditional travel agent, an online travel agent, an airline, an airline that offers AFO on its own and/or other airline flights, more than one entity, any entity formed by airline(s) (may or may not be solely for this purpose), any other entity or any combination thereof.

The AFO VOF may include different conditions imposed on the customer regarding the payments related to the AFO. For example, a customer may be asked to make payments only to the airline even if he/she is receiving flights and/or options from the OA. Similarly, the customer may be required only to pay to the OA even if he or she selected the flights and/or received the options from the airlines. The condition may also be set to ask a customer to make one or more payments to the airline for the flights and/or options received from that airline, and to make one or more payments to the OA for the flights and/or options received from that OA. The condition may allow the customer to make partial payments to the airline and the rest to the QA or vice versa, the basis of which distribution may depend upon various factors, including, but are not limited to, the factors of airline's choosing, the arrangement between the OA and the airline and so on. In another example, the customer may be required to pay to a third party or may be required to pay to any of the combination of the entities mentioned above.

The business models mentioned above, without limitation, may be used to implement the APO VOF in any industry.

Information Technology System for AFO

A client-server architecture may be used to implement the AFO VOF. However, an airline may use a computer hardware and software infrastructure of its choosing to implement an AFO VOF.

The AFO VOF may be best implemented using one or more computer-implemented methods to operate a computer-implemented service to offer AFOs to the customers, that includes, but not limited to, recording the information pertaining to the offered and/or sold AFOs in a database. It may also include operating a computer-implemented service (and/or system) or other service (and/or system) to define the Chosen Flights, and recording the said chosen flights (or defined flights) and all the flights related to an AFO in a database.

For the stage one (i.e., to formulate the AFO VOF), an application server may be used along with a database (e.g., a relational database) that stores all the information relevant to the airline and the customer. The database may include all the relevant information sufficient to identify flights the airline chooses to make eligible for AFO. One or more users (e.g., a business analyst or manager) may have full access to this server through Intranet or highly secured VPN environment to design an optimal value option framework. The database shall also store all the information pertaining to all the acts (in stage one) used by an airline while formulating the AFO VOF.

A similar or a different application server and/or a cluster of application servers (functioning concurrently) along with one or more web servers and a set of one or more database servers may be used for the Buy AFO and CN (Customer Notification) processes in the stage two of the AFO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Buy APO process and the CN process may be computer-implemented. All the customer interactions and the related information such as customer needs, inputs, payment transactions etc are stored in this database, including information pertaining to the interactions with those customers who may not purchase and/or receive AFO. The systems for stage two and stage one should be maintained in a synchronized environment so that each system has access to the most current information and can communicate with each other.

A customer may interact with the Buy AFO and/or the CN process either directly or indirectly using a local or a remote terminal (e.g., a computer with a browser and an access to the Internet) that is able to access the web server(s) that host the Buy AFO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one may be hosted and run by an airline, an OA, a third party service provider or any combination of the above. Similarly, the system for the stage two may be hosted by an airline, an OA, a third party service provider or any combination of the above. In the model, where the OA receives seat allocation from the airline and offers AFO to the customers directly, the web server, application server and database for both stage one and stage two shall be managed by the OA. The OA may also have partial (or complete) access to the airline database and systems through a highly secured environment (for example, a virtual private network). In the model, when an OA and an airline tie-up together to provide AFO, all the computer hardware and software infrastructure for both stage one and stage two may be hosted by and/or property of either or both (mutually) of the sides depending upon the business agreement between them.

As used herein, the term "processor" includes, without limitation, any one or more devices for processing information. Specifically, a processor may include a distributed processing mechanism. Without limitation, a processor may include hardware, software, or combinations thereof; general purpose digital computing elements and special purpose digital computing elements and likewise included. A single processor may perform numerous functions and may be considered a separate processor when implementing each function.

Summary

The APO VOF can concurrently create benefits for both the company and the customers. Customers benefit from enhanced purchase utility. APO eliminates unavailability issues, and minimizes cost and efforts in obtaining flexibility for customers. Because of affordability and convenience, APO may enable a large group of customers to satisfy their flexibility needs. This includes customers who never made any changes to their purchased products even when their needs changed because of one or another reason. It also includes those customers who had fluctuating needs while buying products and would have desired flexibility in purchasing products at that time. In summary, APO enables companies to satisfy customers' flexibility needs and generate incremental revenues from the consumer surplus. APO concurrently maximizes company revenues and customer purchase utility, and creates a win-win situation.

Similarly in the airline industry, the AFO VOF can concurrently create benefits for both the airline and the customers. Customers benefit from enhanced travel utility. AFO eliminates unavailability issues, and minimizes cost and effects in obtaining travel flexibility for customers. Because of affordability and convenience, AFO may enable a much larger group of customers to satisfy their flexibility needs. This includes customers who never changed their itineraries even when their needs changed because of one or another reason. It also includes those customers who had fluctuating plans while buying tickets and would have desired trip flexibility at that time. In summary, AFO enables airlines to satisfy customers' flexibility needs and generate incremental revenues from the consumer surplus. AFO concurrently maximizes airline revenues and customer travel utility, and creates a win-win situation.

AFO is superior to Same Day (SD) change programs, recently started by some airlines. Limitations of SD programs include a) no upfront flexibility—can only get alternate flight on the day of travel, b) limited time and destination range—alternate flights must be between same airports and within specified time interval (usually within hrs of original flight), and c) SD programs are based on seat availability (does not provided guaranteed seats). With AFO, a customer gets upfront flexibility, can choose as many confirmed alternate flights as desired on any desirable date(s). AFO enables dynamic pricing that can maximize airline revenues, unlike the static pricing that may be used in the SD programs. AFO can satisfy customers' flexibility needs at much broader level. The AFO VOF structure allows an airline to adopt a systematic approach to sell flexibility to its customers. An airline may use AFO to optimize spilled demand (potential customer turned away), total revenue, load factors, customer satisfaction, any other factor or combination of any of the above parameters.

The AFO VOF structure may enable an airline to optimize operational levels such as flight loads (or load factors), airport congestion, flight scheduling, airport staff and crew scheduling and so forth. For example, an airline may offer AFO on flights that help to shift passenger loads from congested (or crew/staff constrained) flights and/or terminals to others.

Using AFO, the airline comes to know about the relative flexibility and preferences of the customers. If a customer purchases flight F1 and F2 under AFO, it reflects on the customer preferences for these two flights. The regular ticket purchase, where a customer only purchases one ticket, only displays the customer preference for one flight. As mentioned above, the airline may be able to persuade customers to choose optimal Chosen Flights, using incentive offers. An airline may resell the targeted Released flight seats potentially at higher revenues or use them to shift/optimize the staffing requirements across locations. This structure may also enable an airline to identify the optimal aircraft sizes/structures and flight schedules on specific routes. There may be many other instances of optimization an airline can achieve by using AFO, thus, generating additional revenue, greater customer satisfaction and loyalty or any combination of these. AFO tremendously simplifies the process and makes it easier for a customer to get a flight flexibility. AFO may attract a large number of customers to grasp the airline offers for flexibility, and thus in the process, may motivate customers to select flights that help the airline to accomplish its optimization goals.

(2) UPO Value Option Framework

The creation and utilization (in two stages or acts) of another value option framework will now be discussed. This is the Upgrade Product Option (UPO) VOF. A company may implement a UPO VOF in any industry. The airline industry is assumed herein to demonstrate the system and methodology of the UPO VOF. Selection of an industry provides a context and makes the understanding smoother and easier. Within the airline industry, the customer need for higher ranked cabins (defined below) is used as the targeted value element. With respect to the selected value element (i.e., the customer need for higher ranked cabins) in the airline industry, the UPO VOF may be appropriately termed Upgrade Ticket Option (UTO) VOF. A few other examples of applying the UPO WOOF within the airline industry and other industries are presented in short after the detailed UTO VOF demonstration.

The first stage in the UPO VOF involves steps (or acts) of: capturing customer dynamics, assessing company operations and economic factors, integrating customer dynamics with company economic factors, formulating the VOF and optimizing the VOF. The second stage involves carrying out a dynamic interaction with the customer and then executing an Event Optimizer process. The specific detailed steps with respect to the UTO VOF will now be discussed followed by an illustration for the more generic UPO VOF.

The following terms are relevant to the UTO VOF. The term "cabin" refers to a compartment or a section in an airplane (or similar travel medium, such as a train) with its specific seating arrangement and/or in-flight amenities that are offered to customers while traveling in that cabin. The terms "up cabin" or "up cabins" refer to one or more cabins that rank higher than the other cabins preset in the same flight. The ranking here is assumed to be based on past customer preference. In the same context, the lower ranked cabin is referred to as the "base-cabin". The term "base-cabin" also refers to the cabin to which a customer is currently booked. And in that context, an "up cabin" refers to any higher ranked cabin to which the customer can theoretically be upgraded to. For example, in a flight with first, business and coach cabins, the first class and business cabins would be referred to as up cabins and coach as the base-cabin. The base-cabin for a coach customer is coach, and he/she may be upgraded to either of the two up cabins, first or business. The base-cabin for a business cabin customer is business and he/she can only be upgraded to one up cabin, the first cabin. For simplicity, the following sections assume a flight with only two cabins, first and coach, unless mentioned otherwise.

First Stage: Formulation of "UPO" Value Option Framework (1) Capturing Customer Dynamics In the airline industry, the product offering consists of a complex framework of value elements. For some product features, rankings may be presumed (or are implicit). For example, ranking for flight cabins (e.g., first or business cabin are ranked higher than the coach cabin), Ticket Price (e.g., lower price are ranked higher than higher price) and the number of connections (e.g., non-stop flights are ranked higher than connecting flights) may be presumed. There are other product features for which the ranking is subjective and may not be easy to presume such as seating type (aisle or window), meals (desired or not), flight selection (one flight versus another) and so forth. An airline may need to determine such rankings explicitly through interaction with various customers segments.

FIG. U1 shows an analysis of the value elements that are believed to matter the most to customers in relation to a flight cabin upgrade in the airline industry. In the design value segment (shown in Box U1.100), important value elements may include, but are not limited to, seat assignment, seating comfort and space, in-flight food and other amenities, priority check-in and boarding and special luggage handling. In the price value segment (shown in Box U1.110), important value elements may include, but are not limited to, Ticket Price and upgrade price. In the delivery value segment (shown in Box U1.120), important value elements may include, but are not limited to time to request and get upgrade award, and how long before departure the ticket must be purchased for the customer to be entitled to an upgrade. In the service value segment (shown in Box U1.130) important value elements may include, but are not limited to, the ease of getting the up grade. It may be important to estimate the relative preferences and utilities of these value elements to customers for various cabins.

Similarly, when applying a UPO VOF in any other industry, an analysis, consisting of important customer value elements with respect to their needs for higher ranked products, may be performed for the said industry. As explained earlier, customers assign ranking to different product offerings. A customer may classify the product offerings into different groups (that may or may not be mutually exclusive) and assign a relative rank to each of them. For some product offerings, rankings may be implicit or well established or well known; for which a company may be able to assume/determine customer ranking that would satisfy the majority, based on an analysis of past customer behavior or other forms of market analysis. For some product offerings, the ranking may be very subjective; and may differ from one customer to another, and even for the same customer, may differ from time to time. For such products, a company may need to perform detailed interaction with customer's to determine their ranking. In a customer's frame of mind, products with higher perceived utility (satisfaction) values are generally ranked higher than those with lower perceived utilities. Most customers would prefer to get a higher ranked product over a lower ranked product. When customers cannot get their desired product(s) due to unavailability, price or any other reasons or any combination of the above, they have to settle down with something below their desired value (2) Assessment of Company Economics An assessment of the crucial economic factors for an airline, as indicated in Box U2.100, may reveal these factors to include, but not be limited to, the high fixed costs across various cabins, the marginal costs of carrying an additional customer in different cabins, the number of unused seats after departure, increased competition from low cost carriers, the need to develop competitive advantages against low cost carriers, customer attrition rate, and commoditization of the airline industry. One may dig deeper into details for different cabins such as load factors, spoilage, seat availability, costs per customer mile, marginal costs per customer mile, lost opportunity costs in offering free upgrades to customers through existing upgrade programs, and so forth.

Similarly, as part of the UPO VOF, an assessment of the crucial economic factors, such as costs, constraints and capacities, may be performed, to determine the factors that affect the profitability, growth and goals of a company in any industry. It might be beneficial if the company utilizing the inventive system and method were able to express cost elements in a real-time or quasi-real-time (i.e., up to date) dynamic fashion so that such information may then be used to assess the profitability or contribution of each product sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer Dynamics with Company Economic Factors

The FIG. U2 also illustrates an example of how a mapping may be done, between customer value elements and company profiles, for the UTO VOF in the airline industry. For example, customers prefer first cabin to coach cabin or, in generic terms, there is a preference for a higher ranked cabin over a lower ranked cabin. However, customers are also concerned about the price differences between the first and the coach cabins. All customers cannot afford to buy confirmed first cabin seats at regular prices. However, many customers would be willing to pay more than their coach Ticket Price to get seats in the first cabin. On the other side of the screen, if a flight takes off with one or more empty seats in the first cabin, that condition probably represents the loss of potential revenue for that airline. This is true even if no other potential customers have been turned away, simply because there may be one or more coach customers on the flight willing to take those unfilled first cabin seats at appropriately reduced prices, but they are not given an opportunity to do so. An opportunity, thus exists to concurrently generate an incremental revenue benefit for the airline from consumer surplus, and to maximize the purchase utilities for the customers as a group. As shown at Box U2.200, a mapping is performed between important customer value elements (shown in Box U2.210) and airline economic factors (shown in Box U2.220). The value element "preference for higher ranked cabins" is extracted (shown in Box U2.230), and the UTO framework is created based on this value element.

Under the UPO VOF, a similar mapping and integration may be performed between the customer dynamics and company economic factors. Customers desire higher ranked products and are willing to pay for it accordingly. On the other hand, if a company has surplus inventory or capacity for a higher ranked product, that condition probably represents the loss of potential revenue (and/or opportunity cost) for that company. This is true even if no other potential customers have been turned away, simply because there may be one or more customers, who have purchased other lower ranked products of the same (or different) company, willing to switch to the unused higher ranked surplus products (or capacity) at appropriate price/terms. But, today, they are not able to do so for one or more reasons (mentioned earlier). An opportunity, as mentioned above, thus exists to concurrently generate an incremental revenue benefit for the company from consumer surplus, and to maximize the purchase utilities for the customers. The UPO framework is thus created based on the value element "Preference for higher ranked products".

(4) Formulation of "UPO" Value Option Framework

Structure of UTO Value Option Framework in the Airline Industry

FIG. U3 displays the structure of an illustrative UTO value option framework (shown in Box U3.100) in the airline industry. The UTO VOF is related to the value element "preference for higher ranked cabins", as shown in Box U3.110.

The first event in the UTO VOF is referred to as Initial Transaction, shown by Box U3.200, in which a customer (shown by Box U3.210) and an airline (shown by Box U3.220) transact on an UTO value option. There may be one or more Events (shown by Box U3.230) that follow Initial Transaction.

In the Initial Transaction for a UTO VOF between the airline and the customer, the customer receives a conditional option for an upgrade and the airline awards the upgrade to the customer provided at least one condition on the option is satisfied. One such condition (to upgrade) may be the seat availability in the up cabin associated with the conditional option. It is possible that the seat availability in the up cabin associated with the conditional option is the only condition included in the UTO VOF. If so, after receiving the UTO, a customer receives a conditional right to be upgraded if there is seat availability in the up cabin at a certain time and under certain conditions established as the terms and conditions of the option contract. The time when an Initial Transaction is completed (i.e., the customer receives a UTO) is referred to as the Initial Transaction Time (or ITT, in short).

The UTO VOF may also impose other conditions on the airline and/or the customer. For instance, the conditional option may impose a payment obligation on the customer if the airline upgrades the said customer. The conditional option may confer a right upon the airline to enforce the said payment obligation on the customer. The airline may take a pre-authorization from the customer to charge the customer using any payment mechanism including, but not limited to, credit card, debit card, debit bank account, third party payment service provider, advance payment by the customer, any other means, or combination thereof. The airline may award the upgrade to the customer only if the airline receives a payment from the customer in relation to the said upgrade. The customer may be required to pay one or more prices at one or more times to receive the conditional option for the upgrade. The airline may award the upgrade to a selected group of customers based on any criteria of airline's choosing. For example, an airline may choose to give preference to its frequent flyer customers or high value customers over others. The UTO VOF may also confer a right on the customer to enforce the said upgrade provided at least one condition on the said option is satisfied. For instance, an airline may offer UTOs with preference orders attached to it, i.e., if a customer purchases (or receives) a UTO with a preference order of 1, the said customer shall have the right to be the first customer among others to be awarded the upgrade. In this fashion, a right is conferred upon the customer to enforce the airline to award the upgrade to the customer if a seat is available in the related up cabin.

An instance of the UTO VOF is illustrated in the FIG. U3. This is the UTO VOF for an option to upgrade from the coach (C) to first (F) cabin service, the CF option, as indicated at Box U3.200. Assuming the flight has three cabins, four value options (as shown in FIG. U4) are created as instances of the UTO framework, shown at Box U3.120. We name the cabins for convenience, as coach (C), business (B) and first (F). Clearly fewer or more cabins can be accommodated. Depending upon the number of cabins within a flight, one can create one or more instances of the Upgrade value option framework. An example of a detailed algorithm to create UTO Types (also referred to as UTO instances) is provided later.

The Box U3.200 illustrates an example of the Initial Transaction between the customer and airline, where the airline offers the CF value option to the customer is a successful Initial Transaction for the CF option, a customer may be required to pay a price ($X) to receive a conditional option for an upgrade from the coach to the first cabin, and to agree to pay another amount ($Y) to the airline if the airline (then or later) upgrades the customer to the first cabin.

The price that a customer pays to receive a UTO is termed "initial price". The price paid at the time the customer is upgraded is termed "exercise price". Either or both of these two prices may depend on one or more factors of airline's choosing. The exercise price may be a pre-agreed fixed amount or it may be variable and set later or any combination of the above. There may be one or more additional price conditions included in the UTO VOF. The initial price and/or the exercise price may or may not be uniform for all UTOs designed and/or offered to the customers; an airline may choose any combination of uniform and/or non uniform prices for the initial and/or exercise price. The price may be from a permissible range of prices or the customer may be given a multiple set of prices to choose from and so on. The UTO Price(s) may or may not be embedded within the Ticket Price. The Ticket Price here refers to the price of a seat in a flight cabin that an airline may charge when there is no UTO implementation on the said flight cabin. The customer may make the payment directly or indirectly (e.g., through a third party) to the airline in relation to the said upgrade.

The airline may charge only the initial price or the exercise price. The airline may not charge an initial price to the customer, and may charge only for awarding the upgrade. The airline may not charge for the upgrade award if it has received payment for conditional option to upgrade. The airline may choose any combination of the above. The payment may be taken prior to buying the ticket (e.g., purchasing a set of UTOs or a UTO Pass from airline which may be used for several flights in future), at or during ticket purchase, before or after check-in, before or after boarding, at any predetermined time of at any other time. When purchasing a set of one or more UTOs or a UTO Pass, there may be one or more conditions (e.g., such as time based or value based UTO Pass) that limit the applicability of the UTOs. A time based UTO Pass may allow a customer to only be upgraded to the flights that fall within a specified time period. A value based UTO Pass may allow a customer to get upgrades until the sum of the total payment needed for all the upgrades is less than or equal to the value of the UTO Pass. The payment received by the airline or a payment made to the airline includes, but is not limited to, direct payment received by the airline from the customer, in lieu of relinquishment of one or sore rights by the customer, indirect revenue generation (e.g., the customer relinquishes his/her right or accepts a lower limit on the baggage to allow the airline to sell the preserved cargo capacity for other revenues or other purposes), costs savings obtained (e.g., the customer relinquishes his/her right to meals which saves costs for the airline), enhanced customer service and loyalty and so forth.

The terms and conditions of the option contract may be binding on the airline and the customer only if the customer successfully accepts the airline's offer of the conditional option for the upgrade. The customer may be given a choice of conditional options to choose from and take a decision.

Various option pricing strategies may be employed. For example, in a fixed price strategy, a user may be shown only one fixed price for the option, and the user may or may not buy the option at that price. If the user purchases the option at a price much lower than his/her maximum price, the potential benefit for the airline is less than what could have been achieved. This limitation is removed when a bidding process is used. Bidding may help to determine the highest price a user is willing to spend for the upgrade. In bidding, while buying the UTO Option, the user may provide his highest offer for the final price. At the time of upgrade, if available, the airline shall charge the lowest price (less than the highest offer price selected by the user) that delivers the upgrade to the user. If even the highest offer price chosen by the user is lower than the minimum price needed to get the upgrade, then the user is not awarded the upgrade. The highest offer may be input free form or the airline may provide a few choices from which the user may select one. The airline may also ask, or determine empirically, how much customers will pay for the option. The assumption here is that customers make a logical decision to choose the CF option if they prefer first over coach and can afford to pay the sum of the initial and the exercise prices (if any).

After the initial Transaction, i.e., once the option has been granted (and/or sold) to a customer, there may be one or more potential events related to the associated UTC option. For example, as shown by the Box U3 230, there are two related events for the CF option, namely, 1) the flight has availability in the first cabin for at least one seat (shown in Box U3.250) and 2) the flight has no seat availability in the first cabin, as shown in Box U3.240.

If the event in the Box U3.250 happens, then as many customers as had selected the CF option are automatically upgraded to the first cabin, within the terms and conditions of the CF option contract. There may, of course, have been more coach customers who had purchased upgrade options than the number of first cabin seats available to be used as upgrades. In this situation, the airline may use any algorithm it desires in order to allocate the first cabin seats. A few algorithms are presented in detail later. For example, the customers may have been given the ability, while buying the option, to specify the maximum amount the customer is willing to pay to exercise the option. Then the airline would probably choose to allocate the open first cabin seats so as to maximize its revenue. If there are more sold options of equal value than seats that are available, the airline may use any method it chooses to allocate the upgrades, such as assigning priority based on time of purchase, Ticket Price paid by the customer, random selection or any other customer priority factors like frequent flyer miles etc. The airline may award upgrade to a customer in the same flight in which he/she is traveling or may give an option to get an option to get an upgrade in more than one flight or the airline may upgrade the customer to some other flight as well.

An airline may choose to bump one or more customers from one or more flights in order to create availability to award one or more upgrades to UTO customers.

The airline may inform the customer of the decision related to the upgrade award via any communication channel including, but not limited to, a re-issued ticket sent over email, an email, phone, in-person at an airline counter, or may ask the customer to contact the airline to know the decision.

Using UTO, an airline gets to know the relative preferences and utilities for travel in the first cabin over the coach cabin as some, customers purchase this option and others don't. This may lead to an enhanced revenue benefit for the airline as well as higher travel utility to the customer. There may be some increase in costs for the airline to carry the customer in the first cabin versus the coach cabin, but generally, the additional revenue generated would be more than sufficient to account for the additional upgrade costs (if any). The airline may better optimize its seat availability in the first cabin and may possibly be able to intake additional customers in coach due to the additional seats created in coach (after a coach customer is upgraded to the first cabin). An airline may estimate the total number of expected upgrades and using the same, may estimate the number of vacated seats (due to potential upgrades) in the coach cabin (or other lower ranked cabins). Using this estimate, an airline may be able to add back these seats to the airline inventory to be used for potential sales and/or other purposes.

FIG. U4 provides details on four typical instances of UTO, namely, CB, CF, BF and CBF, that an airline may create in the event there are three cabins in a flight. A sold UTO may be defined by four parameters such as in the notation MN (I, F), where, M is the base cabin (the current cabin of the customer when the option is purchased), N is the up cabin to which the owner of the option can be upgraded, I is the initial price paid by the owner to buy the option, and F is the exercise price which will be paid by the owner if and when he/she is upgraded.

A customer booked in the coach cabin may purchase a CF option to get an upgrade to the first cabin if one becomes available. Similarly, a CB or "coach to business" option may be purchased by a customer with a coach ticket to get a potential upgrade to the business cabin if one becomes available. Likewise, a CBF or a "coach to business or first" option may be made available to a customer who purchased a coach ticket, for a potential upgrade to either the business or the first cabin, depending on availability A BF or "business to first" UTO may be made available to a customer with a ticket for business cabin, for potential upgrade to the first cabin seat if one becomes available.

When a flight has only two cabins, (coach and first), there may be only one instance UTO, namely, CF. Obviously, the number of cabins within a flight affects the total number of UTO instances. The number or UTC instances typically increases with an increase in the number of cabins within a flight. The number of instances does not have to be equal to the number of cabins, of course. An airline may create additional factors that could increase or decrease the number of product levels and, thus, option instances. Some examples are given below such as to divide a cabin into sections with different legroom or meal service. Other amenities/services might be the basis for another arrangement of UTOs. An airline may choose to create one or more instances of an UTO VOF based on factors including, but not limited to, number of cabins, customer needs, customer ranking across various products, in-flight amenities, other amenities or products offered or any other factors.

An airline may choose any set of criteria to create different levels of its product offerings. An airline may choose to subdivide a physically distinct cabin into two or more sections, where each section may act as a separate product level or referred to as an individual 'cabin' with a different level of service and utility to customers. For example, some airlines divide coach cabins into two sections that offer different legroom to customers. The coach section with greater legroom (C1) may be priced higher than the section with the smaller legroom (C2). This creates a difference in the utility provided by the two sections to customers. Another example is to subdivide an up cabin (for example the business cabin) into two sections, B1 and B2 that provides different meal services, e.g., B1 has a meal service, whereas B2 does not). Such divisions may enhance the number of product levels. For example, using the above two examples, a flight with three physically distinct cabins (e.g., coach (C), business (B) and first (F) will have 5 levels of cabins/product to sell (C1, C2, B1, B2 and F).

The costs, revenues, benefits and conditions, shown here are for illustration purpose; only and actual values could be different depending on specific values selected by the users for value options, customer behavior, airline schedule, pricing, any other factor or any combination of the above.

"UPO" VOF Structure in any Industry

The UPO VOF structure in any industry would be similar to the structure mentioned above for the UTO VOF in the airline industry. The terms 'base product(s)' and 'up product(s)' are analogous to the terms 'base cabin(s)' and 'up cabin(s)', respectively. The base product is assumed to be lower ranked than the up product.

In a successful Initial Transaction of UPO between a company and its customer, the customer receives a conditional option for an upgrade (for upgrading from a base product to an up product), and the company awards the upgrade to the customer provided at least one condition on the said option is satisfied. One such condition (to upgrade) may be the product availability for the up product associated with the conditional option.

It is possible that the availability for the up product associated with the conditional option is the only condition included in the UPO VOF. If so, after receiving the UPO, a customer receives a conditional right to be upgraded if there is availability for the up product at a certain time and under certain conditions established as the terms and conditions of the option contract. The time when an Initial Transaction is completed (i.e., the customer receives a UPO) is referred to as the Initial Transaction Time (or ITT, in short).

For example, a company sells two products A and B, where A is ranked higher than B. In a successful Initial Transaction, for the BA UPO instance, the customer receives a conditional option for an upgrade from B to A, and the company upgrades the product from B to A provided there is availability of product A at a certain time and under certain conditions established as the terms and conditions of the option contract.

The UPO VOF may also impose other conditions on the company and/or the customer. For instance, the conditional option may impose a payment obligation on the customer if the company upgrades the said customer. The company may award the upgrade to the customer only if the company receives a payment from the customer in relation to the said upgrade. The customer may be required to pay one or more prices at one or more times to receive the conditional option for the upgrade. The company may award the upgrade to a selected group of customer based on any criteria of company's choosing. For, example, an company may choose to give preference to its frequent flyer customers or high value customers over others.

Similar to the UTO VOF, the UPO VOF may include terms and conditions for both the company and the customer. For example, the customer may have to pay one or more UPO Prices at one or more times. The UPO Price may or may not be embedded within the Product Price. The Product Price here refers to the price of the product that a company may charge when there is no UPO implementation on the said product. The company may charge to award the conditional option for upgrade and/or may charge for upgrade award or any combination of the above. The payment may be taken prior to buying the base product (like purchasing UPO pass from the company which may be used for several product upgrades), at or during product purchase, before or after product delivery, at any predetermined time or at any other time. The payment may be monetary value or a soft value. A company may award a UPO and/or the upgrade of the product in lieu of saved costs, relinquishment of one or more rights by the customer, any other consideration or any combination of the above.

The Initial Transaction may be followed by one or more events, similar to Act U3.230 for the UTO VOF. If there is availability for the higher ranked product, and other conditions of the option contract are satisfied, the company may award the upgrade to the customer who have purchased (or received) the UPO. There may, of course, have been more customers who had purchased UPO than the availability of higher ranked products as upgrades. In this situation, the company may use any algorithm it desires in order to allocate the available upgrades. After the customer is upgraded from the base product to the up product, the base product is released. The released base products may be resold for potential, revenues or reused for any other purposes. A company may estimate the total number of expected upgrades, thus the number of surplus capacity for lower ranked products that may be reused for potential sales and/or other purposes.

A company may choose to create and implement one or more instances of the UPO VOF. A company may choose: any set of criteria to create different levels of its product offerings. There may be some increase in costs for the company to upgrade the customer to a higher ranked product, but the overall benefits from implementing the UPO VOF may be much more than the added incremental costs. The benefits may include direct incremental revenue, enhanced customer loyalty and repeat business, and other operational benefits.

UPO Types Creator Algorithm (to Create UPO Types or Instances)

FIG. U5 presents an example of an algorithm that may be used to create UTO Types or instances (sometimes also referred to as upgrade options or UTOs or UTO) for a given set of products. A starting point is to consider a list of products of a company, where each product can be ranked in terms of priority (or desirability) to customers. A high priority usually implies a higher utility to the customer and is usually accompanied by a higher product price. The following algorithm, as shown in FIG. U5, demonstrates one way to calculate all possible UTO instances for such a set of products. The algorithm uses a recursive loop mechanism.

In Act U5.110, a Set of products (SP) is taken as an input and sorted according to the descending order of priority. Priority may be determined in any way the company desires. It may be a subjective guess at customer desires or it may be based on empirical data, for example. In Act U5.120, the Base Product (BP), a parameter, is assigned the lowest priority product in SP. Another parameter, Collection of Up Products (CUP) is assigned all the products in SP except the BP.

Next, in Act U5.130, a software routine is called, named herein, the "Option_Creator" routine. It receives the BP and CUP as input, and outputs a set of options, the Option_Collection (or OC, in short). Next, in Act U5.140, the OC is initialized (for the current product level) as an empty set. To create the set UTOs for the current Base Product (BP), the BP is combined with each product in the CUP and the combination is added to the Option_Collection (OC), in Act U5.150. That is, when the BP is coach cabin, the combination with other cabins provides the CB and CF options, and so forth.

Next, the current CUP is assigned as the new SP, the BP becomes the lowest priority product in the new SP and the new CUP becomes the old CUP less the old BP, in Act U5.160. In Act U5.170, a test is performed to determine whether the CUP is an empty set. If so, control branches to Act U5.190. If not, to Act U5.180, in which the Option_Creator routine starting in Act U5.140 is called and new conditions are set (a new BP and a new CUP). When Act U5.190 is reached, the OC of the current level Option_Creator is returned to the next higher level of Option_Creator from where the current Option_Creator was called and control passes to Act U5.200.

Next, in Act U5.200, the BP of the current level Option_Creator is combined with each member in the returned OC from the lower level. These combinations are added to the OC of the current level. In Act U5.210, the returned OC from the lower level is added to the OC of the current level. Next in Act U5.220, a test is performed to determine if the current level of Option_Creator is the highest. If so, the Option_Collection of current level is returned as the final output, in Act U5.230, and then the algorithm ends in Box U5.300. If not, then control goes back to the Act U5.190, where the Acts U5.190 to U5.220 are repeated for the new level of Option_Creator.

The computation may be performed using a processor that may calculate results an optimal time.

Example of Using the UPO Types Creator Algorithm

The algorithm of FIG. U5 may be used to create UTO instances in the airline industry, as follows. Consider an airline flight with 4 cabins, namely, A, B, C and D. The priority order among the cabins is A>B>C>D, where the cabin A has the highest rank and the cabin D has the lowest rank.

As in Act U5.110, a Set of Cabins is input to form the SP, with cabins sorted according to the descending order of priority, A>B>C>D Per Act U5.120, the BP is set to D and the CUP is set to comprise cabins C, B and A. Per Act U5.130, Option_Creator (D, [C, B, A]) is called, the notation (D, [C, B, A]) indicating D is input as the BP and the CUP is input as the set [C, B, A].

Next, per Act U5.140, the OC of the current level is initialized as an empty set. Then, a combination is formed of each up cabin in the CUP set [C, B, A] with base cabin D and these combinations are added to the Option_Collection to form OC [DC, DB, DA], per Act U5.150. The current CUP set [C, B, A] is assigned as the new SP and the lowest cabin in the new SP, i.e., C, is the new BP, per Act U5.160.

Per Act U5.170, a test is performed to determine if the CUP set is empty. It is not, so the process continues for a new (lower) level where Option_Creator (C, [B,A]) is called and executed. This is followed by another (lower) level where the Option_Creator (B, [A]) is called and executed. The Acts U5.140 to U5.180 are repeated in a loop until the CUP set is empty. In this case, that happens with A as the BP. Then the Option_Collection [BA] is returned at that point, per Act U5.190.

At this point, control is at Act U5.200, where C, the BP of the current level Option_Creator (C, [B, A]) is combined with each member of the returned OC[BA] from the lower level and the result [CBA] is added to the OC[CB, CA] of the current level.

OC=[CB,CA]+[CAB]=[CB,CA,CBA]

Control goes to Act U5 210, where the returned OC[BA] is added to the OC of the current level.

OC=[CB,CA,CBA]+[BA]=[BA,CB,CA,CBA]

Next, per Act U5.220, a test is performed to determine if the current level is the highest level for Option_Creator. It is not at this point, so control now goes back to Act U5.190, where the current OC is returned to the next higher level of Option_Creator (D, (C, B, A]). Next, the Acts U5.200 and U5.210 are repeated again for Option_Creator (D, (C, B, A]). Per Act U5.200, D (the current BP) is combined with each member of the returned OC[BA, CB, CA, CBA] from the lower level and these combinations [DCB, DCA, DBA, DCBA] are added to the OC of current level.

OC=[DC,DB,DA]+[DCB,DCA,DBA,DCBA]=[DC, DB,DA,DCB,DCA,DBA,DCBA].

Per Act U5.210, the returned OC[BA, CB, CA, CBA] from lower level is added to the OC of current level.

OC=[DC,DB,DA,DCB,DCA,DBA,DCBA]+[BA,CB, CA,CBA]=[DC,DB,DA,BA,CB,CA,CBA,DCB, DCA,DBA,DCBA]

Next, per Act U5.220, a test is performed to determine if the current level is the highest level for Option_Creator. The current level is the highest level at this point, so at this point, control goes to Act U5.230, where the current OC is returned as the final output, and then the algorithm ends in Box U5.300.

(5) Optimization of UPO VOF

As mentioned earlier in the form of an optional last act (shown in FIG. 10) in the first stage, a financial analysis may be performed on the UPO VOF using the existing company and customer data to determine the optimal terms and conditions of the UPO VOF. 'What-if' scenarios may be executed to determine the optimal pricing strategy. The UPO prices may be derived by using different price strategies: optimized price levels, bidding or any other price strategy. The company may divide its customers into one or more customer segments, and design UPO VOFs separately for different customer segments. FIG. U6 displays the corresponding acts for the UTO VOF. In Act U6.100, a set of functions including customer utility function, cost and operational data functions of the airline are input to the system. Next, in Act U6.110, an optimization function and terms constraints need to be defined to determine the optimal terms and conditions for the UTO VOF. Next, in Act U6.120, business judgment should be utilized to finalize the terms and conditions, that may or may not be the same as the optimal terms and conditions.

Second Stage: Using the UPO Value Option Framework

After completing the first stage of the method, the company has created a UPO framework and specific value options within that framework. The company has also segmented customers. The company is fully prepared now to use a structured format consisting of UPO value options to interact with its customers in real time to generate benefits for both customer and company. The second stage of UPO VOF is now presented. The detailed demonstration of the UTO VOF is presented first followed by a summarized illustration of the UPO VOF.

The implementation of the UTO VOF between the customer and the airline takes place through two high level acts, as shown in FIG. U9. In Act U9.100, the 'Buy UTO' process, an interactive event between the customer and the airline web server, runs to carry out the Initial Transaction of the UTO VOF. In this Act, a number of algorithms, the details of which are presented later, are executed on the airline's server to optimally calculate the terms and conditions, of the UTC VOF (e.g., availability, UTO Price(s) and other conditions) to concurrently benefit both the airline and the customer. In Act U9.200, an event optimizer process called the UTO Exercise Process (the details of which are presented later) is run. In this process, the airline awards the upgrade to the customer based on the terms and conditions of the option contract.

Similarly, the implementation of the UPO VOF between the customer and the company takes place through two high level acts (similar to UTO as shown in the FIG. U9). In the first Act, the 'Buy UPO' process, parallel to the 'Buy UTO' process shown in Act U9.100, is an interactive event between the customer and the company web server that runs to carry out the Initial Transaction of the UPO VOF. In this Act, a number of algorithms may be executed on the company's server to optimally calculate the terms and conditions of the UPO VOF (e.g., availability, UPO Price(s) and other conditions) to concurrently benefit both the company and the customer. In the next Act, (similar to the Act U9.200), an event optimizer process called the UPO Exercise Process is run that optimally awards the upgrade to the customer based on the terms and conditions of the option contract.

The UTO VOF may be implemented at different levels including, but not limited to, Itinerary, Segment and Leg. It is assumed here that the UTO is implemented at the Flight Leg level. For the cabin upgrade, the UTO implementations at Segment or Itinerary levels would be similar to that at the Leg level.

1. 'Buy UTO'—Dynamic Interaction to Capture Customer Demand

The FIGS. 18, U7 and U8 show a series of web pages that could be displayed in customer's browser by a airline's web server, providing a practical example of the Buy UTO process, consisting of how the interaction may take place, between a customer and an airlines when the customer comes to purchase UTO (during or after the ticket is purchased). The FIG. 18 shows an Itinerary selected and/or purchased by a customer. The customer may click on the marketing banner for Buy UTO to be linked to the web page displaying the Buy UTO screen (shown in FIG. U7). There, the customer may select to purchase UTO on any flight in his/her Itinerary by clicking the "Buy UTO" link in front of that flight (shown in FIG. U7). This starts the "Buy UTO" process. After the click, the Buy UTO algorithm (details are presented later) running "behind the scenes" on a server of the airline qualifies the availability, applicability and price conditions on all kinds of UTOs available on the selected flight and display the available UTOs along with the price and other conditions in the screen, as shown in FIG. U8. In FIG. U8, three UTOs are displayed. For each UTO, an instant price and an exercise price, which the customer would have to pay if upgraded, are also displayed. The customer may select any UTO by selecting the corresponding radio button and then clicking the 'Save and Go to Summary' button, which would hyperlink the user to a summary page.

The screen shown in FIG. U17 depicts another UTO price strategy. Here, along with the UTO Option, user selects the highest price he/she is willing to pay if upgraded. In the FIG.

U17, three UTOs are displayed and for each UTO, an initial UTO price and a set of choices for the highest exercise prices are displayed.

The following presents an example of the algorithmic illustration of the Buy UTO process. Consider FIG. U18. In Act U18.100, a customer selects an Itinerary (with one or more Flight Legs). It is assumed here that the customer interacts with the airline to Buy UTO during the ticket purchase process. However, the Buy UTO process may take place at any time including before, during, after the ticket purchase process, or any combination thereof. When implementing the Buy UTO process before the ticket purchase, the customer may need to also select the base cabin and/or flight leg on which he or she wants to get the UTO.

Next, in Act U18.110, the customer reaches an interactive interface of airline's web server to Buy UTO, where the customer selects a Flight Leg (referred to as Target_Leg) on which UTO is desired (web illustration shown in FIG. U7). Next, the customer inputs the UTO search criteria (such as desired price range, conditions, up cabins and so forth) for the current Targeted_Leg in Act U18.115.

Next, control goes to Act U18.120, where the UTO search algorithm is executed to search for Available UTO on the Target_Leg. The UTO search algorithm returns a list of valid UTOs along with the associated UTO Price and/or other conditions. The details of the UTO search algorithm are presented later. Next, the search results are displayed for the customer, who then selects the desired UTO (and the associated price and other conditions) in Act U18.130.

Next, in Act U18.140, a test is performed to determine whether the customer wants to purchase more UTOs on the current Target_Leg or on another Flight Leg in the Itinerary. If the customer wants to purchase UTOs on another Leg, control loops back to the Act U18.110, where the customer selects the desired Target_Leg from the Itinerary, and then the process is repeated again for a new Target_Leg. If the customer wants to buy more UTOs on the current Target_Leg, control loops back to Act U18.115, where the customer enters the UTO search criteria and then the process is repeated for the new UTO search criteria. If the customer does not want to buy any more UTO, control goes to Act U18.150, where a payment transaction (if any) is executed between the customer and the airline. If the UTO has a positive initial price, the customer may pay that price for UTO using a credit card, direct bank account debit or any other payment transaction mechanism. Next, the algorithm ends in Box U18.200.

UTO Search

The UTO Search algorithm as shown in FIG. U19 expands the Act 120 of FIG. U18. In Act U19.100, a set of parameters including the number of customers (IP), the Target_Leg and the UTO Search parameters are input to the system. The number of customers refers to those customers for whom this process is being executed. The UTO search parameters include, but are not limited to, up cabin, fare class of the up cabin; class of service, UTO Price and so forth. Next, control goes to Act U19.110, where a list of UTO Types (or upgrade options) for the given Target_Leg is read from the airline's database. All the upgrade options, thus obtained, are added to a list termed LIST_Option.

Next, in Act U19.120, a list of UTO validation rules is obtained from the airline's UTO VOF database and applied to validate all the upgrade options in the LIST_Option list. The ones that do not satisfy the rules are discarded. Validation rules may include, but are not limited to, a Maximum Ticket Price Rule, an Availability Rule, a Fare Class Rule, a Day to Departure (DTD) rule and so forth. For example, a Maximum Ticket Price Rule may discard those upgrade options for which the ticket price of the up cabin related to the upgrade option is more than a specified value. A Day to Departure rule may discard the upgrade options which may not be available until X days to departure of a flight Leg. An airline may choose to implement one or more of the above rules, any other rule, or any combination of the above to further qualify the options in the LIST_Option list. As a last step in Act U19.120, the first element in the updated LIST_Option list is set as the Current_Option.

Next, control goes to Act U19.130, where UTO Price(s) and associated conditions for the Current_Option and Target_Leg is (are) computed. The details of the UTO Price algorithm are presented later. Next, in Act U19.140, a test is performed to determine whether the UTO Price obtained in the previous Act is valid. If so, control goes to Act U19.160. If not, control goes to Act U19.150, where the Current_Option is discarded from the LIST_Option list. Next, control goes to Act U19.160, where another test is performed to determine if any element is left in the LIST_Option list. If so, control goes to Act U19.165. If not, control goes to Act U19.170.

In Act U19 165, the next element in the LIST_Option list is set as the Current_Option and control loops back to Act U19.130 for further processing of the new Current_Option. In Act U19.170, the updated LIST_Option list along with UTO Prices and associated conditions for each option is returned as the search result, and then the algorithm ends (Box U19.200). The computation may be performed using a processor that may calculate results in optimal time.

UTO Price Algorithm

The UTO Price algorithm as shown in FIG. U20 expands the Act 130 of FIG. U19. The price algorithm is based on the price framework (mentioned earlier and shown in FIG. A24). The framework used here, however, may consist of different Price Factors and Check Factors. The framework consists of one or more Price Levels. A Price Level is a reference value used in conjunction with price rules (referred to as Price Factor Rules) to calculate the UTO Price. For example, a Price Factor Rule may define the UTO Price as a percentage of the difference between the Ticket Prices of the base cabin and the up cabin. In this case, a user defines one or more values or percentages (as Price Levels) such as 10%, 15%, 20% and 25%, that would be used to calculate the UTO Price.

The price framework includes a matrix of Check Points and Check Factor Rules to determine the Price Level applicable (referred to as Applicable Price Level) to calculate the UTO Price under a given set of conditions. Check Points are simply predefined points on the time scale (as shown in Box A24.100). A Check Factor Rule represents a checking rule to determine the Applicable Price Level in the framework. An airline may set a (Check Factor Rule (or simply Check Factor) to compare the real time system statistic with its expected targets at various Check Points. A Check Factor Rule allows an airline to define a function for each Price Level that specifies a unique valid range of a System Parameter within which a Price Level acts as the Applicable Price Level.

For example, a Check Factor Rule may be set to increase the UTO Price as the value of UTO sold (number of upgrade options sold for a flight leg) approaches a pre-determined threshold value in order to optimize the overall revenue for the airline. To accomplish this objective, the rule may define a set of steps to compare the value of UTO sold to predetermine threshold value of the upgrade option to determine the Applicable Price Level. A threshold may be determined by considering various factors affecting the number of seats sold in both the base cabin and up cabin associated to a particular upgrade option. When the value of UTO Sold approaches the threshold, then a Price Level with a higher price value is selected as the Applicable Price Level. If UTO Sold is much less than the threshold value, then a Price Level with a lower price value is selected as the Applicable Price Level. An example is shown in Graph A24.200. Four line graphs (marked by the circle, triangle, square and diamond shaped dots) are drawn for the four Price Levels (25%, 20%, 15% and 10%, respectively) across all of the seven Check Points. The area between the X axis and line graph for the 10% Price Level (the lowest one, marked by the diamond shaped dots) represents the valid range for the 10% Price Level. Similarly, the area between the line graphs of 10% (marked by the diamond shaped dots) and 15% (marked by the square shaped dots) Price Levels is valid range for the 15% Price Level and so on. Consider an example. On 15 DTD (or 15 days prior to departure of the flight) a UTO Sold value of 12 lies within the valid range for the 25% Price Level (which spans from 10 to 15). Therefore, the Applicable Price Level is 25% and the UTO Price shall be calculated using the 25% Price Level. It is assumed here that the Price Factor is a percentage of difference in Ticket Prices of the base cabin and up cabin for the option under consideration. Thus, in the example, the UTO Price=25% of difference between the Ticket Prices of Up cabin and Base cabin in the Target_Leg.

An airline may define all the related variables and rules including, but not limited to, the Price Factor Rules, the Check Factor Rules, Price Levels, Check Points for all flights on which UTO is offered to the customers. The same should be stored in a database. This data would be needed to compute the UTO Price in the price algorithm given below. The following presents an example of an algorithm that may be used to compute the UTO Price. A processor may be used to obtain the results in an efficient manner. The UTO Price algorithm may be used to create the Initial, Exercise or any other UTO Prices involved.

In Act U20.100, a Flight Leg and the Current_Option are taken as the input parameters to the algorithm. Next, in Act U20.110, a Check Factor Rule associated with the Current_Option of the Flight Leg it read from the airline's database. The airline may use the Check Factor Rule of its choosing. Next, in Act U20.120, the Check Factor Rule is used to determine the Applicable Price Level.

Next in Act U20.130, a test is performed to determine whether a valid Applicable Price Level was obtained in the previous act. If so, control branches to Act U20.140. If not, to Act U20.135, where a Null value result is returned.

In Act: U20.140, a Price Factor Rule associated with the Current_Option of the current Leg is read from the airline's database. Next, in Act U20.150, the UTO Price of the Flight Leg with respect to the Current_Option is calculated using the Applicable Price Level and the Price Factor Rule obtained. The UTO Price thus calculated is returned in Act U20.160. The algorithm ends in Box U20.200.

The computation may be performed using a processor that may calculate results in optimal time.

'Buy UPO' Process in any Industry

The Buy UPO process may be implemented in any industry using a process similar to that of the Buy UTO process in the airline industry. A company may implement the UPO VOF at any product level(s). In the Buy UPO process, a customer interacts with a company's server to purchase UPO on one or more selected products. The Buy UPO process may be executed at any time including before, during or after the product purchase. When executing the Buy UPO process before purchasing the product, the customer may need to also input the relevant base product and/or other conditions. The algorithms for the Buy UPO, the UPO Search and the UPO Price would be similar to the corresponding algorithms for the Buy UTO process. The rules used in these algorithms, however, may be different and set according to the dynamics of the industry and preferences of the company using the inventive method. For example, the price factors and the check factors used in the UPO price algorithm may be set specific to the industry and company dynamics.

(2) Event Optimizer

Once the customer selects a UPO value option, the processing goes to the Event Optimizer phase where different acts are executed depending on the trigger event that may occur to make an option to become exercisable. The event(s) is (are) related to the value option selected in the first act. In the UTO VOF, the airline may use a software application built on the method defined above to optimally award the upgrades to customers who have bought a UTO. An illustrative UTO Exercise process is described below followed by a short summary of the UPO Exercise process.

UTO Exercise Process

The method defined here may be used to create a system and computer-implemented process to optimally award the available seats as upgrades. This method helps to find an optimal upgrade solution to create a win-win situation between the customers and the airline. The method has two Acts, the Upgrade List and the Upgrade Award. The Upgrade List process uses a set of rules to generate a list of upgrade enabled customers. The Upgrade Award process awards upgrades to one or more upgrade enabled customers based on the defined conditions. It should be noted, however, that technically, the UTO Exercise process may be performed using any rule/method as desired. The following process helps to optimize (increase) the benefits generated.

A system built on the method is described in FIG. U10. The UTO Exercise process starts with an input of a flight on which the UTO Exercise process is supposed to be executed, as shown in Act U10.100. Next, in Act U10.110, based on predefined times to run the Upgrade List and the Upgrade Award, a test is performed to determine whether it is time to run the Upgrade List or the Upgrade Award process. If it is time to run the Upgrade List, the scheduler triggers the Upgrade List process, as shown in Act U10.120 If it is time to run the Upgrade Award, the scheduler triggers the Upgrade Award process, in Act U10.130. An airline user may set one or multiple times to execute the Upgrade List and/or the Upgrade Award processes to maximize the total returns for the airline and to push the UTO Exercise process as close to the departure as possible. It is possible to run the UTO Exercise process even after the flight departure. Typically, at least one Upgrade List must be generated before the first Upgrade Award is executed, and at least one Upgrade Award process may follow every run of the Upgrade List process. The details on both Upgrade List and Upgrade Award processes are presented later in the document.

After the Act U10.120 or Act U10.130, control goes to Act U10.140, where a test is performed to determine if any future scheduled runs are pending for either the Upgrade List or the Upgrade Award. If so, control loops back to Act U10.110 for further processing as per that Act. If not, the algorithm ends at this point, in Box U10.200.

Both Upgrade List and Upgrade Award processes may be run multiple times both before and after the flight departure (anytime starting from the first interaction between the airline and customer to the time the flight arrives). It may be beneficial for the airline to run the UTO Exercise process as close to (or even after) the departure of the flight as possible. This would help in three ways. First, it could help the airline to prevent any form of potential revenue dilution from the last minute walk-in customers who could potentially pay high ticket fares for first/business cabins. Second, it could help to use all the unused seats that become available at the last minute because of a no-show or a last minute cancellation. Third, if the airline schedules (at least a few runs of) the UTO Exercise process after the flight departure, it may help to sell UTO upgrades for a portion of the flight duration. A customer could get upgrade for a portion of a flight duration, thus, allowing multiple customer upgrades using the same seat. For example, one customer could be upgraded to a seat for the first half of the flight duration, and another customer could be upgraded to the same seat for the second half of the flight duration. By doing so, the airline could also charge a lower price for a UTO, thus, attracting more customers. This may allow an airline to increase the total number of upgrade awards, total airline revenue (or profitability), customer satisfaction and utility, any other factor or combination thereof. An airline may choose to implement the partial flight UTOs on some or all flights. The flights with longer duration may be more suitable for such (partial flight) UTO implementation.

The computation may be performed using a processor that may calculate results in optimal time.

Upgrade List

The following terms and definitions are needed to understand the algorithm to create an upgrade list: UTO Type, upgrade value and upgrade combination. These terms are presented first followed by the Upgrade List algorithm.

UTO Type

For each customer to be considered in the upgrade list, the airline needs to determine his/her UTO Type and the upgrade value. It is straightforward to determine the type of UTO for each UTO customer. UTO Type is simply the UTO bought by the customer. However, for customers who are in 'regular' (non-option) upgrade programs, there is a need to determine their UTO Types. To determine the UTO Type, one needs to determine all the up cabins to which a customer can be awarded an upgrade. The list of such up-cabins need to be compared with the list of up cabins associated with all UTOs. The UTO whose up cabins match is the UTO Type far the said customer. For example, if an elite customer in coach (C) can be upgraded to first (F) or business (B), then his/her list of up cabins matches exactly with that of the UTO Type, CBF. Thus, CBF is the UTC Type for the said customer. The UTO Types for other customers may be determined in a similar fashion.

There may be a need to also define UTO Type for standby customers. The following describes a method to treat standby customers just like booked customers to maintain the uniformity in processing the UTO Exercise algorithm. A standby customer, here, is defined as a customer who is not currently confirmed on a flight, but is waiting to get a seat on the flight, whereas the booked customers have confirmed seats in the said flight.

A new dummy cabin, Standby (or S, in short), may be assumed in the flight and all the standby customers may be treated to exist in the dummy cabin (S), which is then added to the list of cabins for a flight. A flight with C, B and F cabins, would have a new list of cabins in descending priority, F>B>C>S. A customer can be on a standby list for one or more cabins for a flight. Here, the customers in the S cabin may be assigned the UTO Types, as follows; SC refers to the UTO Type for a standby for coach (C) only, SB refers to the UTO Type for a standby for business (B) only, SF refers to the UTO Type for a standby for first (F) only, SBF refers to the UTO Type for a standby for business (B) and first (F), SCF refers to the UTO Type for a standby for coach (C) and first (F), SCB refers to the UTO Type for a standby for coach (C) and business (B) and SCBF refers to the UTO Type for a standby for coach (C), business (B) and first (F).

As shown above, if a customer is on a standby list for both the coach and the first cabins, then his/her UTO Type would be SCF. If an airline wants to employ the above mechanism to create a dummy cabin for standby customers, it may be beneficial to include the virtual standby cabin in the list of cabins when calculating all types of upgrade options.

Upgrade Value

Upgrade Value is defined as the total value an airline may realize by upgrading a customer from a given base cabin to a given up cabin. Upgrade Value may be expressed, as follows, Upgrade Value=Payment+Soft Value−Upgrade Cost, In the above formula, the term 'payment' refers to the price paid by the customer to the airline when he/she is awarded an upgrade from the base cabin to the up cabin. 'Soft Value' refers to a combination of any indirect and/or intangible value an airline may generate when a customer is awarded an upgrade from the base cabin to the up cabin. 'Upgrade Cost' refers to the marginal upgrade cost (if any) to an airline to upgrade the customer from base cabin to an up cabin.

The above said "Soft value" may be based on various factors and parameters including, but not limited to, airline's past experiences with the customer, the number of times the said customer has or has not received an upgrade in last 'n' number of attempts, customers who require special attention or care, customers belonging to a certain category, other privileged customers for one or more reasons and so forth.

For UTO customers, an airline may use the final exercise price as the "payment" portion of the upgrade value. The soft value for the UTO customers may be calculated using a function of the long term value of the customer to the airline, trip parameters and upgrade path (let's say Soft Value=x*Long Term Value). The flight parameters that may affect 'X' include, but are not limited to, flight duration, time and date of flight, other flights in the Itinerary, traveling with family/kids, purpose of travel and so forth. For example, consider a UTO customer traveling alone, with a long term value of $1000, who has bought UTO, CF, for a flight with 5 hour duration. The value of 'x', in this situation, may be 2% of the long terms value, and thus, the 'Soft Value' would be $20 (i.e., 2% of $1000). An airline may use any mechanism or methodology to calculate the upgrade value of the UTO customer.

Similarly, the upgrade value may be calculated for the customers in the 'regular' (non-option) upgrade programs and the standby customers. For the customers in the regular upgrade programs, the 'payment' portion of the upgrade value may be zero, however, their 'soft value' may be high. For the standby customers, the payment portion may be calculated as follows, Payment(standby)=Ticket Price*(1−Recapture probability)

In the above formula, the Ticket Price refers to the total Ticket Price the standby customer is expected to pay to the airline if he/she is awarded the seat in the desired cabin. The term "Recapture Probability" refers to a probability that a standby customer can be assigned another seat in another flight of the same (or different) airline so that the airline, in concern, does not lose the potential revenue from the standby customer if the customer is not awarded a seat in the concerned flight. An airline may calculate recapture probability by any method of its choosing.

The above mechanism is not the only way to determine the upgrade value. An airline may choose to use any other mechanism to determine the upgrade value for one or more customers in the input list. The computerized system (built using the method defined here) may also allow manual overrides by the airline user (e.g., an analyst or an agent) to allow the user to allocate special upgrade values to satisfy the customer relations objectives (for e.g. enhance chances for some elite customers to get upgrades over other customers) or for any other reasons, that includes enhancing or reducing the soft values of customers to modify their chances to get upgrades, however, while maintaining the conditions of the options contract executed with the UTO customers.

Upgrade Combination

An upgrade combination consists of one or more members sorted in an order, and needs only one available seat for its topmost member to generate an upgrade for all its members. The topmost member has the highest up cabin associated among all the members in the combination. The award of upgrades for a upgrade combination works in a cascading style, where a new available seat allotted to the combination is awarded to its topmost member, the seat vacated by the topmost member (after his/her upgrade) is awarded to the second (next) topmost member and the chain goes on until the seat vacated by the second lowest member is awarded to the lowest member. Consider the following examples.

Consider an upgrade combination, C-CB-BF, where, C refers to a standby customer for the coach (C) cabin, CB refers to a coach customer enabled to be upgraded to business (B) and BF refers to a business customer enabled to be upgraded to first (F). Here, BF is the topmost member with the highest associated up cabin, F. For this upgrade combination, if one seat is made available in the first cabin, then the BF customer can be upgraded to first, leaving one empty seat in business, the CB customer can be upgraded to the seat emptied in business by the upgraded BF customer, and the C (standby) customer can be awarded the seat emptied by the upgraded customer CB.

Consider another upgrade combination, B-BF, where, B refers to a standby customer for the business (B) cabin and BF refers to a business customer enabled to be upgraded to first (F). For this upgrade combination, if one seat is made available in the first cabin, then the BF customer can be upgraded to first, leaving one empty seat in business, and the B (standby) customer can be awarded the business seat emptied by the upgraded customer BF Consider another upgrade combination, C-CBF, where, C refers to a standby customer for the coach (C) cabin and CBF refers to a coach customer enabled to be upgraded to either business (B) or first (F). For this upgrade combination, if one seat is made available in the business cabin, then the CBF customer can be upgraded to business, leaving one empty seat in business, and the C(Standby) customer can be awarded the coach seat emptied by the upgraded customer CBF. If one seat is made available in the first cabin, then the CBF customer can be upgraded to first, leaving one empty seat in coach, and the C (standby) customer can be awarded the coach seat emptied by the upgraded customer CBF Upgrade List Algorithm The following algorithm, as shown in FIG. U11, uses the terms defined above and demonstrates one way to generate an Upgrade List for a set of cabins. In Act U11.100, a flight and a list of customers to be upgraded is taken as an input along with the UTO Type and the upgrade value for each customer. The input list of customers may include all customers who have bought any type of UTOs. This list may also include the upgrade-enabled customers in the other regular upgrade programs (e.g., frequent flyer miles, elite, staff or corporate program). An airline may also want to include the standby customers in the Exercise UTO process to optimize a desired objective function across all customers. For example, an airline may desire to optimize the total revenue by optimally allocating the available seats among the UTO customers, the regular upgrade customers and the standby customers. The UTO Types and the upgrade values are taken as an input for each customer in the input list.

Next, in Act U11.110, a list of all types of up grade combinations for the input flight is read from the airline's database. An algorithm to create different types of upgrade combinations for a list of products is presented later.

Next, in Act U11.120, the customers in the input list are mapped to the corresponding member of each type of upgrade combination. Next, in Act U11.130, for each type of upgrade combination, each mapped customer of a member is combined with all the mapped customers of all the other members of the combination to create all the different upgrade combinations. For example, consider a type of upgrade combination, DC-CB-CBA. Assume the input list of customers contains 2 customers, DC1 and DC2, with the UTO Type DC. Similarly assume there are 2 customers, CB1 and CB2, with the UTO Type CB and 2 customers, CBA1 and CBA2, with the UTO Type CBA in the given list of customers. DC1 (belonging to DC) is combined with CB1 (belonging to CB) and CBA1 (belonging to CBA) to form one upgrade combination, DC1-CB1-CBA1. Similarly, DC1 is combined with CB1 and CBA2 to form another upgrade combination, DC1-CB1-CBA2. In this fashion, all such upgrade combinations are created, as follows: DC1-CB1 CBA1, DC1-CB1-CBA2, DC1-CB2-CBA1, DC1-CB2-CBA2, DC2-CB1-CBA1, DC2-CB1-CBA2, DC2-CB2-CBA1 and DC2-CB2-CBA2. Similarly, all the upgrade combinations are created for all the up cabins using all the input customers and all the types of upgrade combinations.

Next, the upgrade list is returned in Act U11.140, and then the algorithm ends at Box U11.200.

Algorithm to Create Types of Upgrade Combinations

The following algorithm, as shown in FIG. U12, demonstrates one way to calculate all the types of upgrade combinations for a given set of products. The algorithm uses a recursive loop mechanism.

In Act U12.100, a Set of Products (SP) is input and sorted according to the descending order of priority. Priority may be determined in any way the company desires. It may be a subjective guess at customer desires or it may be based on empirical data, for example.

In Act U12.110, UP, a parameter, is initialized and the product with the lowest priority is assigned as the UP. The control enters in into a routine consisting of two loops, an outer loop and an inner loop.

Next, inside the outer loop in Act U12.120, a list of the types of upgrade combinations for UP, defined by the notation L(UP), is initialized as an empty set.

Next, in Act U12.130, Base Product (or BASE, in short), a parameter, is assigned the lowest priority product. The control, then enters the inner loop.

Next, in Act U12.140, a test is performed to determine whether the current BASE is same as the current UP. If so, control brakes the inner loop and passes to Act U12.150, where the L(UP) for the current UP is returned. If not, control remains within the inner loop and passes to Act U12.142, where the list for the current BASE, L(BASE), is assigned to a collection C1.

Continuing within the inner loop, after the Act U12.142, a list of all upgrade options that can provide an upgrade from the current BASE to the current UP, is read from the airline's database and is assigned to a collection called C2, and then C2 is added to L(UP), in Act U12.144. To create the types of upgrade combinations, each member in the collection C1 is combined with each member in the collection C2 and these combinations are then added to L(UP), in Act U12.146. Next, in Act U12.148, the product that is one level higher than the current BASE in the sorted SP list is assigned as the new BASE. Next, control loops back to the Act U12.140, where the test is performed again for the new BASE.

After the Act U12.150, control passes to Act U12.160, where a test is performed to determine whether the current UP is same as the highest priority product in the SP. If so, control exits the outer loop and the algorithm ends at this point, since all types of upgrade combinations for all the products in the SP have been calculated (in Box U12.200). If not, control remains within the outer loop and the product that is one level higher than the current UP in the sorted SP list is assigned as the new UP, in Act U12.170, and then control loops back to the Act U12.120 to repeat processing for the new UP.

The computation may be performed using a processor that may calculate results in optimal time.

Example of Algorithm to Create Types of Upgrade Combinations

The algorithm of FIG. U12 may be used to calculate all the types of upgrade combinations for a given set of cabins in an airline flight, as follows.

Consider an airline flight with 3 cabins, namely, A, B and C. The priority order among the cabins is A>B>C. Per Act U12.100, a Set of Cabins is input to form the SP, with cabins sorted according to the descending order of priority, A>B>C. Per Act U12.110, UP is set to C, the lowest priority product in input SP. Next, control enters the outer loop, where L(C), a list of types of upgrade combinations for the current UP, is initialized as an empty set.

Next, per Act U12.130, the BASE is set to C, and then control enters the inner loop. Per Act U12.140, a test is performed to determine whether the current BASE (i.e., C) is same as the current UP (i.e., C). It is same, so control branches to Act U12.150, where the current L(C):[ ] is returned, and control goes to Act U12.160, where the test is performed to determine whether the current UP (i.e., C) is the highest priority product within SP. It is not, so the process continues to Act U12.170, where B, the product one level higher than C, in terms of priority, is assigned as the new UP. At this point, the process loops back to Act U12.120, where L(B) is initialized as an empty set.

BASE is again set to C, per Act U12.130, and the test is performed to determine whether C (the current BASE) is same as B (the current UP), per Act U12.140. They are not the same, so, the process continues to Act U12.142, where L(C):[ ] is assigned to the collection C1.

Next, per Act U12.144, a list of UTO Types that can provide an upgrade from C to B (i.e., [CB, CBA]) is read from the airline's database and is assigned to C2, and then C2 is added to L(B) to form L(B):[CB, CBA].

Next, per Act U12.146, since C1 is empty, no combinations are created or added to L(B):[CB, CBA]. Then, the process continues to Act U12.148, where B, the product one level higher than C, in terms of priority, is assigned as the new BASE. At this point, the process loops back to Act U12.140, where a test is performed to determine whether the current BASE (B) is same as the current UP (B). They are same, so, the L(B):[CB, CBA] is returned at this point, per Act U12.150, and control goes to Act U12.160, where a test is performed to determine whether B is the highest product. It is not, so, the process loops back to Act U12.170, where A, the product one level higher than B, in terms of priority, is assigned as the new UP.

Per Act U12.120, L(A) is initialized as an empty set. Base is set to C again, per Act U12.130. The test is performed again to determine whether the current Base (i.e., C) is same as the current UP (i.e., A), per Act U12.140. They are not, so, the process continues within the inner loop and L(C):[ ] is assigned to C1, per Act U12.142.

Next, a list of upgrade options [CA, CBA] that can provide an upgrade from C to A is read from the airline's database, and is assigned to C2 which is then added to L(A) to form L(A): [CA, CBA], per Act U12.144. Since C1 is empty, no combinations are created or added to L(A): [CA, CBA], per Act U12.146.

Next, per Act U12.148, B, the product one level higher than C, is assigned as the new BASE, and the process loops back to Act U12.140, where the test is again performed to determine whether B is same as A. They are not, so the Act U12.142 to Act U12.148 are repeated again. Per Act 142, L(B):[CB, CBA] is assigned to C1. Per Act U12.144, [BA], i.e., the collection of all upgrade options that can provide an upgrade from B to A, is assigned to C2, and is added to L(A) to form L(A):[CA, CBA, BA]. Per Act U12.146, each member of C1 [CB, CBA] is combined with each member of C2 [BA], and all these combinations [CB-BA, CBA-BA] are added to the L(A) to form L(A):[CA, CBA, BA, CB-BA, CBA-BA].

Next, per Act U12.148, the BASE is set to A, one level higher than B. Next, the process loops back again to Act U12.140, where the test finds that the current BASE and the current UP are same (A). Therefore, the L(A) is returned, per Act U12.150, and the process control moves to Act U12.160, where the test is performed to determine whether A is the highest product. It is, so, control moves to Act U12.200, where the algorithm ends.

An airline may create a data structure (or a computer-readable medium) that includes an ability to store therein an indication of each customer of an airline who is eligible to receive an upgrade award and, for each said customer, an indication of each award for which the customer is eligible and one or more values associated with the award. Such said values may include, without limitation, a total upgrade value, a payment value, a soft value and an upgrade cost related to the said upgrade; a base cabin value, and an up cabin value; and one or more values specifying traits or characteristics of the customer and so forth.

Upgrade Award

FIG. U13 presents an illustrative Upgrade Award process. The computation may be performed using a processor that may calculate results in optimal time. In Act U13.100, the seat availability in the cabins is obtained (e.g. from an airline's seat allocation database). In Act U13.110, an Upgrade Award rule is obtained (e.g. from the airline's UTO system database). In Act U13.120, the most recent Upgrade List is obtained (from the airline's UTO system database).

Next, in Act U13.130, a check is performed to determine whether the available seats from all the cabins are exhausted (have been already awarded) or if the upgrade combinations in the Upgrade List have been exhausted. If so, then this ends the Upgrade Award process in Box U13.200. If not, then the process moves forward to Act U13.140, where the Upgrade Award rule (thus obtained) is used to obtain a target upgrade combination from the Upgrade List.

Next, in Act U13.150, a check is performed to determine whether the selected upgrade combination is enabled to be upgraded or not. An upgrade combination is enabled if all of its members are enabled to be upgraded. A member of an upgrade combination may become disabled to be upgraded for one or more reasons, such as cancellation of a reservation, failure to approve payment of charges for the final upgrade, the customer was already awarded an upgrade to a higher cabin and so forth. The reasons provided here are examples and an airline may choose to alter these reasons or to add or subtract reasons or use any other reasons of its choosing. Once a customer is awarded or disabled from being upgraded, all the combinations that include this customer become disabled from the Upgrade Award process.

If the combination is enabled, control goes to the Act U13.160, where another test is performed to determine whether there is availability for the current selected upgrade combination. If so, the Upgrade Award process awards the newly available seat to the topmost member of the upgrade combination, and the respective freed-up seats to the rest of the combination members in Act U13.170. In this Act, just before the award, the Upgrade Award process may charge the customers for a payment amount (if any) using any payment method such as a pre-stored charge card, an airline credit account, a direct debit authorization for a bank account, etc. An airline may take the authorization or set the payment terms when the customer is buying the conditional option or the ticket or at any other time. The customer may pre-authorize the airline to charge only on the condition when the customer is being awarded the upgrade. In case the payment fails, an airline may set up different rules to handle it, such as to discard that member, and hence, the corresponding upgrade combination (and follow the Act U13.190), or to seek another form of payment at that point from the customer or to go ahead with the upgrade and then ask for payment from the customer at the time of check-in or boarding or other time.

Next, in Act U13.180, the status of the awarded customers is edited to indicate the fact that they have been awarded. The process loops back to Act U13.130, to continue until either the availability of seats or the upgrade combinations to be upgraded are exhausted, at which the algorithm ends in Box U13.200.

If the upgrade is not enabled (in Act U13.150) or if there is no availability for the current upgrade combination (in Act U13.160), then the current upgrade combination is discarded (in Act U13.190) and control loops back to the Act U13.130 to continue processing for other upgrade combinations.

An airline may use any Upgrade Award rule of its choosing including, but not limited to, to maximize the total upgrade value (monetary or soft value or a combination of both), the number of upgrades or the number of customers in the flight, to balance load across multiple flights, to optimize customer service for all or a selected group of customers, to optimize flight operations and to accomplish any other objectives or combination thereof.

When the Upgrade Award rule is set to maximize the total upgrade value, the upgrade value of each combination member preferably is added together to get the total upgrade value of the entire upgrade combination. Then, all the upgrade combinations from all the upgrade lists (one for each up cabin) are combined together to form one list sorted by descending value, and the topmost upgrade combination is selected as the target to be considered first for an upgrade award.

When the Upgrade Award rule is set to maximize the number of customers in the flight, the number of upgrade awards given to standby customers has to be optimized. Hence, an upgrade combination that includes a standby customer should be given preference over the one that does not include it. Consider a flight with only two seats available in the first cabin. Assume there are two CF UTO customers and two SF standby customers (for first cabin). In this case, the Upgrade Award algorithm will allocate seats to the two standby customers since this would increase the customer count in the flight by two as compared to a no increase in the total customer count if the two CFs are upgraded (assuming no SC standby customers are, available). For the same example, if the Upgrade Award rule is set to maximize the total number of upgrades, the algorithm would choose those customers (out of 2 standby and 2 CF) that belong to the upgrade combinations with more number of members.

An airline may also choose to select the target upgrade combination randomly: to add all the upgrade combinations from all the upgrade lists of a flight to one list and then to randomly select an upgrade combination as the target combination.

An upgrade, award may be given at any time before the flight arrives at its final destination or before the flight departure. It may also be given at a pre-determined time. For one or more Upgrade Award rules, an airline may need to iterate over possible solutions. Especially in the Act U13.140, the process to choose the target upgrade combination may involve one or more sub-acts (one or more of which may be iterative) that enable the company to accomplish the overall objective.

The airline may use the Upgrade Award rules mentioned above to optimize the desired objective(s) within one flight or across multiple flights. For example, a CF UTO customer in flight F1, may be offered an upgrade to the first cabin in flight F2, when doing so would optimize the total upgrade revenue generated or distribute the load more uniformly across the two flights (e.g., the flight F1 may not have a seat available in the first cabin).

In situations, when there are more than one upgrade combination with the same optimal value, the company can use next level (one or more levels as needed) of Upgrade Award rule(s) to further prioritize the upgrade combinations. The next level of upgrade combination could include one or more of the rules defined above.

Both the airline and the customer may have the right to enforce the upgrade award on each other as per the terms and conditions of the option contract. The airline may have the right to charge the customer for the upgrade amount if the customer is upgraded. The airline may inform/notify the customer and/or take approval from customer to charge the customer's account before awarding upgrade. The customer may also have the right to enforce upgrade on the airline within the bounds of the terms and conditions of the options contract.

The terms and conditions of the option contract may also specify fulfillment of one or more conditions before the airline may award upgrade to the customers. Some of the conditions may be such as payment for upgrade, availability of seat in the highest cabin prior to airline starting the upgrades and so forth.

Example of UTO Exercise Process for an Airline Flight

Consider an airline flight with 3 cabins, first, business and coach. A list of all the upgrade-enabled customers (along with their UTO Types and upgrade values) for this flight is presented in FIG. U14. The list contains a few UTO customers, referred to as UTO, a few customers who belong to other 'regular' (i.e., non-option) upgrade programs, referred to as Freebie or FRB, in short, and a few standby customers, referred to as SBY. There is one run scheduled for the Upgrade List at 30 minutes prior to the flight departure, and one for Upgrade Award, at 25 minutes prior to departure.

The following demonstrates an execution of the algorithms for the UTO Exercise process for the flight mentioned above.

Per Act U10.100, the above flight is taken in as an input. Next, control goes to Act U10.110, where a test is performed to determine whether it is time to run Upgrade List or Upgrade Award. When it is 30 minutes prior to departure, the scheduler triggers the Upgrade List process, per Act U10.120. The Upgrade List process creates a list of upgrade combinations for the given input. The details of the Upgrade List process are provided later. Next, control goes to Act U10.140, where a test is made to determine whether any more scheduled runs (for the Upgrade List or the Upgrade Award) are pending. There is one scheduled run pending for the Upgrade Award. So, control loops back to Act U10.120. The scheduler waits until it is 25 minutes to departure. At that point, the scheduler triggers the Upgrade Award process, per Act U10.130, which awards the customers based on the given availability in the cabins. The details of the Upgrade Award process are provided later. Next, control goes to Act U10.140, where the test is run to determine whether any more scheduled runs are pending. There are none, so, the algorithm ends at this point (Box U10.200).

Details of the Upgrade List Process

Per Act U11.100, the list of customers as shown in FIG. U14 (along with their UTO Types and upgrade values) for the flight is taken as an input. The standby customers are assumed to exist in a dummy cabin, Standby (S), that has the lowest priority among all the flight cabins (i.e., S<C<B<F). There are a total of 13 customers in the list. The first column in Box U14.100 displays the UTO Type of each customer. The second column in the Box U14.100 displays the type of customer (UTO or FRB or SBY). All customers are assigned a unique name, as per the third column in the Box U14.100, based on their UTO Type and a numeric value. For example, the 3 customers with UTO Type CF are referred to as CF1, CF2 and CF3. 'Up cabin', the fourth column in Box U14.100, defines the up cabin to which each customer can be upgraded. The Upgrade Value for all customers has been calculated using the method defined earlier and shown in the Box U14.100. For each row, the fifth, sixth, seventh and eighth columns display the payment value, soft value, upgrade cost and total upgrade value, respectively, for the corresponding customer. For CBF1 and CBF2, two sets of upgrade values are provided, one each for business and first cabin, as they can be upgraded to either of the two cabins.

Next, control goes to Act U11.110, where a list of the types of Upgrade combinations for the input flight are obtained (e.g., from the airline's UTO database), as presented in the Box U14.200. The Boxes U14.210, U14.220 and U14.230 display all the types of upgrade combinations with one, two and three members, respectively for the first cabin. The Boxes U14.240 and U14.250 display all the types of upgrade combinations with one and two members, respectively for the business cabin. Box U14.260 displays all the types of upgrade combinations with one member for the coach cabin.

Next, per Acts U11.120 and U11.130, all the upgrade combinations are created as shown in FIG. U15. There are seven columns and 47 rows shown in the FIG. U15. Each row corresponds to one upgrade combination leading to a total of 47 upgrade combinations. For each row, the entries in the first three columns display the members of that upgrade combination. The first column displays the member (if any) for which the up cabin is first. The second column displays the member (if any) for which the up cabin is business. The third column displays the member (if any) for which the up cabin is coach. If there is no entry in either one or more columns (first, second or third) for a row, this implies that there is no member in that combination with an up cabin associated with that column. For example, the upgrade combination in the $21^{st}$ row, CB2-SC1, does not have an entry in the first column, since it does not have a member who is entitled to an upgrade to the first cabin. The upgrade combinations for the first cabin are listed using the regular font, those for the business cabin are listed using the italics font and those for the coach cabin are listed using the bold font.

For each row, the fourth, fifth and sixth columns display the total upgrade value of the member of the upgrade combination listed in the first, second and third column, respectively. For each row, the entry in the seventh column displays the total upgrade value of the entire combination, which is the sum of the upgrade values of each of the combination member.

Once all the upgrade combinations are created, control goes to Act U14.130, where the upgrade list is returned, and then the algorithm ends per Box U14.200.

Details of the Upgrade Award Process

In the Upgrade Award process, per Act U13.100, the availability in each cabin is taken as input. In this case, the first cabin has three seats and the business cabin has one seat available, and there is no availability in the coach cabin, as shown in Box U16.100.

Per Act U13.110, the Upgrade Award Rule is obtained, that specifies the objective to "maximize upgrade value". In Act U13.120, the most recent Upgrade list is obtained (e.g., from the airline's UTO system database), as shown in FIG. U15. Next, control goes to Act U13.130, where the test comes out to be negative, as neither availability nor UPT Pax have been exhausted. So, control goes to Act U13.140, where the Upgrade Award rule is used to select the target upgrade combination with the maximum upgrade value, which is the combination in the $1^{st}$ row, BF1-CB1-SC1, as shown in the first row in FIG. U15.

Next, per Act U13.150, a test is performed to determine whether the combination is enabled. The above combination is enabled. So, control goes to Act U13.160, where a test is performed to determine whether there is availability for the current selected upgrade combination. The current upgrade combination (BF1-CB1-SC1) needs only one seat in the first cabin. There are 3 seats available in the first cabin, and hence, the test result is affirmative. So, control goes to Act U13.170, where all the members of the current upgrade combination are upgraded to their respective up cabins.

The customer BF1 is upgraded from business to first, CB1 is upgraded from coach to business (using the seat emptied after BF1 is upgraded) and the standby customer SC1 is awarded a seat in coach (using the seat emptied after CB1 is upgraded). This Act consumes only 1 available seat from the first cabin, and still 2 seats in the first and 1 seat in the business cabin are available. The total value generated from this upgrade is $280, as shown in the seventh column in the first row in the FIG. U15. In this Act, before awarding the upgrades, the airline may have a requirement to execute payment transactions for some or all of the members of this combination. Here, since CB1 is a FRB customer, there is no payment transaction required for CB1; the standby customer SC1 may halve already deposited the payment when he or she had bought the standbys ticket; and the airline may need to execute a payment transaction only for the UTO customer BF1 (i.e., to charge the exercise price of $90 to BF1). The airline may use any payment transaction mechanism to do so (e.g., a pre-stored credit card, debit card, direct bank account debit, third party service like paypal and so forth).

Next, the upgrade status for all the combination members is modified to reflect their awarded status, per Act U13.180.

Next, control loops back to the Act U13.130, where the test result again comes out to be negative, as both availability (first has 2 seats and business has 1 seat) and Upgrade Combinations (46 more) are not yet exhausted. So, control goes to Act U13.140, where the highest value upgrade combination is selected, which is the one in the second row, BF2-CB1-SC1, as shown in the FIG. U15. Next, pet Act U13.150, the test is performed to determine whether the combination is enabled. It is not, since both CB1 and SC1 have already been "awarded" and are currently in the disabled state. So, control goes to Act U13.190, where the current upgrade combination is discarded.

Next, control loops back again, and the Acts U13.130, U13.140, U13.150 and U13.190 are repeated 8 times. This is because of two reasons. First, the test in the Act U13.130 is negative each time, since both availability (the first cabin has 2 and the business cabin has 1 seat available) and the upgrade combinations are left. Second, the upgrade combinations from the third row to the tenth row are disabled, and thus, discarded, per Act U13.190.

Next, control loops back to the Act U13.130, where the test result again comes out to be negative, as both availability (the first cabin has 2 and the business cabin has 1 seat available) and the Upgrade Combinations (37 more) are not yet exhausted. Next, control goes to the Act U13.140, where the upgrade combination (BF2-SB1) in the $11^{th}$ row in FIG. U15 is selected. The combination is enabled and thus passes the test, per Act U13.150. Next, per Act. U13.160, availability is tested for the current selected upgrade combination. The current upgrade combination (BF2-SB1) needs only one seat in the first cabin. There are 2 seats available in the first cabin, and hence, the test result is affirmative. Thus, control goes to Act U13.170, where all the members of the current upgrade combination are upgraded to their respective up cabins. The customer BF2 is upgraded from business to first and the standby customer SB1 is awarded a seat in the business cabin (using the seat emptied after BF2 is upgraded). This Act consumes only 1 available seat from the first cabin. If there is a payment condition required, that may be checked in this Act just before awarding the upgrades. Here, since BF2 is a FRB customer, there is no payment transaction required for CB1, and the standby customer SB1 may have already deposited the payment when he or she had bought the standby ticket. So, there is no need to execute any payment transaction at this point.

After this Act, both the first and business cabins have 1 seat available. The total value generated by this upgrade is $260, as shown in the seventh column in the eleventh Tow in the FIG. U15. Next, the upgrade status of all the members in the current upgrade combination is modified to reflect their awarded status, per Act U13.180.

Next, control loops back again, and the Acts U13.130, U13.140, U13.150 and U13.190 are repeated once more. This is because of two reasons. First, the test in the Act U13.130 is negative since both availability (1 seat each in first and business) and the upgrade combinations are not yet exhausted. Second, the upgrade combination in the $12^{th}$ row in FIG. U15 is disabled, and thus, discarded, per Act U13.190.

Next, control loops back to the Act U13.130, where the test result again comes out to be negative, as both availability (1 seat each in first and business) and the Upgrade Combinations (35 more) are not yet exhausted. Next, control goes to the Act U13.140, where the upgrade combination (SF1) in the $13^{th}$ row in FIG. U15 is selected. The combination is enabled and thus passes the test, per Act U13.150. Next, per Act U13.160, the availability is tested for the current selected upgrade combination. The current upgrade combination (SF1) needs only one seat in the first cabin. There is 1 seat available in the first cabin, and hence, the test result is affirmative. So, control goes to Act U13.170, where the standby customer SF1 is awarded a seat in the first cabin. This Act consumes the last available seat in the first cabin. If there is a payment condition required, that may be checked just before awarding the upgrade to SF1. Here the standby customer SF1 may have already deposited the payment when he or she had bought the standby ticket. So there may not be any need to execute a payment transaction at this point.

After this Act, there is no seat available in the first cabin, but, the business cabin still has 1 seat available. The total value generated by this upgrade is $250, as shown in $7^{th}$ column in the $13^{th}$ row in the FIG. U15. Next, the upgrade status of SF1 is modified to reflect his/her awarded status, per Act U13.180.

Next, control loops back again, and the Acts U13.130, U13.140, U13.150 and U13.1990 are repeated 30 more times. This is because of two reasons. First, the test in the Act U13.130 is negative each time since both availability (1 seat in the business cabin) and the upgrade combinations are not yet exhausted. Second, all the upgrade combinations from the $14^{th}$ to the $43^{rd}$ row in FIG. U15 are discarded, per Act U13.190. The upgrade combinations from the $14^{th}$ row to the $35^{th}$ row and from the $40^{th}$ to the $43^{rd}$ rows in FIG. U15 are disabled and fail the test per Act U13.150, and are thus discarded, per Act U13.190. The upgrade combinations from the $36^{th}$ to the $39^{th}$ rows in FIG. U15 need availability in the first cabin. Since the first cabin has no seats available, these combinations fail to pass the availability test, per Act U13.160, and thus, are discarded per Act U13.190.

Next, control loops back to the Act U13.130, where the test result again comes out to be negative, as both availability (the business cabin has 1 seat available) and the Upgrade Combinations (4 more are left) are not yet exhausted. The control, then goes to the Act U13.140, where the upgrade combination (CBF1) in the $44^{th}$ row in the FIG. U15 is selected. The combination is enabled and thus, passes the test, per Act U13.160.

Next, per Act U13.160, availability is tested for the current selected upgrade combination. The current upgrade combination (CBF1) needs only one seat either in the first cabin or in the business Cabin. There is 1 seat available in the business cabin, and hence, the test result is affirmative. So, control goes to Act U13.170, where the customer CBF1 is upgraded from coach to business. If there is a payment condition required, that may be checked just before awarding the upgrade to CBF1. Here, the airline may need to execute a payment transaction for the UTO customer CBF1 (i.e., to charge the exercise price of $58 to CBF1). This Act consumes the last available seat from the business cabin. After this Act, there are no seats available in any cabin. The total value generated by this upgrade is $58, as shown in the seventh column in the $44^{th}$ row in the FIG. U15. Next, the upgrade status of CBF1 is modified to reflect the change, per Act U13.180.

Next, control loops back to the Act U13.130, where the test result is affirmative, since there are no more seats available in any of the cabins. Therefore, the algorithm ends at this point (Box U13.200).

In the above example, as shown in Box U16.200, a total of seven customers are awarded upgrades, out of which, 2 are UTO, 2 are Freebie and the rest 3 are standby customers. As evident, the algorithm does satisfy the objective of the upgrade award rule (i.e., to optimize the total value to the airline), and generates a total value of $848 for the airline.

The freebie customer, CB1, with a zero payment value, gets the upgrade over the UTO customer, CB2, with a $55 payment value. This is because the soft value of CB1 ($75) is much higher than that of CB2 ($10), which led to a higher total value for the upgrade combination containing CB1 when compared to that of CB2.

Another observation is that customers BF1 and BF2 received upgrade awards but CF1 and CF2 did not, even though the latter two have higher individual upgrade values than the former two. The upgrade values for CF1 and CF2 are $105 and $95, respectively, and that of BF1 and BF2 are $90 and $85, respectively. CF1 and CF2 were not awarded upgrades ahead of BF1 and BF2 because the total value of the upgrade combination takes precedence over the upgrade values of any individual member. The customers BF1/BF2 have different UTO Types than CF1/CF2, and hence, they belong to different types of upgrade combinations. The total values of all the upgrade combinations that included CF1 or CF2 were lower than those of the awarded upgrade combinations that include BF1 or BF2.

UPO Exercise Process in Any Industry

The UPO Exercise process is similar to the process demonstrated in FIG. U10 for the UTO Exercise process in the airline industry. The UTO exercise process helps to optimally award available products as upgrades to concurrently maximize purchase utilities for the customer and profitability for the company. The UPO Exercise process shall also consist of two acts, the Upgrade List and the Upgrade Award, like the UTO. Both of these acts may be executed using algorithms similar to the ones used for the UTO.

The Upgrade List process may be used to create a list of upgrade combinations based on a given input of upgrade enabled customers along with their UPO Types and Upgrade values. The Upgrade values and the UPO Types may be computed using algorithms similar to the corresponding algorithms in UTO. The algorithm to create types of upgrade combinations for UPO is presented above. The UTO Award process may be executed to use pre-defined rules to optimally award the available higher ranked products to upgrade enabled customers. The specific rules used in the Upgrade List and Upgrade Award processes may be set according to the company dynamics and preference. For example, the Upgrade Award rule may set according to the specific dynamics of the company using the said inventive system.

Using UTO to Optimize Various Factors

The UTO VOF enables a systematic approach to sell the unused up cabin seats as well as to satisfy the unmet needs of the customers. It may also allow an airline to achieve other optimization objectives. The UTO VOF may enable the airline to optimize the or more categories of freebie (defined above) customers and may earn additional revenue. It may also assist an airline to reduce liability from off the balance sheet items such as pending frequent flyer miles of customers by accepting UTO payments in frequent flyer miles instead of cash.

The UTO VOF structure, provides the airline an opportunity to reuse/resell the released seats after upgrades (after the customer holding the seats are upgraded) for potential sails or any other purpose. An airline may calculate, expected numbers of upgrade awards based on expected UTO sales and expected demand to estimate the number of expected released seats. These released seats may be added back to the airline inventory, where they are sold as regular seats or may be utilized for other non revenue purposes.

The UTO VOF structure may also enable the airline to increase potential revenue and/or fulfill its revenue maximization goals, non-revenue goals, maximization of customer satisfaction, utility and loyalty and/or any combination of these. There may be many other instances of next level of optimization attained by the airline there by generating additional revenue, greater customer satisfaction and loyalty or any combination of these.

Embedded UTO Options

The Initial Transaction in a UTO VOF may take place in one or more ways. The airline may explicitly or implicitly solicit customer participation in UTO. An airline may choose to embed UTO in other product offerings. This means, when a customer comes to purchase a product, the airline offers not only one of its products but also the UTO value options embedded in the product. Considering the present UTO example, it may be implied that, the airline may exercise such practice either by creating a separate fare class or modifying an existing fare class with UTO embedded in it. When creating a new fare class, the ticket price may include Initial, Exercise or both UTO Prices. In this way airline may create various scenarios of identifiable and/or non identifiable option prices in the UTO framework.

Business Model to Implement UTO

Different business models may be used to implement an UTO VOF. For example, an airline may choose to implement an UTO VOF individually or in conjunction with one or more partners and/or other companies.

In an implementation of UTO VOF, an airline may allocate a seat inventory of one or more cabins within one or more flights to another entity. The customer may buy one or more flights from the airline or/and the said entity and then interact with the said entity to purchase UTO in relation to the said (already purchased) flights. The said entity may also receive seat allocation from more than one airline, and thus, offer UTOs on flights from multiple airlines to a single customer during the Initial Transaction for UTO.

An airline may choose to allocate one or more seats on one or more flights to another entity (referred to as "Option Aggregator" or OA, in short). The OA may use those seats and operate a service to offer UTOs to the airline customers. A customer may receive one or more flights from the OA, and then receive a UTO on one or more of those selected flights from the OA. Another approach would be for a customer to receive one or more flights from the airline and then receive the UTO option from the OA on one more of those selected flights. In another example, a customer may receive one or more flights from both the airline and the OA, and then receive the UTO option on one or more of those selected flights from the OA. It is also possible that the customer receives an UTO from the airline or both from the airline and the OA on a given set of selected flights.

The OA and the airline may simultaneously offer UTOs to the airline customers, i.e., a customer may either approach the airline or the OA to receive an UTO on desired flights. In another model, the OA may operate as the sole provider of the UTO all the customers of an airline. In a yet another model, the OA and the airline many choose to work together and jointly offer UTOs to the airline customers.

An OA may be able to offer UTO on flights from one or multiple airlines. An OA may receive allocation of one or more seats in one or more cabins within one or more flights from two or more airlines. A customer may purchase one or more flights from one or more airlines and/or from the OA, and then receive an UTO option on one or mole of those selected flights from the OA. Even if the OA may not be entitled to or does not receive seat allocation from an airline, it may still be able to formulate an agreement with that airline to offer UTOs on the flights of that airline. Thus, a customer may be able to receive an UTO on flights from multiple airlines, giving the customer higher chances to get upgrade and a more variety to choose from. For example, a customer may receive an UTO on two flights from two different airlines and may get upgrades to either of those flights within the terms and conditions of the option contract. A customer may purchase Flight A of airline X and get a UTO on the flight A to receive a right to be upgraded to either an up cabin of the Flight A or of another flight (e.g., Flight B of airline Y) within the bounds of the terms and conditions of the option contract. This may provide a lot of value for the customers.

An OA may be able to thus create a multi-airline UTO VOF Framework, which may tremendously enhance the value for the customers. All the participating airlines that allocate seats to and/or partner with the OA to offer UTO may also gain from an overall increase in the total spending by the consumers, enhanced overall customer satisfaction and/or other operational benefits. Either or both of the OA and the airline may process the tickets for the selected flights associated with an UTO purchased by the customer. A customer may receive tickets from the OA or the airline for the flights related to the UTO grant. An entity (e.g., the OA and the airline) may process tickets for the flights offered only by that entity or by either of the two entities.

The OA and the airline may engage in a business agreement to implement a UTO program. The business agreement may divide the total benefit generated by the UTO program between the two parties using any mechanism or criteria as desired. The total UTO Benefit may be shared between the two parties. The airline may allocate seats to the OA. One or more airlines may allocate only few or may allocate their entire seat inventory to the OA to offer those seats to the customers by way of regular sales and/or UTO. In return, the OA may offer a revenue or fee to the airline for all or a portion of the seats allocated. This fee may be given only for the seats that the OA is able to utilize or for all the allocated seats. The lending fee may be a lump sum amount, may depend upon the number of seats allocated or may depend on one or more factors as desired. The agreement may include a provision where the OA may return the allocated seats back to the airline at a certain time and date. There may be one or more conditions associated with the return of unused seats and/or seats released from upgrades of customers from their base cabins, including, but not limited to, returning the same seat, returning another seat of comparable or higher value to the airline and so on.

An OA may include, but is not limited to, a traditional travel agent, an online travel agent, an airline, an airline that offers UTO on its own and/or other airline flights, more than one entity, any entity formed by airline(s) (may or may not be solely for this purpose), any other entity or any combination thereof.

The UTO VOF may include different conditions imposed on the customer regarding the payments related to the UTO. For example, a customer may be asked to make payments only to the airline even if he/she is receiving flights and/or options from the OA. Similarly, the customer may be required only to pay to the OA even if he or she received the flights and/or options from the airlines. The condition may also be set to ask a customer to make one or more payments to the airline for the flights and/or options received from that airline, and to make one or more payments to the OA for the flights and/or options received from that OA. The condition may allow the customer to make partial payments to the airline and the rest to the QA or vice versa, the basis of which distribution may depend upon various factors, including, but are not limited to, the factors of airline's choosing, the arrangement between the OA and the airline and so on. In another example the customer may be required to pay to a third party or may be required to pay to any of the combination of the entities mentioned above.

The business models mentioned above, without limitation, may be used to implement the UPO VOF in any industry.

Information Technology System for UTO

A client-server architecture may be used to implement the UTO VOF However, an airline may use a computer hardware and software infrastructure of its choosing to implement an UTO VOF.

The UTO VOF may be best implemented using one or more computer-implemented methods to operate a computer-implemented service (and/or system) to offer UTOs to the customers, that includes, but not limited to, recording the information pertaining to the offered and/or sold UTOs in a database. It may also include operating a computer-implemented service (and/or system) or other service (and/or system) to execute the UTO Exercise process and award upgrades to one or customers, and record the information pertaining to the said upgrade awards (and/or other related information) and for all the flights related to an UTO in a database.

For the stage one (i.e., to formulate the UTO VOF), an application server may be used along with a database (e.g., a relational database) that stores all the information relevant to the airline and the customer. The database may include all the relevant information sufficient to identify flights the airline chooses to make eligible for UTO. One or more users (e.g., a business analyst or manager) may have full access to this server through Intranet or highly secured VPN environment to design an optimal value option framework. The database shall also store all the information pertaining to all the acts (in stage one) used by an airline while formulating the UTO VOF.

A similar or a different application server and/or a cluster of application servers (functioning concurrently) along with one or more web servers and a set of one or more database servers may be used for the Buy UTO and UTO Exercise processes in the stage two of the UTO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Buy UTO process and the UTO Exercise process may be computer-implemented. All the customer interactions and the related information such as customer needs, inputs payment transactions etc. are stored in this database, including information pertaining to the interactions even with those customers who may not purchase and/or receive UTO. The systems for stage two and stage one should be maintained in a synchronized environment so that each system has access to the most current information and can communicate with each other.

A customer may interact with the Buy UTO and/or the UTO Exercise process either directly or indirectly using a local or a remote terminal (e.g., a computer with a browser and an access to the Internet) that is able to access the web server(s) that host the Buy UTO and UTO Exercise processes. A customer may also interact with an operator (or a computer operator) using any communication mechanism (e.g., in-person, phone, using email, Internet chat, text messaging system) who then communicates with the web server through the Intranet and/or Internet.

The system for the stage one may be hosted and run by an airline, an OA, a third party service provider or any combination of the above. Similarly, the system for the stage two may be hosted by an airline, an OA, a third party service provider or any combination of the above. In the model, where the OA receives seat allocation from the airline and offers UTO to the customers directly, the web server, application server and database for both stage one and stage two shall be managed by the OA. The OA may also have partial (or complete) access to the airline database and systems through a highly secured environment (for example, a virtual private network). In the model, when an OA and an airline tie-up together to provide UTO, all the computer hardware and software infrastructure for both stage one and stage two may be hosted by either or both (mutually) of the sides depending upon the business agreement between them.

Other Applications of UTO in the Airline Industry

There are several other instances where customers rank products offered by an airline and hence, the UTO VOF may be used in such instances. Some of these instances include, but are not limited to, the following:

Most customers would rank a non-stop flight higher than a flight with one or more connections. In this situation, the airline may offer UTO to such customers who purchase a connecting flight. Under this UTO, the customer receives a conditional right to be upgraded to a Leon-stop flight, if there is seat availability in the non-stop flight at a certain time and under certain conditions established as terms of the option contract. Under the option contract, the customer may get to pre-select one or more desired non-stop flights.

Usually, an airline allows a coach customer to carry a limited number (e.g., only up to two pieces) of check-in baggage. To carry more than the limit, a customer may have to pay a hefty amount, which forces quite a few customers to restrict their travel luggage needs. In such situations, an airline can offer UTO to such customers. Under this UTO, a customer receives a conditional right to be allowed to carry more than the normal limit of bags for an appropriate reduced exercise: price, if such additional capacity becomes available at a certain time and under certain conditions established as terms of the option contract.

An airline may offer multiple sets of UTOs to its customers to provide more services and thereby enhance customer satisfaction and loyalty. For example, an airline could offer customers one or more value options sets, such as meals, baggage, check-in-queue, type of seat (aisle, window), and so forth. Customers can assign ranks to these options according to their preferences either explicitly or implicitly or combination thereof. Based on availability, (then or later), the airline could award one or mole such service upgrades to customers as per their prior-selections. For example, a customer could prefer to get a meal instead of an extra checked-in baggage and another customer could prefer an aisle seat over a meal. In such situations, the airline may save costs (such as reduced meals), generate indirect revenue (selling saved baggage capacity as cargo services) and/or enhance customer service.

An airline may offer UTO in lieu of the customers relinquishing one or more rights or expressing a preference for not using one or more products (or one or more parts of a products) or other consideration. The said relinquishment, expression of preference or other consideration may be related to one or more products or aspects related to one or more products offered by the airline or a related entity or any other entity (e.g., rights related to a travel ticketSuch an act on behalf of the customer may generate a potential benefit to the airline. For example, it may save costs that would have otherwise been incurred on the same, or allow an airline to generate additional revenue or other benefit. An airline in such situations, may offer UTO to customers at no charge for either the upgrade option or for the upgrade award or both. These include, but are not limited, to giving option to upgrade in lieu of meals, baggage (check-in and/or carry on), or to motivate customers to opt for e-ticketing, checking through e-kiosks, buying from the airline website and so forth.

In another example, a customer may prefer to fly on flight F1 instead of F2, but at the time of ticket purchase, the customer may be forced to purchase F2 because of price, unavailability or another reason. In this situation, the airline may offer UTO to such customers. Under this UTO, the customer receives a conditional right to be upgraded to the flight F1 for a given exercise price, if a seat becomes available in F1 at a certain time and under certain conditions established as terms of the option contract. It is possible that an airline may find two or more customers with complimentary needs: one customer is booked on F1 and wants an UTO to get a potential upgrade to flight F2 and another customer is booked on F2 and wants an UTO option to get a potential upgrade to flight F1. Use of UTO in such situations may create synergies among customers and airline needs, and thus, generate tremendous incremental revenue potential for the airline while concurrently maximizing the utility for the customers.

An airline may use UTO to optimize several factors such, as optimizing load factors across flights (by upgrading the customers to flights other than the flight they were originally booked on), optimizing scheduling of appropriate aircraft sizes and seating structure on specific routes. The UTO VOF structure may also help to reduce airport congestion and security issues arising there by shifting few customers from busy airport to some less congested airports as it may serve as motivation to some customers.

Other examples of implementing UTO framework in the airline industry include, but are not limited to, airport check-in queue upgrade, cargo service upgrade, cabin baggage upgrade, customer service upgrade, fare class upgrade, airport club upgrades and so forth. In the check-in queue upgrade, a coach customer may buy check-in queue upgrade, and at the time of check-in at the airport, if there is availability in the check-in queue for first cabin, the airline could upgrade the customer to enable him/her to use the check-in queue for first cabin to check-in for his/her coach ticket. A customer may get an airport club UTO to receive a conditional right to be allowed to use an airport club for a given duration if there is availability at a certain time within the bounds of the terms and conditions of the option contract.

An airline may implement UTO to not only enhance revenue from UTO price paid by a customer but also to generate costs savings (e.g. from saving meal), indirect revenue potential (e.g. surplus luggage capacity sold as cargo services), customer loyalty benefits (more repeat business) or any combination of the above.

Application of UPO VOF in Other Industries

The UPO VOF may be applied to almost any industry where customers have different preferences and ranking to the different product offerings and are willing to pay for higher product utility. One may point to examples in many other industries, such as hotels, car rental, cruise, special events, automobile sales and so forth, where UPO VOF may be applied to generate benefit for both companies and their customers.

In the hotel industry, for example, deluxe or royal suites (i.e., usually the higher-rated and more expensive rooms) often don't get booked as frequently as other rooms, because of inadequate demand at existing high prices. There, the UPO VOF may be implemented and UPO value options may be made available to customers booking hotel rooms. For example, a hotel customer who purchased (or is in the process of purchasing) a lower-rated hotel room, may purchase UPO option, to get the right to be upgraded to a higher-rated hotel room at a given exercise price if one becomes available at a certain time and under certain conditions established as terms of the option contract. The two rooms considered here may belong to same or different hotels. The rating among the hotel rooms may be because of the features (or services) attached to the room or personal preferences of the hotel customers or a combination of both. Such features may include, but are not limited to, room size, design, quality of furnishings, location, amenities (in-room and others), hotel property (one hotel versus another) and so forth.

Similarly, in the car-rental (or truck or any rental) industry, a company may face unequal proportion of demand and supply for various levels of cars. The SUVs or other luxury cars often don't get rented out as frequently as some of the other more economical cars, because of inadequate demand at existing high prices. The UPO VOF may be implemented in such situations. For example, a can rental customer who has purchased for is in the process of purchasing) a rental for an economy (lower-rated) car, may purchase UPO option, to get a conditional right to be upgraded to an SUV (a higher-rated car) for a given exercise price, if one becomes available at a certain time and under certain conditions established as terms of the option contract. The two cars considered here may belong to same or different car rental locations. The rating among the cars may be because of the features (or services) attached to the car or personal preferences of the customers or a combination of both. Such features may include, but are not limited to, car type, ease and speed of pick-up and drop-off, car rental location and so forth.

Consider the automobile industry. Often, customers are not able to buy cars they really cherish, because of higher price or unavailability or any other reason. The UPO VOF may be implemented in several ways to concurrently maximize the benefits for the automobile manufacturers and the car buyers. Several examples listed above for the airline industry may also be applied to the automobile industry. For example, a customer may purchase UPO on a lower priced car to get a conditional light to be upgraded to (or receive) a higher-rated car for a given exercise price, if one becomes available at a certain time and under certain conditions established as terms of the option contract. There may be customers willing to wait for a few weeks to a few months to get the high-rated cars (and/or car accessories) at appropriately reduced prices (or terms) by participating in UPO and thereby also letting the car manufacturers to optimize their inventory and overall profitability.

The UPO VOF may be implemented in the real state industry. While buying or renting a property, a customer may be offered a higher rated property (e.g., due to better feature, location, both or any other factor) using a UPO for an appropriately reduced upgrade exercise price. The customers may participate in the UPO programs offered by a seller with or without a small initial price for UPO. If availability and other conditions (such as price conditions) are satisfied, the seller may then upgrade the customer to the higher-rated property. This allows real estate companies to devise new price strategies for different kinds of properties in various market demand situations.

In another example, in relation to the booking for various kinds of events including, but not limited to, sports, movie, opera, theatre etc. or for other activities including, but not limited to, cruises, travel packages etc, a customer may get a more preferable product by taking part in the UPO offered by the company. In this way, customer may get a better event seat or an otherwise expensive vacation trip at appropriately reduced rates, while the company earns a revenue, without any revenue dilution from regular high paying customers.

Summary

An airline using the method and one or more option frameworks outlined above can improve profitability through some combination of increased load factor, revenue and cost reduction, while improving customer goodwill and creating predictable future business.

Using the above system and method, an airline can optimize across customer demand and internal capacities to maximize its revenues and profitability. In other words, using this system and method, an airline can manage its customers, just like any other internal resource, to optimize its overall business processes. Using the above system and method, an airline may create, manage and utilize customer information as if creating a customer inventory that may be used as desired by the airline.

Each company using the system and method taught herein can make its own choices as to how extensively to deploy the method. For example, an airline can implement as few or as many of the foregoing options as it desires; or it may perceive and implement one or more other options.

Similar options can be identified and pricing/service or product alternatives made available in other industries, such as the Hotels Industry, Car Rental and Cruises, and other industries as also mentioned in the above paragraphs.

This method of collecting customers' advanced and ongoing preferences and including these preferences (and perhaps intentions and plans) into the optimization process is fundamentally different from other business methods used currently, namely customization, build to order, build to stock or any other conventional business method. Focus groups or surveys have been used to formulate new programs but without similar impacts or ability to provide dynamic customization and optimization. Though history is of value, it is no substitute for "current" preferences at the time the customer is shopping. Integrating customer preferences with company economics (formally and in real-time) permits optimization of returns for both customers and the company. The above-described system and method enables companies to interact and optimize business transactions with large numbers of customers, while treating each as an individual.

While the invention has been described with respect to a limited number of embodiments, those skilled in the art, having benefit of this disclosure, will appreciate that other embodiments can be devised which do not depart from the spirit and scope of the invention as disclosed herein. Accordingly, the scope of the invention should be limited only by the attached claims.

What is claimed is:

1. A computer-implemented method for an airline to enhance customers' experience in dealing with an airline, comprising:
   a. operating a computer-implemented service that delivers to a customer an option to fly on up to n of m selected flights which satisfy at least some criteria set by the customer, and which holds at least one seat for said customer on said m flights,
      i. where,
         1. m and n are whole numbers and
         2. n<m, and ii. recording information pertaining to at least said option in a data store;
b. operating a system to define each of the n chosen flights, in response to input from a customer or an entity authorized by a customer for at least one of said n chosen flights, whereby after each of the n chosen flights is defined, the customer can fly on said chosen flight; and
c. recording information pertaining to at least said chosen flights in a data store.

2. The method of claim 1 wherein delivering a said option occurs in relation to a customer purchasing a ticket for at least one flight.

3. The method of claim 2 wherein the ticket purchase is for a flight other than a flight for which an option is delivered.

4. The method of claim 1 wherein said flights are selected in multiple transactions.

5. The method of claim 1 wherein said flights are defined in at least one transaction.

6. The method of claim 5 wherein value of said n is defined after said option is delivered to the customer.

7. The method of claim 1 wherein operating the system to define flights includes the customer defining, at one or more times, one or more of the n chosen flights.

8. The method of claim 1 wherein operating the system to define flights includes the airline defining, at one or more times, one or more of the n chosen flights.

9. The method of claim 1 wherein operating a computer-implemented service includes the airline receiving from the customer an indication of one or more terms and conditions associated with said option.

10. The method of claim 1 wherein operating a computer-implemented service includes the airline delivering to the customer one or more terms and conditions associated with said option.

11. The method of claim 1 wherein no payment transaction is executed between the airline and the customer in connection with the option and the selected flights.

12. The method of claim 1 wherein at least one payment transaction is executed between the airline and the customer.

13. The method of claim 12 wherein the payment transaction includes a soft value.

14. The method of claim 1 wherein the option does not include a notify deadline condition.

15. The method of claim 1 wherein the option includes at least one notify deadline condition.

16. The method of claim 15 wherein at least one of said m flights is defined as the chosen flight if the customer fails to satisfy said notify deadline condition.

17. The method of claim 1 wherein at least one of the associated seats on said m flights is released for reuse by the airline.

18. The method of claim 1 wherein said m flights are from more than one airline.

19. The method of claim 1 wherein the customer interacts with the service via at least one web site.

20. The method of claim 1 wherein the delivery of option includes an electronic delivery of said option.

21. The method of claim 1 wherein the customer interacts with another entity operating the service other than the airline.

22. The method of claim 1 wherein the customer receives said option included in a fare class that does not separately identify a price for the inclusion of said option within the total ticket price.

23. The method of claim 1 wherein at least one airline operates at least one of the service or the system.

24. The method of claim 1 wherein at least one airline and at least one other entity each operates at least one of the service or the system.

25. The method of claim 1 wherein at least one airline identifies to the customer at least one eligible flight for said option and allows the customer to select at least one of said m flights from the eligible flights.

26. The method of claim 1 wherein at least one airline selects at least one of said m flights for the customer.

27. The method of claim 1 wherein an airline allocates at least one seat in at least one flight to another airline or entity, which may deliver said option on at least one of said allocated flights.

28. The method of claim 27 wherein said allocation of seats includes at least one condition requiring return of one or more seats.

29. The method of claim 1 wherein operating the system to define flights includes an entity other than an airline or a customer defining, at one or more times, one or more of the n chosen flights.

30. The method of claim 1 wherein delivering an option includes holding at least one more confirmed flight than said n flights for the customer.

31. A computer-implemented method for an airline to enhance a customers' experience in dealing with the airline, comprising:
a. providing a data store including relevant information regarding flights, sufficient to identify flights an airline chooses to make eligible for flight options;
b. using a server with which customers may interact for flight options;
c. using a server to receive inputs, from at least a customer, for flight options and searching the data store for flights eligible for flight options matching all or part of the inputs received;
d. displaying the search results output from the server;
e. receiving selections from at least among the search results of some or all of m flights to be grouped for flight options;
f. delivering to the customer an option to fly on up to n of said m flights, on which at least one seat is held for the customer on said m flights, and recording information for at least said option in a data store, where,
i. m and n are whole numbers and
ii. n<m;
g. operating a service to receive from a customer or an entity authorized by a customer at least one input to define at least one of the n flights among said m flights; and
h. recording information pertaining to at least said n flights in a data store.

32. The method of claim 1 or claim 31 further comprising releasing the hold on seats as and when the n flights are defined.

33. A system to provide options on flights, comprising:
a. a data store including relevant information regarding flights, sufficient to identify flights an airline chooses to make eligible for flight options;
b. a server with which customers may interact for flight options;
c. a server being adapted to receive inputs for flight options and to search the data store for flights eligible for flight options matching all or substantially all the inputs received;
d. at least one output device to output the search results from the server;

e. a data processor being adapted to receive selections from at least among the search results of some or all of m flights to be grouped for flight options;
f. a data processor being adapted to deliver to the customers options to fly on up to n of said m flights on which at least one seat is held for the customer on said m flights, and to record information for at least said options in a data store, where,
  i. m and n are whole numbers and
  ii. $n<m$;
g. an input device being adapted to receive from a customer or an entity authorized by a customer at least one input to define the n flights among said m flights; and
h. a data processor being adapted to record information pertaining to at least said n flights in a data store.

34. A system for providing options on flights, comprising one or more computers executing suitable program code to:

a. deliver to a customer an option to fly on up to n of m selected flights which satisfy at least some criteria set by the customer, and which holds at least one seat for said customer on said m flights,
  i. where,
    1. m and n are whole numbers and
    2. $n<m$;
b. record information pertaining to at least said option in a data store;
c. receive from a customer or an entity authorized by a customer at least one input to define each of n chosen flights, whereby after each of the n chosen flights is defined, the customer can fly on said chosen flights; and
d. record information pertaining to at least said chosen flights in a data store.

* * * * *